(12) United States Patent
Atsmon et al.

(10) Patent No.: US 8,078,136 B2
(45) Date of Patent: Dec. 13, 2011

(54) PHYSICAL PRESENCE DIGITAL AUTHENTICATION SYSTEM

(75) Inventors: Alon Atsmon, Yahud (IL); Amit Antebi, Ramat-Gan (IL); Tsvi Lev, Tel-Aviv (IL); Moshe Cohen, Tel-Aviv (IL); Gavriel Speyer, Tel-Aviv (IL); Alan Sege, Santa-Monica, CA (US); Nathan Altman, RaAnana (IL); Rami Anati, Hadera (IL)

(73) Assignee: Dialware Inc., Los Angeles, CA (US)

( * ) Notice: Subject to any disclaimer, the term of this patent is extended or adjusted under 35 U.S.C. 154(b) by 69 days.

(21) Appl. No.: 12/752,181

(22) Filed: Apr. 1, 2010

(65) Prior Publication Data

US 2010/0256976 A1 Oct. 7, 2010

Related U.S. Application Data

(63) Continuation of application No. 10/618,962, filed on Jul. 14, 2003, now Pat. No. 7,706,838, which is a continuation of application No. 09/570,399, filed on May 12, 2000, now Pat. No. 6,607,136, said application No. 10/618,962 is a continuation-in-part of application No. PCT/IL99/00525, filed on Oct. 4, 1999, and a continuation-in-part of application No. PCT/IB99/02110, filed on Nov. 16, 1999, which is a continuation-in-part of application No. PCT/IL99/00506, filed on Sep. 16, 1999, said application No. 10/618,962 is a continuation-in-part of application No. PCT/IL98/00450, filed on Sep. 16, 1998, and a continuation-in-part of application No. PCT/IL99/00470, filed on Aug. 27, 1999, and a continuation-in-part of application No. PCT/IL99/00521, filed on Oct. 1, 1999.

(60) Provisional application No. 60/180,530, filed on Feb. 7, 2000, provisional application No. 60/115,231, filed on Jan. 8, 1999, provisional application No. 60/122,687, filed on Mar. 3, 1999, provisional application No. 60/143,220, filed on Jul. 9, 1999, provisional application No. 60/145,342, filed on Jul. 23, 1999, provisional application No. 60/153,858, filed on Sep. 14, 1999.

(51) Int. Cl.
*H04M 11/00* (2006.01)

(52) U.S. Cl. .............. 455/403; 455/3.06; 455/412.1; 455/18; 700/94; 705/14

(58) Field of Classification Search .............. 455/403, 455/3.06, 412.1, 18, 414.1, 575.9, 556.1; 700/94; 705/14
See application file for complete search history.

(56) References Cited

U.S. PATENT DOCUMENTS 2,990,646 A 7/1961 Berger
(Continued)

FOREIGN PATENT DOCUMENTS

DE 19645071 5/1998
(Continued)

OTHER PUBLICATIONS

Official Action Dated Feb. 10, 2011 From the US Patent and Trademark Office Re.: U.S. Appl. No. 12/007,441.

(Continued)

*Primary Examiner* — Minh D Dao

(57) ABSTRACT

The interactive authentication system allows a consumer to interact with a base station, such as broadcast media (e.g., television and radio) or PC, to receive coupons, special sales offers, and other information with an electronic card. The electronic card can also be used to transmit a signal that can be received by the base station to perform a wide variety of tasks. These tasks can include launching an application, authenticating a user at a website, and completing a sales transaction at a website (e.g., by filling out a form automatically). The interaction between the base station and the electronic card is accomplished by using the conventional sound system in the base station so that a special reader hardware need not be installed to interact with the electronic card. The user is equipped with an electronic card that can receive and transmit data via sound waves. In the various embodiments, the sound waves can be audible or ultrasonic (which can be slightly audible to some groups of people).

22 Claims, 50 Drawing Sheets

U.S. PATENT DOCUMENTS

| | | | |
|---|---|---|---|
| 3,885,089 A | 5/1975 | Callais et al. | |
| 3,961,323 A | 6/1976 | Hartkorn | |
| 4,207,696 A | 6/1980 | Hyman et al. | |
| 4,231,184 A | 11/1980 | Corris et al. | |
| 4,264,978 A | 4/1981 | Whidden | |
| 4,335,183 A * | 6/1982 | Hosaka | 428/844.6 |
| 4,353,064 A | 10/1982 | Stamm | |
| 4,390,877 A | 6/1983 | Curran | |
| 4,479,995 A * | 10/1984 | Suzuki et al. | 428/203 |
| 4,614,861 A | 9/1986 | Pavlov et al. | |
| 4,637,007 A | 1/1987 | Sakurai | |
| 4,640,034 A | 2/1987 | Zisholtz | |
| 4,641,374 A | 2/1987 | Oyama | |
| 4,670,746 A | 6/1987 | Taniguchi et al. | |
| 4,673,371 A | 6/1987 | Furukawa | |
| 4,677,657 A | 6/1987 | Nagata et al. | |
| 4,682,370 A | 7/1987 | Matthews | |
| 4,696,653 A | 9/1987 | McKeefery | |
| 4,716,376 A | 12/1987 | Daudelin | |
| 4,717,364 A | 1/1988 | Furukawa | |
| 4,764,666 A * | 8/1988 | Bergeron | 463/25 |
| 4,766,294 A | 8/1988 | Nara et al. | |
| 4,814,591 A | 3/1989 | Nara et al. | |
| 4,818,855 A | 4/1989 | Mongeon et al. | |
| 4,840,602 A | 6/1989 | Rose | |
| 4,851,654 A | 7/1989 | Nitta | |
| 4,857,030 A | 8/1989 | Rose | |
| 4,874,935 A * | 10/1989 | Younger | 235/492 |
| 4,894,663 A * | 1/1990 | Urbish et al. | 343/702 |
| 4,918,416 A | 4/1990 | Walton et al. | |
| 4,924,075 A | 5/1990 | Tanaka | |
| 4,935,907 A | 6/1990 | Friedman | |
| 4,942,534 A | 7/1990 | Yokoyama et al. | |
| 4,961,229 A | 10/1990 | Takahashi | |
| 4,973,286 A | 11/1990 | Davison | |
| 4,978,840 A | 12/1990 | Anegawa | |
| 4,984,380 A | 1/1991 | Anderson | |
| 5,032,099 A | 7/1991 | Chan | |
| 5,072,103 A | 12/1991 | Nara | |
| 5,085,610 A | 2/1992 | Engel et al. | |
| 5,176,560 A | 1/1993 | Wetherell et al. | |
| 5,191,615 A | 3/1993 | Aldava et al. | |
| 5,209,695 A | 5/1993 | Rothschild | |
| 5,241,160 A | 8/1993 | Bashan et al. | |
| 5,280,267 A | 1/1994 | Reggiani | |
| 5,280,527 A | 1/1994 | Gullman et al. | |
| 5,289,273 A | 2/1994 | Lang | |
| 5,307,051 A | 4/1994 | Sedlmayr | |
| 5,314,336 A | 5/1994 | Diamond et al. | |
| 5,317,636 A | 5/1994 | Vizcaino | |
| 5,324,038 A | 6/1994 | Sasser | |
| 5,356,326 A | 10/1994 | Ting | |
| 5,376,778 A | 12/1994 | Kreft | |
| 5,407,376 A | 4/1995 | Avital et al. | |
| 5,412,253 A * | 5/1995 | Hough | 307/17 |
| 5,416,829 A | 5/1995 | Umemoto | |
| 5,420,606 A * | 5/1995 | Begum et al. | 345/156 |
| 5,423,073 A | 6/1995 | Ogawa | |
| 5,434,398 A | 7/1995 | Goldberg | |
| H1469 H | 8/1995 | Simonoff | |
| 5,452,901 A | 9/1995 | Nakada et al. | |
| 5,467,095 A | 11/1995 | Rodal et al. | |
| 5,479,408 A | 12/1995 | Will | |
| 5,481,535 A | 1/1996 | Hershey | |
| 5,511,122 A | 4/1996 | Atkinson | |
| 5,517,194 A | 5/1996 | Carroll et al. | |
| 5,522,089 A | 5/1996 | Kikinis et al. | |
| 5,522,623 A * | 6/1996 | Soules et al. | 283/91 |
| 5,523,749 A | 6/1996 | Cole et al. | |
| 5,539,819 A | 7/1996 | Sonoyama et al. | |
| 5,552,790 A | 9/1996 | Gunnarsson | |
| 5,579,537 A | 11/1996 | Takahisa | |
| 5,583,933 A | 12/1996 | Mark | |
| 5,606,732 A | 2/1997 | Vignone, Sr. | |
| 5,623,552 A | 4/1997 | Lane | |
| 5,629,867 A | 5/1997 | Goldman | |
| 5,629,981 A | 5/1997 | Nerlikar | |
| 5,635,701 A | 6/1997 | Gloton | |
| 5,638,047 A | 6/1997 | Orloff et al. | |
| 5,638,450 A | 6/1997 | Robson | |
| 5,640,003 A | 6/1997 | Makino | |
| 5,646,907 A | 7/1997 | Maccabee | |
| 5,647,787 A | 7/1997 | Raviv et al. | |
| 5,655,945 A | 8/1997 | Jani | |
| 5,697,829 A | 12/1997 | Chainani et al. | |
| 5,698,836 A | 12/1997 | Fujioka | |
| 5,708,853 A | 1/1998 | Sanemitsu | |
| 5,717,168 A | 2/1998 | Debuisser et al. | |
| 5,719,387 A | 2/1998 | Fujioka | |
| 5,731,757 A | 3/1998 | Layson, Jr. | |
| 5,740,232 A | 4/1998 | Pailles et al. | |
| 5,742,677 A | 4/1998 | Pinder et al. | |
| 5,745,555 A | 4/1998 | Mark | |
| 5,745,591 A | 4/1998 | Feldman | |
| 5,752,880 A | 5/1998 | Gabai et al. | |
| 5,761,606 A | 6/1998 | Wolzien | |
| 5,763,862 A | 6/1998 | Jachimowicz et al. | |
| 5,764,512 A | 6/1998 | Michel et al. | |
| 5,764,763 A | 6/1998 | Jensen et al. | |
| 5,764,900 A | 6/1998 | Morris et al. | |
| 5,774,791 A | 6/1998 | Strohallen et al. | |
| 5,778,071 A | 7/1998 | Caputo et al. | |
| 5,778,187 A | 7/1998 | Monteiro et al. | |
| 5,786,764 A | 7/1998 | Engellenner | |
| 5,786,988 A | 7/1998 | Harari | |
| 5,789,733 A | 8/1998 | Jachimowicz et al. | |
| 5,793,305 A | 8/1998 | Turner et al. | |
| 5,800,243 A | 9/1998 | Berman | |
| 5,805,676 A | 9/1998 | Martino | |
| 5,809,245 A | 9/1998 | Zenda | |
| 5,815,020 A | 9/1998 | Allen et al. | |
| 5,817,207 A | 10/1998 | Leighton | |
| 5,818,030 A | 10/1998 | Reyes | |
| 5,825,871 A | 10/1998 | Mark | |
| 5,831,520 A | 11/1998 | Stephan | |
| 5,832,424 A | 11/1998 | Tsutsui | |
| 5,847,662 A | 12/1998 | Yokota et al. | |
| 5,847,752 A | 12/1998 | Sebestyen | |
| 5,850,077 A | 12/1998 | Tognazzini | |
| 5,854,589 A | 12/1998 | How et al. | |
| 5,859,913 A | 1/1999 | Goreta et al. | |
| 5,861,841 A | 1/1999 | Gildea et al. | |
| 5,862,491 A | 1/1999 | Nair et al. | |
| 5,864,794 A | 1/1999 | Tasaki | |
| 5,870,155 A | 2/1999 | Erlin | |
| 5,878,142 A | 3/1999 | Caputo et al. | |
| 5,880,769 A | 3/1999 | Nemirofsky et al. | |
| 5,881,149 A | 3/1999 | Weatherill | |
| 5,884,271 A | 3/1999 | Pitroda | |
| 5,903,721 A | 5/1999 | Sixtus | |
| 5,905,246 A * | 5/1999 | Fajkowski | 235/375 |
| 5,905,865 A | 5/1999 | Palmer et al. | |
| 5,907,142 A | 5/1999 | Kelsey | |
| 5,914,980 A | 6/1999 | Yokota et al. | |
| 5,921,674 A | 7/1999 | Koczi | |
| 5,928,292 A | 7/1999 | Miller et al. | |
| 5,949,772 A | 9/1999 | Sugikawa et al. | |
| 5,955,961 A | 9/1999 | Wallerstein | |
| 5,963,643 A | 10/1999 | Goreta et al. | |
| 5,986,562 A | 11/1999 | Nikolich | |
| 5,987,509 A | 11/1999 | Portuesi | |
| 6,005,548 A | 12/1999 | Latypov et al. | |
| 6,010,074 A | 1/2000 | Kelly et al. | |
| 6,014,083 A | 1/2000 | Bauerschmidt et al. | |
| 6,016,476 A | 1/2000 | Maes et al. | |
| 6,018,641 A | 1/2000 | Tsubouchi et al. | |
| 6,019,285 A | 2/2000 | Isobe et al. | |
| 6,021,119 A | 2/2000 | Derks et al. | |
| 6,023,509 A | 2/2000 | Herbert et al. | |
| 6,023,779 A | 2/2000 | Fullam et al. | |
| 6,036,099 A | 3/2000 | Leighton | |
| 6,055,592 A | 4/2000 | Smith | |
| 6,058,373 A | 5/2000 | Blinn et al. | |
| 6,060,332 A | 5/2000 | Martin | |
| 6,068,192 A * | 5/2000 | McCabe et al. | 235/487 |
| 6,079,621 A | 6/2000 | Vardanyan et al. | |
| 6,081,782 A | 6/2000 | Rabin | |

| | | | |
|---|---|---|---|
| 6,089,942 A | 7/2000 | Chan | |
| 6,097,292 A | 8/2000 | Kelly et al. | |
| 6,098,106 A | 8/2000 | Philyaw et al. | |
| 6,110,000 A | 8/2000 | Ting | |
| 6,119,228 A | 9/2000 | Angelo et al. | |
| 6,125,172 A | 9/2000 | August et al. | |
| 6,125,452 A | 9/2000 | Kuriyama | |
| 6,131,042 A * | 10/2000 | Lee et al. | 455/556.1 |
| 6,149,490 A | 11/2000 | Hampton et al. | |
| 6,163,616 A | 12/2000 | Feldman | |
| 6,176,837 B1 | 1/2001 | Foxlin | |
| 6,182,044 B1 | 1/2001 | Fong et al. | |
| 6,186,396 B1 | 2/2001 | Crandall, Jr. | |
| 6,189,096 B1 | 2/2001 | Haverty | |
| 6,194,993 B1 | 2/2001 | Hayashi et al. | |
| 6,195,693 B1 | 2/2001 | Berry et al. | |
| 6,202,926 B1 * | 3/2001 | Ito et al. | 235/449 |
| 6,211,858 B1 | 4/2001 | Moon et al. | |
| 6,222,880 B1 | 4/2001 | Eastmond et al. | |
| 6,233,736 B1 | 5/2001 | Wolzien | |
| 6,236,724 B1 | 5/2001 | Labaton et al. | |
| 6,237,026 B1 | 5/2001 | Prasad et al. | |
| 6,244,260 B1 | 6/2001 | Ragoza et al. | |
| 6,248,946 B1 * | 6/2001 | Dwek | 84/609 |
| 6,257,486 B1 | 7/2001 | Teicher et al. | |
| 6,272,228 B1 | 8/2001 | Martin | |
| 6,278,993 B1 * | 8/2001 | Kumar et al. | 707/708 |
| 6,284,406 B1 * | 9/2001 | Xing et al. | 429/96 |
| 6,289,114 B1 | 9/2001 | Mainguet | |
| 6,292,437 B1 | 9/2001 | Beard | |
| 6,309,275 B1 | 10/2001 | Fong et al. | |
| 6,331,972 B1 | 12/2001 | Harris et al. | |
| 6,332,163 B1 | 12/2001 | Bowman-Amuah | |
| 6,345,766 B1 * | 2/2002 | Taskett et al. | 235/493 |
| 6,360,953 B1 | 3/2002 | Lin et al. | |
| 6,377,670 B1 | 4/2002 | Rosset et al. | |
| 6,380,844 B2 | 4/2002 | Pelekis | |
| 6,382,516 B1 | 5/2002 | King | |
| 6,385,314 B1 | 5/2002 | Furuya | |
| 6,389,055 B1 | 5/2002 | August et al. | |
| 6,389,935 B1 | 5/2002 | Azima et al. | |
| 6,392,960 B1 | 5/2002 | Seltzer et al. | |
| 6,393,126 B1 | 5/2002 | Van der Kaay et al. | |
| 6,400,996 B1 | 6/2002 | Hoffberg et al. | |
| 6,404,877 B1 * | 6/2002 | Bolduc et al. | 379/218.01 |
| 6,421,453 B1 | 7/2002 | Kanevsky et al. | |
| 6,442,510 B1 | 8/2002 | Klefenz | |
| 6,445,780 B1 | 9/2002 | Rosset et al. | |
| 6,513,015 B2 | 1/2003 | Ogasawara | |
| 6,519,564 B1 * | 2/2003 | Hoffberg et al. | 704/270.1 |
| 6,547,130 B1 | 4/2003 | Shen | |
| 6,556,768 B1 | 4/2003 | Nakajima et al. | |
| 6,556,965 B1 | 4/2003 | Borland et al. | |
| 6,559,755 B1 | 5/2003 | Hamamoto et al. | |
| 6,570,490 B1 | 5/2003 | Saitoh et al. | |
| 6,594,052 B2 | 7/2003 | Hiramatsu et al. | |
| 6,607,136 B1 * | 8/2003 | Atsmon et al. | 235/492 |
| 6,628,240 B2 | 9/2003 | Amadeo | |
| 6,641,374 B2 | 11/2003 | Kim | |
| 6,647,063 B1 | 11/2003 | Oikawa | |
| 6,648,719 B2 | 11/2003 | Chan | |
| 6,661,563 B2 | 12/2003 | Hayashi et al. | |
| 6,681,008 B2 * | 1/2004 | Bolduc et al. | 379/222 |
| 6,704,715 B1 | 3/2004 | Rosset et al. | |
| 6,708,892 B2 | 3/2004 | Smith, II | |
| 6,754,641 B2 | 6/2004 | Kolls | |
| 6,758,404 B2 | 7/2004 | Ladyansky | |
| 6,760,276 B1 | 7/2004 | Karr | |
| 6,765,996 B2 * | 7/2004 | Baxter, Jr. | 379/88.14 |
| 6,766,946 B2 * | 7/2004 | Iida et al. | 235/381 |
| 6,804,778 B1 | 10/2004 | Levi et al. | |
| 6,823,452 B1 | 11/2004 | Doyle et al. | |
| 6,853,731 B1 | 2/2005 | Boyle et al. | |
| 6,873,974 B1 | 3/2005 | Schutzer | |
| 6,934,848 B1 | 8/2005 | King et al. | |
| 6,963,842 B2 | 11/2005 | Goodwin | |
| 6,973,426 B1 | 12/2005 | Schier et al. | |
| 6,976,164 B1 | 12/2005 | King et al. | |
| 6,982,649 B2 | 1/2006 | Blum et al. | |
| 6,990,334 B1 * | 1/2006 | Ito | 455/414.3 |
| 7,013,301 B2 * | 3/2006 | Holm et al. | 707/741 |
| 7,058,376 B2 * | 6/2006 | Logan et al. | 455/186.1 |
| 7,080,253 B2 * | 7/2006 | Weare | 713/176 |
| 7,159,153 B2 * | 1/2007 | Kim | 714/48 |
| 7,183,929 B1 | 2/2007 | Antebi et al. | |
| 7,260,221 B1 | 8/2007 | Atsmon | |
| 7,280,970 B2 | 10/2007 | Tamir et al. | |
| 7,334,735 B1 | 2/2008 | Antebi et al. | |
| 7,565,294 B2 * | 7/2009 | Rhoads | 704/270 |
| 7,765,373 B1 | 7/2010 | Merry et al. | |
| 2001/0047486 A1 | 11/2001 | Green et al. | |
| 2001/0055202 A1 | 12/2001 | Templeton et al. | |
| 2002/0019939 A1 * | 2/2002 | Yamamoto et al. | 713/172 |
| 2002/0097467 A1 | 7/2002 | Terahara et al. | |
| 2002/0112171 A1 | 8/2002 | Ginter et al. | |
| 2002/0156917 A1 * | 10/2002 | Nye | 709/238 |
| 2002/0157034 A1 * | 10/2002 | Sagar | 714/4 |
| 2002/0169608 A1 | 11/2002 | Tamir et al. | |
| 2003/0006901 A1 * | 1/2003 | Kim et al. | 340/572.5 |
| 2003/0010190 A1 | 1/2003 | Sammut et al. | |
| 2003/0074569 A1 | 4/2003 | Yamauchi et al. | |
| 2003/0111527 A1 * | 6/2003 | Blossom | 235/380 |
| 2003/0147547 A1 | 8/2003 | Lin et al. | |
| 2003/0159040 A1 | 8/2003 | Hashimoto et al. | |
| 2004/0031856 A1 | 2/2004 | Atsmon et al. | |
| 2004/0053642 A1 | 3/2004 | Sandberg et al. | |
| 2004/0130442 A1 | 7/2004 | Breed et al. | |
| 2004/0220807 A9 | 11/2004 | Tamir et al. | |
| 2004/0236825 A1 | 11/2004 | Anati et al. | |
| 2004/0260556 A1 * | 12/2004 | Hoffberg et al. | 704/270.1 |
| 2005/0044561 A1 * | 2/2005 | McDonald | 725/18 |
| 2005/0172137 A1 | 8/2005 | Hopkins | |
| 2005/0234826 A1 | 10/2005 | Ohmori et al. | |
| 2006/0136544 A1 | 6/2006 | Atsmon et al. | |
| 2006/0229114 A2 * | 10/2006 | Kim, II | 455/575.1 |
| 2006/0271646 A1 * | 11/2006 | Janky et al. | 709/219 |
| 2006/0288374 A1 * | 12/2006 | Ferris et al. | 725/62 |
| 2007/0063025 A1 * | 3/2007 | Blossom | 235/380 |
| 2007/0112565 A1 * | 5/2007 | Kim et al. | 704/229 |
| 2007/0112566 A1 | 5/2007 | Chen | |
| 2007/0135984 A1 | 6/2007 | Breed et al. | |
| 2007/0223705 A1 | 9/2007 | Kasahara et al. | |
| 2008/0034410 A1 | 2/2008 | Udupa et al. | |
| 2008/0071537 A1 | 3/2008 | Tamir et al. | |
| 2008/0072072 A1 | 3/2008 | Muraki et al. | |
| 2008/0152137 A1 | 6/2008 | Nakano et al. | |
| 2008/0173717 A1 | 7/2008 | Antebi et al. | |
| 2009/0006729 A1 | 1/2009 | Piazza et al. | |
| 2009/0175318 A1 | 7/2009 | Koenck et al. | |
| 2009/0264205 A1 | 10/2009 | Atsmon et al. | |
| 2010/0030838 A1 | 2/2010 | Atsmon et al. | |
| 2010/0223120 A1 * | 9/2010 | Dragt | 705/14.27 |

FOREIGN PATENT DOCUMENTS

| | | |
|---|---|---|
| EP | 0526015 | 2/1993 |
| EP | 0789320 | 8/1997 |
| EP | 0872995 | 10/1998 |
| EP | 0933733 | 8/1999 |
| FR | 2790849 | 9/2000 |
| GB | 2236258 | 4/1991 |
| JP | 62-060076 | 3/1987 |
| JP | 01-226091 | 9/1989 |
| JP | 07-087234 | 3/1995 |
| WO | WO 93/11619 | 6/1993 |
| WO | WO 93/21720 | 10/1993 |
| WO | WO 94/17498 | 8/1994 |
| WO | WO 96/10880 | 4/1996 |
| WO | WO 97/15899 | 5/1997 |
| WO | WO 97/16049 | 5/1997 |
| WO | WO 98/12670 | 3/1998 |
| WO | WO 98/57474 | 12/1998 |
| WO | WO 99/22362 | 5/1999 |
| WO | WO 99/23804 | 5/1999 |
| WO | WO 00/01456 | 1/2000 |
| WO | WO 00/15316 | 3/2000 |
| WO | WO 00/21020 | 4/2000 |
| WO | WO 00/21203 | 4/2000 |
| WO | WO 00/29920 | 5/2000 |

| WO | WO 00/77751 | 12/2000 |
| WO | WO 01/82223 | 11/2001 |
| WO | WO 02/14974 | 2/2002 |
| WO | WO 02/076717 | 10/2002 |
| WO | WO 02/078199 | 10/2002 |

OTHER PUBLICATIONS

Official Action Dated Mar. 7, 2011 From the US Patent and Trademark Office Re.: U.S. Appl. No. 12/079,000.
Official Action Dated Feb. 17, 2011 From the US Patent and Trademark Office Re.: U.S. Appl. No. 12/496,669.
Communication Pursuant to Article 94(3) EPC Dated Mar. 25, 2011 From the European Patent Office Re. Application No. 02718485.2.
Official Action Dated Mar. 24, 2011 From the US Patent and Trademark Office Re.: U.S. Appl. No. 10/668,109.
Notice of Allowance Dated May 12, 2011 From the US Patent and Trademark Office Re.: U.S. Appl. No. 11/902,009.
Response Dated May 17, 2011 to Official Action of Feb. 17, 2011 From the US Patent and Trademark Office Re.: U.S. Appl. No. 12/496,669.
International Preliminary Examination Report Dated Dec. 4, 2003 From the International Preliminary Examining Authority of the Patent Cooperation Authority Re.: Application No. PCT/IL01/00758.
International Preliminary Examination Report Dated Mar. 21, 2001 From the International Preliminary Examining Authority of the Patent Cooperation Authority Re.: Application No. PCT/IL99/00525.
International Search Report Dated Dec. 3, 2002 from the International Searching Authority of the Patent Cooperation Treaty Re.: Application No. PCT/IL02/00236.
International Search Report Dated Apr. 4, 2000 From the International Searching authority of the Patent Cooperation Treaty Re.: Application No. PCT/IL99/00525.
International Search Report Dated Jul. 5, 2000 From the International Searching Authority of the Patent Cooperation Treaty Re.: Application No. PCT/IB99/02110.
International Search Report Dated Dec. 9, 2002 From the International Searching Authority of the Patent Cooperation Treaty Re.: Application No. PCT/US02/90342.
International Search Report Dated Feb. 17, 2000 From the International Searching Authority of the Patent Cooperation Treaty Re.: Application No. PCT/IL99/00521.
International Search Report Dated Jul. 21, 2000 From the International Searching Authority of the Patent Cooperation Treaty Re.: Application No. PCT/IL99/00506.
International Search Report Dated Mar. 25, 1999 From the International Searching Authority of the Patent Cooperation Treaty Re.: Application No. PCT/IL98/00450.
International Search Report Dated Mar. 26, 2002 From the International Searching Authority of the Patent Cooperation Treaty Re.: Application No. PCT/IL01/00758.
International Search Report Dated Sep. 28, 2000 From the International Searching Authority of the Patent Cooperation Treaty Re.: Application No. PCT/IL99/00525.
Notice of Allowance Dated Jan. 2, 2008 from the United States Patent and Trademark Office Re.: U.S. Appl. No. 09/806,618.
Notice of Allowance Dated Jun. 4, 2007 From the United States Patent and Trademark Office Re.: U.S. Appl. No. 09/853,017.
Notice of Allowance Dated Oct. 4, 2007 From the United States Patent and Trademark Office Re.: U.S. Appl. No. 09/806,789.
Notice of Allowance Dated Aug. 5, 2008 From the United States Patent and Trademark Office Re.: U.S. Appl. No. 11/339,275.
Notice of Allowance Dated Jun. 7, 2005 From the United States Patent and Trademark Office re.: U.S. Appl. No. 09/806,618.
Notice of Allowance Dated Dec. 11, 2009 From the US Patent and Trademark Office Re.: U.S. Appl. No. 10/618,962.
Notice of Allowance Dated Mar. 24, 2009 From the US Patent and Trademark Office Re.: U.S. Appl. No. 09/787,265.
Notice of Allowance Dated Oct. 26, 2006 From the United States Patent and Trademark Office Re.: U.S. Appl. No. 09/743,065.
Official Action Dated Jun. 2, 2005 From the United States Patent and Trademark Office Re.: U.S. Appl. No. 09/853,017.
Official Action Dated Sep. 2, 2004 From the United States Patent and Trademark Office Re.: U.S. Appl. No. 09/806,789.
Official Action Dated Feb. 3, 2010 From the US Patent and Trademark Office Re.: U.S. Appl. No. 12/007,441.
Official Action Dated Aug. 4, 2008 From the United States Patent and Trademark Office Re.: U.S. Appl. No. 10/618,962.
Official Action Dated Jun. 4, 2007 From the United States Patent and Trademark Office Re.: U.S. Appl. No. 10/618,962.
Official Action Dated Apr. 6, 2006 From the United States Patent and Trademark Office Re.: U.S. Appl. No. 09/806,618.
Official Action Dated Jan. 6, 2009 From the US Patent and Trademark Office Re.: U.S. Appl. No. 10/668,109.
Official Action Dated Jan. 7, 2005 From the United Stated Patent and Trademark Office Re: U.S. Appl. No. 09/853,017.
Official Action Dated Oct. 7, 2004 From the United States Patent and Trademark Office Re.: U.S. Appl. No. 09/806,618.
Official Action Dated Jan. 9, 2006 From the United Stated Patent and Trademark Office Re: U.S. Appl. No. 09/853,017.
Official Action Dated Mar. 10, 2010 From the US Patent and Trademark Office Re.: U.S. Appl. No. 11/902,009.
Official Action Dated Feb. 11, 2008 From the United States Patent and Trademark Office Re.: U.S. Appl. No. 09/787,265.
Official Action Dated Aug. 12, 2004 From the United States Patent and Trademark Office Re.: U.S. Appl. No. 09/831,935.
Official Action Dated Jun. 13, 2007 From the United States Patent and Trademark Office Re.: U.S. Appl. No. 11/339,275.
Official Action Dated Nov. 14, 2006 From the United States Patent and Trademark Office Re.: U.S. Appl. No. 09/806,789.
Official Action Dated Jan. 15, 2010 From the US Patent and Trademark Office Re.: U.S. Appl. No. 11/902,009.
Official Action Dated Dec. 17, 2003 From the United States Patent and Trademark Office Re.: U.S. Appl. No. 09/853,017.
Official Action Dated May 17, 2005 From the United States Patent and Trademark Office Re.: U.S. Appl. No. 09/831,935.
Official Action Dated Jan. 18, 2008 From the United States Patent and Trademark Office Re.: U.S. Appl. No. 10/618,962.
Official Action Dated Mar. 18, 2009 From the US Patent and Trademark Office Re.: U.S. Appl. No. 10/618,962.
Official Action Dated Jun. 19, 2007 From the United States Patent and Trademark Office Re.: U.S. Appl. No. 09/806,789.
Official Action Dated Mar. 19, 2008 From the United States Patent and Trademark Office Re.: U.S. Appl. No. 10/668,109.
Official Action Dated Aug. 20, 2009 From the US Patent and Trademark Office Re.: U.S. Appl. No. 12/272,828.
Official Action Dated Feb. 21, 2008 From the United States Patent and Trademark Office Re.: U.S. Appl. No. 11/339,275.
Official Action Dated May 21, 2007 From the United States Patent and Trademark Office Re.: U.S. Appl. No. 09/806,618.
Official Action Dated Jul. 22, 2009 From the US Patent and Trademark Office Re.: U.S. Appl. No. 12/007,441.
Official Action Dated Oct. 23, 2003 From the United States Patent and Trademark Office Re.: U.S. Appl. No. 09/787,265.
Official Action Dated Sep. 24, 2009 From the US Patent and Trademark Office Re.: U.S. Appl. No. 10/668,109.
Official Action Dated Jan. 25, 2003 From the United States Patent and Trademark Office Re.: U.S. Appl. No. 09/787,265.
Official Action Dated May 25, 2005 From the United States Patent and Trademark Office Re.: U.S. Appl. No. 09/806,789.
Official Action Dated Sep. 25, 2006 From the United States Patent and Trademark Office Re.: U.S. Appl. No. 09/787,265.
Official Action Dated Sep. 25, 2006 From the United States Patent and Trademark Office Re.: U.S. Appl. No. 11/339,275.
Official Action Dated Jan. 26, 2006 From the United States Patent and Trademark Office Re.: U.S. Appl. No. 09/831,935.
Official Action Dated Jun. 29, 2007 From the US Patent and Trademark Office Re.: U.S. Appl. No. 09/787,265.
Official Action Dated Oct. 29, 2008 From the US Patent and Trademark Office Re.: U.S. Appl. No. 09/787,265.
Official Action Dated Aug. 30, 2006 From the United States Patent and Trademark Office Re.: U.S. Appl. No. 09/853,017.

Response Dated Feb. 2, 2010 to Official Action of Jan. 15, 2010 From the US Patent and Trademark Office Re.: U.S. Appl. No. 11/902,009.
Response Dated Dec. 22, 2009 to Official Action of Aug. 20, 2009 From the US Patent and Trademark Office Re.: U.S. Appl. No. 12/272,828.
Response Dated Mar. 24, 2010 to Official Action of Sep. 24, 2009 From the US Patent and Trademark Office Re.: U.S. Appl. No. 10/668,109.
Response Dated Mar. 31, 2010 to Official Action of Feb. 3, 2010 From the US Patent and Trademark Office Re.: U.S. Appl. No. 12/007,441.
Supplemental Notice of Allowability Dated Dec. 16, 2008 From the US Patent and Trademark Office Re.: U.S. Appl. No. 11/339,275.
Written Opinion Dated Aug. 16, 2000 From the International Preliminary Examining Authority of the Patent Cooperation Treaty re.: Application No. PCT/IL99/00525.
Ahuja et al. "An Analog Front End for a Two-Chip 2400-Bit/s Voice-Band Modem", Intel Corporation, IEEE Journal of Solid-State Circuits, 22(6): 996-1003, 1987. Abstract.
Official Action Dated Apr. 2, 2010 From the US Patent and Trademark Office Re.: U.S. Appl. No. 12/272,828.
Encotone "The Technology", TeleIDTM System, Encotone Ltd., 8 P., Retrieved From the Internet: <http://web.archive.org/web/19981205063057/www.encotone.com/html/tech_def.html>, 1998.
Encotone Encotone, Ltd.—Corporate Background, 2 P., 1998. Retrieved From the Internet: <http://web.archive.org/web/19981205164055/www.encotone.com/html/comp_def.html>.
Official Action Dated Apr. 29, 2010 From the US Patent and Trademark Office Re.: U.S. Appl. No. 10/668,109.
Supplementary European Search Report Dated Feb. 24, 2010 From the European Patent Office Re.: Application No. 01908897.0.
Notice of Allowance Dated Aug. 16, 2010 From the US Patent and Trademark Office Re.: U.S. Appl. No. 11/902,009.
Response Dated Jun. 9, 2011 to Official Action of Feb. 10, 2011 From the US Patent and Trademark Office Re.: U.S. Appl. No. 12/007,441.
Response Dated Dec. 22, 2010 to Communication Pursuant to Article 94(3) EPC of Aug. 18, 2010 From the European Patent Office Re. Application No. 01908897.0.
Encotone "The Technology", TeleIDTM System, Encotone Ltd., 8 P., Retrieved From the Internet, 1998.
Encotone Encotone, Ltd.—Corporate Background, 2 P., Retrieved From the Internet, 1998.
Response Dated Jul. 12, 2010 to Official Action of Mar. 10, 2010 From the US Patent and Trademark Office Re.: U.S. Appl. No. 11/902,009.
Official Action Dated Jul. 22, 2010 From the US Patent and Trademark Office Re.: U.S. Appl. No. 12/007,441.
Response Dated Jul. 27, 2010 to Official Action of Apr. 2, 2010 From the US Patent and Trademark Office Re.: U.S. Appl. No. 12/272,828.
Official Action Dated Aug. 6, 2010 From the US Patent and Trademark Office Re.: U.S. Appl. No. 12/079,000.
Response Dated Aug. 22, 2010 to Official Action of Apr. 29, 2010 From the US Patent and Trademark Office Re.: U.S. Appl. No. 10/668,109.
Communication Pursuant to Article 94(3) EPC Dated Aug. 18, 2010 From the European Patent Office Re. Application No. 01908897.0.
Notice of Allowance Dated Nov. 24, 2010 From the US Patent and Trademark Office Re.: U.S. Appl. No. 12/272,828.
Official Action Dated Dec. 2, 2010 From the US Patent and Trademark Office Re.: U.S. Appl. No. 10/668,109.
Official Action Dated Nov. 10, 2010 From the US Patent and Trademark Office Re.: U.S. Appl. No. 12/496,669.
Response Dated Nov. 8, 2010 to Official Action of Aug. 6, 2010 From the US Patent and Trademark Office Re.: U.S. Appl. No. 12/079,000.
Response Dated Dec. 9, 2010 to Official Action of Nov. 10, 2010 From the US Patent and Trademark Office Re.: U.S. Appl. No. 12/496,669.
Response Dated Dec. 21, 2010 to Official Action Dated Aug. 6, 2010 From the US Patent and Trademark Office Re.: U.S. Appl. No. 12/079,000.
Response Dated Dec. 22, 2010 to Communication Pursuant to Article 94(3) EPC of Aug. 18, 2010 From the European Patent Office Re. Application No. 01908897.0.
Response Dated Nov. 22, 2010 to Official Action of Jul. 22, 2010 From the US Patent and Trademark Office Re.: U.S. Appl. No. 12/007,441.
Response Dated Dec. 27, 2010 to Official Action of Dec. 2, 2010 From the US Patent and Trademark Office Re.: U.S. Appl. No. 10/668,109.
Notice of Allowance Dated Jul. 20, 2011 From the US Patent and Trademark Office Re.: U.S. Appl. No. 12/496,669.
Response Dated Jun. 6, 2011 to Official Action of Mar. 7, 2011 From the US Patent and Trademark Office Re.: U.S. Appl. No. 12/079,000.
Response Dated Jun. 23, 2011 to Response of Mar. 24, 2010 to Official Action of Sep. 24, 2009 From the US Patent and Trademark Office Re.: U.S. Appl. No. 10/668,109.
Response Dated Jul. 25, 2011 to Communication Pursuant to Article 94(3) EPC of Mar. 25, 2011 From the European Patent Office Re. Application No. 02718485.2.

* cited by examiner

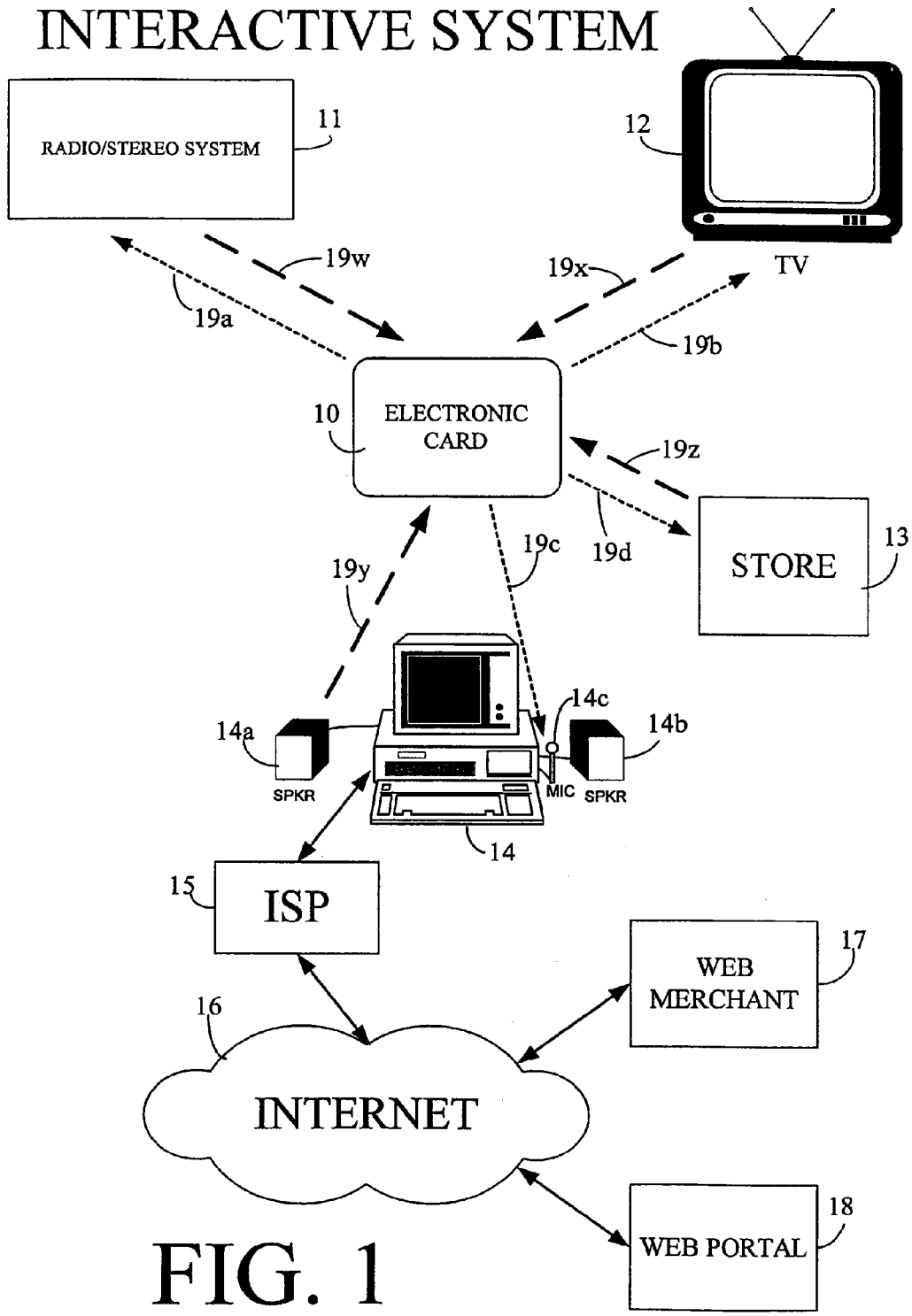

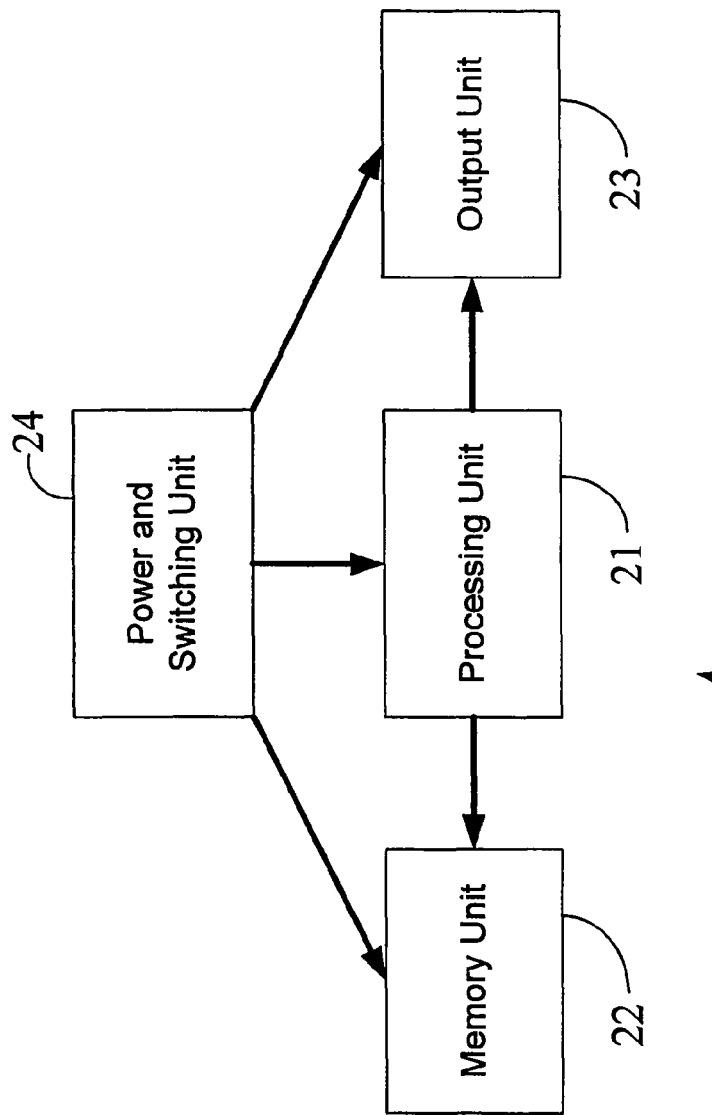

TWO-WAY CARD

CARD RECEIVER

DATA FORMAT

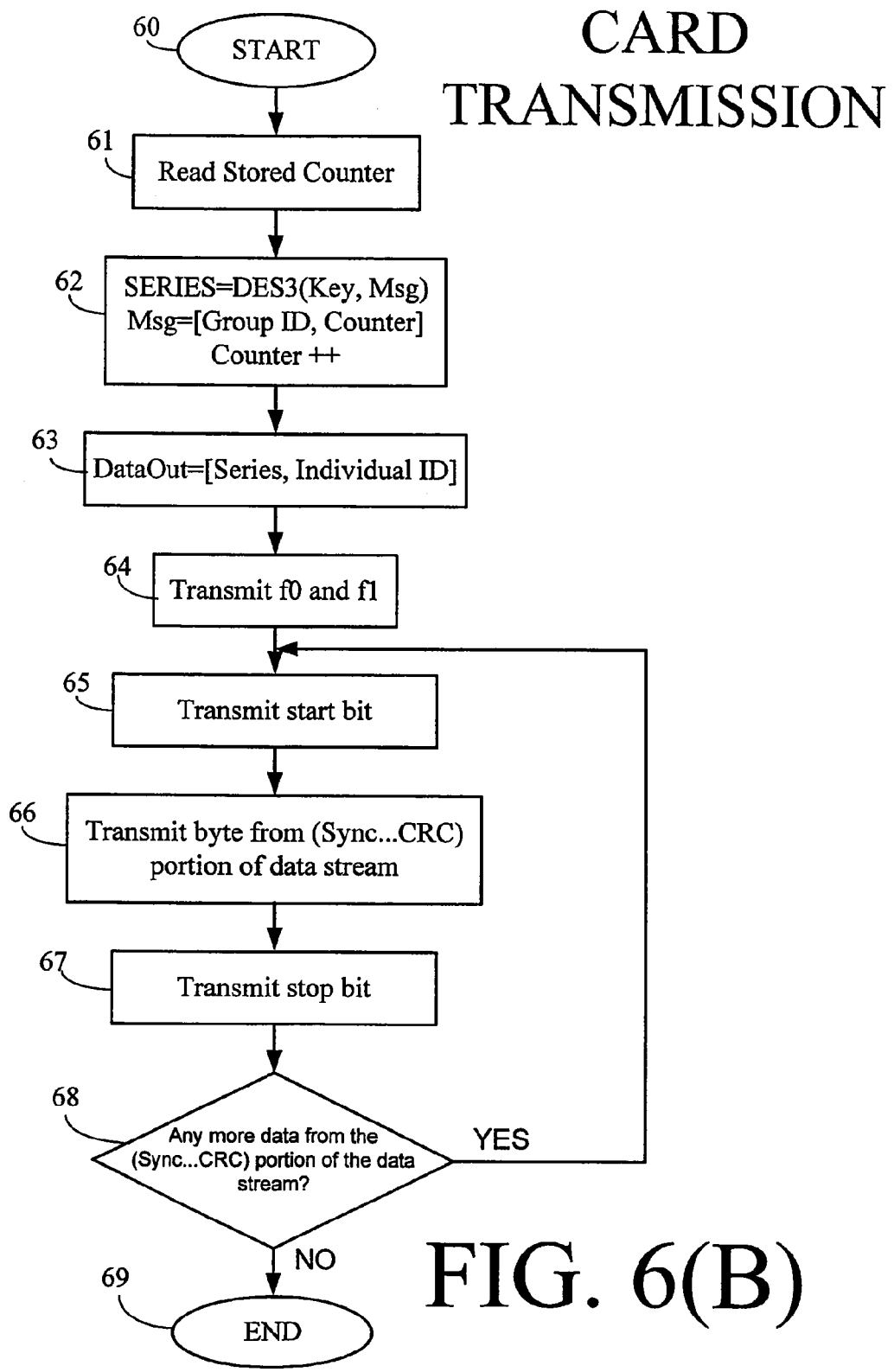

POWER AND SWITCHING CIRCUIT

TRANSDUCER FABRICATION

SMART E-WALLET PROCESS

CSP EMBODIMENT

PHYSICAL PRESENCE DIGITAL AUTHENTICATION SYSTEM

RELATED APPLICATIONS

This application is a continuation of U.S. patent application Ser. No. 10/618,962 filed on Jul. 14, 2003, now U.S. Pat. No. 7,706,838 which is a continuation of U.S. patent application Ser. No. 09/570,399 filed on May 12, 2000, now U.S. Pat. No. 6,607,136, which claims the benefit of priority of U.S. Provisional Patent Application No. 60/180,530 filed on Feb. 7, 2000.

U.S. patent application Ser. No. 10/618,962 is also a continuation-in-part of PCT Application Nos. PCT/IL99/00525 filed on Oct. 4, 1999, and PCT/IB99/02110 filed on Nov. 16, 1999, which both claim the benefit of priority of U.S. Provisional Patent Application Nos. 60/115,231 filed on Jan. 8, 1999, 60/122,687 filed on Mar. 3, 1999, 60/143,220 filed on Jul. 9, 1999, 60/145,342 filed on Jul. 23, 1999, and 60/153,858 filed on Sep. 14, 1999.

PCT/IB99/02110 is also a continuation-in-part of PCT Application No. PCT/IL99/00506 filed on Sep. 16, 1999.

U.S. patent application Ser. No. 10/618,962 is also a continuation-in-part of PCT Patent Application Nos. PCT/IL98/00450 filed on Sep. 16, 1998, PCT/IL99/00470 filed on Aug. 27, 1999, and PCT/IL99/00521 filed on Oct. 1, 1999. The contents of the above Applications are all incorporated herein by reference.

BACKGROUND OF THE INVENTION

1. Field of the Invention

The present invention relates generally to electronic cards or device for interaction with another electronic card or device such as a computer and, in particular, to electronic cards that use acoustic signals for such communications.

2. Description of Related Art

The Internet, and the World Wide Web (WWW) in particular, has grown in popularity in recent years. In addition to news and information, merchants and consumers alike have come to view the web as a virtually unlimited source for conducting business, in the form of sales of products, services, and information. Nevertheless, many computer users are still somewhat leery of conducting sales transactions over the web especially because credit cards are involved, along with the associated fear of widespread and unchecked dissemination of the credit card numbers. These same users may also be leery of conducting non-Internet related sales transactions using credit cards. After all, anyone can swipe a credit card number and use it later for unauthorized purchases. Assurances from well-meaning web (and non-web) merchants do not alleviate these concerns because the user would have to carry a credit card in his person, which can be easily stolen or lost (and thus found by an unscrupulous thief). What is needed is a secure purchasing mechanism that provides users with the peace of mind to make a purchase on the web (or any other form of electronic purchase or other secure information access) without the fear of having his credit card number stolen by an interloper at any point in the transaction.

Typically, systems that provide security to such online users do so to the detriment of user convenience. Because the Internet is a mass-medium, the success of online services depends largely on preserving user convenience. Without such conveniences, users would become decreasingly tolerant resulting in a loss of business and social opportunities for both web merchants and users alike.

Traditional microprocessor credit cards, also known as "smart cards" or "chip cards," provide security. But while smart cards that work in conjunction with dedicated smart card readers have become prevalent (i.e., bank cards in Europe), they are ill-suited for deployment as widespread Internet access control devices. Deploying smart card readers to users in their homes, for example, and educating users on their installation and use, are cumbersome, expensive, and inconvenient.

The prior art smart card systems largely were developed for a disconnected world; that is, maintaining a constant connection between the smart card and some other entity was considered expensive, inconvenient, and largely unnecessary. Indeed, the telephone charge itself was significant enough in cost to warrant minimizing such connection times.

In the prior art smart card, a small computer apparatus was embedded into a credit card plastic. At the very minimum, that apparatus would authenticate a user's secret personal identification number that was manually entered by the user on an in-store keypad every time a card is swiped. This authentication process did not require the intervention of any other authentication network. One aim of the present invention is to provide authentication that is as secure as ordinary bank cards, but in a manner where the functionality associated with the card is accessed via a public network such as the Internet. Ideally, such cards that send a one-way authentication signal can be used anywhere the Internet is available.

Computer network components that communicate using radio frequency (RF), infrared (IR), and wires are well known. In addition, some home appliances are controlled using acoustic remote control. However, these networks and appliances needed dedicated hardware components to realize the communication protocol; that is, specific and specialized hardware whose sole purpose was to effectuate the communication was installed therein. If such communication were not needed, the specific and specialized hardware would not be needed at all. Installing such hardware on an existing computer, TV, or radio may be expensive and/or problematic. Further, some electronic and/or computer embedded devices, for example cellular telephones may be "sealed" products, to which it is impossible to add internal components. What is needed is an electronic device that communicates with existing infrastructure equipment without the need to further equip these infrastructure equipment with any special hardware such as a smart card reader.

PCT publications WO96/10880, WO94/17498, WO93/21720 and WO93/11619, the disclosures of which are incorporated herein by reference describe an electronic device which transmits coded information to a microphone of a telephone using a DTMF-like encoding scheme. A WWW page addressed "http://www.encotone.com/html/tech_def-.html", suggests using such a device to transmit audible DTMF-like tones to a personal computer using the computer's sound card.

Two way communications using audible DTMF-like tones, between an electronic card and a telephone communication system is described in U.S. Pat. No. 5,583,933, the disclosure of which is incorporated herein by reference. Thus, what is needed is a communication mechanism that allows the electronic card to communicate with a transmitter/receiver without the need for dedicated or special hardware. Use of existing components would facilitate the wide acceptance of this communication mechanism, particularly in the purchasing context.

The present invention provides such a system and method and provides solutions to the problems described above.

SUMMARY OF THE INVENTION

One object of the present invention is to provide an electronic system which allows users to easily interact with a merchant (web-based or otherwise) or some other entity.

Still another object of the present invention is to provide a credit card-sized electronic card that can interact with various electronic devices (e.g., computer) to transmit information as well as receive information.

Another object of the present invention is to provide such an interactive electronic system without the use of dedicated hardware; that is, existing hardware will be utilized resulting in little, if any, changes for the television, radio, and stereo system manufacturers.

A further object of the present invention is to require little or no change to the content (as opposed to the infrastructure equipment itself) generated by the existing infrastructure. Sound is an essential element of human communications. Therefore, the present invention is relatively immune from changing communications standards, and is mass scalable. Strictly speaking, implementing those two-way methods requires little or no infrastructure change or modification of existing sound content. Two-way implementations under the current invention provide widespread utility in situations removed from a network. For example, some embodiments described here enable users to "bookmark" sound content, and later use those sound bookmarks to retrieve desired content from a network or other receiving apparatus.

In accordance with one embodiment of the present invention, the interactive electronic system includes an electronic card. In one embodiment, the electronic card is a one-way card that has a transducer, receiver circuitry and software (i.e., DSP and operating system) to process the incoming data. In another embodiment, the electronic card is a two-way card with both transmission and reception circuitry. In a further embodiment, the electronic card is a one-way transmit-only card. In any of these embodiments, the electronic card also includes a display, such as a liquid crystal display (LCD) panel. Memory (ROM, EEPROM, and RAM), a bus system, and power source are also provided. Electronic card contacts may also be provided to allow the electronic card to interface with standard electronic card readers. One or more physical buttons are also provided on the electronic card itself to perform any of a number of functions: (1) transmit data from the electronic card, (2) transmit data followed by a short period in receive mode, or (3) turn on the power to receive data for a short period.

Generally, the electronic card works with the existing infrastructure; that is, no special dedicated reader is necessary for the electronic card to communicate with existing base stations. For example, one such base station is a personal computer. The personal computer typically has sound devices installed therein and the electronic card of the present invention can communicate with the computer using this already existing sound system. However, in another embodiment, special readers can be used to provide various functionality— from reading the contents of the card (for those systems without a sound device) to adding bidirectional support for an otherwise one-way card to recharging the battery(ies) in the card. So, if the computer system is not equipped with a sound system, a special reader is provided to allow the electronic card to communicate with the computer system. As another example, the special reader can be an electronic device with a microphone to allow an otherwise transmit-only one-way electronic card to have two-way capability.

Without trading off security, the present invention provides substantially enhanced user convenience. For example, reader-free authentication devices are disclosed that enable "one-button" triggering of complex tasks such as connecting to a network and logging in securely to personalized network services. The software that enables the reader-free communication can be stored permanently on the base station for enhanced functionality. But for enhanced portability, methods are described for outsourcing that communications software to a remote computer, so that the devices can be used at a broader array of base stations.

The spectrum of applications enabled by the electronic card is broad. For the various embodiments of the present invention, the applications can be grouped into seven different categories—(1) One-way Infrastructure-to-Card, (2) One-way Card-to-Infrastructure, (3) Two-way, (4) Card-to-Card, (5) Client Software Applications, (6) Card Distribution, and (7) Dedicated Systems.

BRIEF DESCRIPTION OF THE FIGURES

The above objects and description of the present invention may be better understood with the aid of the following text and accompanying drawings.

FIG. 1 shows a system level diagram of the various components of the interactive media system in accordance with one embodiment of the present invention.

FIG. 2 shows a high level view of the one-way transmit-only electronic card.

FIG. 6(B) shows a detailed flowchart of the transmission portion of the transmission routine of FIG. 6(A).

DETAILED DESCRIPTION OF PREFERRED EMBODIMENTS

Figure 3A:
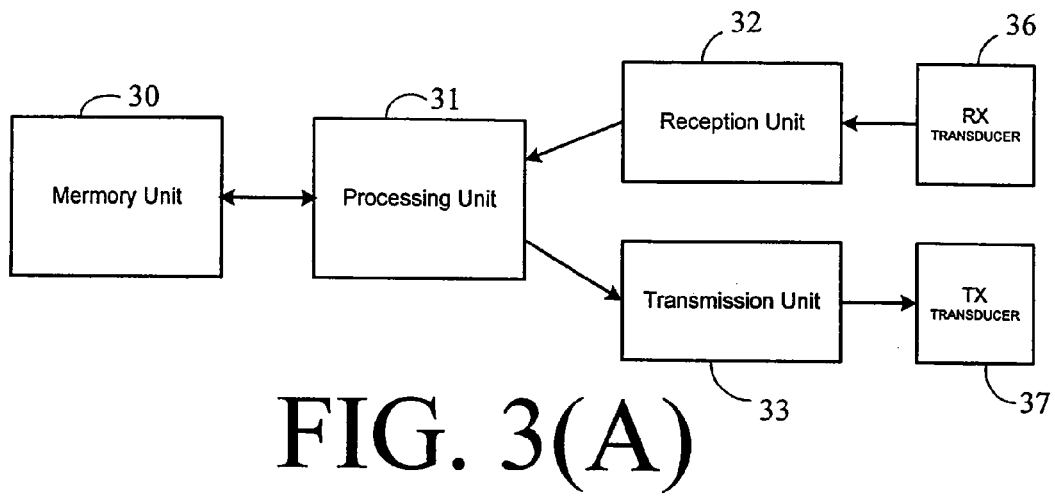
FIGS. 3(A) and 3(B) show high level views of a two-way electronic card.

At a high level, this patent specification provides detailed information on the system, the electronic card itself, the base station (e.g., personal computer), and various applications (which may involve various web servers). In particular, the patent specification is organized as follows:

1.0 SYSTEM SUMMARY
2.0 FREQUENCY RANGE
3.0 ELECTRONIC CARD
   3.1 TWO-WAY CARD
   3.2 CARD TRANSMISSION HARDWARE
   3.3 CARD TRANSMISSION SOFTWARE
   3.3.1 DATA STREAM
   3.3.2 TRANSMISSION ROUTINE
   3.3.3 MULTI-MODE SWITCH
   3.4 CARD RECEPTION HARDWARE
   3.5 CARD RECEPTION SOFTWARE
   3.6 CARD MECHANICAL CONSTRUCTION
   3.6.1 SHEETS-LEVEL CARD FABRICATION
   3.6.2 COMPONENT LAYOUT
   3.6.3 CARD LAYERS
   3.6.4 TRANSDUCER CONSTRUCTION 4.0 BASE STATION
   4.1 CLIENT COMPUTER SYSTEM
   4.2 INSTALLATION AND INITIALIZATION
   4.3 BASE STATION TRANSMISSION SOFTWARE
   4.4 BASE STATION RECEPTION SOFTWARE
   4.5 CONCURRENT OPERATION OF MULTIPLE RECORDING SOFTWARE
   4.6 SERVER-BASED PROCESSING
5.0 APPLICATIONS
   5.1 BROADCAST MEDIA
     5.1.1 BROADCAST MEDIA INFRASTRUCTURE
     5.1.2 BROADCAST MEDIA COUPON TRANSMISSION
     5.1.3 BROADCAST MEDIA COUPON REDEMPTION
        5.1.3.1 Password-based Internet Manual Redemption
        5.1.3.2 Internet Automatic Redemption
        5.1.3.3 Store Redemption
     5.1.4 INTERACTIVE TV AUCTION
     5.1.5 CONTENT RECORDING FOR SEARCH/REDIRECTION
        5.1.5.1 Electronic card Hardware
        5.1.5.2 Server Architecture
        5.1.5.3 System Operation
     5.1.6 BOOKMARKS FOR BROADCAST MEDIA
   5.2 SMART E-WALLET SYSTEM
     5.2.1 INSTALLATION
     5.2.2 OPERATION
     5.2.3 SECURITY
   5.3 WEB TRANSACTIONS AND AUTHENTICATION
     5.3.1 CREDIT CARD INFRASTRUCTURE
     5.3.2 ON-LINE AUTHENTICATION
     5.3.3 OFF-LINE AUTHENTICATION
     5.3.4 PASSWORD GENERATOR
     5.3.5 CHALLENGE-RESPONSE
     5.3.6 CRYPTO SERVICE PROVIDER (CSP)
   5.4 PLUG-INS
     5.4.1 PLUG-IN SUBSERVIENT
     5.4.2 PLUG-IN DOMINANT
   5.5 POINTS/CASH PURCHASING MECHANISM
   5.6 BAR CODE READER
   5.7 CARD-TO-CARD INFORMATION EXCHANGE
   5.8 WEBPAGE-DEPENDENT ACTIVATION
   5.9 ELECTRONIC LOYALTY SYSTEM
   5.10 ADDITIONAL SYNERGIES WITH VOICE
6.0 NON-ACOUSTIC EMBODIMENTS
   6.1 RADIO FREQUENCY (RF)
   6.2 MAGNETIC FIELD 1.0 System Summary One embodiment of the present invention provides for a system that allows a user to interact with merchants and other entities via an electronic device, such as television, radio, or personal computer, to conduct transactions of various kinds (e.g., consumer purchase of products/services, security check). The transactions can involve transmitting information of various kinds (e.g., membership information, personal information) and receiving information of various kinds (e.g., account statements, coupons, special sales offers, other sales information). The user is equipped with an electronic card that can receive and transmit data via sound waves. The interaction is accomplished by using sound from the electronic device's speakers when receiving data and emitting sound from the electronic card to the electronic device's microphone when transmitting data. In the various embodiments, the sound waves can be audible or ultrasonic (which can be slightly audible to some groups of people).

Note that in addition to the electronic card, the client software, and the various applications, the communications protocol itself also contains various unique aspects. The communications scheme can be between cards and between the card and the base station. The direction of the transmission can be one-way or two-way.

FIG. 1 provides a high level view of the interactive system in accordance with one embodiment of the present invention. At the core of the system is an electronic card 10 (or electronic card 10). As discussed in greater detail below, the electronic card 10 is a card that complies with standard credit card form factor requirements while containing some electronic circuitry and transducer(s) for processing data, storing data, transmitting data, and receiving data. In some embodiments, the electronic card 10 also contains an LCD display. The transmitted and received data are in the form of sound waves that are either audible or ultrasonic.

Although this embodiment requires the electronic card to adhere to ISO-compliant credit card form factor specifications, other embodiments do not require such compliance. Indeed, other embodiments involve large electronic devices that contain the logic and functionality described herein in this patent specification. Although a major advantage of the electronic card in accordance with one embodiment is its credit card form factor size, the spirit and scope of this patent application extends to any electronic device regardless of physical form factor.

In one embodiment, as illustrated in the general diagram of FIG. 1, the electronic card 10 can be used by the user to interact with almost any infrastructure electronic device, so long as the infrastructure electronic device is equipped with hardware that is not necessarily dedicated to interact with the electronic card 10 and supporting software. Thus, the electronic card 10 can transmit data to a radio 11 via sound waves 19$a$, television 12 via sound waves 19$b$, a computer 14 via sound waves 19$c$, and some electronic device in conventional store 13 via sound waves 19$d$. Of course, each of these infrastructure electronic devices must have corresponding microphones to receive the sound waves (e.g., microphone 14$c$ for computer 14). In the case of the radio 11 and television 12, the electronic card 10 can emit infrared, RF, or magnetic signals, instead of sound waves if these devices do not contain a microphone. Also, the electronic card 10 is equipped with transmission circuitry, microprocessor circuitry, memory, and a transducer to generate the sound waves.

Conversely, the infrastructure devices can deliver data to the electronic card 10. Thus, the electronic card 10 can receive data from radio 11 via sound waves 19$w$, television 12 via sound waves 19$x$, computer 14 via sound waves 19$y$, and some electronic device in conventional store 13 via sound waves 19$z$. Each of these infrastructure electronic devices must have corresponding speakers to emit the sound waves (e.g., speakers 14$a$ and 14$b$ for computer 14). The electronic card 10 is equipped with reception circuitry, microprocessor circuitry, memory, and a microphone to receive and process the sound waves.

When the electronic card 10 is used with a personal computer 14, other commercial opportunities open up. For example, the user could use the electronic card to interact with a web merchant 17 and a web portal 18 via the Internet 16. Of course, the average consumer would need access to the Internet via some Internet Service Provider (ISP) 15. The electronic card 10 could be used to facilitate the sales transaction between the web merchant 17 and the user. Furthermore, the electronic card 10 could provide a greater sense of security to various web players (i.e., web merchants, credit card issuers, acquiring banks, consumers themselves). These and other applications of the electronic card-based interactive system are detailed below.

The following is a sampling of the system specifications.

| System Feature | Specification Description |
| --- | --- |
| Card transmission speed | Card-to-PC: 200 bps |
| EDAC mechanisms | Bytes transmitted with parity, with on-the-fly error correction and detection |
| Card lifespan | Up to 10,000 key presses |
| Card dimensions | 0.76 mm × 85 mm × 54 mm |
| Robustness | Sustains bending and torsion; highly resistant to electromagnetic radiation |
| Range | 1-2 feet from microphone |
| PC Operating System | Windows 95/98 |
| System Requirements | Pentium 100 MHz; 32 MB RAM; 1 MB free space on hard disk; sound card |
| Browsers | Internet Explorer 4.0 and higher; Netscape Communicator 4.0 and higher; AOL |

The transmission technique is frequency shift keying (FSK), as described in more detail below. In other embodiments, the transmission technique is n-ary phase shift keying (PSK). However, in contrast to the FSK technique where magnitude was used in the DFT banks to select the two relevant frequency channels, nPSK relies on selecting a particular channel for detection and then determine phase drift and offset by examining the I and Q channels.

The spectrum of applications enabled by the electronic card is broad. From a complexity point of view, the applications may include, at one extreme, the simple task of providing information to a web merchant or store (i.e., "I am present.") to a medium complexity task of automating the process of filling out a form and, at the other extreme, performing a complicated series of tasks involving security, context sensitivity actions, and multiple modes. For the various embodiments of the present invention, the applications can be grouped into seven different categories—(1) One-way Infrastructure-to-Card, (2) One-way Card-to-Infrastructure, (3) Two-way, (4) Card-to-Card, (5) Client Software Applications, (6) Card Distribution, and (7) Dedicated Systems. Each of these categories of applications will be described in greater detail below.

2.0 Frequency Range

In one embodiment of the present invention, the interactive system uses acoustic waves. Preferably, acoustic signals in the ultrasonic frequency band are used. In one embodiment of the present invention, acoustic waves in the ultrasound frequency range will be used. Ultrasound is in the 15-28 kHz frequency range, and typically higher. Of course, the reader should realize that ultrasound has no fixed upper limit. In the preferred embodiment, the frequency range of 17-20 KHz has been selected for the ultrasonic acoustic signals. In particular, one embodiment uses 17.5 kHz for one FSK frequency and 18.5 kHz for the other FSK frequency. These numbers were selected because half (for Nyquist sampling) of the 44.1 KHz recording rate for CD-quality audio is 22.05 KHz. The upper limit of 20 KHz was selected because in most sound systems, sound above 20 KHz is filtered out sharply. Thus, this embodiment uses sounds in the frequency range that can be supported by the current sound systems that are installed in today's computer systems. In another embodiment, the sound waves can go down to 10 kHz while still retaining the benefits of the ultrasonic frequency signals.

Ultrasound has certain benefits over the audible frequency range. First, most people cannot hear ultrasound and when they do hear it, it is not noticeably loud. Normally, young people can hear in sounds in the frequency range of 0-20 kHz, adults can hear in the 0-18 kHz range, and the older senior citizens can hear in the 0-16 kHz range. Some animals, such as dogs, can hear sounds at much higher frequencies.

Second, ultrasound is less subject to interference. Most ambient noise is audible and audible sounds are omnidirectional. Thus, using audible frequencies would subject the electronic card to all sorts of unwanted interference. As the sound is at a higher frequency range (such as ultrasound), it also becomes more directional. In addition to the directionality, the higher frequency sounds travel shorter distances. Thus, ultrasonic noise sources, if any, need to be generally pointing directly at the microphone and be reasonably close to the ultrasonic electronic card to cause any interference.

Third, the bandwidth is greater at the higher frequencies. Therefore, more information can be transmitted per unit of time. This is important because the data transfer should not occur over an extended period of time.

Fourth, to implement ultrasound, the transducers are smaller than conventional sound transducers. Because the electronic card will comply with the major credit card standards, this small size is particularly important. The smaller size transducers will take up less space and if placed strategically in the card, the user will be able to bend the electronic card without any damage to the components therein.

Fifth, the ultrasonic electronic card can be used with existing non-dedicated base station infrastructure equipment. For example, the sound device (e.g., "Sound Blaster" sound card) in a personal computer supports the ultrasound frequency band. Accordingly, with no hardware modifications, additions, or subtractions of any kind, the electronic card of the present invention can interface with the existing base station infrastructure.

When ultrasound is used, the electronic card has a range of approximately 1-3 feet. Other frequency ranges, such as the audible frequency range, provide greater distances. Thus, the particular acoustics that the electronic card uses determines the transmission distance. Typically, the user (and hence the card) would be fairly close to a microphone to pick up the acoustic signals transmitted by the electronic card. This also applies to the reception of the acoustic signals by the electronic card.

Of course, the selection of the frequency range for the acoustic signal depends on the application. If the base station that communicates with the acoustic electronic card is a conventional telephone, for example, audible acoustic signals should be used since filters in the telephone network remove signals in the ultrasound range. Thus, in one embodiment, the electronic card emits acoustic signals in the non-ultrasonic audible frequency range so that it can communicate with band-limited sound systems. In another embodiment, the particular audible frequencies that are used are based on the DTMF system.

3.0 Electronic Card

The electronic card 10 (see FIG. 1) will now be discussed. Initially, a two-way card will be described, followed by individual transmission and reception components. Note that some embodiments require a two-way card, while other embodiments require a transmit-only one-way card or a receive-only one-way card. In all of these embodiments, at least one switch that is physically activatable by the user is provided on the card. In some embodiments, multiple switches are provided to provide additional functionality.

3.1 Two-Way Card

A high level block diagram of a two-way electronic card will now be described with respect to FIGS. 3(A) and 3(B). For one-way transmit-only cards, the transmission portion of the two-way card is used. For one-way receive-only cards, the receiver portion of the two-card is used.

FIG. 3(A) shows one embodiment where a receive transducer and a separate transmit transducer are provided. In FIG. 3(A), memory unit 30 is coupled to processing unit 31, which is in turn coupled to reception unit 32 and transmission unit 33. The received signals in the reception unit 32 are provided to the processing unit 31. Also, the processing unit 31 determines what data to transmit with the transmission unit 33. The reception unit 32 is coupled to the receive transducer 36, while the transmission unit 33 is coupled to the transmit transducer 37. A power and switching unit that is identical to unit 24 of FIG. 2 is also provided but not shown in FIG. 3(A).

Figure 3B:
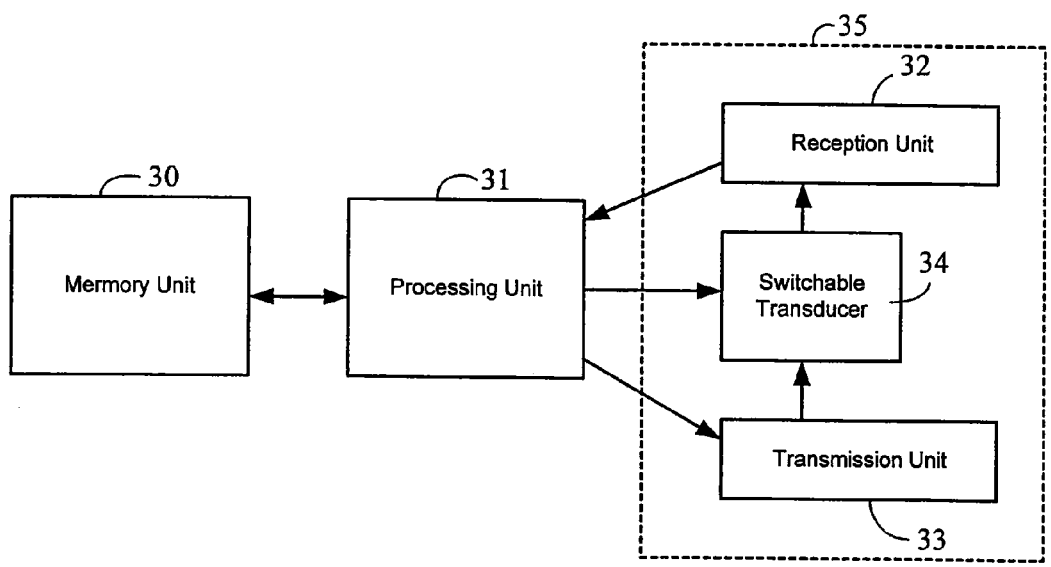

In contrast, FIG. 3(B) shows another embodiment where a single transducer is provided for both reception and transmission. Again, the memory unit 30 is coupled to the processing unit 31. The processing unit 31 is coupled to an input/output unit 35. The input/output unit 35 includes a reception unit 32, a transmission unit 33, and a switchable transducer 34. The switchable transducer 34 is under the control of the processing unit 31 since the processing unit 31 knows when the electronic card should transmit and receive. Any received signals detected by the switchable transducer 34 are provided to the reception unit 32, while any signals that need to be transmitted are provided by the transmission unit 33 to the switchable transducer 34.

Further details of the card's transmission and reception hardware units will be provided below. Also, the software in the microcontroller 31 includes:
(1) transmission software
(2) reception software
(3) encryption software
(4) memory retrieval and storage These four parts of the card's software will be discussed further below.

3.2 Card Transmission Hardware

The transmission hardware will now be discussed. In particular, the transmission hardware will be discussed in the context of a one-way transmit-only electronic card 10 as shown in FIG. 2. The electronic card 10 is essentially a portable device with a processing unit 21, memory unit 22, output unit 23, and power and switching unit 24. The processing unit 21 provides the computation and control necessary for operating system functionality, cryptography, communication, memory management, and code updates. This unit comprises a dedicated chip microcontroller, DSP functionality, a smartcard chip, and a bus system. Preferably, the processing unit used has sufficient power (a few MIPS), and includes some on-chip or off-chip memory for storing and/or generating a cryptographic signature. A Microchip 12C508, 12C672 or higher processing unit is preferred. In one embodiment, a Microchip PIC16F84 is used which uses an on-chip EEPROM.

Preferably, the microcontroller should satisfy the following requirements:
(1) working voltage of 2.2 V depending on the battery. Although 2.2 V is adequate for standard batteries, 2.0 V is preferable. A voltage of 3.0 V also works.
(2) low supply current of approximately 2 mA
(3) MIPS: at least 0.5
(4) Program memory of 2 KBytes, although 2 K instructions is preferable
(5) EEPROM of 8 Bytes
(6) Data memory of 100 Bytes (although the Microchip PIC16F84 has 68 Bytes)
(7) Timer is desirable
(8) RC input for clock source in one embodiment, but an external frequency source can be used for some ASIC implementations
(9) Die
(10) Temperature tolerance of 0-50 degrees Celsius for working conditions and −10 to 70 degrees Celsius for storage
(11) Watchdog functionality to add reliability to the microcontroller (resets the microcontroller if it starts to malfunction)
(12) I/O: at least 4 I/O pins are needed with 2 spares.
(13) Sleep mode for reducing current after card operation has been executed
(14) Low cost The memory unit 22 is used to store data relevant for the card user. The memory unit 22 comprises read only memory (ROM), random access memory (which may also be incorporated in the processing unit 21), and an EEPROM to permanently store externally received data. Specifically, the memory unit can contain data for security encryption, personal details, electronic coupons, and upgradeable software. In one embodiment, the memory unit 22 is a non-volatile memory. The digital ID stored therein is 8 bits long in one embodiment and after encryption, it becomes 32 bits (for main digital ID bits, checksum, CRC, header, etc.).

The output unit 23 physically creates the transmitted signal. It is preferably made from a metal plate with a piezo material (e.g., piezo ceramic material with a small thin metal plate) on it. Being very thin, these transducers produce the required intensity at the ultrasonic frequencies. It also comprises driver circuitry and amplification circuitry connected between it and the processing unit 21.

The power and switching unit 24 comprises a very thin battery with enough capacity and drain ability, or with recharge capabilities. A switch is provided for turning the card on or off and for changing states (or modes) of the card. Aside from a mechanical switch, the processing unit can also automatically turn the power and switching unit 24 off. The card may be programmed so that the system wakes up at the occurrence of certain wake-up events. Power supply amplification and filtration are also provided.

Figure 7:
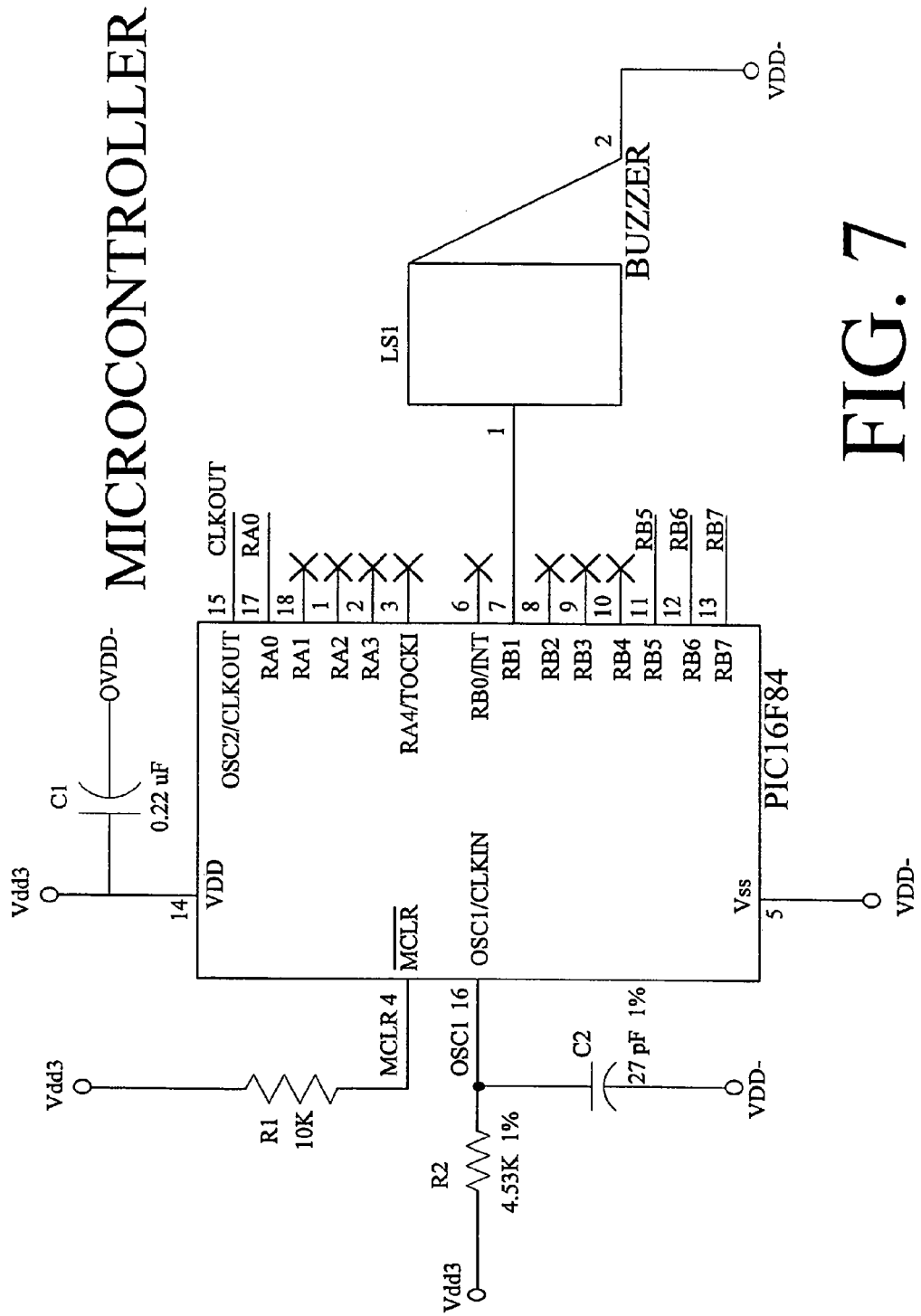
FIG. 7 shows a low level view of the circuitry surrounding the microcontroller in accordance with one embodiment of the present invention.

Referring now to FIGS. 7-10, a detailed low level description of the one-way card will now be provided. FIG. 7 shows the Microchip PIC 16F84 microcontroller and surrounding circuitry. The processor is a PIC 16F84, which is fast and contains on-chip data EEPROM. The PIC 16F84 also provides for three options to provide the clock source—(1) external crystal oscillator, (2) external oscillator circuit, and (3) external RC circuit. Because of the size constraint of the electronic card, a crystal clock source could not be used. Also, an external oscillator circuit, while feasible, contains too many components. Accordingly, an RC circuit (R2 and C2) is provided at the OSC1/CLKIN input. With the particular values shown in FIG. 7, the clock frequency selected is 4 MHz. Reset is provided at the MCLR input.

Figure 8:
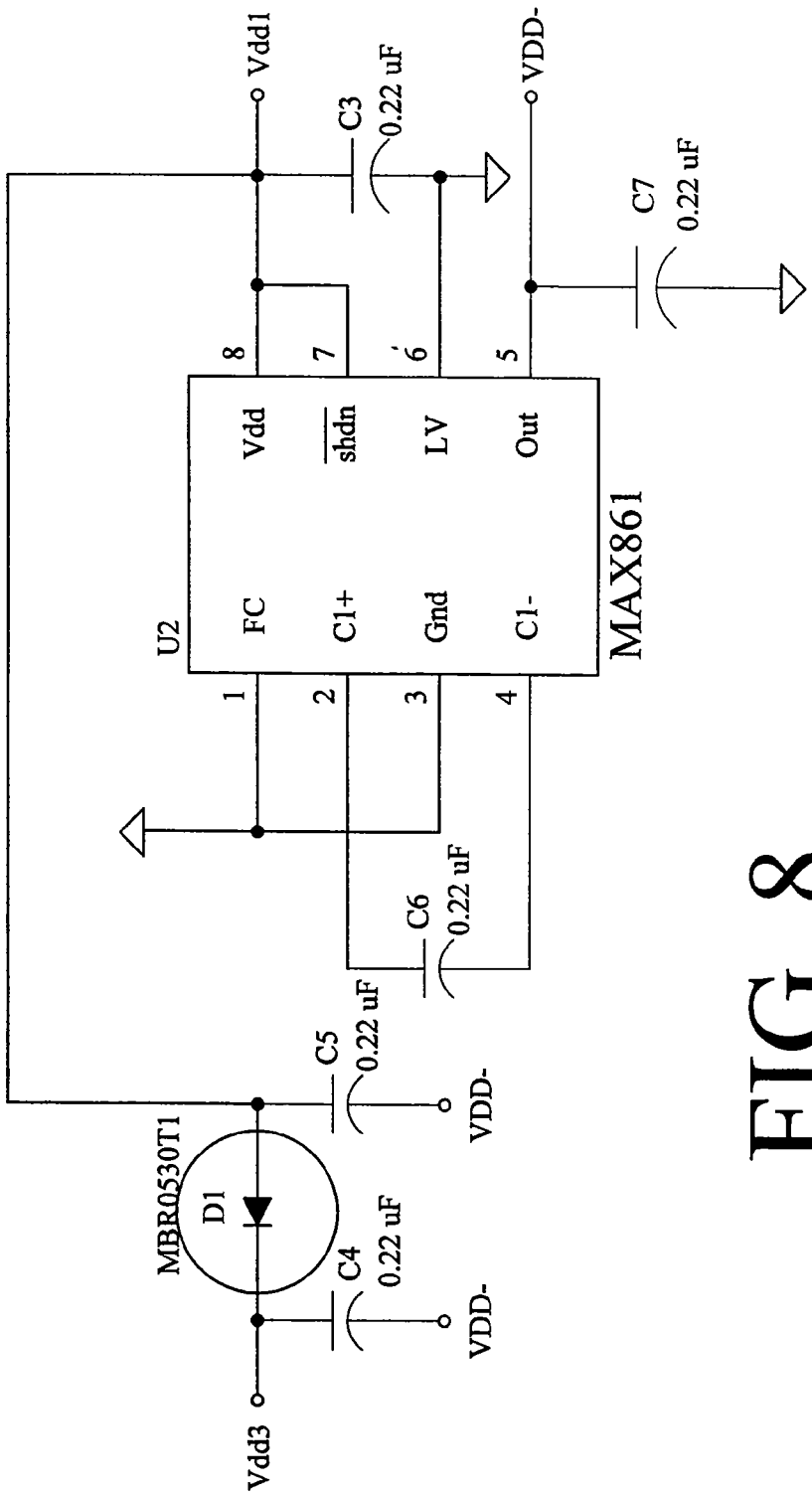
FIG. 8 shows a low level view of the voltage doubler circuitry in accordance with one embodiment of the present invention.
Figure 9:
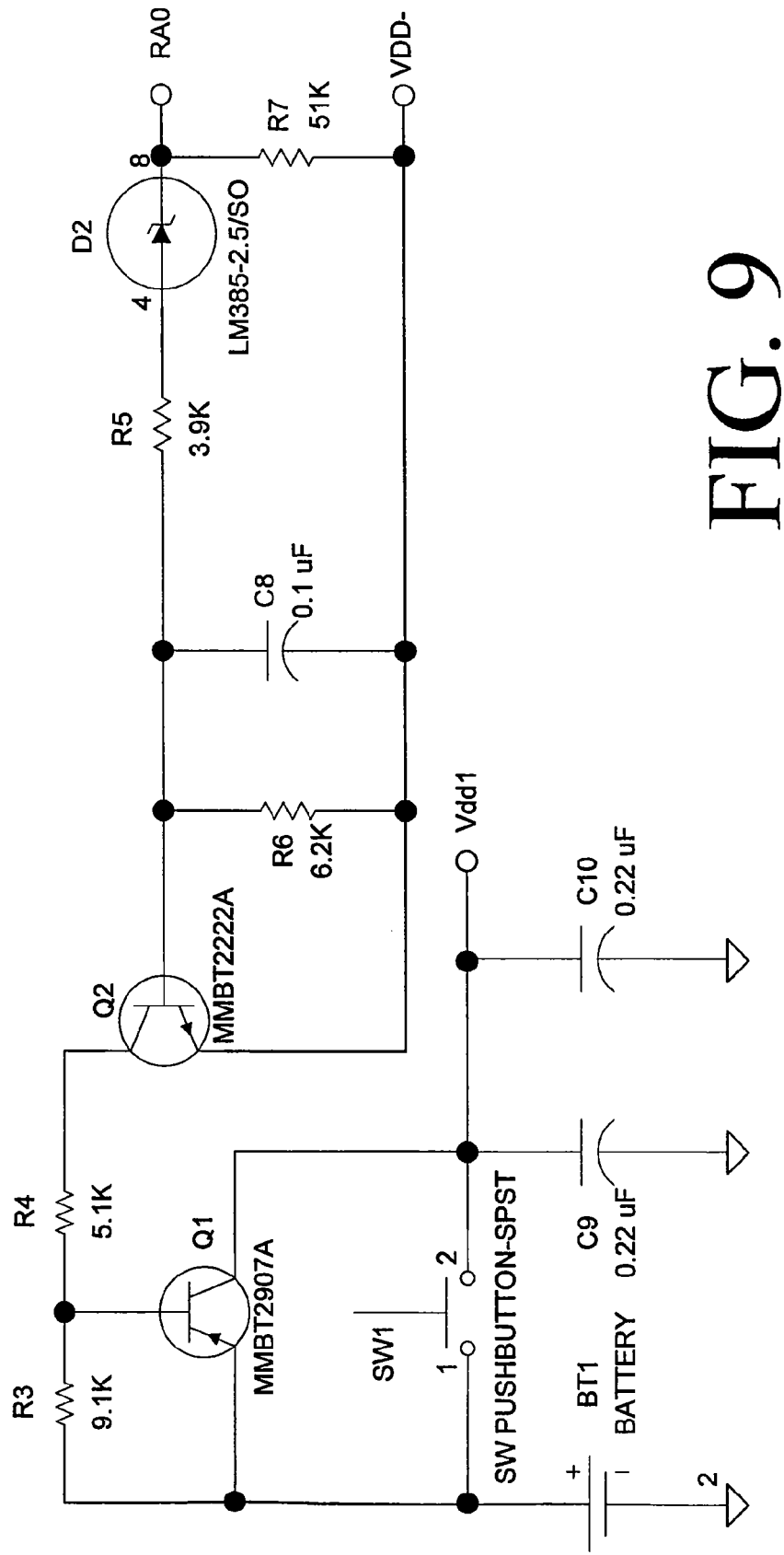
FIG. 9 shows a low level view of the power and switching circuitry in accordance with one embodiment of the present invention.

At the VDD input, the microcontroller is coupled to Vdd3, capacitor C1, and VDD−. The power supply, which is discussed later in conjunction with FIG. 9, provides 2-3 volts. The microcontroller however needs 4-6 volts the transmission circuitry and also because the microcontroller can operate faster with higher input voltage. A voltage doubler circuit of FIG. 8 provides the doubling needed to effectively operate the microcontroller.

The RA0 pin is used as an output pin. The voltage provided at this pin mirrors the voltage doubled input VDD− and is also provided to the power and switch unit which is described below in FIG. 9. Essentially, the RA0 prevents the operation of the electronic card during transient states (turning on or turning off).

The output at RB1 is coupled to buzzer LS1, which generates the acoustic signal. In one embodiment, this buzzer is an FT12-T.

Figure 10:
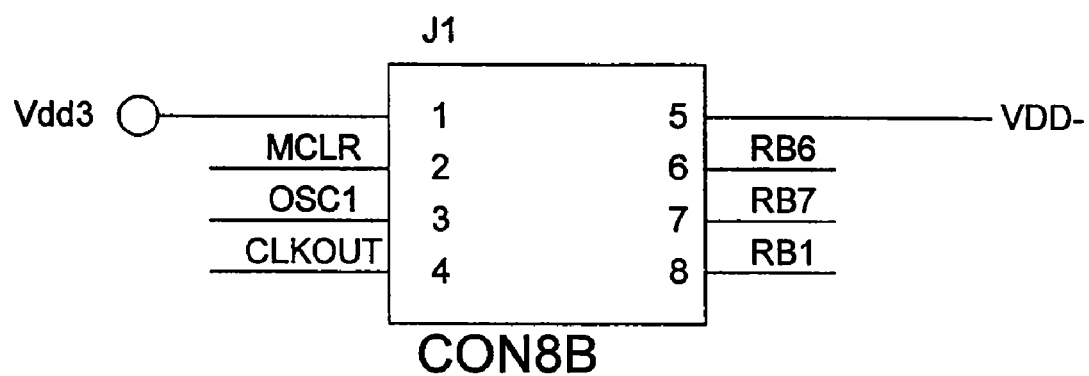
FIG. 10 shows a low level view of the electronic card connector.

Pins RB5-RB7 are used for programming and testing the microcontroller. In addition, the electronic card connector of FIG. 10 is used for programming and debugging.

The voltage doubler circuit will now be described with respect to FIG. 8. The voltage doubler is a high efficiency device. A charge pump scheme is used because of the big physical size of the needed inductors in other schemes. However, in other embodiments, the use of such inductors is feasible in the credit card-sized electronic card 10 of FIG. 1. The Maxim voltage converter MAX861 takes as its input at Vdd and outputs a doubled voltage VDD− at pin Out. The VDD− is provided to the VDD input of the microcontroller in FIG. 7. The additional circuitry of C4, C5, and Motorola diode MBR0503T1 provides protection to the chip from overvoltage at the input Vdd.

The power and switching circuit will now be described with respect to FIG. 9. The power source is a Varta LPF25 battery which is small, has low current drain, and provides just enough voltage for the rest of the card's circuits. In one embodiment, it outputs 2-3 volts.

A switch SW1 is provided. The switch is used by the user to enable the transmission of data in the electronic card. The user should keep the switch pressed for as long as the transmission requires, which is usually a short period of time since the data transmission is relatively fast at 200 bits per second. However, sufficient protection circuitry is provided so that if the user releases the switch prematurely, the proper operational voltage is delivered to the processor so that the data can be transmitted without fail. When the switch SW1 is pressed, transistors Q1 (Fairchild Semiconductor MMBT2907A) and Q2 (Fairchild Semiconductor MMBT2222A) provides a smart switch function. After turning on, these transistors Q1 and Q2 are turned off by the Microchip processor of FIG. 7. Transistor Q1 passes the voltage from the battery to the voltage doubler circuit of FIG. 8 as voltage Vdd1. The capacitors C9 and C10 allow for the power to ramp up smoothly and to hold the Vdd1 voltage for some time period. The transistor Q2 receives a digital command from the processor and shifts voltage levels for transistor Q1 as needed. The discrete bipolar transistors are used because of their low leakage current, which can be as low as a few nAmps.

The combination of Q1, Q2, micro power voltage reference. D2 (National Semiconductor LM385-2.5/SO), and their resistors are provided to confirm the validity of the signal. This circuit ensures that any signal above 4 volts from the processor via RA0 will deliver power to the power and switching circuit for its effective operation. However, any signal below 3 volts will be ignored so that latch-up of the circuit will be prevented during transient states (turning off or turning on). This circuit consumes less than 10 nA in the off state. An alternative circuitry for the LM385-2.5 can be a reset supervisor which will reset the microcontroller when the voltage drops below the allowed threshold. Such IC's can be the equivalent of MAX821 or MAX6326.

An electronic card connector J1 is also provided as shown in FIG. 10. The electronic card connector is used to program, test, and debug the electronic card. In alternative embodiments, however, the electronic card connector is not provided. Instead, the electronic card is programmed by the manufacturer of the microcontroller. In another embodiment, the card is programmed using the electronic card connector and then the circuits including the electronic card connector are laminated over with suitable material, including printed PVC.

An alternative embodiment of the card transmission hardware provides for two added benefits—lower power consumption and greater power output. With the lower power consumption, battery life is extended. With the greater power output, reliability is increased with lower bit error rate. A high level block diagram of this alternative embodiment is shown in FIG. 17.

Figure 17:
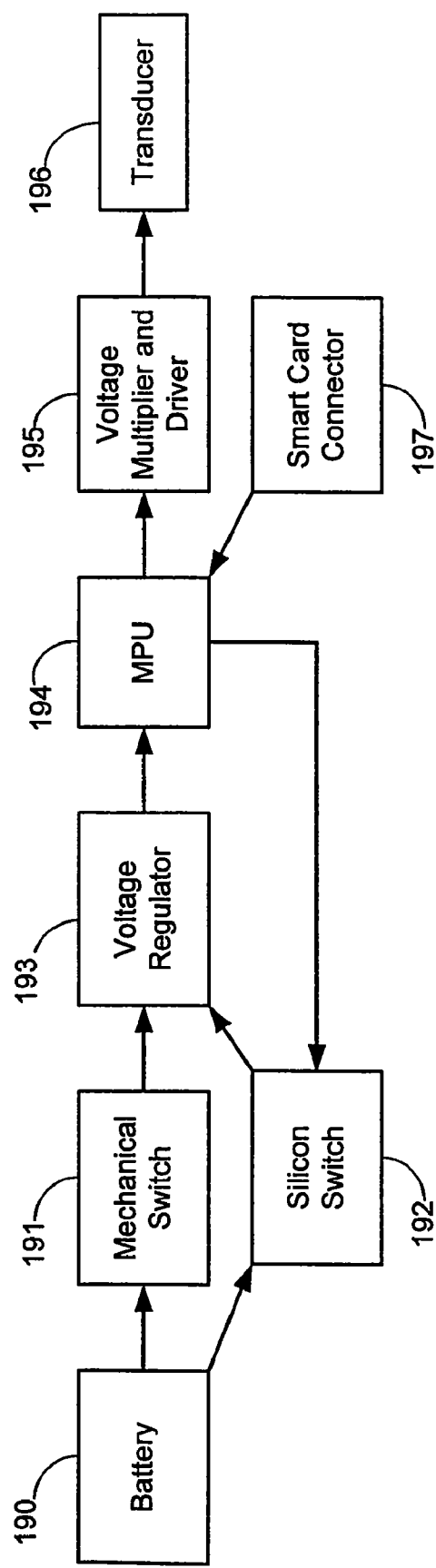
FIG. 17 shows an alternative embodiment of the one-way Transmit card. This circuit can also be applied to two-way cards for the transmit portion.

In FIG. 17, a battery 190 is provided. This battery supplies 2-3 volts nominal voltage. In one embodiment, the battery is a single Varta LPF-25 battery that provides 2.7V nominal at 1 mA discharge (25 mAH).

A mechanical switch 191 provides the circuit connection when it is closed. In one embodiment, the mechanical switch is a dome switch. A silicon switch 192 is also provided for maintaining power after the user has activated the mechanical switch 191. The silicon switch 192 makes sure that the rest of the transmission circuitry in the card has enough power to function properly for a period of time after the user has activated the mechanical switch 191 in the event that the user lifts the mechanical switch 191 prematurely.

A voltage regulator 193 is coupled to the battery 190 via the mechanical switch 191 and the silicon switch 192. The voltage regulator 193 stabilizes the frequency of the microprocessor 194 and lowers the current consumption of the battery 190. The voltage regulator 193 is an LDO with low decoupling capacitors and low current. The output voltage is 2.2V. This IC can also be omitted in expanse to a lesser frequency stability. The voltage is provided to the microprocessor 194, which in one embodiment is a Microchip PIC 16F84. An electronic card connector 197 allows for the microprocessor 194 to be programmed. Additional contacts are provided for factory testing and debugging.

A voltage multiplier and driver 195 receives signals from the microprocessor 194 and provides an output at 6Vpp to the transducer 196. An alternative circuit can double the battery voltage to 5Vpp, with fewer components. The voltage multiplier and driver 195 doubles the input voltage to generate a square of the power out. At the very least, the transducer needs twice the battery voltage to be driven. The transducer 196 exhibits approximately 5 nF of capacitance.

In contrast to the above embodiment where a single channel is used to transmit either f0 or f1 for this FSK scheme, two channels can be implemented to increase the bit rate. In one embodiment, the two frequencies to be transmitted are summed in the electronic card where the single transducer transmits the summed signal to the PC. In another embodiment, each frequency to be transmitted is associated with a transducer in the electronic card, where after being transmitted, the transmission medium (e.g., air) adds the two frequency components before being received by the PC. In a further embodiment, one transducer is associated with frequencies f1 and f2, while another transducer is associated with f3 and f4. At any moment in time during a transmission, each transducer transmits one bit so that the electronic card with two transducer essentially transmits two bits at the same time.

Accidental activation of the TX switch in the electronic card can potentially drain the power from the battery supply unless appropriate safeguards are taken. In one embodiment, circuitry is provided such that if the switch is pressed for more than a threshold amount of time (e.g., 1 sec), then the electronic card will turn itself off. No transmission will be possible unless the switch is deactivated first. In another embodiment, the microprocessor is programmed with a time-out logic so that if the TX is pressed for more than a threshold amount of time, then the microprocessor unit will turn off the power.

3.3 Card Transmission Software

The software in the electronic card primarily performs the following routines:

(1) read data (e.g., ID, sync byte) from memory
(2) write data (e.g., increment counter value) to memory
(3) perform DES3 encryption to calculate Series
(4) calculate checksum
(5) beep audible feedback to user
(6) initialization
(7) transmit data
(8) receive data These and other related features of the card software will be described further below.

3.3.1 Data Stream

The software for the card resides in the microcontroller and is written in Assembly language. On activation of the card (i.e., press of the switch), the card transmits a data stream that comprises a header, data, a footer, and start/stop bits. The header, footer, and start/stop bits are fixed. However, the software calculates the data portion.

Figure 5A:
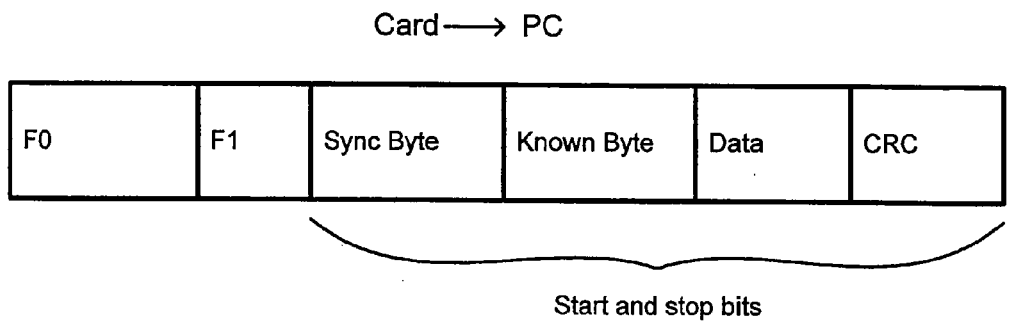
FIG. 5(A) shows the data stream format for the card-to-PC communication direction.

Referring now to FIG. 5(A), the data stream includes f0 (approximately 100 msec long or 24 bits), f1 (approximately 20 msec long or 5 bits), a synchronization byte, a known byte, the data portion (96 bits), and a checksum (CRC) byte. The portion of the data stream beginning with the synchronization byte to the checksum byte is divided up into bytes of data with start and stop bits inserted between the bytes. Thus, at the beginning of a byte is a start bit (e.g., logic 1) and the end of that same byte is a stop bit (e.g., logic 0).

The f0 and f1 portions of the data stream represent the two FSK frequencies employed by the system. The f0 and f1 portions are pure sinusoids of the base FSK frequencies and are transmitted first to allow the receiver to enable detection.

The sync byte is a sequence of alternating bits with some pattern (e.g., 01010101) that enables synchronization of the receiver with the received data stream. The known byte is a byte known to both the receiver and transmitter of the system. It assures the receiver that this signal is indeed a signal and not noise.

The data portion is the major part of the data stream where each bit is translated to a wave of frequency f0 or frequency f1 with a length of T msecs that determine the raw bit rate. The discussion below details how one embodiment calculates the data portion, which is denoted by the variable DataOut. In other embodiments, DataOut is calculated differently and can be any desired length depending on the functionality desired by the press of the TX switch.

The checksum (CRC Code 32) byte is transmitted to ensure no errors in the received data stream. Also, as mentioned above, start/stop bits are inserted into the portion of the data stream beginning with the synchronization byte to the checksum byte. This portion is divided up into bytes of data. Start and stop bits are inserted between the bytes. Thus, at the beginning of a byte is a start bit (e.g., logic 1) and the end of that same byte is a stop bit (e.g., logic 0). The start and stop bits are utilized for resynchronization. Because of the clock source in the card has errors, the transmitted signal drifts in frequency which results in missing a sampling point (or sampling the wrong point). The resynchronization provides for this correction.

Returning now to the data portion of the data stream, the software makes use of certain algorithms along with some numerical attributes of the card. Each card is associated with a group ID, individual ID, and a key. The group ID identifies this card with other similarly situated cards; that is, if ABC Corporation distributed the card to its members, the card would have ABC Corporation's group ID number. All cards distributed by XYZ Inc.'s web portal would be associated XYZ's group ID number. The individual ID is essentially the card's serial number and is unique to that card. The key is a secret private key. Note that the terms "private/public key" are from asymmetric crypto systems, but in the current embodiment, only one key is used and is usually referred to in the literature as "the key" or "the secret key". The microcontroller also manages a counter in non-volatile memory, which in one embodiment, increments by one each time the card's TX switch is pressed. In one embodiment, the size of these card numerical attributes are:

Group ID: 32 bits
Individual ID: 32 bits (in another embodiment, 16 bits)
Key: 16 Bytes
Counter: 32 bits Based on these numerical attributes, the microcontroller in the card creates a complex numeric series that is not easy to predict. One preferred series is:

Series=DES3(Key,Msg), where Msg=[Group ID,Counter]

DES3 represents the Data Encryption Standard (DES) cryptographic algorithm as defined by the U.S. Bureau of Standards (NIPS PUB 46-2, 1993 and FIPS PUB 74, 1981). Msg is the concatenation of the 32-bit Group ID and the 32 bit Counter value, which results in a 64-bit number. The Series is a 64-bit number. The microcontroller employs the algorithm in the encryption portion of the software to calculate this Series. However, what is actually transmitted for the data portion of the signal is:

DataOut=[Series,Individual ID]

Here, DataOut represents the concatenation of the 64-bit Series which is a DES3 encrypted number and the unencrypted 32-bit Individual ID, which results in a 96-bit number. On every activation of the card, the counter is incremented and the next code in the series is used.

In an alternative embodiment, security can be assured by storing identical sets of random numbers both on a memory unit in the card, and on the authentication server. That random number takes the place of the DES3 encrypted number element of the DataOut series described above. The advantages of such an embodiment are twofold. First, it clears processing resources on the card, or reduces the complexity of the processor needed, since the encryption algorithm no longer is practiced. Also, theoretically, a random number scheme is virtually impossible to decrypt.

3.3.2 Transmission Routine

Figure 6A:
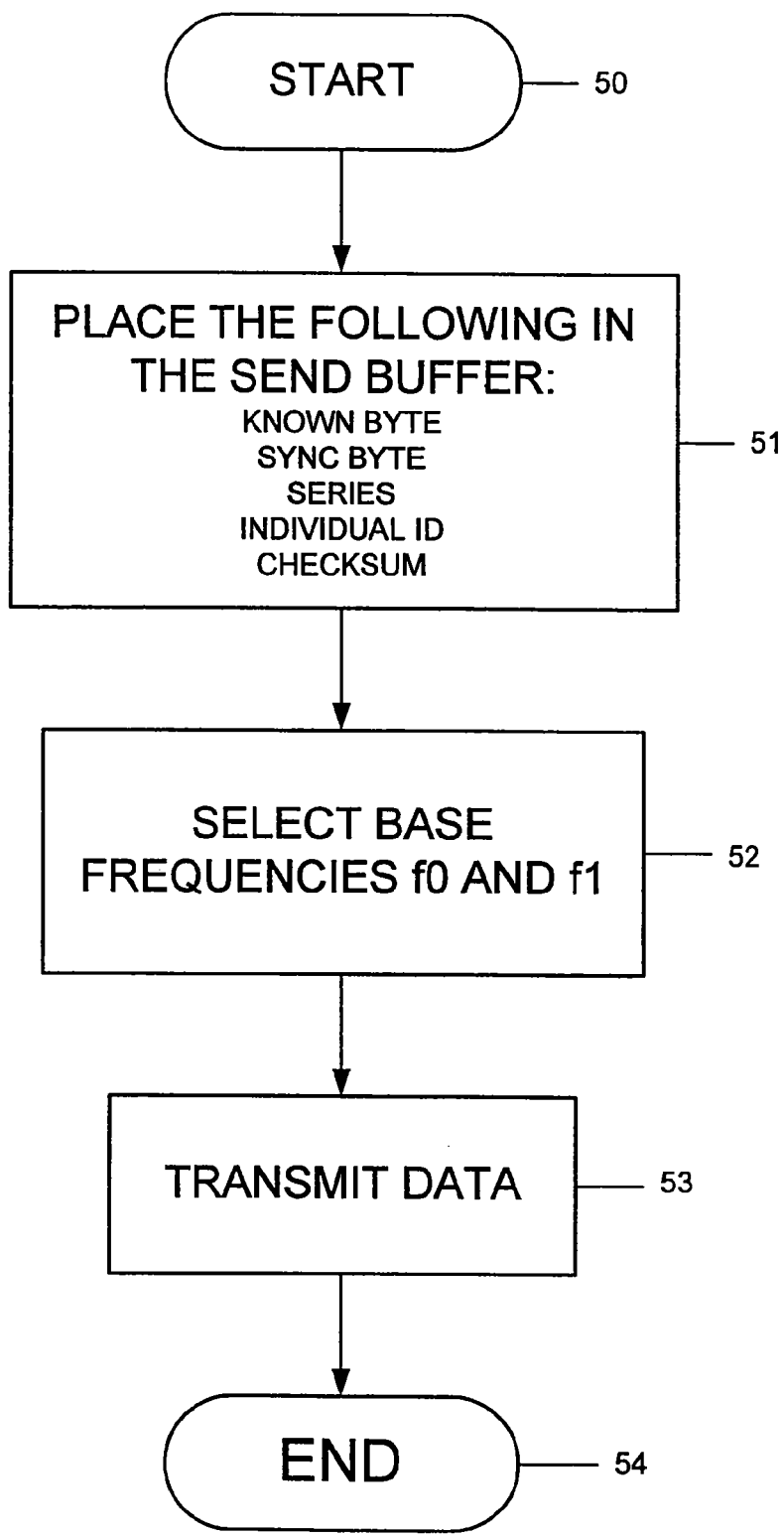
FIG. 6(A) shows a flow chart of the transmission routine of the electronic card in accordance with one embodiment of the present invention.

A high level description of the transmission routine in the electronic card will now be provided with respect to FIG. 6(A). The transmission routine begins at step 50. At step 51, the parameters Known Byte, Sync Byte, Series, Individual ID, and Checksum are placed in the send buffer. To perform this step, some of these parameters are either retrieved from memory (Known Byte, Sync Byte, Individual ID, checksum, and also the counter value) as well as calculated (Series). Step 52 requires that the base frequencies f0 and f1 in FSK are selected. Step 53 transmits the data. The transmission routine ends at step 54.

FIG. 6(B) illustrates a more detailed flowchart of the transmission process. This flowchart provides more details for steps 51 and 53 of the FIG. 6(A). The flowchart begins at step 60. At step 61, the microcontroller reads the counter value. At step 62, the microcontroller calculates the Series based on the Key and the Msg, as described above. For each press of the TX switch, the microcontroller increments the counter value by one. At step 63, the microcontroller determines DataOut as the concatenation of the encrypted Series and the unencrypted Individual ID. Having calculated the data portion of the data stream, the microcontroller is now ready to transmit the data stream.

At step 64, the microcontroller transmits f0 for approximately 120 ms (or 24 bits) and f1 for approximately 20 ms (or 5 bits). At step 65, the start bit (logic 1) is transmitted. A byte of a portion of the data stream beginning with the synchronization byte and ending with the CRC bytes are then transmitted at step 66. The stop bit is transmitted at step 67. If any more data from the sync byte . . . CRC portion of the data stream is remaining, then the microcontroller goes back up to step 65 to transmit the start bit. It then transmits another byte of data, followed by the stop bit. If no more data is remaining to be transmitted, the process ends at step 69.

After the data has been transmitted, the card turns itself off to conserve battery power. In another embodiment, the card goes into receive mode for a few seconds after the transmission steps in anticipation of receiving data. Thereafter, the card turns itself off to conserve power. In still another embodiment, the card provides an audible feedback (e.g., beep) to alert the user that the data has been successfully transmitted. Some delay is provided after the beep to compensate for the case where the CPU turns off the power before the user lifts his finger off the switch. Then, the card turns itself off, or alternatively, goes into receive mode followed by power off.

Note that the system uses FSK to transmit the signals. In one embodiment, the system is capable of being modified so that the base frequencies (f0 and f1) are adjustable. This modification can occur in realtime and in automated fashion to ensure that the receiver receives a good signal. Similarly, automatic retransmission is also provided as a feature of the electronic card. For example, if the user presses the switch on the card longer than expected, this may imply that the transmission is bad because the user did not see the appropriate response from the PC (e.g., an audible beep from the PC to indicate that the signal was properly received). In this case, the card will, after some delay, retransmit the data stream possibly using a different set of FSK frequencies.

Some other design considerations should be taken into account. The program code necessary to execute the above process is relatively small to fit into the small microcontroller. The timing is very exact so as not to introduce errors and audible noise to the communication. Since a low cost processor is used (e.g., Microchip PIC16F84), PWM or DTOA units are not available; therefore, the digital output pins of the processor will be used for transmitting the signal.

In one embodiment, the bit rate for the transmitted data is 200-600 bits per second.

3.3.3 Multi-Mode Switch

In accordance with one embodiment of the present invention, the electronic card contains one switch. To provide multiple functionality for the electronic card (and the client base station, such as a personal computer), the electronic card is equipped with multiple modes. Each mode is associated with some unique function apart from the other modes. In one embodiment, the mode of the card depends on the length of time that the switch is pressed by the user. To assist the user in determining what mode he has invoked, or conversely, how long he has pressed the switch, an audible feedback such as a beep sound is generated by the electronic card. Thus, for every T seconds that the switch is pressed, a single audible beep is generated. In one embodiment, T is 0.25 seconds. A single beep indicates that the electronic card is in one mode, while two beeps indicate that the electronic card is in another mode.

Figure 28:
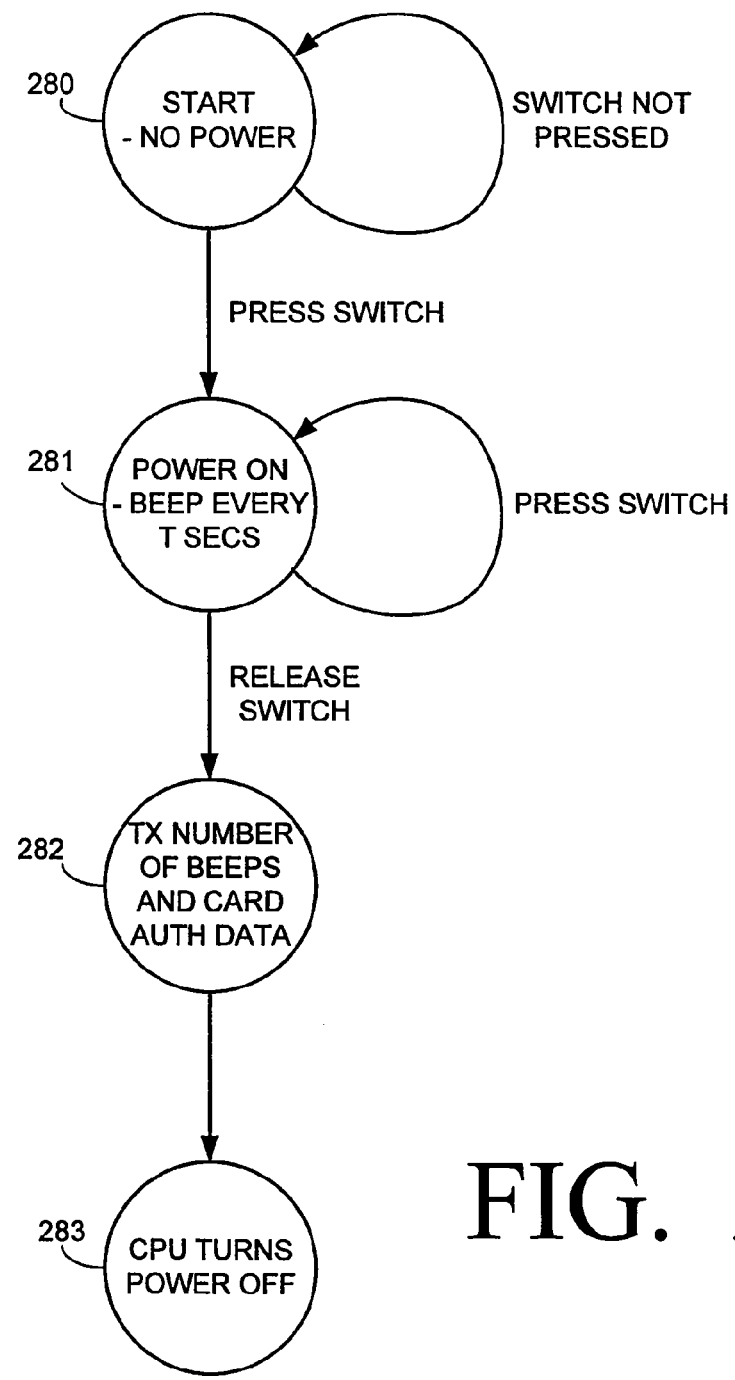
FIG. 28 shows a state diagram of the multi-mode switch software in the electronic card.

Referring to FIG. 28, a state diagram is provided. At state 280, the electronic card is turned off. So long as the switch is not pressed, the electronic card is not operating.

When the switch is pressed, the power of the card is turned on. This is represented by state 281. The card may require the switch to be pressed for some minimum amount of time before it is recognized as a valid switch press. In one embodiment, this minimum amount of time is 0.25 seconds. When the switch is pressed for this minimum amount of time, the electronic card will provide an audible beep every T seconds (e.g., 0.25 seconds) so long as the switch is depressed. The number of beeps indicates to the user the mode of the electronic card. Of course, the user would already know what mode he wants to place the electronic card in and he holds down the switch until the desired number of beeps is produced.

When the user finally releases the switch, the number of beeps is temporarily stored in memory in the electronic card in state 282. This beep number can then be used by the electronic card to perform its function in accordance with the mode selected by the user. Alternatively, the number of beeps along with the card authentication data (e.g., Series, checksum, Individual ID) are transmitted to the client base station. The client base station can then receive the number of beeps and interprets the mode of the communication. At state 283, the CPU in the electronic card turns off the power to conserve battery power.

Some exemplary modes are as follows. A single beep indicates that the electronic card is in transmit mode. Whatever data that needs to be transmitted will be transmitted shortly. After the data has been transmitted, the electronic card turns itself off. In another embodiment, a reception period (e.g., 1 second) follows immediately after the transmission of data. This is then followed by power off.

A double beep indicates that the electronic card is in receive mode only for a short time period. In another embodiment, the electronic card sends the two beep indication to the client base station. The software in the client base station interprets the two beep indication as displaying a drop-down menu list of actions. The user can then select one of the listed actions. In one embodiment, these listed actions can be: (1) launch the browser, (2) launch the browser, if it is not already launched, and go to the user's designated home page (or the home page of the company sponsoring the electronic card); (3) launch the browser, if it is not already launched, and go to some designated website; (4) launch the user's email application, if it has not already been launched; (5) send email in the user's outbox and receive email from the user's mail server; (6) perform simple diagnostics by sending data to the electronic card, followed by receiving some data from the electronic card; and (7) perform any other series of actions (predefined or assigned by the user).

In another embodiment, the list of actions that are displayed on the client base station's monitor is context-sensitive. Thus, if the user's browser is already opened and displays the home page, one of the actions listed will not be to launch the web browser and go to the user's home page. Typically, one of the actions listed will be to fill out a form. So, if a user was shopping on the web and found some merchandise he would like to purchase, he proceeds to the checkout line on the website where he encounters a form. The user presses the switch on his electronic card and waits for two beeps to sound before releasing the switch. The client base station receives the two-beep indication and proceeds to list action items in menu form. One of the action items is to "fill out a form." When the user selects this action on the list, the client base station proceeds to fill out the form on that web page to automate the purchasing process for the user. The client base station would have all the information necessary to fill out such a simple purchase form—name, billing address, shipping address, phone number, credit card number, credit card expiration date, etc. Once this form has been filled out, the user can use the browser in the conventional manner to complete the sales transaction. Form filling functionality details are provided below.

In another embodiment, three beeps indicate that the electronic card should reset. Similarly, three beeps could indicate that the electronic card should erase the contents of its battery backed-up RAM. If the RAM is used to store downloaded data off the Internet or some broadcast media device (e.g., TV or radio), this data is then erased.

In a further embodiment, a text-to-speech conversion feature is provided in the electronic card. An audio file is also stored in the electronic card. Each audio file is associated with one of the beep numbers; that is, an audio file is associated with a single beep and another audio file is associated with two beeps. Thus, the user need not remember what function corresponds to how many beeps. When the user has released the switch after N number of beeps, the electronic card plays the audio associated with the N beeps. For example, if the user selected two beeps, the played audio file says, "On-screen menu? One beep for YES and two beeps for NO." If the user did indeed want an on-screen menu list of actions to be displayed on the client base station monitor, he would press the electronic card switch until one beep sounds. Otherwise, he would press the switch until two beeps sound.

As described above, the electronic card can have one switch or multiple switches. Similarly, the audible feedback can vary from a single beep to multiple beeps. Based on the context or the action taken by the user, the audible feedback or alert can have different sounds (e.g., beep, buzz, ring). Additionally, the audible sound can be provided at the beginning or at the end of the action taken by the user. In other words, to use the example above, the beep can sound at the beginning of every T seconds instead of at the expiration of every T seconds.

One attractive application of either a multi-mode switch or of multiple switches on a single card relates to using the same card at base stations with diverse reception/transmission capabilities. For example, certain base stations, such as ordinary phones in a "Plain Old Telephone" ("POTS") network, are capable of receiving and passing on sounds in the audible, but not in the ultrasonic range. Where it is desirable to have a single card use audible transmissions in that environment, but ultrasound in other environments, a multiple switch or multimode switch as described above can be used. Specifically, in a multimode embodiment, a single press of the switch would activate an ultrasonic transmission terminated by an audible beep for user feedback. A longer press could result in (i) either the ultrasonic transmission or a simple pause, followed by (ii) either a terminating "beep" for user feedback or none; and (iii) by an audible transmission for use over the phone or another similarly limited device.

There are a number of examples of the types of cards that would be attractive when implemented as cards tailored for use with highly functional acoustic base stations like computers or base stations that are more acoustically limited. For example, when implemented as a credit card, this multimode card would offer the cardholder the security of knowing that even a customer service representative does not get access to their credit card number, since it will sound like modem noise, which is actually transmitting a one-time code that cannot be reused (Described below). Just a few examples include frequent flyer or loyalty cards that can be used on the phone or via an Internet computer to accrue or spend points, car reservation services, and membership cards of all sorts.

3.4 Card Reception Hardware

Figure 4A:
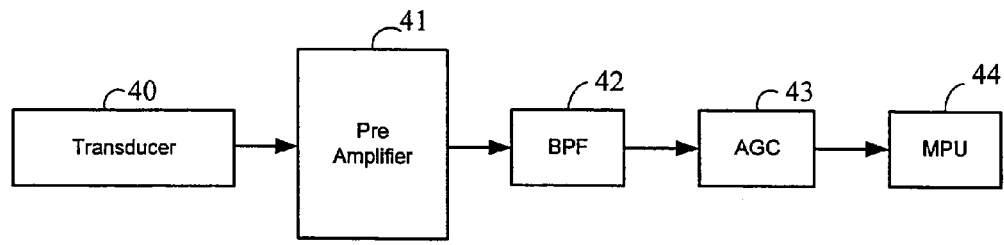
FIGS. 4(A) and 4(B) show high level views of the receiver portion of the electronic card.
Figure 4B:
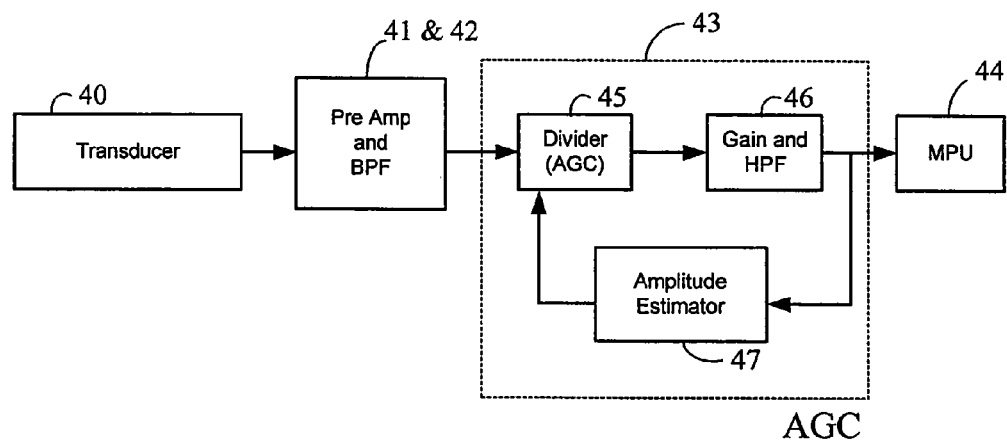

The reception unit 32 will now be described in greater detail with respect to FIGS. 4(A) and 4(B). The primary objective of the analog front end of the reception unit is to detect the transducer's response to audio signals, amplify the transduced signals, filter them, and pass them to the microcontroller's A/D for digital processing. FIG. 4(A) shows a transducer 40 receiving the audio signal, transducing the acoustic signal to an electrical signal such as a voltage change, and delivering the transduced electrical signal to a pre-amplifier 41. The transduced electrical signal is at level of tens of microvolts (e.g., 10 microvolts).

The pre-amplifier 41 is a high impedance amplifier that amplifies the transduced electrical signal. It amplifies the signal 100 or 200 times the input. Thus, the output of the pre-amplifier 41 is at 1,000 microvolts or 1 mV. The pre-amplifier 41 then sends the amplified signal to a band pass filter 42.

The bandpass filter 42 is a filter with a Q of approximately 8 to filter the signal. In one embodiment, it passes signals in the 17-20 kHz range for the ultrasonic frequencies. A high pass filter is also provided on top of the bandpass filter to further attenuate speech. The design of the bandpass filter 42 accounts for the limited gain margin of the op-amps at the center frequency. The classic computation of Q should also be altered for compensation. The bandpass filter 42 passes the filtered signal to an automatic gain control (AGC) circuit 43, which then delivers the signal to the microcontroller 44.

The combination of the pre-amplifier 41 and the bandpass filter 42 uses a non-inverting MFBF scheme as a compromise to obtain the high Q and high input impedance. The pre-amplifier 41 needs a high input impedance, but the bandpass filter 42 with a high Q has very low input impedance. The gain in the lower frequency ranges is 1 (instead of decaying in 20 dB/dec), but this still leaves more than 40 dB of attenuation compared to the center frequency. The next blocks with the high pass filter (see FIG. 4(B)) deal with the further attenuation at lower frequencies.

The AGC circuit 43 will now be discussed with respect to FIG. 4(B). The AGC 43 keeps a fixed level of amplitude on the microcontroller's input and is located after the bandpass filter 42 to maintain a stable output (i.e., low phase shifts inside the AGC loop). The output of the AGC 43 is a frequency shift keying (FSK) signal. In one embodiment, the dynamic range of the AGC 43 should be approximately 40 dB. Also, the AGC 43 works with low current and low voltages (e.g., 2 volts) with low amplitude variance at the output (input to the microcontroller 44). The microcontroller 44 determines whether the FSK signal is a signal at one frequency f0 or another frequency f1.

In the AGC 43, the signal at the output of the band pass filter 42 is provided to a divider 45, which outputs a signal at a relatively constant amplitude and low level. This signal is delivered to a gain and high pass filter circuit 46. The gain circuit is a constant gain amplifier with a fixed gain of approximately 300 dB determined mainly be the feedback resistors ratio. The input of this block is approximately 3.3 mVp-p and the output is approximately 1 Vp-p. This gain is large compared to the amplifier's open loop gain, and the amplifier has a relatively small gain margin at the desired frequency. This results in a reduced gain (compared to the lower frequency with the same resistors ratio), and a phase shift. However, the signal is not distorted. The high pass filter portion of the circuit 46 is realized by adding a capacitor to the feedback resistors. This high pass filter further attenuates speech frequencies. The output of the gain and high pass filter 46 is provided to the microcontroller 44 for further processing.

An amplitude estimator 47 is placed in a feedback loop from the output of the gain and high pass filter 46 to the input of the divider 45. The amplitude estimator 47 comprises two low end op-amps—an absolute value block and an integrator. The absolute value block estimates the output signal's amplitude. Other circuits (e.g., peak detector) may also be considered. The integrator locks the output amplitude on a predetermined value. This value is determined by the ratio of the resistors of the integrator. The gain of this integrator is determined by the multiplication of the feedback capacitor and the input resistor. This factor controls the speed of the loop and the ripple on the AGC's FET (the ripple is reduced by a LPF network after the integrator).

A tradeoff exists between the speed of the integrator and the signal distortion. When the gain is low, the FET receives a well-filtered signal that allows fine-tuning of the FET's resistance. When the gain is high, the output signal's final amplitude is reached quickly, but the signal will be distorted because of the fluctuations on the FET's gate. When Vgs/Vt is approximately 1, small fluctuations in Vgs result in large fluctuations in the FET's resistance. The ripple on the FET's gate is approximately 2 mV, based on a simulation.

Another tradeoff is between the time of settling and the final amplitude. The microcontroller prefers to have the largest amplitude possible (Vcc peak-to-peak). However, the integrator needs a spare of output amplitude in order to manufacture faster the error voltage for the FET. For now, the output signal is about a quarter (¼) of the Vcc.

The constraints on the system include:
(1) low IC count
(2) low passive components count
(3) low current drain (<2 mA, not including the microcontroller)
(4) power supply is 4-6 volts, although the design works with 2-3 volts power supply with voltage multiplier circuitry
(5) low cost
(6) working temperature of 0-45 degrees Celsius
(7) robustness of design over device tolerances
(8) low noise level at the output
(9) input signal is tens of microvolts.

Figure 18:
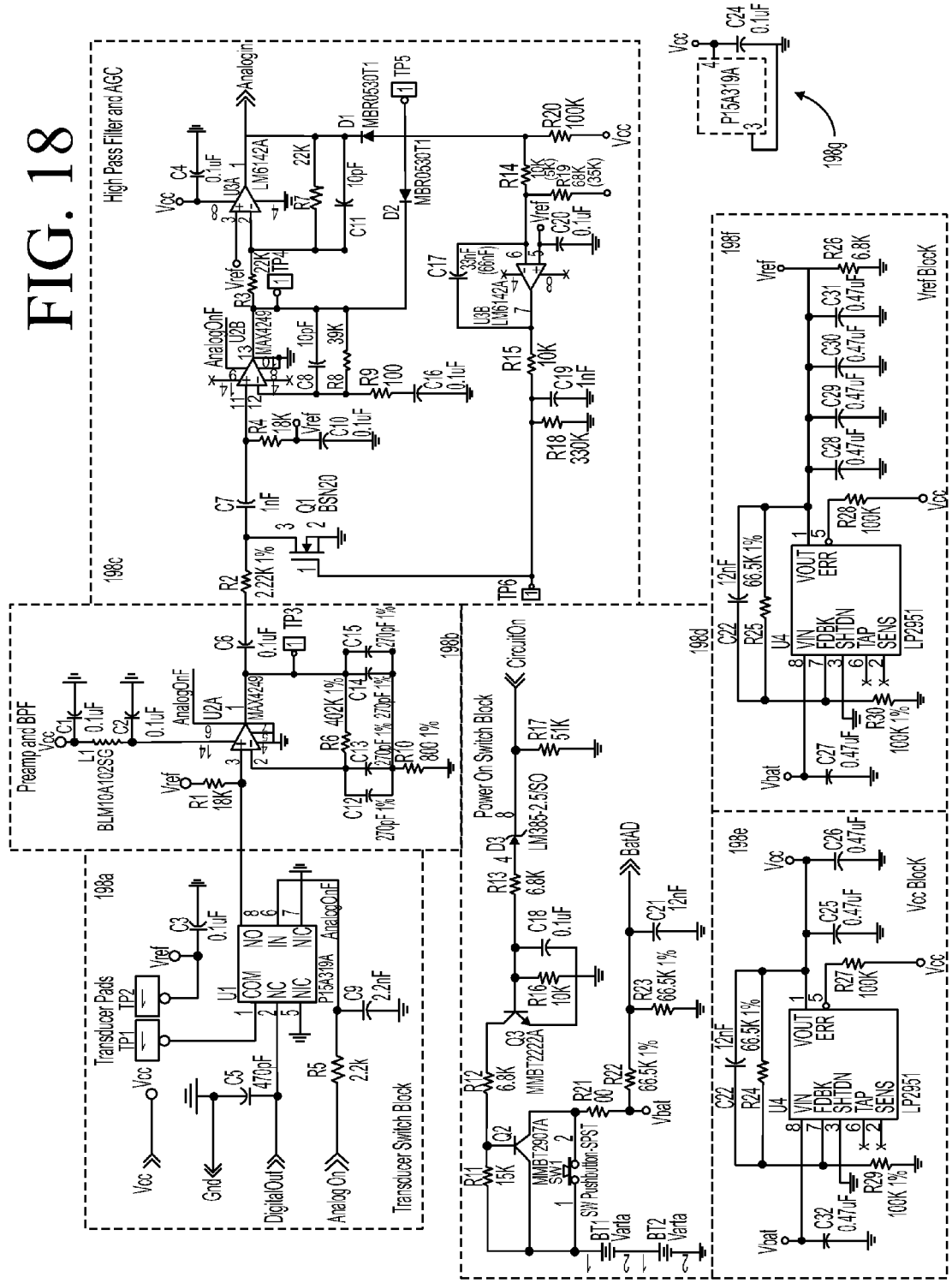
FIG. 18 shows a detailed analog front end portion of the receiver circuitry for the electronic card in accordance with one embodiment of the present invention.
Figure 19:
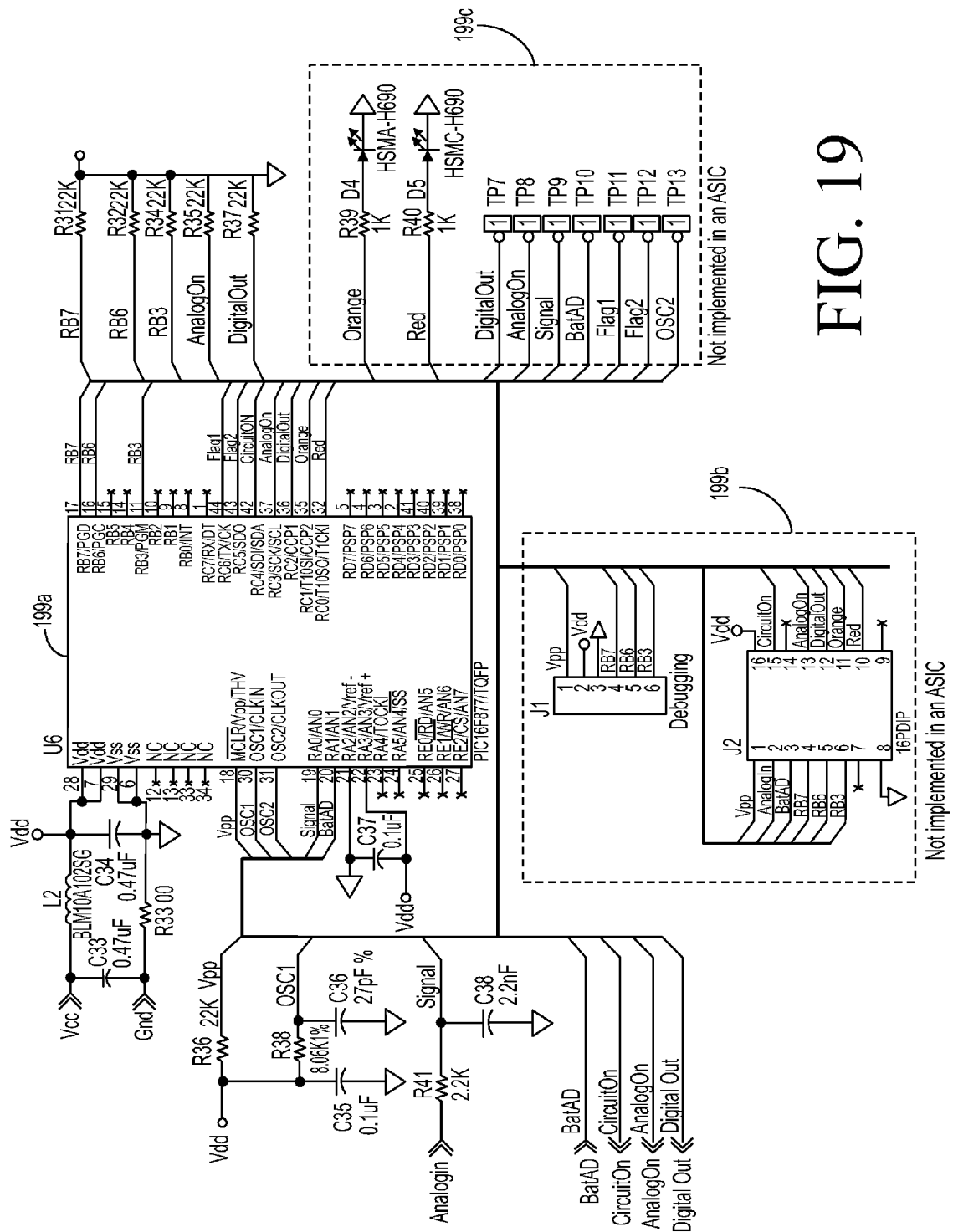
FIG. 19 shows a detailed digital core portion of the two-way electronic card in accordance with one embodiment of the present invention.

A more detailed view of the receiver in a two-way configuration is provided in FIGS. 18 and 19. FIG. 18 shows the analog front end and FIG. 19 shows the microcontroller unit. In FIG. 18, the power on switch block 198*d* provides for the batteries, where in this embodiment, two Varta batteries BT1 and BT2 are installed. These batteries provide power to the rest of the circuit via the switch SW1. The remainder of the circuitry provides for signal shaping and signal holding in a manner similar to the circuit of FIG. 9.

The transducer switch block 198*a* provides for both transmission and reception front end capabilities. The AnalogOn allows for the selection of input/output. The signal that should be transmitted is present on DigitalOut to pin 2 of the PI5A319A chip. If the transducer switch block 198*a* is in transmit mode, the signal is provided on pin 1 of the PI5A319A chip to the transducer pad TP1. If the transducer switch block 198*a* is in receive mode, the signal is provided to pin 1 of the PI5A319A chip from the transducer pad TP1. The received signal is then routed to pin 8 of the PI5A319A chip. The portion of the transducer switch block 198*a* that is associated with TP2 provides for noise immunity.

The received signal makes its way to the preamplifier and bandpass filter block 198*b*. After amplification and filtering, the received signal is provided to the high pass filter and AGC block 198*c*. The beginning portion of the circuit from resistor R2 to capacitor C7 provides for the divider function. The next portion of the circuit provides for the AGC function to generate the fixed amplitude. The bottom portion of the circuit provides for amplitude estimation. The processed signal is then provided to the microcontroller (e.g., Microchip PIC16F877 in a TQFP package) via AnalogIn.

The Vcc block 198*e* and Vref block 198*f* provide for the appropriate Vcc and Vref voltage sources that are used throughout the analog front end circuits. The additional circuitry 198*g* round out the analog front end.

FIG. 19 provides the pinouts and circuitry surrounding the digital core of the electronic card. The microcontroller/microprocessor 199*a* used in this embodiment is a Microchip PIC16F877 in a TQFP package. AnalogIn is the received signal to be processed. Conversely, DigitalOut is digital signal to be transmitted out of the card. The additional components like the connectors 199*b* and test point block 199*c* allow for programming and debugging of the microprocessor 199*a*.

Figure 40:
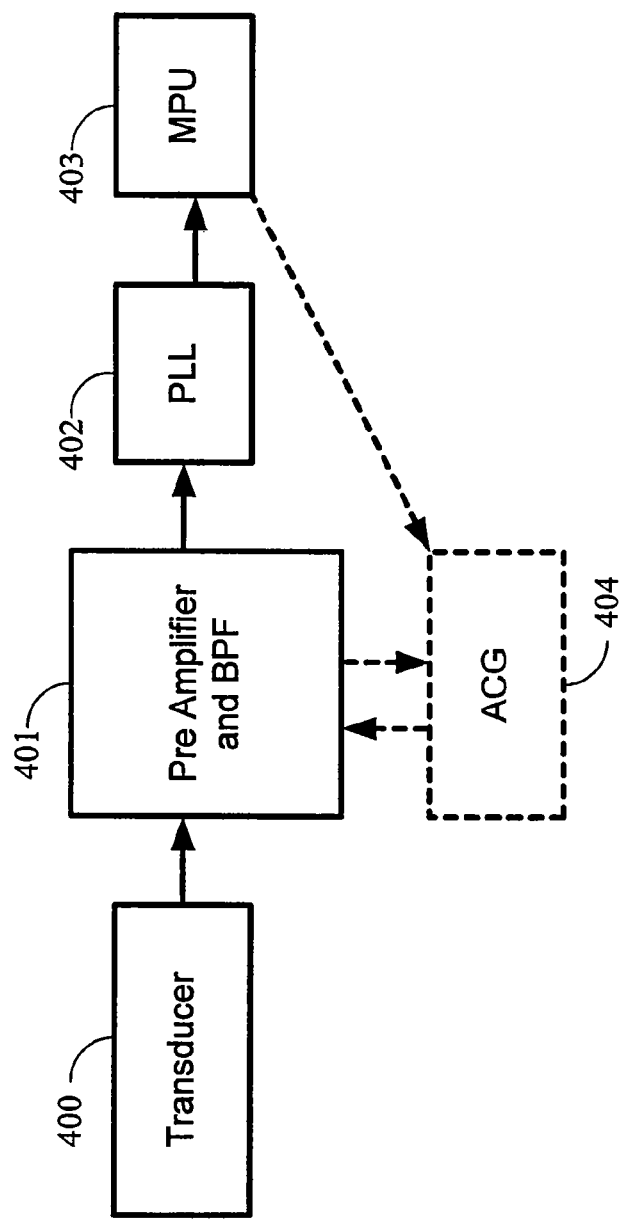
FIG. 40 shows another embodiment of the present invention where a hardware PLL technique is used in the electronic card for processing acoustic signals.

Additional embodiments use different techniques for decoding the received signal in the electronic card. In one embodiment, a hardware phase-locked loop technique is employed. Referring to FIG. 40, transducer 400 receives the acoustic signal and makes the appropriate voltage conversions. The bandpass filter portion of unit 401 filters the signal in order to attenuate speech (or noise) signals. The preamplifier portion of unit 401 amplifies the signal to a minimum amplitude of a few milli-Volts. At this amplitude, most PLLs can lock onto the input signal. An AGC block 404 can be realized before the PLL 402 to increase the SNR.

In this embodiment, the PLL 402 is an XR215, XR2211, LMC568, or the like. The PLL 402 demodulates the audio signal as known to those ordinarily skilled in the art. The output of the PLL 402 can be a digital square wave of the decoded FSK signal. Alternatively, the output can be an analog voltage whose level is correlated to the input signal frequency. The microprocessor unit 403 accepts either of these forms of signals for further processing.

Figure 41:
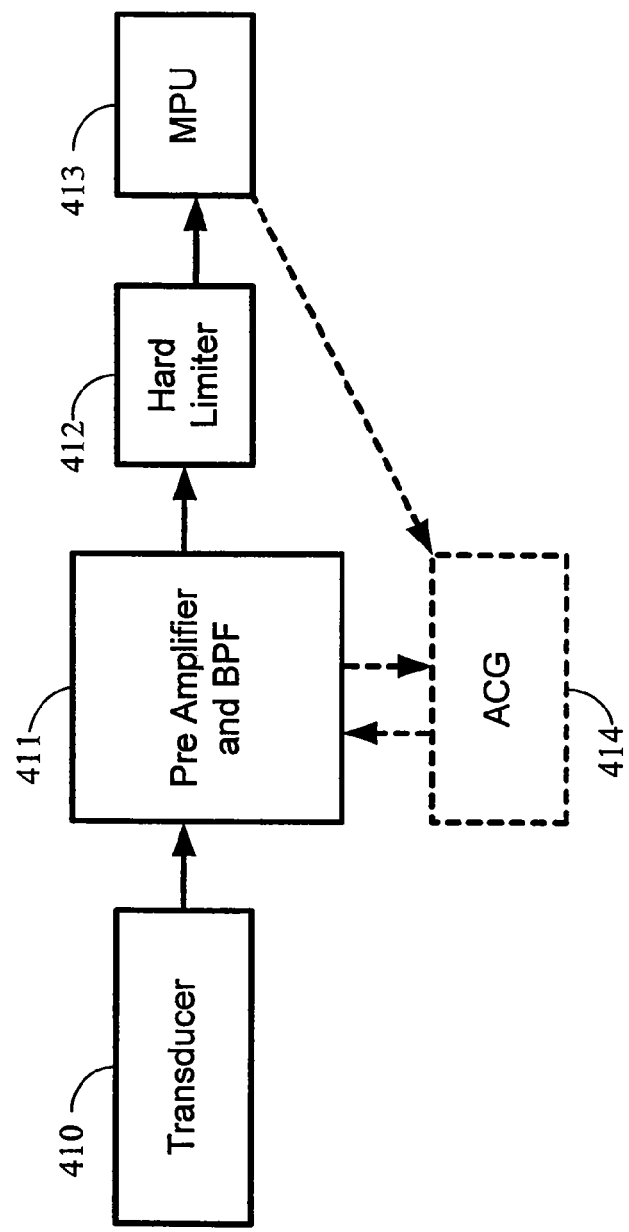
FIG. 41 shows another embodiment of the present invention where a software PLL/FLL technique is used in the electronic card for processing acoustic signals.

In another embodiment, software PLL/FLL decoding technique is employed to implement the locking of the input signal. Referring now to FIG. 41, the transducer 410 receives the acoustic signal and provides the necessary conversions. The bandpass filter portion of unit 411 filters the signal in order to attenuate speech (or noise) signals. The preamplifier portion of unit 411 amplifies the signal to a minimum amplitude of a few milli-Volts. The hard limiter block 412 produces a square wave from the analog output. The microprocessor unit 413 uses this digital input signal to implement the decoding. To increase the SNR, an AGC block 414, under the control of the microprocessor unit 413, can be realized before the hard limiter block 412.

Figure 42:
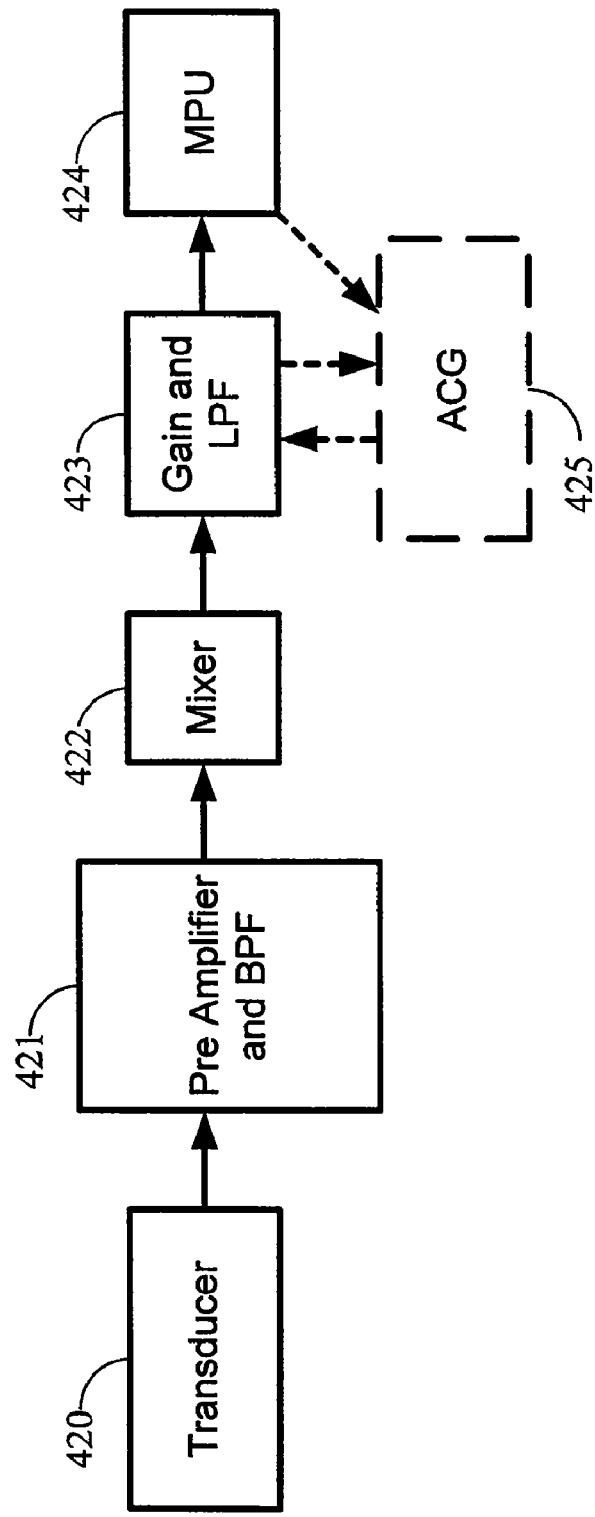
FIG. 42 shows another embodiment of the present invention where a mixer is used for baseband processing in the electronic card for processing acoustic signals.

In another embodiment, a mixer is used for baseband processing. Referring to FIG. 42, the components are similar to the above two embodiments corresponding to FIGS. 40 and 41 with the exception of a mixer 422. In this technique, the mixer 422 shifts the ultrasonic acoustic signal from around 20 kHz to baseband. Baseband processing is much easier to implement. An exemplary decoding method is squaring the analog output and processing the digital data. Another equally applicable method is conventional DSP algorithms for processing analog data.

3.5 Card Reception Software

The goal of the receiver, whether hardware or software, is to detect and decode the FSK signal in real-time in a very simple processor with an erroneous clock. The receiver hardware received the acoustic signal, transduced it to an electrical signal, amplified it, and cleaned it before presenting it to the microcontroller. The receiver software in the microcontroller then processes the cleaned-up analog signal and attempts to decode it to extract the actual data therein.

Figure 5B:
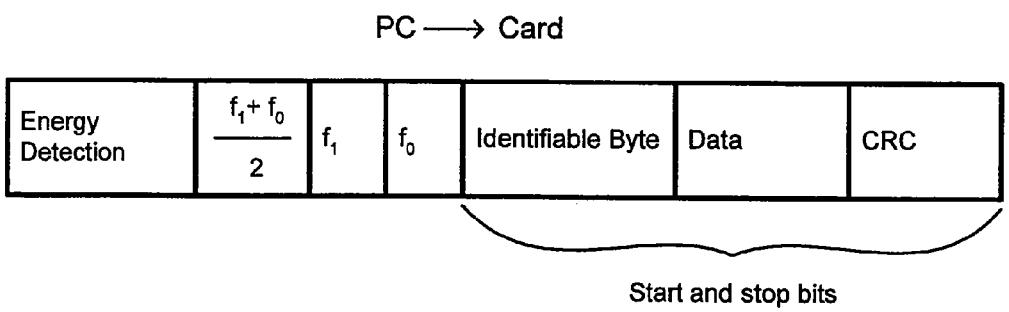
FIG. 5(B) shows the data stream format for the PC-to-card communication direction.

The data stream transmitted by a base station (e.g., PC) comprises a header, data, a footer, and start/stop bits therein. The header, footer, and start/stop bits are fixed. The footer includes the checksum (CRC) byte. Referring to FIG. 5(B), the header includes an energy detector bit (1 bit) which includes contributions from two frequencies (sin(2*pi*f0*t)+sin(2*pi*f1*t)), a pure sinusoid with frequency (f0+f1)/2 (3 bits), a pure sinusoid with frequency f0 (3 bits), a pure sinusoid with frequency f1 (3 bits), and a known byte.

The data portion includes the actual data that the base station is trying to deliver to the card. This includes instructions, flags, and pure data for storage (e.g., coupons). The length of the data portion varies from one application to another.

Like the card-to-PC transmissions, start and stop bits are also used for this PC-to-card transmissions for resynchronization. The portion of the data stream from the known byte to the CRC byte is divided into bytes. Each byte is preceded by a start bit (logic 1) and appended by a stop bit (logic 0).

Figure 12:
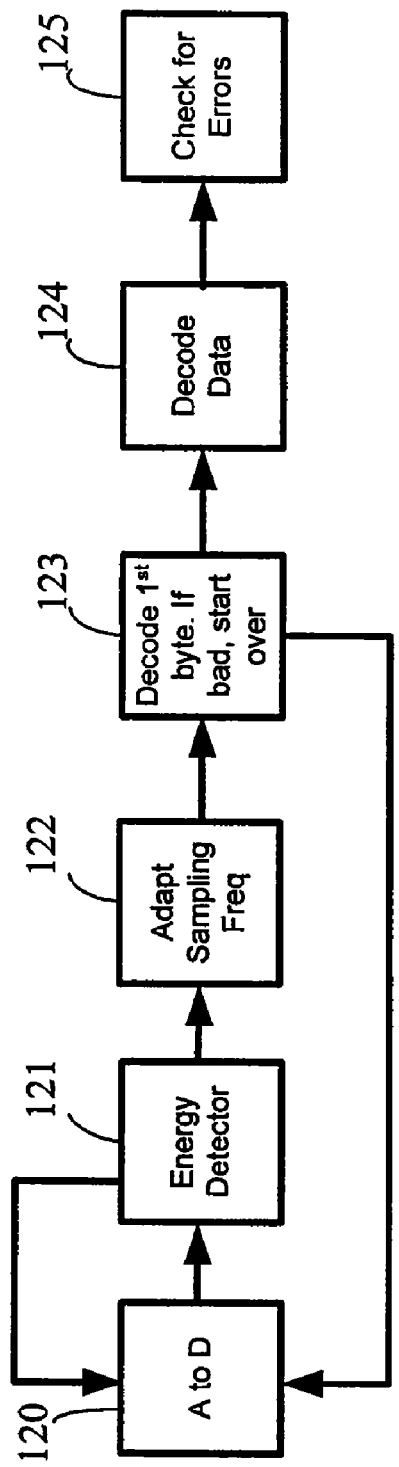
FIG. 12 shows a high level block diagram of the electronic card's reception software in accordance with one embodiment of the present invention.

Referring to FIG. 12, the receiver downsamples the signal so that it could handle the otherwise large number of computations in real-time. This downsampling can be achieved in hardware with a bandpass filter and an analog-to-digital (A/D) converter 120. For example, if the signals are between 18 kHz and 20 kHz, this portion of the spectrum can be prefiltered with the bandpass filter and then sampled at approximately 5 kHz (or 4900 Hz which is CD audio quality 44.1 kHz divided by downsampling factor 9). After the sampling, the signal will have moved to the 0-2 kHz band.

The energy detector 121 in the software then looks for a sharp rise in the signal energy. This energy detector 121 is used to determine whether an actual signal is present for processing. This can be accomplished by averaging the absolute power of the first bit (energy detector bit in FIG. 5(B)) of the received signal using a first order IIR filter of the form:

$$y[n]=a*\mathrm{abs}(x[n])+(1-a)*y[n],\text{ where }0<a<1\text{ and }x[n]\text{ is the input signal}$$

As mentioned previously, the signal comprising the energy detector bit is the addition of two sinusoids, where one sinusoid is at frequency f0 and the other sinusoid is at frequency f1. The reason why both FSK base frequencies are used is because there's a chance that one or the other frequency component will be DC after aliasing from the downsampling operation. If so, the high pass filter will remove it and the energy detector 121 will miss the beginning of the signal.

The receiver software samples one point. If the energy detector detects a high enough signal, then it's a signal. If not, the energy detector examines the next sample.

The next two blocks 122 and 123 correct for the card's clock errors. In contrast to the clock source in the card, the PC's clock source is more precise. Thus, the PC sends a constant and known frequency for the card to lock onto. The algorithm used by the card is a Least Mean Squared (LMS) on the following equation.

Any sine wave of the form x[n]=A*sin(2*pi*f0*n+phi) satisfies the difference equation:

$$x[n+1]*\cos(2*pi*f0)=(x[n]+x[n+2])/2,\text{ for every }n$$

Most notable about this difference equation is that it is second order, with at least one unknown parameter, b=cos(2*pi*f0), which can be interpreted as an unknown multiplicative constant. By defining an intermediate signal, b is determined by minimizing the mean squared error:

$$E\{(b*x[n]-s[n])^2\}$$

where E{ } denotes statistical expectation. An LMS rule for determining the unknown coefficient b is given by the recursion $$b[n+1]=b[n]-c*(b[n]*x[n]-s[n])$$

where c is a parameter that determines the rate of convergence (0<c<2), and the subtraction is used to implement the negative of the gradient (with respect to the parameter b) of the instantaneous cost C(b*x[n]−s[n]), as defined above. The frequency f0 can be estimated from b[n] by inverting the formula b[n]=cos(2*pi*f0[n]), most preferably in steady state (after convergence), and under the condition that −1<=b[n]<=1.

So, if the coefficient of x[n] is not known, an initial guess can be made and subsequently, the coefficient can be adaptively changed proportionally to the error as in any LMS algorithm. Here, the frequency adaptation bits are used. Referring briefly to FIG. 5(B), the 3 bits of (f1+f0)/2, the 3 bits of f1, and the 3 bits of f0 are used. For the first 3 adaptation bits, the average of f1 and f0 is used to minimize the risk that the correct frequency correction will be made. If only f1 or f0 is used, either f1 or f0 may flip over to the other side on the frequency spectrum during downsampling. When this happens, the receiver software will make a wrong correction of the frequency. By taking the average, the chance that the frequency will flip over is minimized and hence, the wrong correction will not be made.

After the frequency is adaptively selected in block 122, block 123 attempts to decode the first byte. If the decoding is bad, the receiver software returns to the A/D converter stage and starts over.

At block 124, the receiver software decodes the data to determine whether the received signal is a logic "1" or logic "0." Finally, block 125 checks for any errors using the checksum byte.

3.6 Card Mechanical Construction

With respect to the mechanical construction of the electronic card, the electronic card complies with the credit card set of standards—ISO 7810, 7811-1 to 7811-6, 7813, 7816-1, and 7816-2. Some minor deviations from the standard are inevitable such as the location of the external switch and of course, the additional functionality provided by the card electronics. In other embodiments, no attempt is made to make the electronic card comply with the credit card standards. However, in the discussions below, the credit card standard-complying electronic card will be described.

The components in the card are miniaturized and placed on select locations in the card to optimize the use of such limited space. An external button is provided on the electronic card itself so that when it is pressed by the user, the electronic card encrypts the digital ID and transmits the encrypted digital ID via ultrasonic acoustic waves. The card also includes acoustic transduction elements, such as a microphone and a speaker, which serve as the acoustic antennae.

In a preferred embodiment of the invention, the card is thin (0.8 mm is a standard plastic card thickness), so the microphone should also be very thin. The acoustic receiver can be any microphone, such as a regular capsule microphone or an ultrasonic type microphone, which is possibly specific for a particular frequency or frequency range used. In some cases, special ultra-low power circuitry may be desirable. The acoustic transmitter can preferably generate a strong atmosphere wave. It is noted however, that only a small amount of power is required for short range transmissions.

The reception transducer is a capacitive microphone with two plates with a small air gap; that is, the distance between the two plates are small compared to conventional capacitive microphones. Any vibration on the plate changes the capacitance which in turn changes the current to the reception circuitry. With a DC voltage applied across the plates, the resulting changing current signal is filtered, amplified, and then analyzed since the modulation of this signal is directly proportional to the information contained therein. The transmit transducer is a thin stainless steel/brass plate on a PCB with a piezo-ceramic material on top of it. The distance between the top surface of the piezo-ceramic material and the printed PVC layer is approximately 0.8 microns (micro-meters).

The electronic card's battery is small and is guaranteed to work in 0-60 degrees Celsius. Even if the electronic card is left inside a hot car, the battery will not be damaged. The battery also functions in temperatures down to –15 degrees Celsius. Up to 10,000 card activations (i.e., switch press) are possible for one embodiment of the present invention.

The electronic card is very robust to bending and has been designed to provide maximum bending protection. The electrical connection between the battery and the other components is soldered and subsequently covered with PVC, making the circuitry very resilient. Furthermore, components in the card have been placed in locations such that any bending of the card will not damage or otherwise impair the functionality of the electronic card.

With the current fabrication process, the electronic card can be laminated and embossed at 120 degrees for 10 minutes without damage to the card's circuitry or internal components. In other embodiments, the components, such as the transducer itself, are shielded so that hot lamination processes can be used.

The electronic card allows for conventional embossing in the area reserved for embossing cardholder information in compliance with ISO 7816. High pressure embossing is also possible in the card signature field since the electronic card does not have circuitry in this area.

Branding is also important for electronic card sponsors. The electronic card can be printed with any external features of the integrator's choice, including holograms and company logos.

3.6.1 Sheets-Level Card Fabrication

With current smart card fabrication techniques, the exposed nature of the smart card contacts complicates the assembly/lamination/printing process. Usually, assembly of the smart cards involves the manufacture of a plurality of smart cards in sheets. Each sheet is typically 7×12 cards (or 84 cards), although the exact dimensions of the matrix can vary depending on the type of smart card. However, for efficient and cost effective mass production, these smart cards are manufactured in large numbers to produce these sheets. Also, because these sheets contain smart cards, the smart card modules are exposed, which complicates the process. Also, sometime during this process of creating sheets, the individual smart cards are programmed. At some point, these sheets are cut into smart cards.

The current process for producing smart "bank" cards utilizes the conventional credit card fabrication more closely than that of the electronic card of the present invention. In fabricating smart cards, actual fully compliant "dumb" cards are produced in a credit card manufacturing operation. This includes the standard sheet printing/laminating/singulation processes. Once the "dumb" card is complete, it is further processed into a smart card. This is accomplished by machining a cavity into the body of the "dumb" credit cards and implanting a smart card module into the body of the card. The subsequent personalization processes, therefore, do not represent a significant threat to the module.

During the lamination and printing stages, special machines (e.g., DataCard, Heidleberg) are needed to print the appropriate information (logos, numbers) around the exposed smart card modules. Heidleberg printing presses are used for the offset printing of the sheets, whereas the DataCard machines are for the personalization of individual cards, which can include thermal or dye sublimation printing. Without these special machines, the printing/lamination stage could potentially damage the exposed smart card modules and render the smart card useless. Also, special machines would also be needed to read and program the chips in the smart card. If additional personalization is needed (i.e., user name, user signature, user photo), these special machines would be needed again to print around the exposed modules as well as read and program the chips therein. Thus, the exposed modules in these smart cards complicate and otherwise makes costly the card fabrication process after the cards have been laid in sheets.

One embodiment of the present invention significantly improves this procedure. Not only do the electronic cards of the present invention contain "smarts," but these electronic cards do not expose the contacts or modules fabricated therein. The manufacturer programs these cards with the appropriate codes and IDs that are described throughout this patent specification. These cards are also laid out in sheets, where at some point, they are cut to produce the credit card-sized electronic cards. During the printing/lamination stage, standard credit card printing/lamination machines that are used on conventional United States-based "dumb" credit cards are utilized. No special machines are needed to print and laminate around the exposed smart card modules since the electronic cards of the present invention have no exposed modules. Also, since the electronic cards of the present invention have already been programmed, no additional machines are needed to read and program these cards. These cards are delivered directly to the user of the account.

To activate and personalize the card, the user would normally log into the card sponsor's website and press the button on the card. The website would process the data transmission and affiliate the card ID with the user's account. This is analogous to the user calling an 800 number to activate the card. In fact, the card can emit a signal usable over ordinary phone lines or cellular phones and thus, the cardholder's first activation of a card over that 800 number could also result in affiliating the card ID with the cardholder's account. Thus, the issuer need not worry about programming the electronic card since the affiliation of the electronic card with the user's account would occur at the backend after the user has activated the card by pressing the card button. The personalization of the card occurs upon the "first use" of the card in accordance with one embodiment of the present invention. In contrast, conventional technologies require some form of card-accepting device to be available and operational at the time of card registration or activation in order for personalization to occur.

Furthermore, according to the credit card standards, if smart card modules are exposed, the smart card must comply with the credit card standards organization's approved payment system. This involves additional components in the cards and additional programming to comply with the payment standard. By not exposing the modules in the electronic cards of the present invention, the manufacturer of these electronic cards need not comply with this payment system standard. This allows the manufacturer to save on the cost of supplying, assembling, and programming the chips with the payment system standard-complying logic.

By preprogramming the electronic cards and not exposing any of the modules, the fabrication of these electronic cards provides efficiency improvements in fabrication (via the use of standard printing/lamination machines and no additional programming), cost (no additional logic needed to comply with payment system standard; no special machines needed to print/laminate around the exposed modules), and standards compliance (no separate payment system standard compliance issues). In essence, fabricating the electronic card of the present invention provides all the benefits of fabricating a standard credit card, in addition to the benefits described above.

3.6.2 Component Layout

Figure 25A:
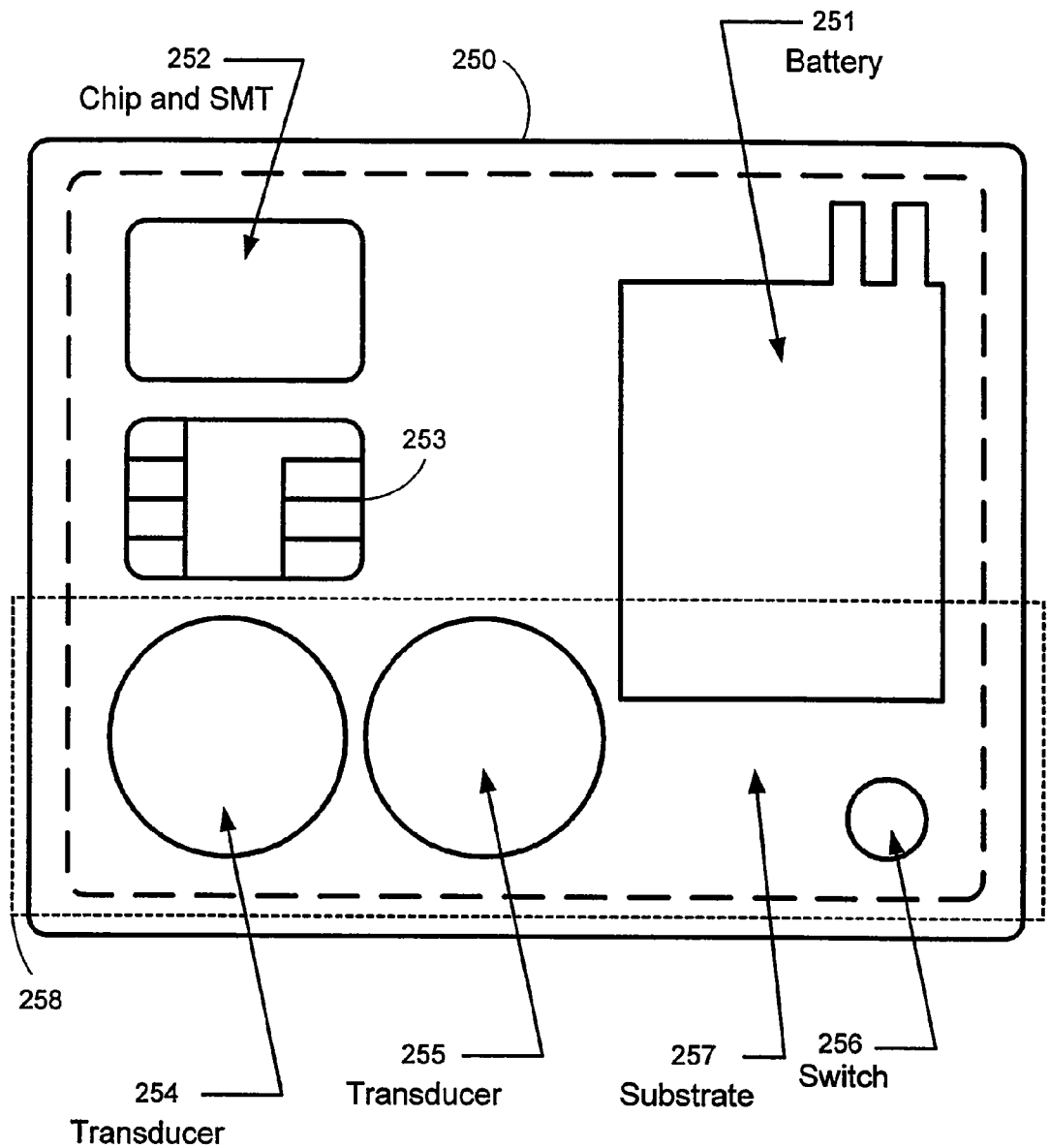
FIGS. 25(A), 25(B), and 25(C) show three embodiments of the component layouts for the electronic card.

The component layout in the electronic card will now be discussed. Referring to FIG. 25(A), the substrate portion of the electronic card is shown. Here, the basic components and their placement in the substrate of the electronic card are illustrated. For the sake of clarity, trace conductors/interconnects are not shown; however, one ordinarily skilled in the art can determine the location and paths of trace lines based on the circuit diagrams described above.

Here, substrate 257 is shown superimposed on the outline of the final credit card form factor card 250. From this orientation, the magnetic stripe portion of a typical credit card is provided in region 258. On one side of the electronic card in this region is the magnetic stripe itself. On the other side of the electronic card in this region is the embossing area where credit card issuers normally place the name, social security number, expiration date, and other embossed information. On the same side is the logo of the credit card, and in some cases, the photo of the cardholder.

In this region 258, several components are also provided—switch 256 and transducers 254 and 255. The switch enables the electronics in the card to first transmit data in the electronic card and then followed by a short receive period. In other embodiments, of course, the single switch permits multiple modes where, for example, a single press indicates transmission and a double press indicates reception. In still other embodiments, multiple switches are provided on a single electronic card. Typically, the switch is a dome switch constructed of stainless steel material. A thin PVC layer also covers the switch. The switch is normally provided on the side opposite the printed PVC layer where the actual magnetic stripe is placed.

In this embodiment, two transducers are provided—one for transmit (e.g., speaker for acoustic signals) and the other for receive (e.g., microphone for acoustic signals). In other embodiments, only one transducer is used for both transmit and receive. Essentially, the transducer is piezo-ceramic disc on top of a small brass/steel plate. The entire structure is enclosed in a reverberation chamber. More details of this construction are provided below.

Outside of this magnetic stripe region 258, the battery 251, the chip and surface mount technology components 252, and electronic card connectors 253 are provided. In one embodiment, the battery is a Varta LPF-25. For smaller capacity, the battery is a Varta LPF-7. The chip and SMT components include the digital core (microprocessor and supporting circuits) as well as the analog front end.

Figure 25B:
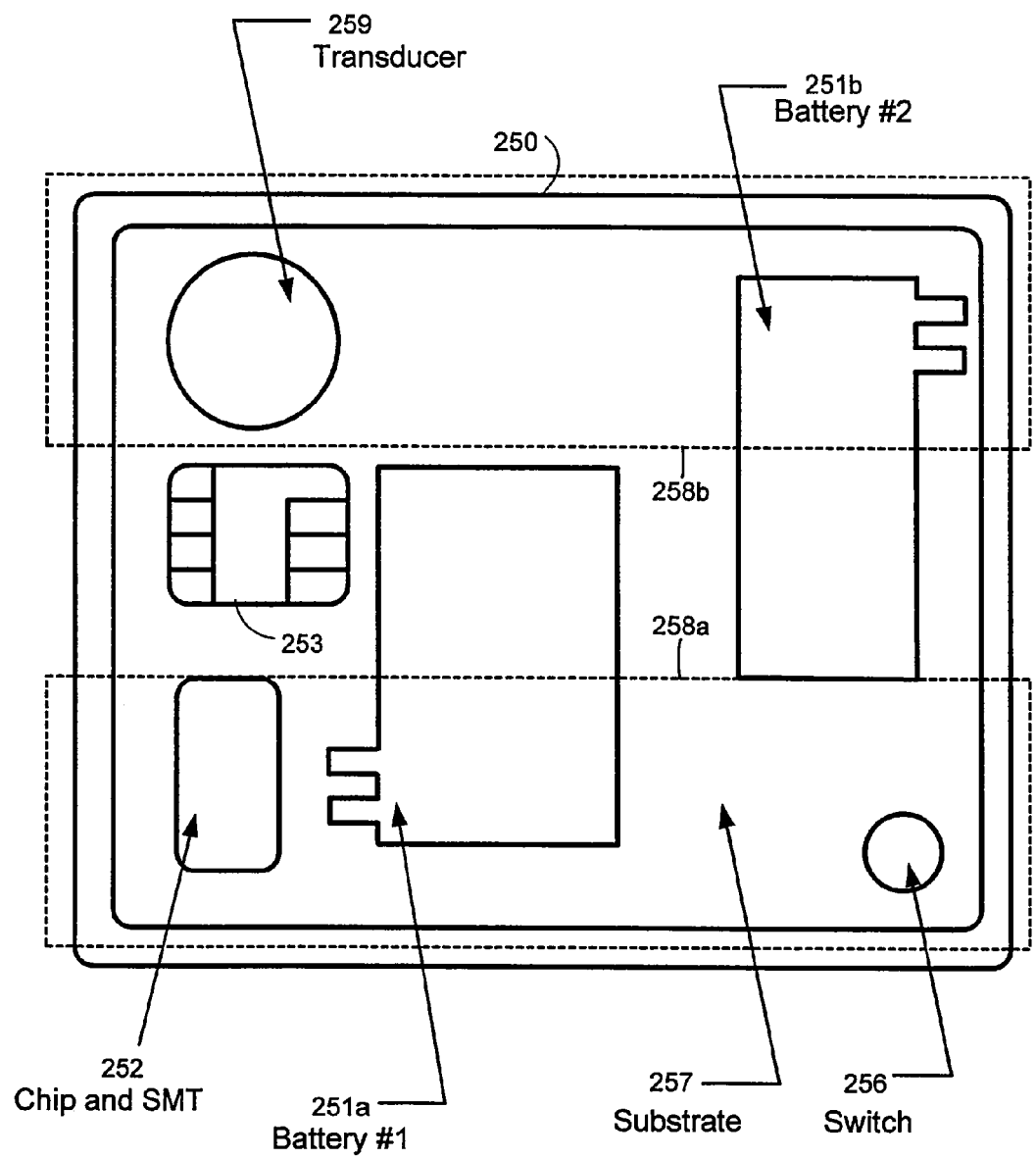

Another embodiment of the component layout is shown in FIG. 25(B). Once again, the substrate 257 is shown superimposed on the outline of the electronic card 250. In this embodiment, two batteries 251a and 251b are provided. Part of the first battery 251a along with the chip/SMT 252 and the switch 256 are in the magnetic stripe region 258a. Outside of this region, the electronic card connectors 253, transducer 259 (which can provide both transmit and receive functions) and second battery 251b are provided.

In another embodiment, region 258b is the magnetic stripe area, instead of region 258a. In this embodiment, transducer 259 and part of the second battery 251b are placed in this region without affecting the magnetic stripe. Other components are outside this region 258b.

Figure 25C:
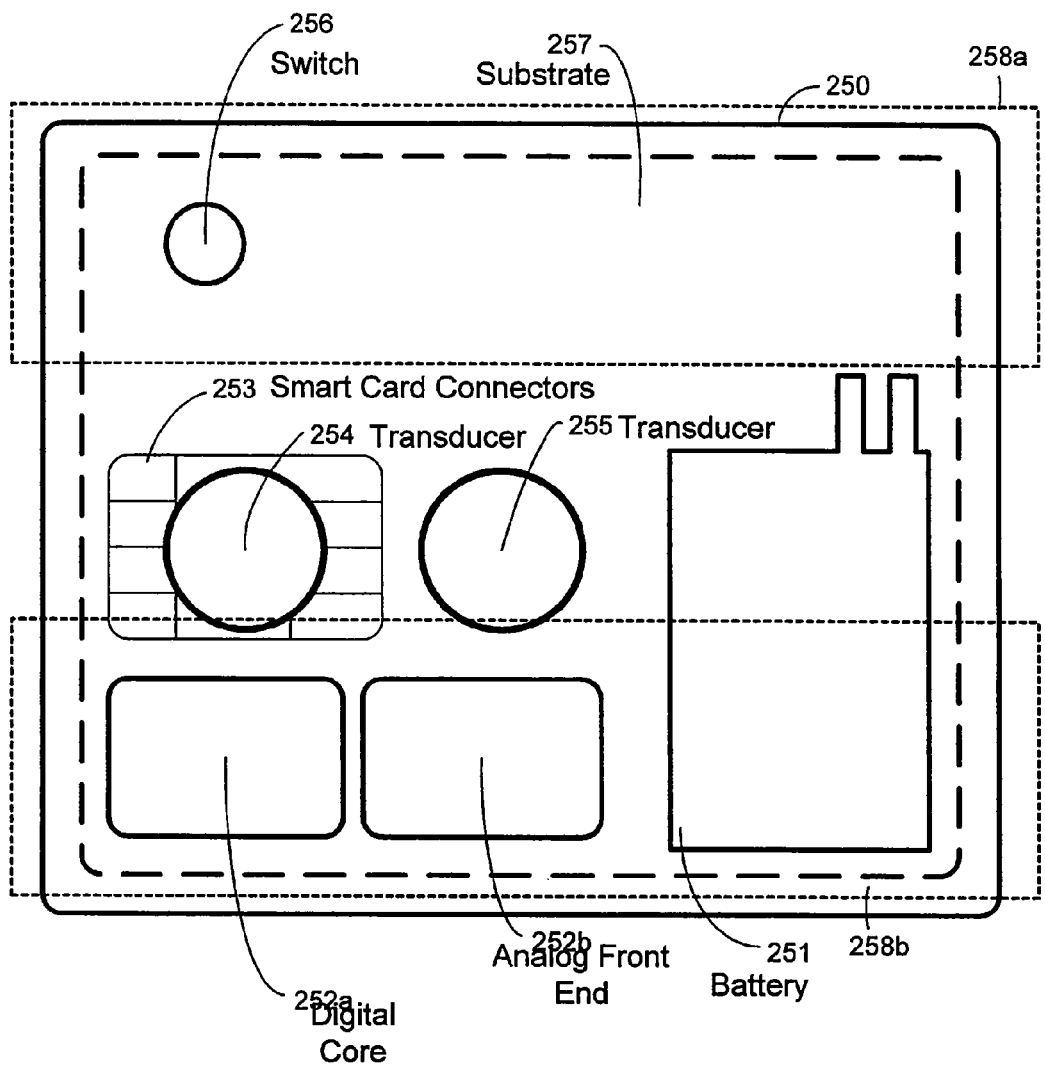

FIG. 25(C) shows a third embodiment of the component layout. In this embodiment, the switch 256 is the only component in the magnetic stripe region 258a. All other components including the two transducers 254, 255, the electronic card connectors 253, the digital core circuitry 252a, the analog front end circuitry 252b, and the battery 251 are placed outside this region 258a. Note that in this embodiment, the electronic card connectors 253 are placed below transducer 254. The magnetic stripe region 258a can also be used for embossing purposes.

In another embodiment, region 258b is used for the magnetic stripe. In this case, region 258a would be used for embossing.

As these three embodiments in FIGS. 25(A), 25(B), and 25(C) illustrate, the placement of the components in the electronic card is an important design criteria. Generally, the embossing area, which is also typically not the same area as the magnetic stripe region 258, should have as little components as possible. This allows embossing to be accomplished with relative ease while minimizing the concerns that credit card manufacturers may have on whether the embossing process might harm an electronic component. However, as components get smaller and smaller, the placement of some components (in whole or in part) should not affect the durability and reliability of the electronic card.

3.6.3 Card Layers

Figure 26:
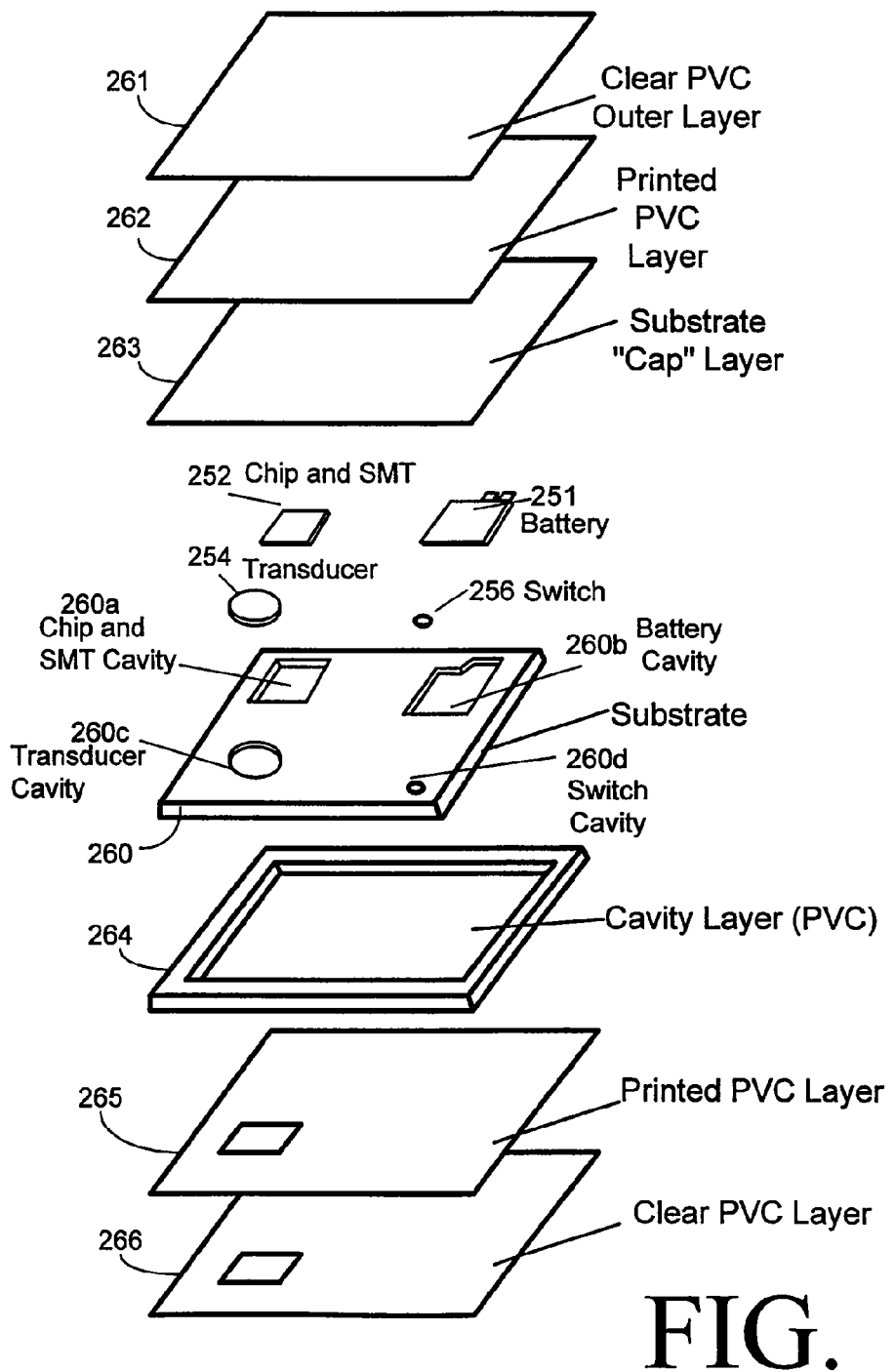
FIG. 26 shows the layers of materials that make up the electronic card in accordance with one embodiment of the present invention.

The fabrication of the electronic card will now be discussed. FIG. 26 shows the various layers that make up the electronic card. At the heart of these layers is the substrate layer 260. This substrate layer includes a chip/SMT cavity 260a, battery cavity 260b, transducer cavity 260c, and switch cavity 260d, where the chip/SMT component 252, battery 251, transducer 254, and switch 256 are placed in these cavities, respectively. Some insulation material is used to cover the battery 251. Also, in some embodiments, the electronic card connectors (not shown in FIG. 26) are covered with PVC and other insulation material after the microprocessor in the electronic card has been programmed and debugged. In the portion of the substrate where silicon components are provided, some epoxy material is used to cover this area to prevent moisture from forming and to prevent this area from physically bending.

Surrounding the substrate layer 260 is the substrate "cap" layer 263 and the cavity layer 264. The substrate "cap" layer 263 is basically a very thin PCB where the underside (in the direction facing the substrate 260) has copper interconnects with special coating. The cavity layer 264 is a PVC material that is provided around the substrate 260 to artificially produce a fixed and constant height for the substrate 260 and its components. Obviously, without the cavity layer 264, the placement of the various components in the substrate layer 260 results in different heights for the different regions of the substrate. This entire section which includes the substrate "cap" layer 263, the substrate layer 260 (with the components), and the cavity layer 264 are all filled with a material to fill in gaps to eventually even out the height of the entire section.

Above the substrate "cap" layer 263 is the printed PVC layer 262. The magnetic stripe is fabricated on this layer. Analogously, the other printed PVC layer 265 is provided below the cavity layer 264. The various images (e.g., credit card logo, bank logo), photos, and other information associated with credit cards are provided on this layer. Conversely, the magnetic stripe can be placed on printed PVC layer 265 and the other images and photos can be placed on PVC layer 262. A clear PVC outer layer 261, 266 are provided on the outer surface of each side of the electronic card.

3.6.4 Transducer Construction

Figure 27A:
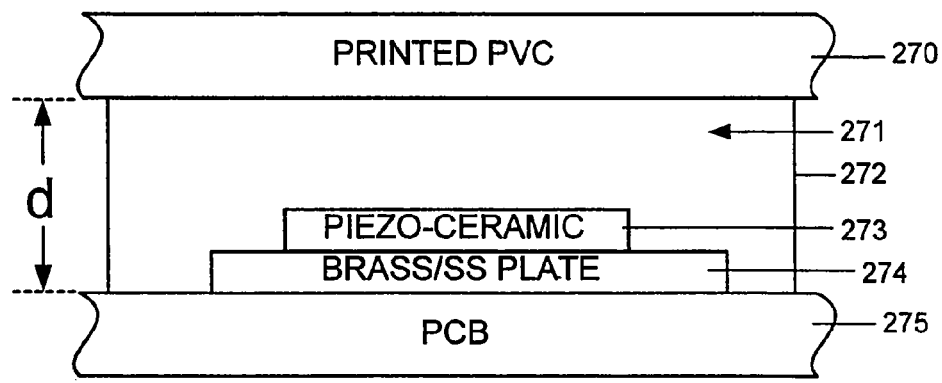
FIGS. 27(A), 27(B), and 27(C) illustrate the transducer construction in accordance with three embodiments of the present invention.

The mechanical construction of the transducer will now be described with respect to FIGS. 27(A) to 27(C). FIG. 27(A) shows a cross-section of a circular transducer, like transducer 254 of FIG. 25(A), in accordance with one embodiment of the present invention. On the PCB 275, which is approximately 0.1 um (microns) in height of plastic, a brass/stainless steel plate 274 is provided. The brass/stainless steel plate 274 is approximately 0.1 um to 0.15 um in height. On top of the brass/stainless steel plate 274 is a small piezo-ceramic disc or element 273, which is approximately 0.15 um in height.

To provide some room for the vibration or movement of the piezo-ceramic element 273 to generate the acoustics, some space is provided around the piezo-ceramic element 273. Spaced apart from the piezo-ceramic element is the printed PVC layer 270. The distance from the top of the piezo-ceramic element 273 to the bottom of the printed PVC layer 270 is approximately 0.8 um. A wall 272 surrounds the piezo-ceramic element 273 and the brass/stainless steel plate 274 to create some enclosed chamber 271. The spacing of piezo-ceramic element 273 from the printed PVC layer 270 and the creation of a chamber 271 with the wall 272 also result in some form of a reverberation chamber for the acoustics. The acoustic signal is generally directed toward the PCB 275 (downward direction on FIG. 27(A)).

The resonant frequency of the acoustic signals generated by this transducer depends on the selection of the various parameters of the components in the transducer. The main parameters include the thickness of the piezo-ceramic element 273, and the thickness, stiffness, type of material, shape, and diameter of the brass/stainless steel plate 274.

Figure 27B:
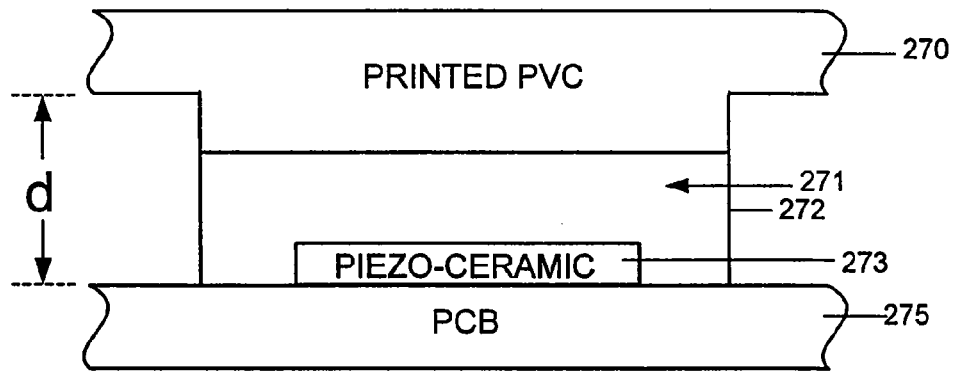
Figure 27C:
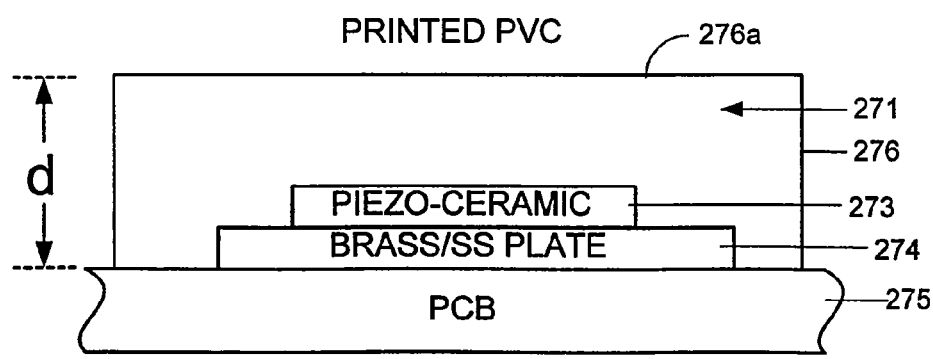

FIG. 27(B) shows an alternative embodiment of the transducer construction. In this embodiment, the brass/stainless steel plate is not used. Instead, the piezo-ceramic element 273 rests on and uses the PCB layer 275 as a substitute plate. Additionally a portion of the printed PVC layer 270 protrudes into the chamber 271 so that the distance between the top of the piezo-ceramic element 273 and the bottom of the protruded printed PVC layer 270 remains at 0.8 um. In a variation of this embodiment, the piezo-ceramic element 273 can be made thicker so that the protruding portion of the printed PVC layer 270 would not be necessary. The additional thickness of the piezo-ceramic element 273 would be approximately 0.15 um (or the thickness of the brass/stainless steel plate had such a plate been used). Thus, the distance between the top of the piezo-ceramic element 273 and the bottom of the unprotruding printed PVC layer 270 is 0.8 um.

The embodiments of FIGS. 27(A) and 27(B) show transducers which are fabricated as the entire electronic card is fabricated. In contrast, FIG. 27(C) shows a third embodiment of the transducer construction where the transducer is modular and not fabricated with the card. In this embodiment, the wall 276 also includes a cover portion 276a. The cover portion 276a and the wall 276 form the chamber or cavity 271. In one embodiment, the cover portion 276a and the wall 276 are made of either steel or plastic. In this configuration, the piezo-ceramic element 273 need not rely on the printed PVC layer to form the chamber. When this modular transducer is used in the fabrication process of the electronic card, other fabrication technology can be used. For example, the more widely available technique of hot lamination can be used in some of the fabrication steps. Without the modular transducer of FIG. 27(C), some components in the transducer cannot be heated too high without component failure.

4.0 Base Station

In one embodiment, the base station is a station that is part of a land-based infrastructure. Although it is usually part of some network, this is not a mandatory requirement. Thus, a personal computer, whether or not it is connected to a local area network or has access to the Internet, is a base station. Other exemplary base stations include televisions, radios, telephones, automated teller machines, card reader at the store checkout line, and the like. In one embodiment, the base station transmission software is similar to that of the electronic card.

In another embodiment, the base station is not necessarily part of the land-based infrastructure; rather, the base station can be portable. Thus, cellular phones, personal digital assistants (PDAs), portable radios, portable televisions, and the like can be base stations. Like the land-based base station, the electronic card in accordance with one embodiment of the present invention can communicate with the portable base station.

In either case, the frequencies for the acoustic signal are carefully selected to enable the electronic card to communicate with the base station. For example, if the base station is a personal computer with a sound system, the acoustic signals can be in the ultrasound range. If the base station is a telephone connected to the public telephone infrastructure, then the acoustic signals should be in the audible range so that they can pass through the filters effectively. Note that a single card can be equipped to emit either audible or ultrasonic transmissions as desired to send to a telephone, a computer, or other digital devices as needed. In another embodiment, the audible frequencies selected conform to the standard DTMF scheme.

4.1 Client Computer System

Referring briefly to FIG. 1, in the client computer system 14, a special client remote access software in accordance with one embodiment of the present invention is installed and running. In addition, a standard microphone, speaker(s), and a web browser are utilized. Of course, a web browser is not absolutely essential so long as the computer system allows the user to access the Internet. This can be accomplished with a piece of communications software. At the web merchant or web portal side, a server is provided to handle the user's redemption needs. Thus, having downloaded the coupon from a TV 12 or radio 11, the user can take his card to his computer 14, access the Internet 16, and redeem his coupon at the sponsoring web merchant's or web portal's website.

Figure 11:
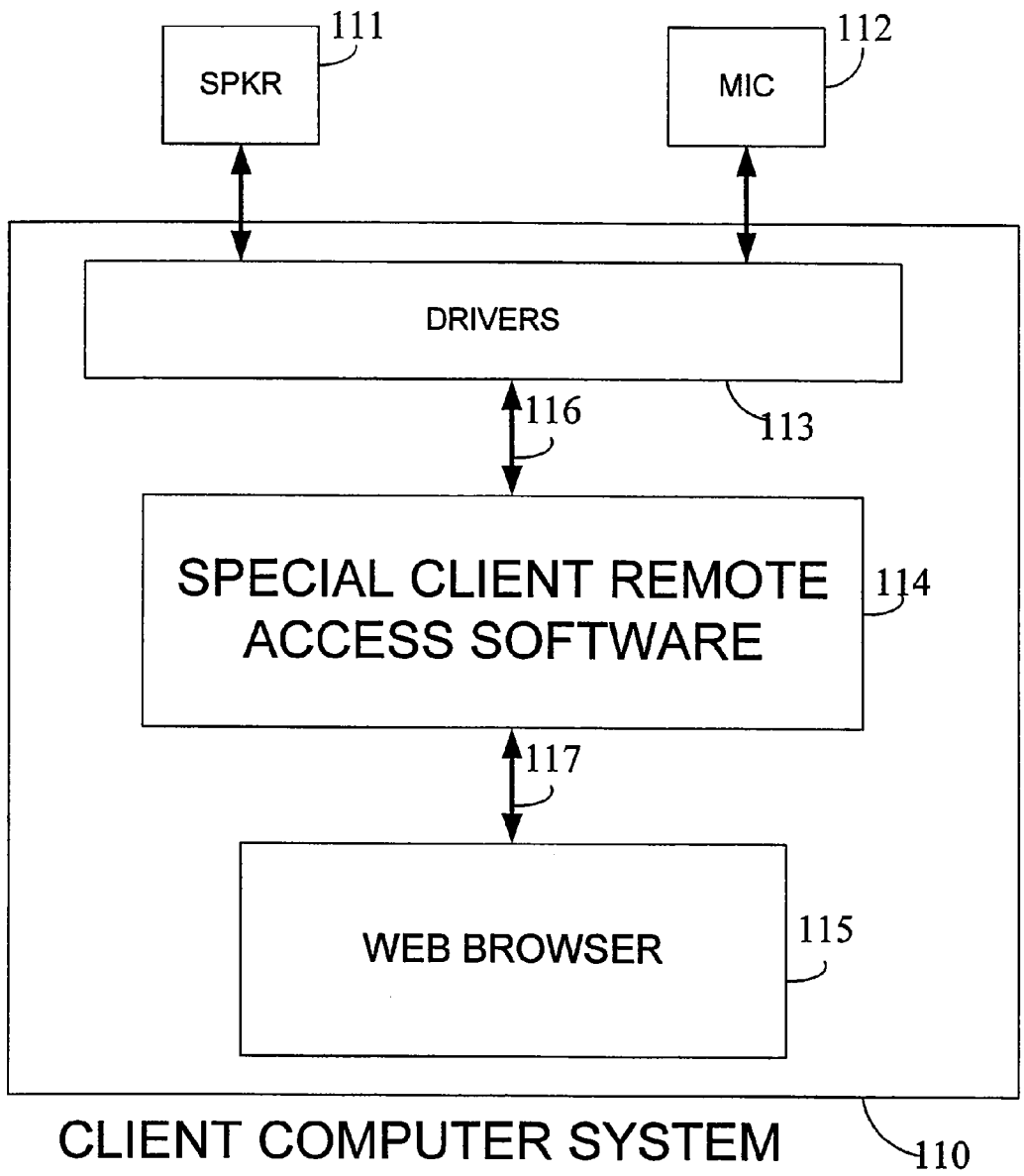
FIG. 11 shows the key components of the client computer system, including the speaker/microphone, sound card driver, special client remote access software, and the web browser in accordance with one embodiment of the present invention. Note that the browser is optional and that the present invention is operational with just the special client remote access software.

Referring now to FIG. 11, the client computer system will now be described. The client computer system includes a web browser (e.g., Microsoft Internet Explorer, Netscape Navigator) 115, a special client remote access software 114, at least one speaker 111, a microphone 112, and drivers 113 for the sound device(s) (e.g., speaker/microphone). The sound card and corresponding sound card software normally interfaces with the speaker and microphone. Most computers currently on sale include a sound system, usually a "Sound Blaster" sound card, connected to at least one microphone and at least one speaker.

Note that the sound devices that are necessary depend on the particular application of the electronic card. If the electronic card is one-way transmission only, only the microphone is needed in the computer system. If the electronic card is two-way, both the speaker and the microphone would be needed. If the electronic card is one-way receive only, then the speaker would be needed in the computer system.

In a preferred embodiment of the invention, client computer system 110 and electronic card 10 communicate using these standard computer components of client computer system 110, which are usually for human communication, not for computer communication. Some computers are provided with other types of sound systems, which also support the application of preferred embodiments of the invention, possibly with a variation in frequencies to account for different circuit or sampling characteristics. Typically, this sound system is designed for generating music and other audible sounds. In addition, many computers include an internal speaker and a modem speaker. Some computers use USB speakers which are connected directly to the USB (Universal Serial Bus).

In one preferred embodiment of the invention, a standard sound card, such as the popular "Sound-Blaster" is used to generate sonic and/or ultrasonic signals to (and to alternatively or additionally receive them from) an electronic card. The acoustic signal may be audible (in some applications) or inaudible (more preferable), for example having mainly ultrasonic or infrasonic frequencies. Preferably, frequencies of about 22 kHz and 24 kHz and 32 kHz are used, since a standard sound card provides these sampling rates (and/or their multiples, e.g., 44 kHz and 48 kHz). Alternatively, lower frequencies, such as between 17 kHz and 21 kHz may be used. In other embodiments, the standard sound card receives sound waves from the electronic card 10 (see FIG. 1) for further processing.

In some preferred embodiments of the invention, a sound card is adapted to work in the near ultrasonic range, for example by increasing its sampling frequency. Generally, the microphone and loudspeaker used for a computer system can support low frequency ultrasound with sufficient fidelity without adaptation. However, in some embodiments of the invention, a special ultrasound-sensitive microphone or ultrasound-effective speaker may be used. In other cases, the sensitivity of a particular microphone and/or loudspeaker maybe determined by the user prior to or during communication with an electronic card.

To provide for software control of the speaker 111 and the microphone 112, the client computer system 110 includes drivers 113. Normally, the user can set playback volume and recording volume on the software control panel which are then set in hardware by the drivers.

A special client remote access software 114 is provided to interface with the speaker/microphone drivers 113 via communication line 116 and the web browser 115 (or communications application) via line 117. The special client remote access software 114 was written specifically for the various embodiments of the present invention. This software 114 is installed in the client computer system 110 and is normally loaded at all times because the user may use his electronic card 10 at any time. Of course, if the special client remote access software 114 is not loaded, the user simply opens the application whenever he is operating the card.

The special client remote access software 114 performs multiple tasks that are important to the various embodiments of the present invention. During the initial stages of the user's on-line purchase, the special client remote access software 114 processes the sound waves corresponding to the digital ID that have been emitted by the electronic card 10. After having been received by the microphone and processed by the sound card, the sound waves are processed further. The special client remote access software 114 checks the encrypted digital ID sound waves to make sure that the data is complete and corresponds to the appropriate user's electronic card 10. Thereafter, the received data is processed by special client remote access software 114 in different ways depending on the application.

4.2 Installation and Initialization

As mentioned above, the special client remote access software 114 in the user's PC is needed to communicate with the electronic card and the web browser. At times, the special client remote access software 114 can access the Internet and communicate with web servers without the web browser. The installation of the special client remote access software 114 can be accomplished in many different ways. The installation may occur over the web as the software is downloaded from a web server and then subsequently installed in the user's PC. Alternatively, the software can be installed via CD-ROM or floppy disk. Furthermore, when the user buys a computer, the software may be bundled with the computer equipment so that installation is automatic.

In communicating with the web browser, the special client remote access software 114 uses Java applets. When the special software 114 needs to interact with a web page, the Java applet calls the appropriate ActiveX controls to perform basic functions associated with that web page. The deployment of ActiveX by the special software 114 is routine and is known to those ordinarily skilled in the art. In this manner, some aspects of the special client remote access software are found in various servers that can be downloaded to the local client as they are needed. The basic special client remote access software 114 however, is installed locally. Thus, as the user navigates from one webpage to another, different functions may be supported. As the user encounters these webpages, the user can download these different functions to extend the capabilities of his electronic card.

For example, assume that a user has encountered a shopping website. The shopping website requires some authentication to log in. The website indicates that it supports the electronic card. The user then downloads the authentication logic from this website's server. Once downloaded, the user can then press his electronic card to authenticate himself into the website and access his account. When he reaches the checkout line, he downloads the form fill logic from that website's server. When he presses the button on his electronic card, the just recently downloaded form fill logic portion of the special client software recognizes the electronic card transmission as requesting a form fill. The special client software then fills out the form on that webpage to assist the user. Other functions can be supported in this manner. Thus, as the user navigates from one webpage to another, he can encounter webpages that support different electronic card functions. If desired, the user can download those functions to extend the usefulness of the electronic card at that website.

In other embodiments, the special client software does not need the web browser to communicate on the web. After all, the special client software can contain all functionality that is in the web browser in addition to the functions needed to communicate with the electronic card. In a further embodiment, the special client software is not needed as the web browser provides all the functions that the user will need. A Java applet downloaded via a Java VM can perform all the specialized electronic card-related tasks, while the web browser itself allows the user to communicate on the web.

Initialization primarily involves the sound system and its supporting equipment. Two main tasks are executed—(1) mixer settings, and (2) sound card memory allocation. When the special client software is launched or otherwise turned on, it initially stores the default mixer settings so that later, it can return the PC to the state before the special client software was activated. The special client software then checks and adjusts the mixer control settings so that the sound card is optimized to interact with the electronic card.

First, the recording setting must be on. If it is off, the special client software turns on the recording setting. In other embodiments, the special client software asks the user to turn on the recording setting.

The special client software then performs several tests, with and without the assistance of the user. These tests involve testing the speaker, the microphone, and the electronic card-PC communication, as detailed below. These tests need not be performed every time, though.

The special client software also checks the microphone. If the microphone is off, then the special client software enables the microphone to be turned on. Alternatively, the special client software may ask the user to turn on the microphone. The special client software may also ask the user to test the microphone by speaking into the microphone. Various threshold settings are stored—(1) silent mic, (2) non-receiving mic, and (3) receiving mic. Alternatively (or additionally), the special client software may ask the user to operate the electronic card. If the test fails, the special client software will ask the user to fix the electronic card by providing various tips, such as proper press of switch, proper distance of electronic card to microphone, proper orientation of the electronic card to the microphone, and the like.

Additionally, to avoid feedback problems, the special client software turns off the playback control. For those sound blasters with AGC, the special client software will turn on the AGC setting when appropriate, as well as other special settings (e.g., boost).

The special client software takes control of the volume control slider and moves it all the way up to maximum. In some cases, however, audio clipping may be a problem due to the presence of ambient noise. If so, the special client software may move down the volume control slider and then subsequently alert the user to retransmit the data from the electronic card. In one embodiment, a test may be performed with a sample audio file. During the initialization phase, the special client software asks the user to transmit a sample data. By pressing the TX switch in the electronic card, a sample audio file is transmitted. Based on the reception quality of this sample audio file, the special client software adjusts the volume control setting that allows proper recording while minimizing the negative influence of ambient noise.

For the sound card memory allocation, the special client software sends a request to the sound card driver in the PC to allocate memory. The memory has to be substantial enough to hold the audio data. In a typical sound card, 8 MB are available in the buffer. Usually, not all of this memory is needed. However, in some applications, many seconds of audio need to be recorded. As an exemplary number for the amount of memory used, approximately 1 MB is needed to record 10 seconds of audio.

In one embodiment of the sound card, assume that the special client software needs about 1 MB of memory to record 9-10 total seconds of audio. The sound card driver divides the 1 MB of memory into 36 buffers, where each buffer holds approximately 250 ms of audio data. When any buffer is filled, the sound card driver sends the audio data in that buffer to the special client software.

For two-way embodiments, a test with a sample .wav file is done to determine whether the electronic card can receive data properly. The special client software includes a sample audio .wav file. After the memory is allocated by the sound card, the sound card driver sends a pointer to a buffer location. The special client software then sends the sample .wav file to the buffer location specified by the pointer. The sound card then plays the .wav file through its speaker(s) while the electronic card receives this audio sample. If the expected audio sample is received and properly decoded in the electronic card, then the electronic card generates an audible beep to indicate that the test was successful.

Typically, these initialization settings are made upon launch of the special client software. When the electronic card transmits the data to the PC, the special client software processes this data. After processing this data, one embodiment returns the PC back to the initialization state where it waits for additional data transmissions from the electronic card. Thus, the special client software is active (usually as a tray application on the desktop) and the sound card is optimized for electronic card-to-PC communications until the application is closed.

In another embodiment, however, the special client software restores the default mixer settings. As mentioned above, the special client software stored the mixer control settings prior to adjusting them for the electronic card. If the user needs to use the electronic card again, he enables the initialization routine to start over again for the mixer control settings and the sound card memory allocation.

4.3 Base Station Transmission Software

The primary purpose of the base station transmission software is to generate the data stream shown in FIG. 5(B). The data portion of the data stream can be instructions, flags, and pure data for storage (e.g., coupons). For the most part, if sound is utilized, a conventional audio file (e.g., .wav file) is played by a software audio player as is known in the art.

In some cases, the data is transmitted from a computer system via the speakers. The special client software packages the data to be transmitted, whether the data is locally available or downloaded remotely from a website, and transmits them. The transmission involves the playing of the audio .wav file. Thus, the packaging of the data to be transmitted can be as simple as locating the relevant audio file in memory and playing that audio file via the speakers.

In other cases, the data is transmitted from a TV or radio set. Today's television sets and radios are fairly passive and dumb devices; that is, they merely broadcast what they have received from the conventional TV/radio stations or the cable infrastructure. Accordingly, the transmission software is installed in the location where the coupon data is mixed with the programming. This may be the headend or even the network program source in the cable infrastructure. Once mixed, the coupon data (whether audible or ultrasonic) and the regular TV/radio program travel through the normal channels to the user's TV or radio set. Thereafter, if the TV or radio set is on, it transmits the data stream of FIG. 5(B) via acoustic waves, where the coupon data is found in the data portion of the data stream.

4.4 Base Station Reception Software

When any sound is emitted by some sound source, whether or not the sound source is the smart card of the present invention, the microphone on the computer (computer 14 of FIG. 1) may pick up that sound. If the sound complies with the data stream format of FIG. 5(A), the special client software 114 (FIG. 11) can process it and extract the data therein. If, however, the sound is unrecognizable (or is otherwise noise) to the special client software 114, it ignores it. Generally, the special client remote access software 114 in the PC receives a signal, determines whether the signal is proper, and if so, performs digital signal processing on the signal and decodes it. Based on the decoded signal, the special client software 114 can perform many functions such as open a web browser to a specific web page, fill out a form, redeem a coupon, and otherwise automate previously manual operations.

Figure 13:
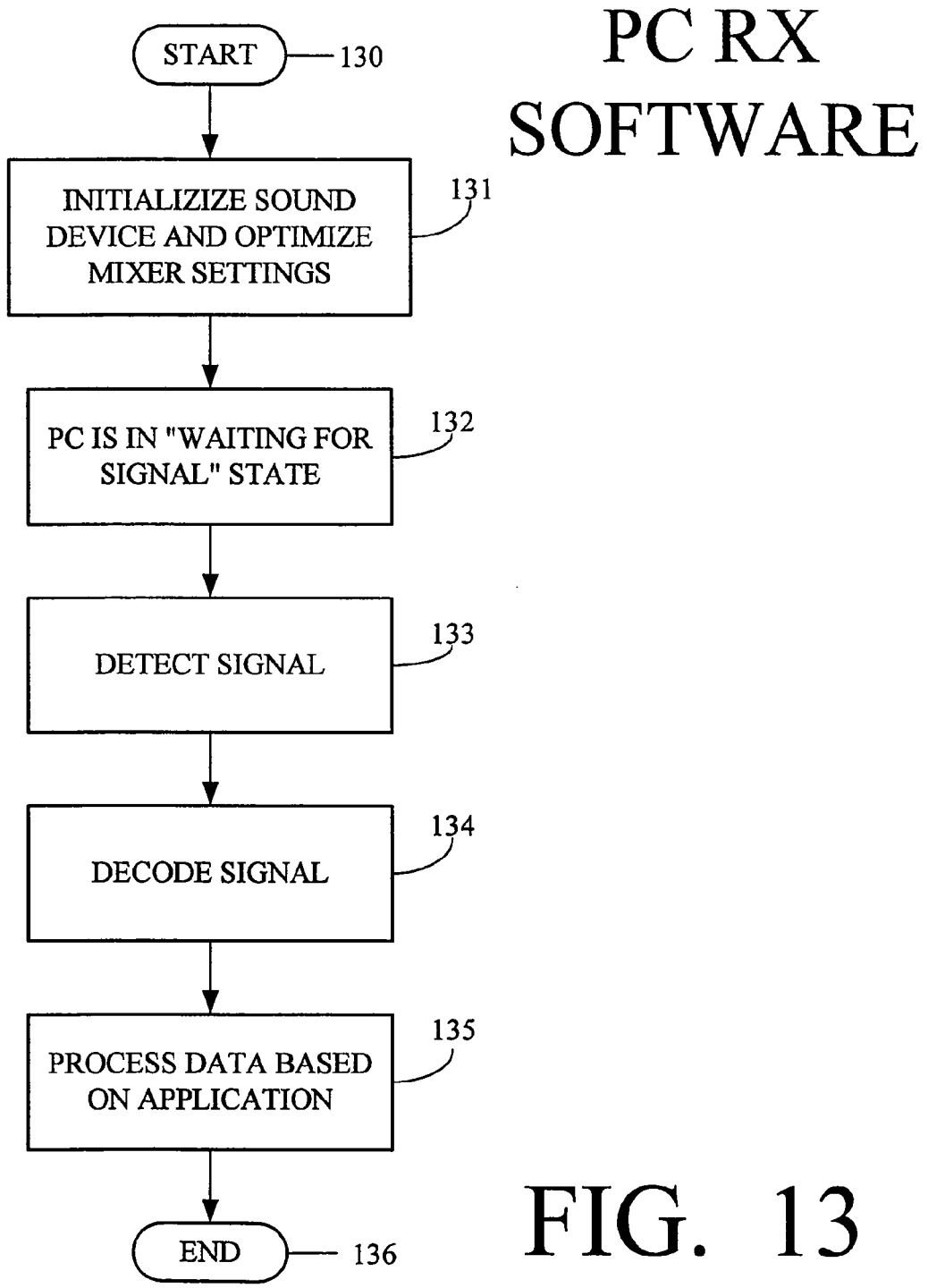
FIG. 13 shows a flow chart of the reception software in a personal computer.

In one embodiment, the base station is a personal computer that is connected to the Internet. FIG. 13 shows a flow chart of one embodiment of the reception software portion of the special client software 114 (FIG. 11). In FIG. 13, the process begins at step 130. At step 131, the software initializes the sound device (e.g., "Sound Blaster" sound card) and optimizes the mixer settings. Here, the software allocates enough memory in the sound device to properly receive all the data. In one embodiment, it allocates 1 MB of memory, which allows for approximately 10 seconds of sound. It also checks to make sure the microphone is on (if it's off). The recording volume is initially set at the highest level. In some cases, however, if the recording volume is too high, signals will overflow the system and data may be lost. In other words, clipping may occur because of ambient noise. In this case, the software will readjust the recording volume slider to suitable levels. If the recording volume is too low, weak signals may not be detected. To avoid feedback, the playback mic control is turned off. In some sound devices, an automatic gain control (AGC) feature is provided. In this case, the software turns on the AGC.

After the initialization step, the PC is in a "waiting for signal" state at step 132. As mentioned before, in accordance with one embodiment of the present invention, the signal is in the form of a Frequency Shift Keying (FSK) signal. At step 133, the software performs the detection operation. The detection of the FSK signal involves two distinct operations—multi-rate processing and signal detection. In multi-rate processing, the signal from the A/D converter (from the sound device) is high pass filtered and downsampled while preserving the range of frequencies in which the received signal is assumed to occupy. This stage is used to restrict the attention of the detector to a narrow band of frequencies in which the received signal may or may not be present.

The problem of detection is to determine whether a transmitted signal is present in a background noise environment. Assuming noise is gausian in nature, one technique is to correlate the received signal with the specific expected wave. The output of the correlator Z[n], can then be compared against a threshold to decide if signal is present. The test is $$Z[n] = \sum_{m=0}^{\infty} h_{mf}[m] y[n-m] \gtrless_{H0}^{H1} \eta$$

y[n] is the received signal. $h_{mf}[n]$ is a matched filter (usually a sinusoid for FSK transmission). H1 is the alternate hypothesis (signal present), and H0 is the null hypothesis (no signal present). The test threshold $\eta$ is a value determined to minimize the probability of false alarm, while maximizing the probability of detection. This maximization is determined directly from the distribution of the test statistic Z[n].

In practice, the frequencies and amplitudes of the FSK signals are not known a priori, with the result that a band of frequencies, corresponding to that band of frequencies defined by the range of error from the transmitting card, are scanned using Discrete Fourier Transform (DFT) banks and then subjected to Generalized Likelihood Ratio Tests (GLRTs), to establish the presence or absence of a signal given. A GLRT is used since the amplitude of the transmitted signal is unknown, and so is the estimated parameter in the test. The noise thresholds for the tests are generated from a delayed window of "noise only" data, where the decision "noise only" was made by the detector at an earlier time, or from the start-up default condition, where the noise statistics are estimated. Subsequent to statistical testing, the received signal is further established as valid if it contains the proper data format (see FIG. 5(A)) and spacing between frequencies f0 and f1.

Figure 14:
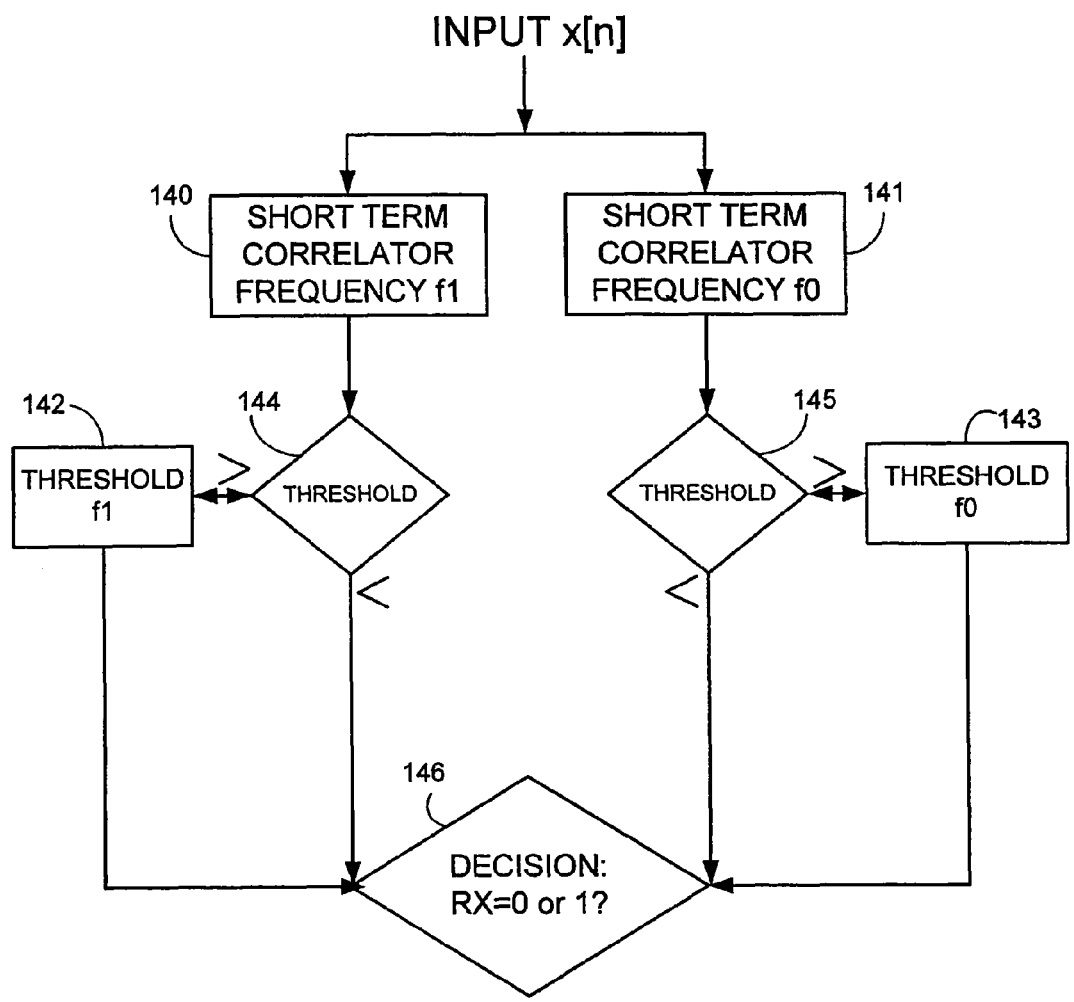
FIG. 14 shows a signal decoder in accordance with one embodiment of the present invention.

Once the signal has been detected at step 133, step 134 decodes the signal. The decoding procedure considers each of the two FSK channels separately to draw conclusions about the transmitted data. Referring briefly to FIG. 14, the input detected signal is provided to two short term correlators— frequency f1 correlator 140 and frequency f0 correlator 141. Again, the notion of a test statistic is used, where the test statistics are generated by the two correlators. The hypothesis testing in this case is that between the alternate hypothesis (Signal present, power A0 in correlator 140 or A1 in correlator 141), and the null hypothesis (No signal present, power level E0 in correlator 140 or E1 for correlator 141). The testing between the two hypotheses in each channel can thus be understood to establish the received signal variance as being either A1 (or A0) over E1 (or E0) in correlator 140 (or 141) given a Gaussian distribution for each hypothesis and an equal probability that the received bit is a one or zero, that is, for correlator 140, the following test is used:

$$\frac{p(r/\sigma_{r/H_1}^2 = A1)}{p(r/\sigma_{r/H_0}^2 = E1)} \gtrless_{H_0}^{H_1} 1$$

This two-pronged approach for making bit decisions is necessary since the received FSK signal may be subject to echoes, a phenomenon that affects each channel differently. The advantage of making two decisions, one for each channel, as opposed to a single decision, based on a test statistic generated from testing the likelihood of one frequency (channel) over the other, is that when both channels disagree on the value of the received bit, one can use the ratios A1/E1 and A0/E0, as a means for favoring the decision of one channel over the other. That is, if one channel has a stronger echo, it is less reliable. It is also important to note that the quantities A0, A1, E0, and E1 are all time varying quantities, owing to the fact that card movement, even slight movement, can give rise to noticeable changes in echo and signal levels. As a result, these quantities must be tracked throughout the transmission. It should be clear that if the bit rate is Fb=1/Tb, then the above procedure is performed exactly once every Tb seconds, where the optimal timing, that is, the point at which to sample in an interval Tb, is determined during synchronization and resynchronization.

The output of correlator 140 is provided to threshold 144, where the threshold is determined from the log-likelihood ratio test between zero mean Gaussian distributions having variances A1 or E1, under the alternate and null hypotheses, respectively. If the signal is greater than this threshold, then block 146 makes a decision that the signal is a logic "1" and updates A1 based on the current output power from correlator 140, and using some averaging with the current value of A1. If the signal is less than this threshold, a "0" is established, and the value of E1 is updated based on the current output power from the correlator (140) and the current value of E1. Similarly, the output of correlator 141 is provided to threshold 145. If the signal is greater than the threshold determined from the likelihood ratio test that decides between the alternate hypothesis (variance=A0) and the null hypothesis (variance=E0), then block 146 makes a decision that the signal is a logic "0" and A0 is updated based on a weighted average between the current output from the f0 correlator (141) and the current value of A0. If the signal is not greater than this threshold, then a logic "1" is decided and E0 is updated. The signal is then provided to block 146 for the decision. Under most circumstances, we expect that the two LRTs (144 and 145) will make the same decision, agreeing that a "1" or "0" was received for a given symbol interval. In cases where the two disagree, then if this is due to echoes, we can establish the best decision based on that channel having less echoing, which is determined from the ratio E0/A0 or E1/A1. This final level of decision making is performed at step 146.

To summarize the decoding operation, each of the two channels is processed separately, with a threshold being both tested against and updated from the current observation. In the case where both channels make the same decision, a secondary test is provided which takes into account the signals when the channels are inactive.

Returning to FIG. 13, the decoded data is then stored and processed based on the application at step 135. The application may be simple form filling on a web page after the user purchases some merchandise. The application may be the automatic launching of the user's web browser and navigation to a particular home page. Also, the application may be the delivery of the data to a web site for processing at the server, such as when coupons are redeemed. The process ends at step 136. Normally, the special client software is always turned on in the background (i.e., application could be placed in the Windows "tray").

The detection operation will now be discussed in greater detail. One of the keys to implementing a recursive DFT rests on preserving the property of orthogonality between the frequencies in the DFT and ignoring the choice of phase, which itself is arbitrary. Phase is only significant in a relative sense; that is, phase exists between the frequency components in the received signal. If desired, this phase can be discerned in a recursive DFT scheme with a few additional operations. Accordingly, this allows for the extensions of this scheme to Phase Shift Keying (PSK) and Quarternary Phase Shift Keying (QPSK), as well as the generalizations of these procedures.

Figure 15:
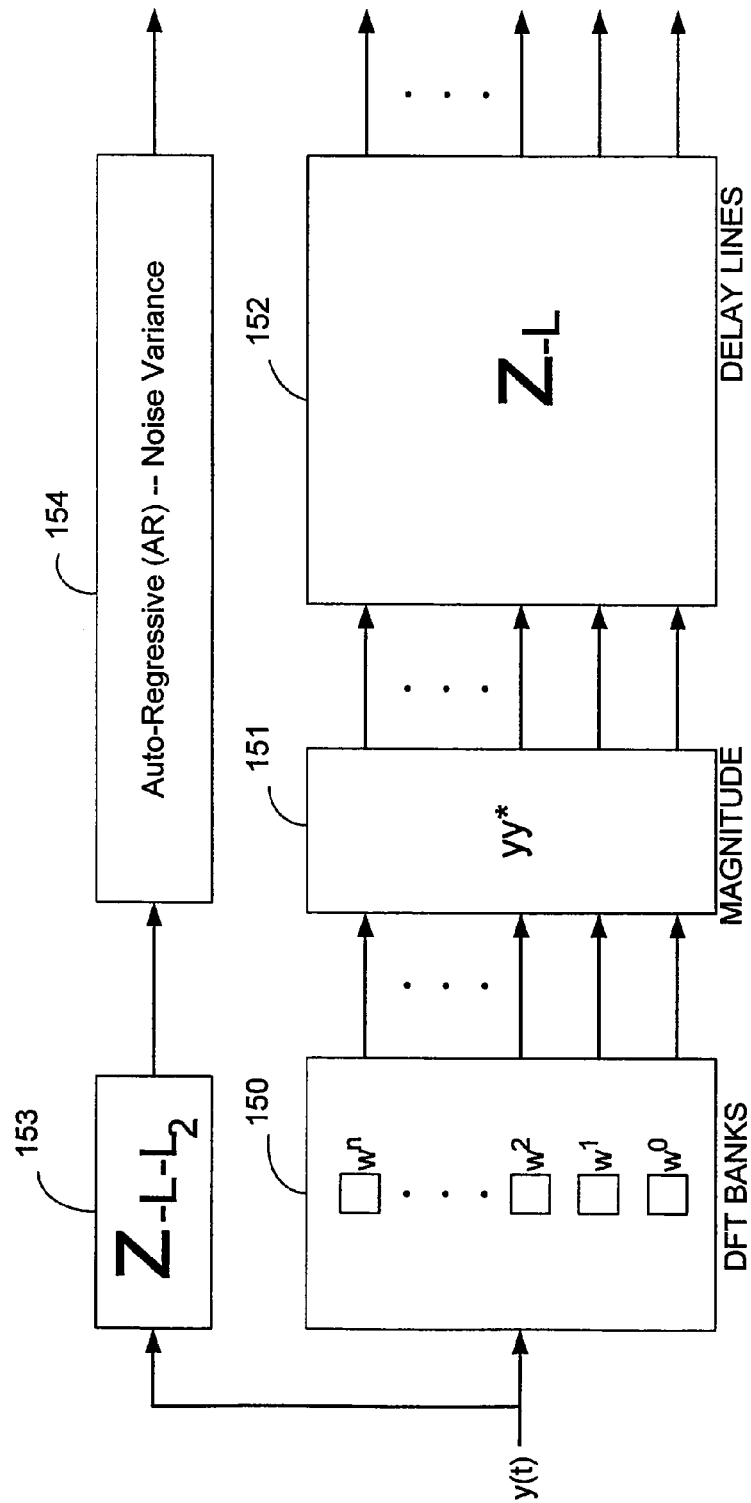
FIG. 15 shows a signal detector in accordance with one embodiment of the present invention.

Referring now to FIG. 15, a portion of the digital signal processing scheme is shown. Several DFT banks 150 are provided to perform the DFT operation on the received signal y(t). The DFT banks are necessary because of the inherent inaccuracy (i.e., due to small clock error) of the smart card in generating the FSK signals. If one knew the FSK frequencies (e.g., f0 and f1), then the entire detection process would be one of correlating along f1 and f0 and searching for a particular pattern or bit stream on which to synchronize using some type of statistical test as a criterion for acceptance. Because of the lack of a precise knowledge of the transmitted frequencies, the data format of the smart card includes a preamble. Referring briefly to FIG. 5(A), the preamble includes the two frequencies f0 and f1, where these two transmission intervals are sufficiently long to estimate each of the two FSK frequencies precisely. The known bit pattern is then used for synchronization. The reception software in the computer identifies the correctness of the received frequencies by their spacing (f1-f0), durations, and energy relative to the ambient noise level.

Since the smart card's clock error is consistent, identifying one variable leads to the simple calculation of the other variables; that is, the variables f1, f0, and T (symbol duration) have one degree of freedom which is the specific clock error in the smart card. Thus, assuming that the duration of each frequency is sufficiently long, and that the energy over the given interval exceeds the threshold specified by the GLRT, then the symbol interval T can be recovered from the F1 and F0 intervals, as depicted in FIG. 5(A). With the symbol interval in hand, synchronization can be performed by using the delay line 152 in FIG. 15 along each of the corresponding frequencies f1,f0, according to their respective indices in the DFT bank 150, and with the aid of the known bit stream FIG. 5(A).

After the highpass filtering and downsampling, the frequencies of interest are located in the narrow band of 0-2 kHz. The bit rate for the signal in this system is 200 bps in one embodiment, which is a symbol period of 5 msec long ($T_{symbol}$=1/200 bps). The downsampled rate is approximately 5 kHz (4.9=44.1 kHz/9, where 44.1 kHz represents the sampling rate of the sound card in the PC and 9 represents the downsampling factor). At this downsampled rate, approximately 25 samples are taken in one period (5 msec) of the received signal.

For practical purposes, the 0-2 kHz narrow band is divided into 13 (which is approximately 25/2) bands to assist the software in determining the actual frequency of the received signal. Accordingly, the DFT banks 150 include 13 separate banks, where each bank is focused on one of these narrow bands. In effect, each bank or bank channel determines how much of the received signal is directed along the frequency the bank channel is associated with; that is, how much the given bank channel frequency (e.g., $w_0$) contributes to the received signal.

Figure 16:
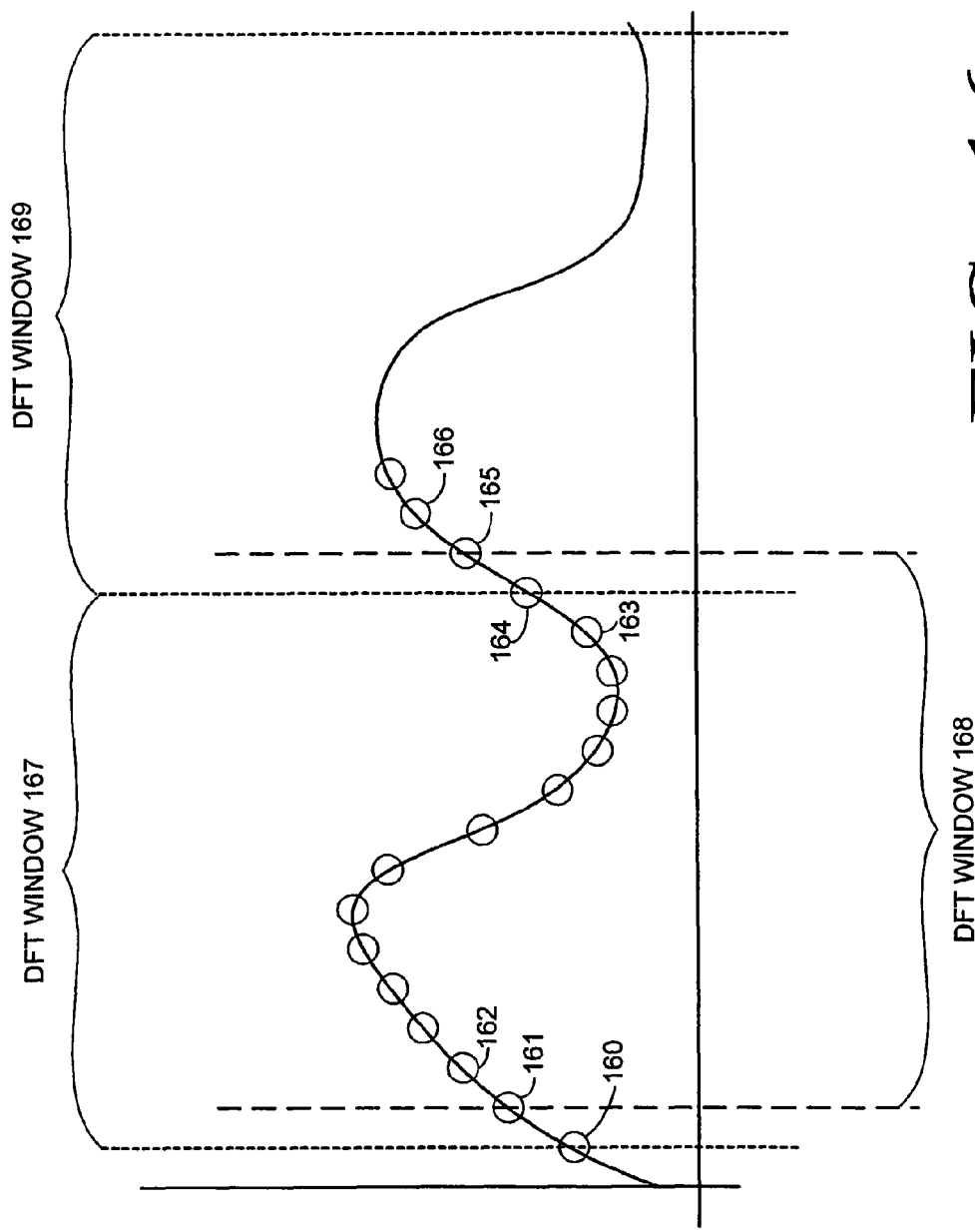
FIG. 16 shows an exemplary graph of the received signal and the sampled points therein to illustrate the moving average concept in accordance with one embodiment of the present invention.

Because the bit rate for the system is 200 bps in one embodiment, the DFT window in the DFT banks is 5 msec long ($T_{symbol}$=1/200 bps). Referring briefly to FIG. 16, the DFT window 167 is 5 msec long. Within the DFT window 167 are several sampled points, such as samples 160, 161, 162, 163, and 164, although in FIG. 16, each DFT window is not associated with 25 sampled points for the sake of clarity in the illustration. The 25 points in DFT window 168 are used to generate the 13 DFT coefficients for the particular embodiment as specified by the 44.1 kHz sampling rate, 200 bit per second transmission, and downsampling factor of 9. Since the signal being analyzed is real, the spectrum has conjugate symmetry, and it is therefore sufficient to analyze only half of the signal's total bandwidth. Having the DFT in window 167, we can proceed to compute the DFT in window 168 recursively in the following manner.

Fundamentally, recursively computing the DFT comprises the moving correlation between a given complex exponential $e^{jk\omega_0 n}$ with the received signal x[n]. This quantity is denoted by $\hat{a}_k[n]$ such that:

$$\hat{a}_k(n) = \frac{\sum_{m=n-N+1}^{n} e^{jk\omega_0 m} x[m]}{N}$$

Defining the intermediate variable $\hat{x}[n]$ such that $\hat{x}[n] = e^{jk\omega_0 n} x[n]$, the quantity $\hat{a}_k[n]$ is a moving average of the quantity $\hat{x}[n]$, and hence can be written in the form:

$$\hat{a}_k(n+1) = \hat{a}_k(n) = \frac{\hat{x}[n+1] - \hat{x}[n-N+1]}{N}$$

Note the change in lower bound from N to N+1, as in the lower bound on the sum defining ak[n], which is termed the sliding DFT coefficient. Note that the difference $$\hat{x}[n+1] - \hat{x}[n-N+1] = x[n+1]e^{j\frac{2\pi k(n+1)}{N}} - x[n+1-N]e^{j\frac{2\pi k(n+1-N)}{N}} =$$

$$(x[n+1] - x[n+1-N])e^{j\frac{2\pi k(n+1)}{N}}$$

so that the DFT coefficient $a_k[n+1]$ is simply updated from $a_k[n]$ by generating the difference between the newest and oldest samples, and adding to the real part of $a_k[n]$ this difference times the cosine of $2\pi k/N$. Similarly, the imaginary part of $a_k[n]$ is updated by adding the product between the difference (x[n+1]−x[n+1−N]), scaled by the reciprocal of the window length N, and the sine of $2\pi k/N$.

With this recursive formulation, the kth DFT coefficient $a_k[168]$ for DFT window 168 can be computed from the kth DFT coefficient $a_k[167]$ from DFT window 167 by determining the difference between sample 165 and sample 160, and updating the real part of $a_k[167]$ with this difference times the cosine of $2\pi k*168/N$, and similarly updating the imaginary part of $a_k[167]$ by multiplying the difference between sample 165 and sample 160 with the sine of $2\pi k*168/N$.

Another recursive form for DFT is given by expressing the DFT window as the impulse response $$h_k[n] = \sum_{m=0}^{N-1} e^{j2\pi \frac{k(N-1-m)}{N}} \delta(n-m)$$

This representation has z-transform $$H(z) = \sum_{m=0}^{N-1} e^{j2\pi \frac{k(N-1-m)}{N}} z^{-m}$$

$$= e^{-j2\pi \frac{k}{N}} \frac{1 - z^{-N}}{1 - e^{-j2\pi \frac{k}{N}} z^{-1}}$$

which yields the recursion formula $$a_k[n] = e^{-j2\pi k/N}(a_k[n-1] + x[n] - x[n-N])$$

Note that this recursion formula requires twice as many operations as the first recursion.

Returning to FIG. 15, the output of the DFT banks 150 is a block 151 that calculates the magnitude of the received signals for each channel. These values are then provided to delay lines 152, which is slightly longer than the data stream by a factor of 3/2. The delay lines store the values output from the magnitude block 151.

Concurrently, an additional delay line 153 is provided. This delay line takes in input y(t) to make a calculation of the noise variance. The noise variance is actually calculated in the Auto-Regressive block 154. The delay through 153 of FIG. 15 is sufficiently long so that the variance estimated at the output of 153 in the AR block 154 is from a period of time considerably earlier than the data in the correlator bank 150 of FIG. 15 and the delay lines 152 of FIG. 15. This means that since the detector is currently searching for a signal, that earlier period whose power is evaluated in 154 of FIG. 15 must be a period deemed 'noise only.' Hence, the statistics so computed are enough to specify the threshold η of the Neyman-Pearson test on Z[n], described earlier.

The bank channels having maximum energy are then found in the delay line 152, according to the F1-F0 format described in FIG. 5(A). Since the sequence F1-F0 is transmitted first, these signal are the oldest in the delay lines, or the furthest back in 152 in the direction of the arrows. These selected bank channels are then compared to the calculated noise threshold to decide whether they are signal or noise, and also to each other to make sure that the proper frequency separation is present. Once these tests are passed, the detector has now determined the two bank channels that correspond to f0 and f1, or certainly close enough for decoding purposes.

Once the f0 and f1 frequencies have been determined with the f0 and f1 signals, the detector can now focus on synchronization. For the synchronization bits, the detector is programmed to know the particular pattern. If the pattern is 01010101, then the detector starts at a column in the delay lines 152 of FIG. 15 (where the frequency index denotes a row in the delay line 152) that corresponds to the point immediately after the location of the frequency identification intervals, F0 and F1, and alternately sums the values from the two selected banks, corresponding to f0 and f1, in step sizes of T, corresponding to the estimated symbol interval as estimated from F0 and F1. For example, the detector starts with the first bit, "0", which is the first symbol received, and so is the oldest on the delay line. The detector takes the value from the selected bank channel assumed to correspond to f0. The detector then proceeds to the next bit, "1", with location offset from the point previously taken from f0 by T samples and in the direction of the most recent sample, or towards the DFT bank, and adds this value from the f1 bank to the previous value. The detector continues with this 01010101 pattern until it has summed, for each value in the bit stream, the corresponding channel magnitude, with each such element separated from the previous by symbol interval T. Since this sum is a function of the offset from zero time, where zero time denotes the point where the energy in the first synchronization bit exceeds that in the last frequency identification bit, as in FIG. 5(A), we construct a cost function C[m], where m denotes the offset in samples from the zero time, and we define this first sum as C[0]. We write $$C[n] = \sum_{m=0}^{M} b[m] f1[D-n-mT] + (1-b[m]) * f0[D-n-mT]$$

where b[n] is the known preamble sequence, D is the offset from the output of the Magnitude device 151 to the zero time in 152, f1 is the delay line associated with frequency f1, and similarly for f0. Note that the sum moves from the oldest recordings of the 151 output towards the newest, in agreement with our understanding that the first bit transmitted will be the oldest recorded.

The detector now evaluates the sum C[1], which determines the sum of the delayed f0 and f1 correlator outputs offset by 1 sample from the previous sum, with the offset in the direction of the most recent sample, or in the direction of the DFT banks (opposite the direction of the arrows in FIG. 15). As before, the cost function C[1] is generated by alternately summing the magnitudes stored in the delay lines 152 of FIG. 15, spaced apart by T samples, with the choice of frequency index f0 or f1 in the delay line 152 given by the corresponding value of the bit in the known bit sequence "0101010101". The detector now evaluates C[2], C[3], etc. until it has evaluated at least T points, which is sufficiently long to determine a synchronization point. When all the elements of C[m] are then compared to each other, one of the points is the maximum; that is, when these sums are plotted, the plot forms an upside down V pattern. The sum corresponding to the peak of this upside down V pattern is the synchronization point. From this synchronization point, one can in turn evaluate A0, A1, E0, and E1, which are the powers in each channel for one or the other of the two frequencies transmitted. Knowing the synchronization point on the received synchronization pattern, these quantities are directly calculated by taking advantage of the known (synchronization) data sequence.

The final issue to address is resynchronization, which bears sharp resemblance to synchronization. Based on the timing synchronization point K established from the maximum of C[m], the decoder will sample every T samples at points K+nT until the decoder reaches the 'stop' bit framing a given received byte. Since the "start" and "stop" bits are known, these bits are used to resynchronize much in the same way as the known synchronization sequence assisted in establishing the synchronization point K. In this case, however, rather than having many bits, there are only two, but conceptually the process is the same. A cost function is constructed from a point corresponding to the middle of the coming "start" bit. In this way, knowing that we are probably not off by much in terms of synchronization loss, we can sum the magnitude of the delayed "stop" bit with the current "start" bit, generate a cost function C'[m], and use the maximum as the new synchronization point K'. In some applications, an AGC can be introduced to the DECODING stage at a point prior to the f0 and f1 correlators to ensure that the resynchronization cost C'[m] always has the correct maximum by correcting the received signal in the presence of fading or weak signals.

In another realization, one can replace the auto-regressive noise power estimator 154 of FIG. 15 with a bank of autoregressive (AR) estimators which separately track the power in each of the frequencies analyzed by the bank 150 of FIG. 15. In this case, the delay line 153 of FIG. 15 can be removed, and the input to the bank of AR power estimators can be placed at the end of 152 of FIG. 15, after the delay line length of 152 is extended from L to accommodate the time required for the preamble duration and the time for the AR buffers in the new frequency—power estimation unit to fill with noise.

Interference Suppression:

The utility of estimating the noise power as a function of frequency, which is called the periodogram estimate, is particularly useful in the case where the background noise environment is colored. Classically, detection in the presence of colored noise amounts to preceding the detection mechanism with a prewhitening filter. When detecting frequencies, however, a whitening filter would translate to an increased threshold for those frequencies where the noise power is higher, and a reduced threshold at those frequencies with little noise power. This is in fact exactly how the spectrogram is used—thresholds are set at a frequency by frequency basis, where out of band interference can then be ignored. The cumulative effect of the periodogram estimate is then simply to replace the previous estimate of the threshold, for a given frequency, with the corresponding periodogram noise estimate for that frequency.

The advantages of this digital signal processing scheme are primarily threefold:

(1) The received signal may have a low signal-to-noise ratio since the DFT bank used for detection is essentially a bank of narrowband filters, improving the SNR per channel as compared with simple energy tests on the received signal. This is particularly important since the acoustic signals that are detected have very low amplitudes.

(2) The detector is practical to implement because of the application of the moving average concept to the DFT banks.

(3) The accuracy of the detector is close to optimal. The detector is a true matched filter.

In another embodiment, n-ary phase shift keying (nPSK) technique is used to decode the signals instead of FSK. In this scheme, the delay lines or channels at the output of the DFT bank, select one of the channels based on magnitude. Having selected the best bank, estimate the phase shift by processing the I-phase component and the Q-phase component of this bank. The offset determines whether the transmitted data is a "1" or "0".

4.5 Concurrent Operation of Multiple Recording Software

In some computer systems, the operating system does not allow more than one recording software to operate at any given time. One such group of operating systems is Windows 95/98/NT/2000. If Windows allocates resources in the sound card for a particular commercial recording software, the special client software 114 (in FIG. 11) in accordance of the present invention may not work properly. After all, the electronic card and the special client software need the sound card in the PC to capture the audio signals for electronic card-to-PC transmissions and to generate the audio signals for PC-to-electronic card transmissions.

Assuming that the commercial recording software was installed first, Windows dedicates resources for that software in the sound card. Any other recording software that is installed later may not be recognized by Windows. Of course, if the special client software 114 (in FIG. 11) in accordance with the present invention is installed first, then the electronic card-special client software will work properly. The later-installed commercial recording software may have some problems working properly.

Of course, the user could manually unlink the commercial recording software from Windows to make the special client software work properly, but this is a cumbersome and annoying task. Furthermore, if some bug in the first-installed commercial recording software is present, the sound card in the PC would be locked and the special client software 114 (in FIG. 11) cannot function.

Figure 43:
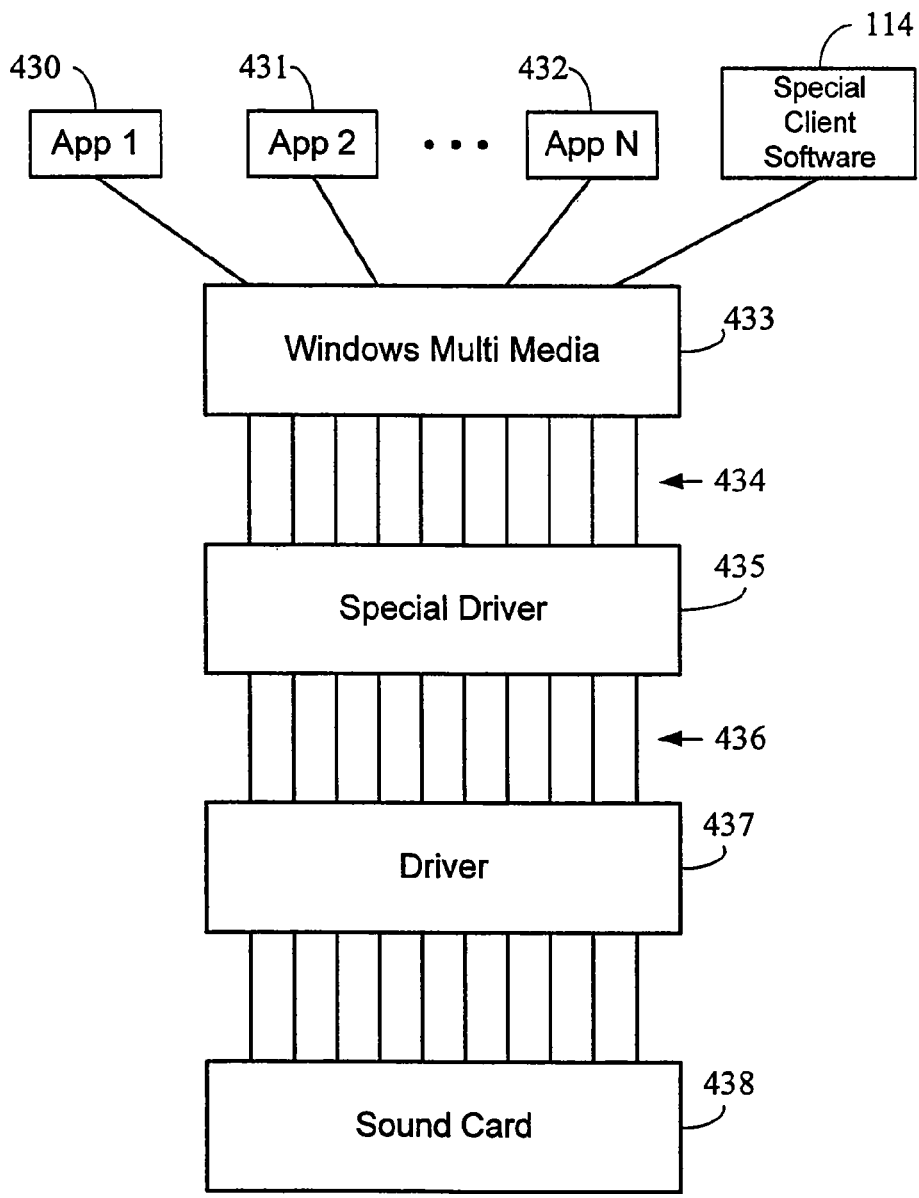
FIG. 43 shows an embodiment of the present invention where a special driver is placed between the Windows Mulimedia interface and the default sound card driver so that multiple applications can run concurrently in the computer system.

In accordance with one embodiment of the present invention, a special driver would be written and placed between the current driver and the Windows Multimedia interface. Referring to FIG. 43, several applications 430, 431, 432 are installed in the computer station, which in this example is a PC with a Windows operating system. One of the applications is the special client software 114 that can communicate with the electronic card of the present invention.

In order to access the sound card 438, these applications use the Windows Multimedia interface 433. Normally, the Windows Multimedia interface 433 communicates directly to a driver 437 to access the sound card 438. In one embodiment of the present invention, a special driver 435 is written and is placed between the Windows Multimedia interface 433 and the driver 437. The API 434 of the special driver 435 is a copy of the API 436 of the driver 437. This special driver 435 is installed instead of the current default driver 437. But the special driver 435 uses the default driver 437 for normal operation. The special driver 435 also changes some of the recording parameters for the special client software 114 to function properly. Note that some of the processing can be done in the driver level, where the invention's "driver" layer will perform the processing.

In operation, when an electronic card signal is detected by the sound card 438, the driver 437 presents the data to the special driver 435. Some byte of data in the electronic card transmission will be provided to let the special driver 435 know that this data is for the special client software 114 and not the other recording applications. Of course, some decoding logic would be provided in the special driver 435 to decode this byte in the electronic card transmission. Once decoded, the special driver 435 processes this data for the special client software 114, while preventing other applications (such as application 430) from taking control. In effect, the special driver 435 convinces Windows Multimedia interface 433 that the current recording channel is no longer valid. Then, the special client software 114 accesses Windows Multimedia interface 433 for its own needs. This way, the special client software takes control of the sound card 438 without crashing the other applications in the computer system.

Figure 44:
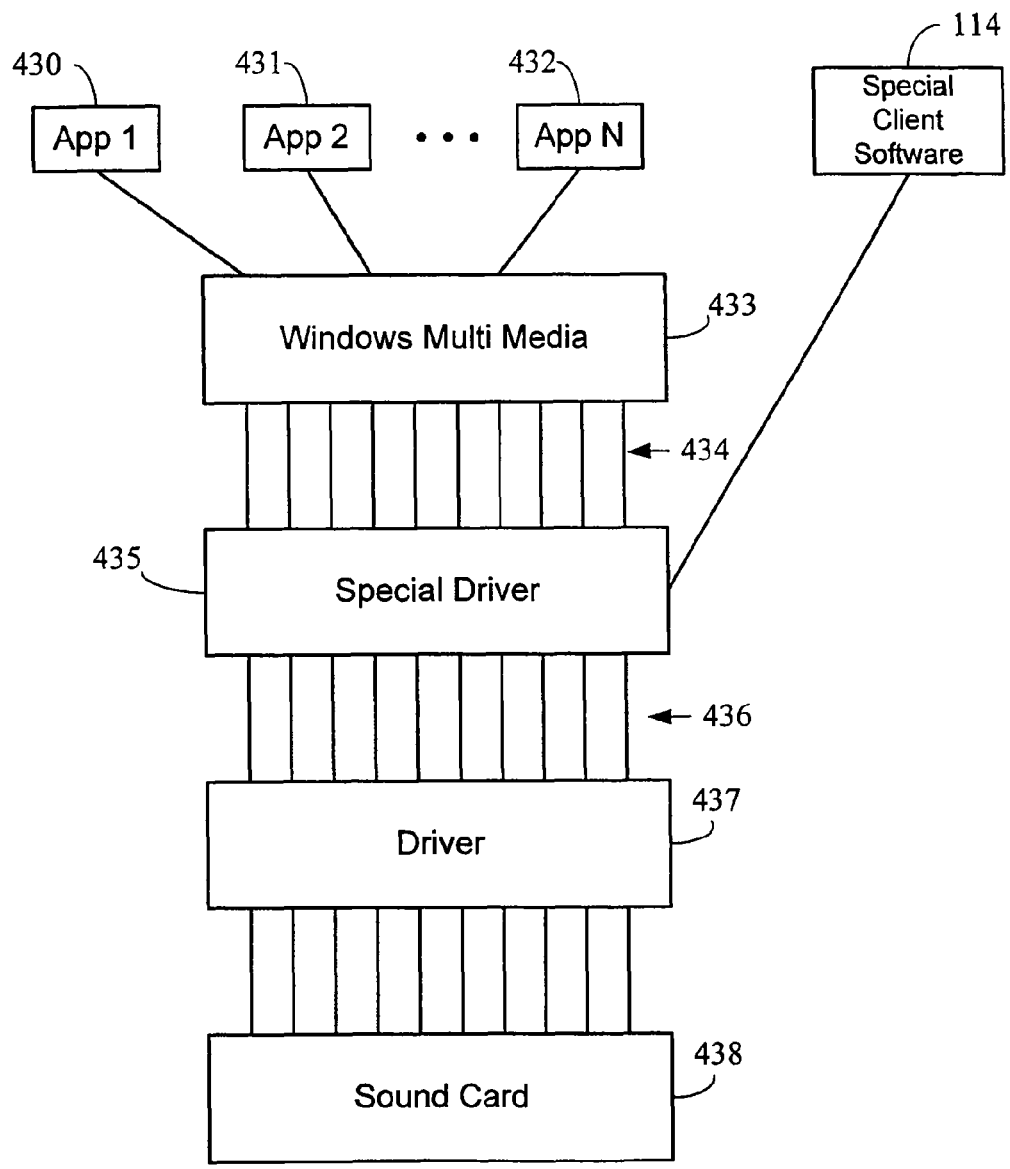
FIG. 44 shows an alternative embodiment from the system described an shown in FIG. 43 where a special driver is placed between the Windows Mulimedia interface and the default sound card driver so that multiple applications can run concurrently in the computer system.

In another embodiment, as shown in FIG. 44, the special client software 114 interfaces directly with the special driver 435 instead of indirectly through the Windows Multimedia interface. The special client software 114 "steals" the appropriate handles that are used by another application (e.g., application 431) so that the electronic card-special client software communication can take place via the sound card 438. As known to those ordinarily skilled in the art, Windows provides handles of Windows Multimedia interface 433 to the relevant application. The relevant application uses the handles to have Windows Multimedia interface 433 perform various tasks.

4.6 Server-Based Processing

In the above description of the base station, special client software is resident in the client to perform such tasks as digital signal processing, data processing, performing some web-related action, and communication with selected web servers. Typically, all the necessary functionality are found in the special client software. In some cases, however, the software needed to perform some functions is downloaded from a designated server on an as-needed basis. In other words, the special client software in conjunction with a particular supporting web server determines whether a particular functionality is available in the client. If so, then the user goes about his business to conduct any transaction or otherwise communicate with that web server. If not, the special client software downloads that functionality from that web server so that the user can employ this functionality with this web server.

In another embodiment, the server contains all the functionality described above for the base stations to process the acoustic signals and perform the designated action based on the data in the signals. The client contains only the necessary software to record sounds and deliver those recorded sounds to any designated server. The server would then playback the recorded sounds and digitally process the signals to extract the data therein (if any). Thus, instead of processing the signals and communicating the data to the web server, the client merely records the sounds and delivers them to the server. The server itself performs the digital signal processing operation, data processing operation, and the requisite action.

In this embodiment, the client software contains two main features: (1) recording, and (2) communications. The first feature allows the user the record the acoustic signal that is emitted when the user presses the button on the electronic card. The second feature allows the recorded signal to be delivered to a default designated web server to process the signals for authentication. The default designated web server would be contacted if the user did not already launch his web browser or the web browser has accessed a web page that does not support the electronic card and its communications protocol in accordance with the present invention. If, however, the web browser has already been launched and the user has accessed a page that supports the communications protocol of the present invention, then the communications component of the client software would interface with the web browser to deliver the recorded sound to that particular web page's web server.

Typically, when the web browser accesses a web server (i.e., web page) that supports the communications protocol of the present invention, the web server would send a code (or embedded data in the header) along with the html data that only the client software can interpret. It functions like a flag. When this code is detected by the client software, the recorded audio file can be delivered to this web server. If the code is not detected (i.e., this web page does not support the communications protocol of the present invention), then client software sends the recorded audio file to the default server.

5.0 Applications

Figure 46:
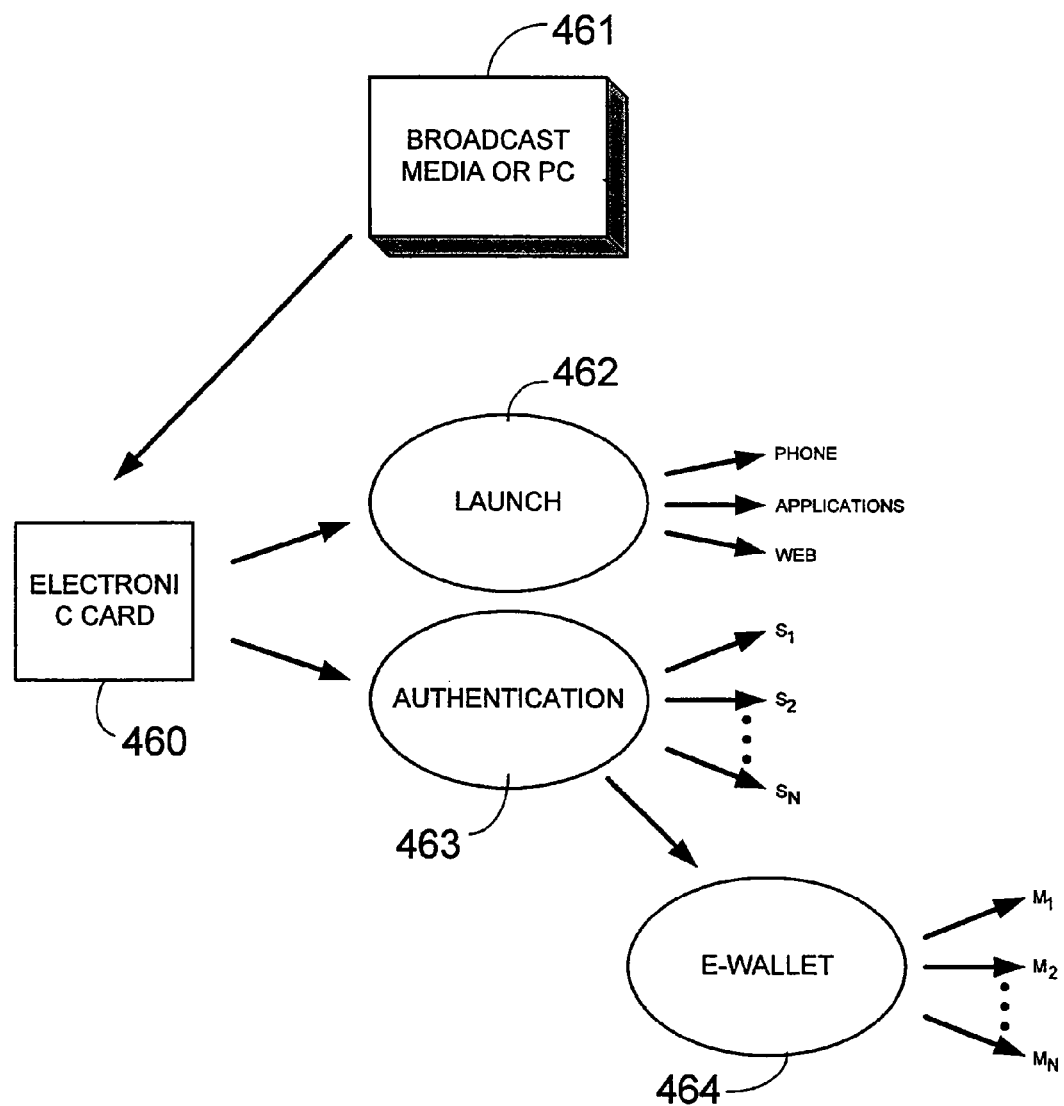
FIG. 46 shows a high level abstracted view of some of the many applications that are enabled by the present invention.

The spectrum of applications covered by the various embodiments of the present invention is broad. Referring to FIG. 46, at the core of the various applications is the electronic card 460 itself, whether in one-way or two-way form. As a receiver of information, the electronic card 460 can receive all kinds of information from simple facts to coupons, discount offers, promotional offers, and incentive points. The reception of information occurs via some electronic device 461, such as a broadcast media (e.g., TV, radio) or a personal computer.

The received information can be in two forms—(1) embedded information, or (2) actual content for later pattern recognition. The embedded information can be some code that complies with the communications protocol of the present invention. Exemplary embedded information can be actual synthesized sounds that are generated as part of the broadcast program, code that was mixed in later at some point in the distribution chain of the broadcast program, and an audio file that is played on a website.

For the reception and processing of actual content, no communications protocol need to be followed since the electronic card is recording the actual sounds (whatever they may be) that emanate from the speakers of the TV, radio, or computer system. Later, the user can playback his recording where some pattern recognition server will attempt to match that sound clip with one of the soundtracks stored in its database. When a match is found, the server will identify the sound clip, provide links associated with the sound clip, or automatically redirect the user to a relevant website associated with that sound clip. This pattern recognition feature is particularly valuable when the user has limited or no access to the Internet at the moment that the user hears the sound. By recording that sound at that moment, he can later get more information related to that sound clip.

Based on the type of information received (and saved), the electronic card 460 can be used to exploit this information. Thus, if the information received is a coupon, the electronic card 460 can be used to redeem this coupon either online on the web or at a conventional bricks-and-mortar store.

As a source of information, the electronic card 460 allows the user to perform various acts with the mere press of a single button. The button press can launch applications or functions as represented by reference numeral 462, authenticate the user into a website or server as represented by reference numeral 463, or perform other acts 464 within a service once the user has successfully accessed and been authenticated into a service.

For the launching action 462, the press of the button initiates such things as launching an application (e.g., web browser), accessing a particular website (e.g., buying club, travel service (airline, car, hotel), online account service, online banking, and proprietary service such as America Online), or accessing some service that requires telephone dial-in. In this launching action, no authentication is necessary since the user is merely accessing services that are publicly available but in a way that is more efficient and user-friendly.

For the authentication action 463, the press of the button on the electronic card 460 enables the user to securely log into various services $S_1, S_2, \ldots, S_N$, whether these services are accessed over the web or via a telephone number. Thus, instead of arduously entering ID and password information, the electronic card 460 simplifies the process by performing the login functions for the user without compromising the security concerns of these services. Exemplary services include an online trading service, a private intranet, a proprietary database, a remote desktop, a remote hard drive service, a web-based email service, or a music collection service. The list of services, whether commercial or personal, is long and can be anything that requires some authentication action to allow the user to access the contents therein. The authentication would be needed because the service contains personal or otherwise private information that need to be securely protected, or the service is commercially motivated to limit access to paying users.

Once the user has successfully been logged into a service (accessed and authenticated), the user can use the electronic card 460 to perform other actions with the press of a button. These actions can be as simple as filling out a purchase form at the checkout line to purchase some merchandise at an online store. For more sophisticated operations, the press of the button on the electronic card 460 may involve detecting the context of the user's current online experience and taking some action based on this context. Thus, this context-sensitive feature can intelligently detect what the user wants to do based on which web page his was viewing at the time he pressed the button. One example of this type of action is the e-wallet 464 which simplifies the user experience at various merchants' websites $M_1, M_2, \ldots, M_N$.

In another embodiment, the authentication action 463 follows immediately from the launching action 462. Thus, although FIG. 46 shows two arrows directly flowing out of electronic card 460 into launch 462 and authentication 463, this alternative embodiment would show only one arrow directly flowing out of the electronic card 460. This one arrow would point to launch 462, which would point to the authentication action 463.

Importantly, these applications require no infrastructure changes. Existing sound systems in personal computers work with the electronic card.

5.1 Broadcast Media

One embodiment of the present invention is the user of the electronic card to download (and later redeem) coupons via broadcast media (e.g., television, radio). For the moment, the manner in which the coupons, targeted sales offers, special discounts, sales information, and the like are delivered to the broadcast media devices such as televisions and radios will not be discussed. Hereinafter, the term "coupon" or "coupon data" will be used to refer to these various sales offers. Thus, the electronic card 10 can receive coupons from a radio/stereo system 11 via sound waves 19w; a television 12 via sound waves 19x; a personal computer 14 via sound waves 19y; and a conventional non-web store 13 via sound waves 19z. To receive these sound waves, the electronic card 10 contains a transducer for converting the received sound waves into electrical signals for digital signal processing. The electronic card 10 is placed near the speakers of these broadcast media devices, computer speakers (such as speakers 14a and 14b), and speakers at checkout counters in conventional stores. Although the speakers generate the actual sound waves, the source of the sound waves (and the data therein) is located at key locations in the television/radio infrastructure (e.g., headend of a cable service), web infrastructure (e.g., web site), and the conventional store office (e.g., network server in the back room of a department store).

Once the coupon data has been received and stored in the electronic card 10, it can be redeemed in any number of ways. In one embodiment, the user of the electronic card 10 can use a web browser (e.g., Microsoft Internet Explorer or Netscape Navigator) in his personal computer 14 to access the Internet 16 via his Internet Service Provider (ISP) 15. Once on the Internet, the user can access any web merchant's web site 17 or web portal 18. Having located and accessed the web merchant 17 or web portal 18 that is sponsoring the coupon that he just downloaded, the user would then go to the web page that contains the coupon redemption information. Such a web page can be the home web site of the web merchant, or it could be merely a button on the web page that says simply, "Click here to use your electronic card coupon." When the user clicks on the button, the server associated with the web page would send an audio file (e.g., .wav file) to the web browser. The web browser would interact with the sound card in the computer 14 to play the audio file. The electronic card would receive the sound waves generated from the speakers 14a, 14b of the computer 14, process them along with the already stored coupon data, compare them to make sure that the proper coupon data is stored in the electronic card 10, and if the coupon data is proper, the electronic card 10 would generate a password on its LCD. The user enters the password manually on the keyboard and submits it to the web site. Then, depending on the type of coupon that the user previously downloaded into his electronic card, the web site could apply the coupon to the user's purchase or award a merchandise for free. This is just one of the many ways in which the user could use or otherwise redeem his coupon in his electronic card 10. This and other ways of redemption are detailed below.

An alternative option is that the customer will not need to remember the merchant's web address. The web address will be stored as part of the coupon data. The user would simply access a central homepage, press the button on his card, and the card will transmit the data (two-way card) and the browser will direct him automatically to the merchant's web page. In fact, the web address may even direct the user to the exact product with the discount already in place. To save space and communication time, instead of full webpage addresses, the coupon will contain a coupon ID which will be interpreted at the central homepage. A second option will be to use a tray application that always listens and does the job of the central homepage (selection of coupon and redirection). In addition, using the same pattern recognition method described below, the coupon could be a recorded part of the commercial which will then be associated and detected in the central web page.

If the user stored multiple coupons, the browser will ask him which one to use and he will make his choice either via clicking or via the keyboard/mouse. These and other embodiments will be described further below.

5.1.1 Broadcast Media Infrastructure

One embodiment of the present invention allows coupons to be downloaded from the television/radio infrastructure to a user's electronic card 10 (see FIG. 1). The manner in which the coupon can be redeemed varies from application to application. First and foremost, a brief discussion of the television and radio infrastructure will be provided.

Figure 23:
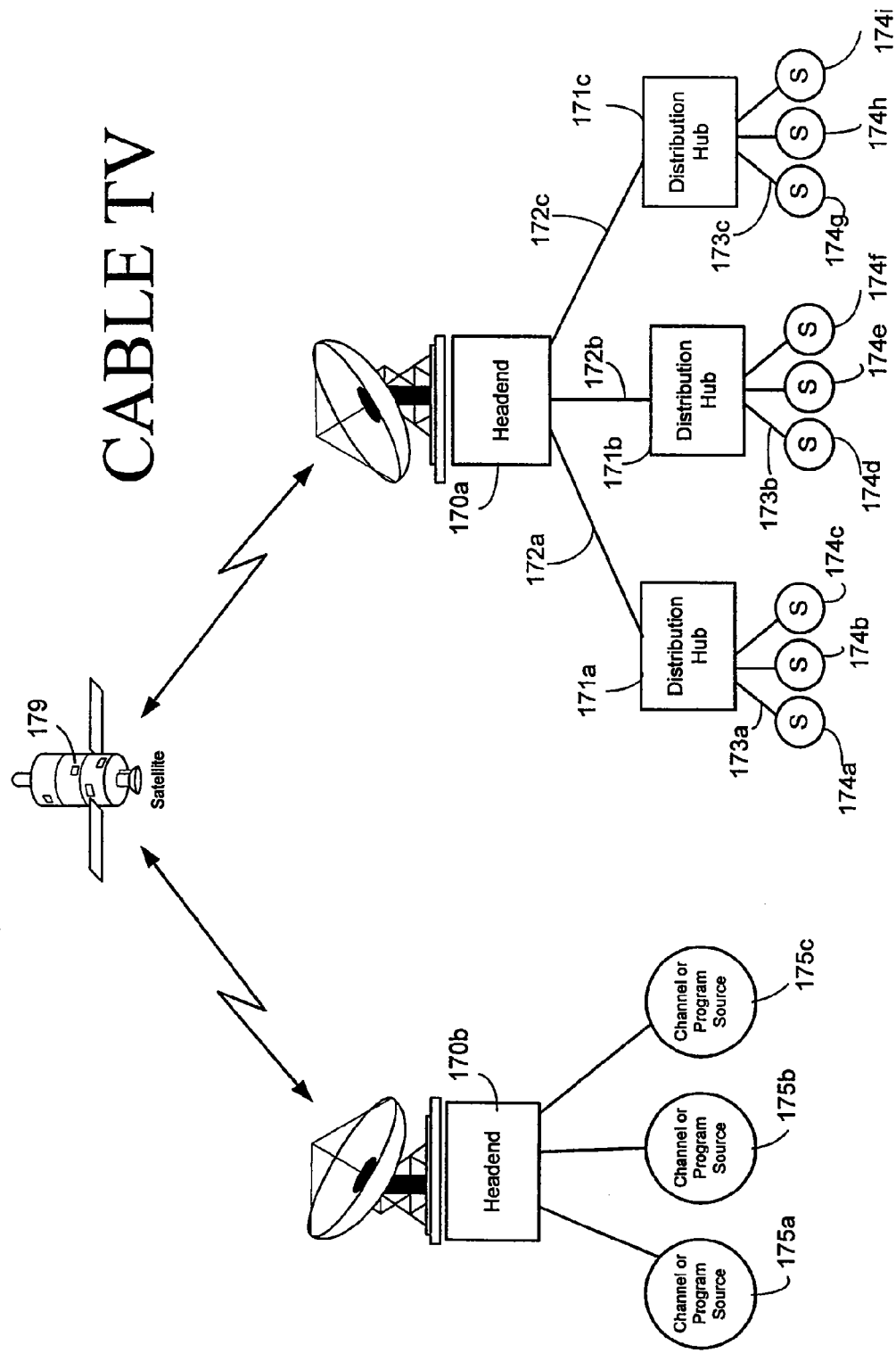
FIG. 23 shows a high level diagram of a cable TV infrastructure and the manner in which the merchant data is mixed with normal programming.

Cable television systems are well known. As shown in FIG. 23, these systems are usually comprised of a headend 170a with one or more trunk lines 172a-172c extending therefrom, where each trunk line has a plurality of feeder lines 173a-173c extending therefrom into subscriber areas. Each subscriber 174a-17 is attached to a feeder line via a line tap onto the feeder or service line.

If the distances between the headend and subscriber areas are substantial, intervening distribution hubs 171a-171c may be located along the trunk lines to replenish the strength and quality of the signal transmitted to the subscribers. Distribution hubs simply act as small headends and exist to ensure the quality of delivered signal in large CATV networks. Each distribution hub may, in turn, be coupled to a plurality of service sites by feeder lines. Each service site may have one or more service lines extending therefrom to couple a plurality of subscribers to the service site.

In this cable network, a transmission signal is provided by the headend 170a over the trunk lines 172a-172c to the distribution hubs 171a-171c or service hubs. This amplified signal is then provided to the feeder lines 173a-173c extending from the distribution hub or service hub to provide the signal to the service sites. Taps located at each subscriber site bring the transmission signal into a subscriber's site.

The transmission signal from the headend 170a may include entertainment signals and data signals. The entertainment signals may be received as broadcast signals received via satellite 179 from an originating location. This originating location may be another headend 170b. This originating headend 170b receives its signals from channel or program sources 175a-175c. These channel or program sources 175a-175c may be HBO (i.e., Time Warner), TBS, ESPN, ABC, NBC, CBS, PBS, or even the Food Network. It is also possible for the channel or program sources 175a-175c to have a direct link to headend 170a (instead of headend 170b) if these channel or program sources are located reasonably close so that a satellite link is not necessary.

At the headend 170a, the policies and business strategies dictate which of the many programs the headend 170a receives from the headend 170b will be rebroadcast to the subscribers and on which channels. Each subscriber area may receive a different set of channels and programs as determined by the headend 170a. Of course, the subscriber also controls which of the available channels he receives based on his subscribed service.

Each broadcast signal is placed on its own channel within the spectrum of the trunk, feeder and service lines used in the CATV system. The spectrum of the lines coupling the CATV system together is the range of frequencies supported by the communication conduits used for the lines. In a typical CATV system, this spectrum is divided into a transmission portion and a return portion. The return portion of the spectrum may be used to support data transmissions, telemetry, and/or control information from subscriber sites back to the headend. The data transmissions from subscribers typically include status information about the subscriber's equipment which may be used by components at the headend to ascertain the status of the cable system or subscriber equipment.

Figure 24:
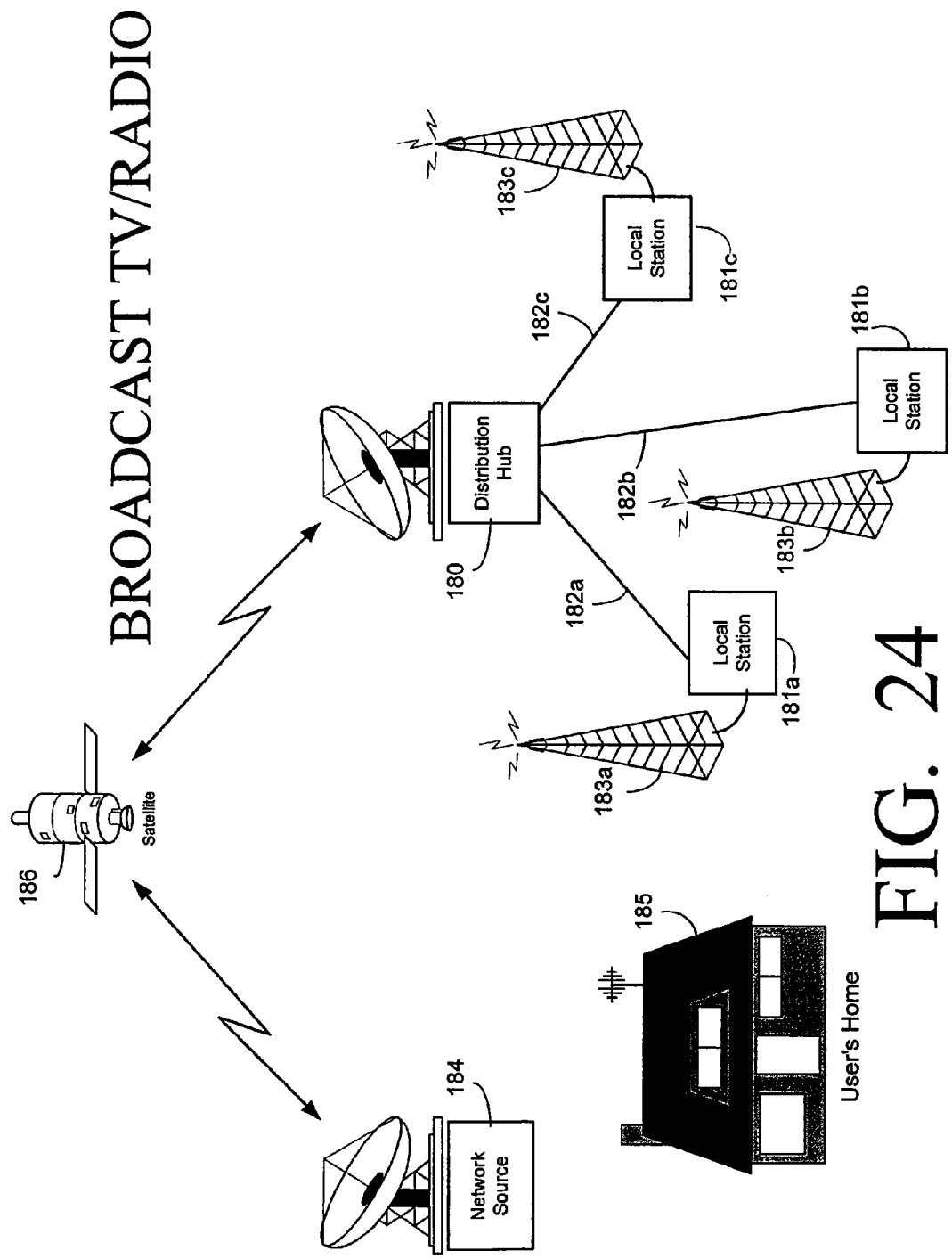
FIG. 24 shows a high level diagram of a broadcast TV/radio infrastructure and the manner in which the merchant data is mixed with normal programming.

Referring now to FIG. 24, the conventional broadcast television and radio infrastructure is somewhat analogous. A user 185, among many users, has a TV antenna on the roof of his house. With the antenna and the TV inside his house, the user can receive broadcast TV signals from a number of TV station transmission towers 183a-183c, if these transmission towers are reasonably close and are transmitting at a suitable power. These transmission towers 183a-183c are associated with local TV stations 181a-181c.

Typically, each TV station is affiliated with one of the major networks—NBC, CBS, ABC, PBS, Fox, or WB. By being affiliated with one of the networks, the local TV stations can broadcast network programming during prime time (usually 8 PM to 11:00 PM), late night (11:30 PM to 1:30 AM), daytime (e.g., soap operas), and certain other designated time periods (e.g., weekend sporting events). In addition, these local TV stations can broadcast locally produced programming such as local news, local sporting events (e.g., high school or local college), and local events (e.g., downtown Christmas parade). Finally, these local TV stations can broadcast syndicated programming at various desired time slots. These syndicated programs can be reruns of popular TV shows (e.g., MASH, Cheers, Star Trek), currently produced game shows (e.g., Jeopardy, Wheel of Fortune), or the lengthy infomercials, among others.

Usually, the TV stations 181a-181c receive non-locally produced programming from a network or programming source, such as source 184. If the distance is great, a link with a satellite 186 is needed. Typically, each local TV station would have its own satellite dish and receiver to receive these non-locally produced programming from the source 184. In other cases, a distribution center 180 is provided with a satellite dish and receiver which then delivers the programming to the appropriate local TV station 181a-181c via lines 182a-182c. Typically, the distribution center 180 is associated with a particular network (e.g., NBC) to serve several nearby local TV stations who are also affiliated with the same network but which serve different local regions (with some overlap).

The infrastructure for radio stations is similarly structured as shown in FIG. 24. Thus, a radio station 181a has local programming as well as network programming and syndicated programming (e.g., Howard Stern Show). The non-locally produced programming are received from the network or program source via satellite. The locally-produced programs originate from the radio station itself normally. The user 185 has a radio/stereo system with speakers and an antenna.

5.1.2 Broadcast Media Coupon Transmission

A coupon is a sales item that a merchant distributes to the mass public or a limited set of the mass public (i.e., targeted consumers) to promote his store (web or otherwise), product line, service line, or other business. The hope is that after redemption of the coupon, the consumer will like the product or his "visit" to the store just enough so that the consumer will buy that coupon or visit that store again. With this initial step, the merchant hopes to breed brand or store loyalty with this consumer. Usually, coupons are found in print media (e.g., newspapers, magazines) or on ad banners in certain web pages. But, as mentioned above, coupon distribution via the print media or the Internet is inefficient and ineffective.

Use of a special card that simply records time slices of sound for playback to a centralized pattern recognition server that correlates each slice to a coupon is discussed more fully below. But in circumstances where a more brief and reliable way of communicating coupons is desired, or in information environments that are too data rich for convenient implementation of a pattern recognition server, another method of communicating coupons to a card from an ordinary television, radio or sound device will now be discussed.

In accordance with one embodiment of the present invention, coupon data can be either in the audible frequency range or ultrasonic range. These data are mixed with normal programming so that when the user is watching TV or listening to the radio, he can collect coupons in a relatively simple manner. The television or the radio set itself is a passive device; that is, it receives electromagnetic signals, demodulates them, and presents the information in the signals to the user via the TV screen and speakers. Thus, the TV set or radio set itself does not generate any coupons; rather, it merely presents what it receives from the program/channel source.

Accordingly, the coupon data are mixed at a point somewhere along (and including) the communication path between the network/channel/program source and the user. Taking the exemplary cable infrastructure illustrated in FIG. 23, the coupon data can be generated with the program at the program source, such as program source 175a. In one example, the studio that makes a particular movie or TV show can "place" a coupon into the plot of the show. Much like product placement, the producers of the TV show could, for example, create the data stream (see FIG. 5(B)) by electronically synthesizing it. In this example, this synthesized data stream is audible. During the making of that TV show, an actor could announce on-air, "Please take out your XYZ card to receive a free gift or coupon. In just a few seconds, the coupon will be delivered to you." A second method will be to show a special visual mark at the corner of the screen at the beginning of the commercial and remove it when it is over. At this point, the audible data stream is played. This is recorded as part of the show. Of course, the context of the TV show is such that this announcement will not seem out of place or inappropriate. The TV show could be a home shopping network or a standard sitcom. When this TV show, which was recorded sometime in the past, is finally broadcast on TV, and the user watches it, he will be able to download the coupon at the proper time. So, when the scene where that actor makes that coupon announcement is shown, the user merely points his electronic card to the TV speakers and receive the audible data stream for storage in his card. The user now has the coupon or gift in his electronic card. Of course, only those users with the electronic card can interact with the TV in this manner to receive this coupon. In this case, the coupon is provided within the show itself and therefore, no mixing of the data stream with the audio tracks is necessary.

In an alternative embodiment, this embedded audio data could be played repeatedly throughout the broadcast of this show so that the user need not time his recording precisely. Thus, whenever this show is on, the user could record a portion of the broadcast and since the embedded audio data is looped over and over again, the user is assured of capturing this data in his electronic card.

For the most part, however, the merchant of the coupon do not want to be indelibly linked to a TV show, radio show, or movie forever. In this case, the data stream containing the coupon data is mixed with the audio tracks at another point in the broadcast link. If the merchant has some agreement with a channel or network source, such as HBO or CBS, he can ensure that his coupon his placed with certain shows for a certain time period. If the merchant's agreement runs for one year, he may specify that every episode of CBS's "60 Minutes" for the corning year should air the merchant's coupon at some specified time. Although "60 Minutes" is produced like always, the CBS channel source that is responsible for distributing the show to its affiliates mixes the merchant's coupon data stream with the audio tracks of "60 Minutes". The CBS channel source also provides some visual indication of when the data stream will be played to alert the viewer to get his card out for the download. This show is then provided by CBS to the headend 170b (FIG. 23) which then delivers "60 Minutes" along with other programming to the appropriate headend 170a for regional distribution. When "60 Minutes" is finally broadcast on cable TV, the user merely takes out his card at the appropriate time (which is specified) and downloads the coupon.

Similarly, a merchant may buy certain 30 second or 1 minute commercial slots to be played during commercial breaks of a TV show. The merchant may record the data stream in his commercial so that when the commercial is finally played, the coupon data can be played and the user can download the coupon.

Similarly, the mixing of the coupon with the programming (or commercial) may occur at the headend 170b or 170a. Normally, the headend associated with the cable service has commercial slots of its own to sell. Some of the merchants buy these commercial slots and much like the above TV commercial, the merchant records the coupon data stream with the commercial so that when the commercial finally airs, the coupon data stream is emitted and the prepared user can download the coupon. The headend could also mix coupon data streams on its own with the audio portion of the programs that are aired. A headend that is responsible for a region can strike deals with local merchants who want to air their coupon data stream. In this manner, local merchants can distribute the coupon data to the subscribers in the region of interest at a price much lower than the national merchant who wants to advertise nationally. This is similar to paying for local advertisement time on local TV channels.

The same principles apply to the conventional TV/radio broadcast infrastructure. The coupon data stream can be recorded or mixed at the production studio (e.g., for shows and commercials), the network source (e.g., CBS), and the local station (e.g., station KXYZ). Each entity in this broadcast link can strike its own deals with merchants who want to provide coupon data to users.

When the data stream is emitted by the speaker of the TV or radio, the user normally points his electronic card in the direction of the sound and presses the RX button to receive and download the data. The card then turns off after the data has been received. If more coupons are available, the user can activate his card and receive more coupons. The number of coupons stored in the card is limited by the storage space.

Referring to FIG. 5(B), the data stream includes a data portion. This data portion can be any length and can contain any information. In the coupon case, the data portion may include a merchant ID and a coupon number. The coupon redemption scheme relies on these two pieces of information to authorize the redemption.

In another embodiment of the present invention, the coupon data are transmitted to those subscribers with set top boxes. Set top boxes are normally used for interactive TV as well as certain premium cable services (e.g., AT&T Cable Service's Expanded Service with Digital Cable). For these cable services, these set top boxes also provide some electronic TV program guide functionality so that the user can simply select his channel using his on-screen program guide rather than entering the channel number directly. Of course, the user can still enter the channel number directly if so desired.

For this embodiment, the coupon data are transmitted during off-peak hours (e.g., early in the morning) once a day, or during the vertical blanking intervals (VBI). As the coupon data is transmitted, the set top box receives and records them for later playback as necessary. Thus, instead of the coupons being associated with a program, the coupons are now associated with a channel or the electronic TV program guide. The user can turn to a dedicated Ad channel where he can scan the listed coupons and select the ones he wishes to download. When he has selected a coupon for download, he presses a button on his set top box remote control (or his electronic card). The set top box then plays the audio file that contains the coupon data. The user would of course have his electronic card ready and pointed toward the speaker. The coupon data is now stored in his electronic card.

5.1.3 Broadcast Media Coupon Redemption

Assuming that at least one coupon is stored in the user's electronic card, the user has several options to redeem his coupon:

(1) Password-based Internet Manual Redemption—access the coupon sponsor's website and redeem manually via a password
(2) Internet Automatic Redemption—access the coupon sponsor's website and redeem automatically
(3) Store Redemption—physically visit a store and manually redeem at the checkout line/kiosk These redemption schemes will now be discussed. In the preferred embodiment, the automatic form of redemption if favored over the manual redemption, although both are feasible.

5.1.3.1 Password-Based Internet Manual Redemption

Password-based Internet Manual Redemption implies that the user must enter some key sequence with his computer keyboard to redeem his coupon. In one embodiment, the user's electronic card includes an LCD display. In this embodiment, the user accesses the website associated with the stored coupon. Eventually, he navigates to the page where the coupon redemption function is provided. He may even see a button on the web page that says "Click here to redeem with your electronic card." When the user presses the button on the web page, the web page asks the user to press the RX switch on his electronic card. The web page plays an audio file which includes what is hereinafter referred to as "redemption data" and the electronic card receives this audio signal and processes it.

Based on a known algorithm that checks whether the coupon is valid or not (based on the merchant ID and coupon number), the electronic card displays a password. Simultaneously, the web page asks if the user received the signal properly. If not, the user can press that button on the web page again to initiate the playing of the audio file. If the user's electronic card received the audio signal properly and provided a password, the web page provides a section that allows the user to manually enter the password. The user then enters the password. The web site checks to make sure that this is a valid password and if so, authorizes the redemption. If the password is not valid, the website will deny the redemption request. The user then proceeds in the conventional manner to either continue shopping or go to the checkout line to claim his gift or otherwise apply his coupon to his purchase.

In this embodiment, the password is unique to this particular redemption because the counter value and the individual ID (refer to the discussion above with respect to FIGS. 5(A) and 5(B)) in the card have been incorporated in the password generation. Thus, merely giving a friend this same password will not enable this friend to "redeem" a coupon because that password is unique to the electronic card holder and that particular transaction. Another electronic card user who downloads a coupon will have a different password.

In another embodiment, the special client software 114 (FIG. 11) plays a more important role. When the user navigates to the web page where the coupon redemption function is provided, he may see a button on the web page that says "Click here to redeem with your electronic card." When the user presses the button on the web page, the web page asks the user to press the TX switch on his electronic card. When the user presses the button on the web page, the web site delivers the redemption data which is provided to the special client software. The user also activates the TX switch on his electronic card to transmit the coupon data to the PC. The PC processes the coupon data with the redemption data and generates a password. The password is displayed by the PC and the user can enter it manually with his keyboard into the web page. The web site checks the password and either authorizes or denies the redemption request.

In the above two examples, the user's electronic card may hold several coupons. The processor checks each coupon separately with the redemption data to generate the password. For those coupons that are not associated with a particular merchant's redemption data, they are ignored.

Note that these password or two-factor security schemes are, as a practical matter, less convenient to the user. So, these two-factor security schemes will be employed if security is paramount. If, however, convenience is paramount, such as for online shopping, these two-factor security schemes will not be employed. The user only needs the electronic card itself to conduct his online shopping.

5.1.3.2 Internet Automatic Redemption

Internet Automatic Redemption implies that the user need not enter any key strokes with his computer keyboard to redeem his coupon. Furthermore, the user's electronic card need not have an LCD display. In this embodiment, the user accesses the website associated with the stored coupon. Eventually, he navigates to the page where the coupon redemption function is provided. He may even see a form on a web page that requests, "Please enter the coupon redemption number." The user then presses the TX switch on his electronic card which transmits his counter value, individual ID, and the coupon data. If more than one coupons are stored in the electronic card, all coupons are transmitted to the PC.

The special client software 114 (see FIG. 11) receives the data and displays a dialog box with some choices and asks the user which coupon he would like to redeem. The user selects the choice that corresponds to the coupon he wishes to redeem. The special client software then fills out the web page form with the coupon redemption number (which may incorporate the individual ID, counter value, and coupon data) and sends the form back to the web site. The web site checks the coupon data as well as the user's individual data and counter value to ensure that this user is a valid card holder and eligible to receive this coupon. The counter value is used to ensure that this same downloaded coupon cannot be used again by some computer hacker who stole the coupon redemption data online. As described above, with each press of the electronic card, the counter value increments.

In another embodiment, when the user navigates to the web page where the coupon redemption function is provided, he may see a button on the web page that says "Click here to redeem with your electronic card." When the user presses the button on the web page, the web page asks the user to press the TX switch on his electronic card. When the user presses the button on the web page, the web site delivers the redemption data which is provided to the special client software. The user also activates the TX switch on his electronic card to transmit the coupon data to the PC. The PC processes the coupon data with the redemption data and generates a password. The password is not displayed and the software can provide this password to the web site automatically without the user ever knowing the password. The web site checks the password and either authorizes or denies the redemption request.

Again, the password is unique to this particular redemption because the counter value and the individual ID (refer to the discussion above with respect to FIGS. 5(A) and 5(B)) in the card have been incorporated in the password generation. Another electronic card user who downloads a coupon will have a different password.

5.1.3.3 Store Redemption

In this embodiment, the user takes his electronic card to a conventional non-web store. Of course, the store sponsored the coupon he downloaded or otherwise sells a product/service of the company that sponsored the coupon. He takes his electronic card to a kiosk, which is equipped with a PC. The user activates the kiosk to prepare it to receive the coupon data. He then activates the TX switch on the electronic card to transmit the coupon data, along with his individual ID and counter value. The kiosk receives the information and checks to make sure the coupon is valid. If the store is a national or otherwise chain-type store, this check may occur at a designated network server that links other related stores. If the store is purely a local store, the check may be done locally at the kiosk or a network server that serves that particular store. If the check indicates that the coupon is valid, the kiosk may generate an actual paper coupon for the user to use at the checkout line.

Note that in another embodiment, the system uses pattern recognition as described more fully below. In this pattern recognition embodiment, the kiosk may "listen" for the recorded time slice of audio stored in the electronic card and perform pattern matching.

In another embodiment, the user may simply go to the checkout line at the store (with or without any merchandise, depending on the coupon). At the checkout line, the store has a computer that also functions as an electronic cash register. Equipped with a standard sound device, the cashier asks the user to press his TX switch on his electronic card. He does so and the coupon data along with his individual ID and counter value are transmitted to the store computer. This transmitted data is now checked. Again, like the kiosk case above, if the store is a national or otherwise chain-type store, this check may occur at a designated network server that links other related stores. If the store is purely a local store, the check may be done locally at the network server that serves that particular store. If the check indicates that the coupon is valid, the computer allows the user to redeem that coupon. If some merchandise is involved, the value of the coupon is applied to the purchase of that merchandise. If a free promotional item is offered, the item is given to the user without charge. Thus, based on the nature of the coupon, the action taken after the check will vary.

Another redemption scheme involves the use of the magnetic strip on the electronic card. A code would be written onto the magnetic strip portion of the electronic card as the user downloads coupons electronically off the web or some media device. The logic circuitry necessary to write this code onto the magnetic strip area exists in the form of magnetic strip writers. The various components to realize the magnetic strip writer are manufactured in miniature form to comply with the electronic card's form factor requirements. Appropriate software in the electronic card would detect that a coupon was downloaded and stored in the electronic card. This software would then instruct the magnetic strip writer circuitry to write the redemption code onto the magnetic strip area of the electronic card.

5.1.4 Interactive TV Auction

In this embodiment, the television set is an interactive TV set, typically with a set top box. When a live auction is broadcast on one of the channels, the user is allowed to bid on an item by pressing the TX switch of his electronic card. For example, assume that one of the channels is an auction channel, perhaps even called "The Auction Channel." The Auction Channel broadcasts traditional auctions with perhaps live participants. However, in addition to live participants, TV viewers equipped with the electronic card of the present invention are also allowed to bid on the item. Whenever the user presses the TX switch, the electronic card sends out his individual ID, counter value, group ID, among other data. The two-way set top box receives the user's data stream and passes this data stream along to the various distribution hubs and headends that make up this return path. Ultimately, the user's data stream makes its way to the server of the Auction Channel for the particular auction he is viewing.

When the Auction Channel's server receives the user's data stream, performs an authentication check (i.e., the user is a valid user) and the request is a valid request by checking the counter value, among other data. When all the checks have cleared, the user's data stream is interpreted as a valid bid by the Auction Channel's server and also by the human auctioneer. This process can continue until the item has been awarded to the winning bidder.

Alternatively, the user's data stream may go to a dedicated authentication server that is independent of the Auction Channel's server. Once authenticated by this authentication server, the user can then use his conventional set top box remote control to bid on items for that particular auction.

5.1.5 Content Recording for Search/Redirection

In another embodiment of the present invention, the electronic card can be used for recording an audio clip of the raw content broadcast over TV, radio, or heard by the cardholder. Once the audio clip has been recorded, a variety of redemption schemes allow the user of the electronic card to benefit from the recording. For the purposes of this patent specification, the term "redemption" is used to denote any type of action that the user takes to obtain something for recording that audio clip with his electronic card. Basically, the redemption schemes include: (1) finding information that is related to or associated with the audio clip more quickly and easily than conventional Internet searching techniques; and (2) receiving coupons, incentive points, or other sales offers as a reward for watching that TV program/advertisement or listening to a particular radio broadcast/advertisement. These redemption schemes can be implemented on-line over the Internet or at a conventional store. Details of these redemption schemes are provided below.

5.1.5.1 Electronic Card Hardware

Referring to FIG. 1 again, the electronic card 10 is now basically a portable digital recorder of sound. Audio, for example, from TV and/or radio can be recorded as an audio clip. Typically, only 5 to 10 seconds of the audio clip need to be recorded for the redemption scheme to succeed. Thus, if a user missed the beginning of a broadcast, he need not worry since recording any portion of the entire audio soundtrack is sufficient for successful redemption. As for the quality of the recording, high fidelity level is not necessary and thus low component/fabrication costs and small form factor sizes can be achieved.

Figure 20:
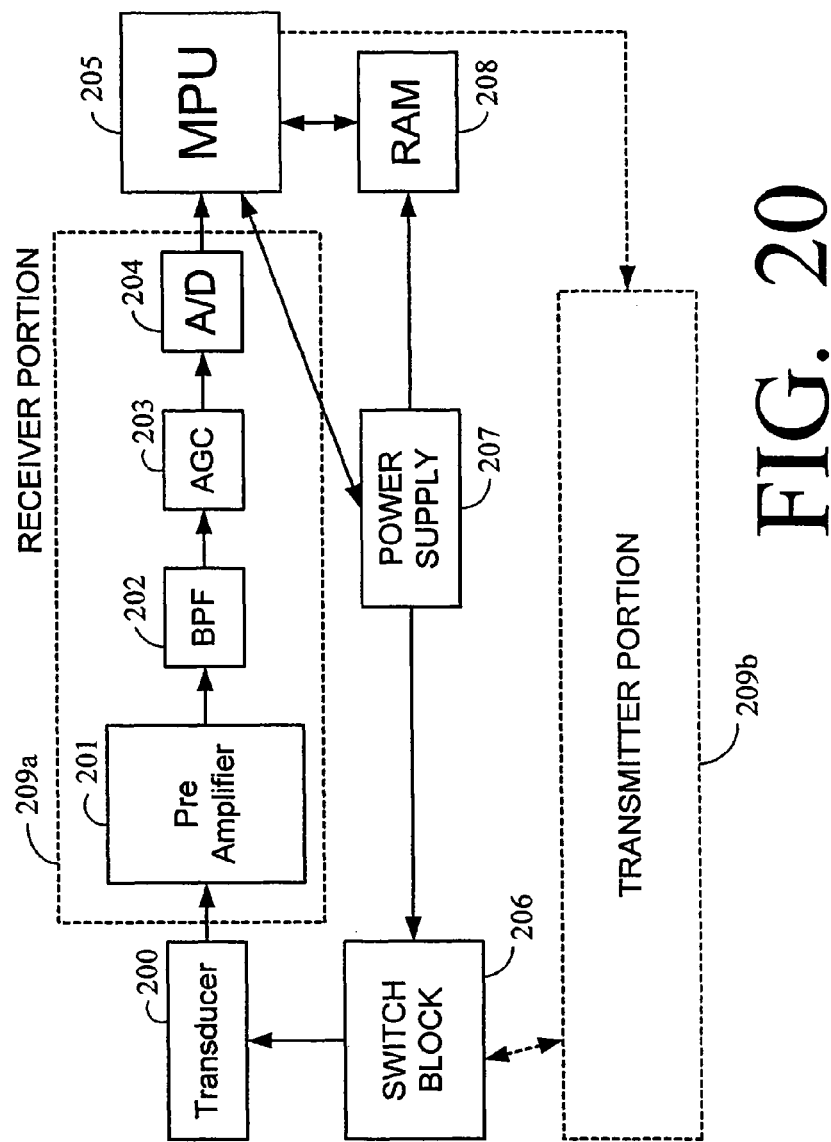
FIG. 20 shows a block diagram of the card architecture which implements analog recording in accordance with one embodiment of the present invention.

FIG. 20 shows one embodiment of the electronic card that provides the analog recording function. This FIG. shows a two-way card, in which the receiver portion 209a functions as a sound recorder and the transmitter portion 209b functions as a playback device. Power to the entire card is provided by a power supply 207, which in one embodiment is a Varta LPF-25 battery. The power supply 207 provides power to the microprocessor 205, the switch block 206, and the RAM 208 for battery back-up.

The digital core of the card is a microprocessor unit 205, which is coupled to a battery backed-up RAM 208. The RAM 208 needs to be battery backed-up to keep the recorded sounds in memory for as long as the user desires. In one embodiment, the microprocessor 205 manages the memory in the RAM 208 in a first-in first-out (FIFO) scheme. In this manner, the oldest recorded and stored audio clip is played first (during playback). If not enough memory space is available, the microprocessor 205 erases the oldest recorded audio clip first. Thus, as more and more audio clips are recorded and stored, more and more of the oldest stored audio clips will be replaced by the newer audio clips if memory space becomes an issue.

For the analog front end portion, a transducer 200 and a switch block 206 are provided. The transducer 200 can be either a single transmitter/receiver transducer or two separate transducers (i.e., one transducer functions as a microphone and the other transducer functions as a speaker). The switch block 206 provides power to the entire card. In one embodiment, the card contains two switches—a record switch and a transmit switch. These two switches are provided in the switch block 206. As described above, the switch block has silicon switches so that when the user releases the switch too soon, the rest of the circuitry in the card still has enough power to perform their respective functions. The recording feature will now be discussed. When the record switch is pressed in the switch block 206, power from the power supply 207 is provided to the transducer 200 as well as the rest of the circuitry in the card. Sound that is picked up by the transducer microphone is delivered to the receiver portion 209a of the card where it is amplified (amplifier 201), filtered (BPF 202), and gain controlled (AGC 203) prior to being digitized (A/D 204). The digitized sound is provided to microprocessor 205 which stores the digitized recording in RAM 208. Because each recorded audio clip takes up only 5-10 seconds, the RAM 208 must be large enough to support all the recordings that need to be stored. Typically, 5 seconds of sound take up approximately 500 KB of memory.

The playback feature will now be discussed. Having stored the sound in RAM 208, the recorded sound can be played by the user at any time. When the user presses the playback switch in the switch block 206, the recorded sound stored in RAM will be played through the transducer speaker of the card. Each press of the playback switch plays a single recorded audio clip in the order in which they were stored. Thus, the first press of the playback switch activates the playback of the oldest audio clip file. The second press of the playback switch activates the playback of the second oldest audio clip file. This process is circular so that after the newest audio clip file is played, the next audio clip file to be played corresponds to the oldest audio clip file. Of course, one ordinarily skilled in the art can devise other similar schemes to playback recorded audio. Multiple buttons can be implemented as well as a single button with multiple functions (or modes). Perhaps a delete button can be implemented so that the user can selectively delete the desired audio clip.

The circuitry in the transmitter portion 209b of the card is similar to that of FIGS. 2, 7, 8, 9, and 10. However, in this embodiment, the switch press activates a transmit routine that incorporates the audio clip file stored in RAM 208. A pointer is implemented that keeps track of which audio clip to play. After each press of the playback switch, the audio file being pointed to is played, and the pointer then moves to the next oldest audio file in RAM 208. In addition, the DES3 encryption scheme which includes the use of the group ID, individual ID, and counter values can also be used for authentication purposes. Thus, when the playback switch is pressed, an encrypted version of the audio clip file along with other authentication data is transmitted to the computer's microphone. The server receiving this data can authenticate the user and provide the pattern recognition search service for website redirection or coupon/incentive point collection, as described below.

5.1.5.2 Server Architecture

A server computer station 210 associated with the broadcast media interactive system in accordance with one embodiment of the present invention will now be discussed with respect to FIG. 21. At the core of the server 210 is a web server 215b which interfaces with a database server 212, a messaging server 215a, an authentication server 213, and the Internet 16. The web server 215b is further coupled to communications lines 219f (e.g., via a modem or network router connected to server 210) and the Internet 16.

In one embodiment, the web server 215b performs many tasks related to the management of the accounts, merchandises, coupons, incentive points, and soundtracks, music sales, sales of other services or merchandise associated with the recorded sound clips, or other information services relevant to the card issuer. From executing code for any number of different applications, managing resources, handling web requests, managing files and records, creating files and records, deleting files and records, delegating tasks, and handling exceptions, the web server 215b provides the main processing for the server 210. As noted above, this functionality, in other embodiments, could be distributed across multiple hardware servers.

The web server 215b also works with a messaging server 215a via line 219d (e.g., the system bus or a network connection to another hardware server) and a database server 212 via line 219b. The messaging server 215a works with the web server 215b via line 219d and is also connected to the Internet via communication lines 219e. The messaging server 215a provides various messaging functionality in various communications media such as telephone, email, instant messaging, active desktop application, and web browser notices. For example, email notices such as product news, discount updates, and customer service access are provided via communications line 219e. News of upcoming sales offers that may interest the potential customer are delivered frequently. Also, any questions that a user may have may be directed to customer service through the messaging server 215a, which will direct the email to the appropriate personnel within the customer service department. As noted above, various forms of instant messaging as are well known in the art could replace some or all of the functionality of messaging server 215a.

Note that communications lines 219e and 219f are standard interfaces to the Internet (e.g., an Ethernet or other network interface to a router and CSU/DSU, modem, etc.) or across machines which are typically Ethernet-connected at the "back end" of the network.

In another embodiment, the web server 215b and messaging server 215a are integrated in an Internet server 215. The interface to the Internet 16 is provided by primary communications line 219f (line 219e is not implemented). Thus, all web traffic passes through this Internet server 215 via communications line 219f. The messaging server 215a communicates with the web server 215b and the back end of the system (e.g., database server 212).

The database server 212 performs many tasks related to the creation, deletion, and management of various files and records managed by the server 210. The database server 212 supports the web server 215b in accomplishing its tasks of running the redemption portion of the broadcast media interactive system. The database server includes a management tools and web page information unit 212a and a pattern recognition search engine unit 212b. The management tools and web page information unit 212a provides exactly that—tools for the web page administrator to update, modify, and troubleshoot his web site. The web page information is also provided herein so that the web server 215b accesses the web page information from this unit 212a. Thus, when a user logs into the web page associated with server 210, the look and feel of this web page is stored in the unit 212a. However, the web server does not access the unit 212a for each access of this web page; rather, the web server 215b accesses the web information in the unit 212a only periodically to update its contents. The pattern recognition search engine 212b will be discussed in greater detail below. Generally, however, the pattern recognition search engine 212b performs pattern recognition matching functionality between a user-submitted audio clip and the soundtrack files in the soundtrack database 211d.

The database server 212 serves a database of content to be operated or accessed in conjunction with card operation. For example, that database server 212 can serve an incentive points database 211a, a coupon database 211b, a merchandise database 211c, a soundtrack database 211d, and an account database 211e. These databases 211a-211e are coupled to a communications line 219a and to the database server 212.

These databases on communications line 219a comprise the "back end" of the system. Note that the common bus-like illustration of the communications line 140 is merely conceptual. The databases may not actually be on a common bus. These databases may be widely dispersed geographically or integrated into one database. Also, some of the databases may be on a common bus while others may be located remotely and accessed via the Internet.

The incentive points database 211a contains various incentive points banner ads and programs. Additionally, the prerequisites for earning these incentive points are also stored herein. Similarly, the coupon database 211b contains various coupon information that is either disseminated via the messaging server 215a or awarded to certain users when certain requirements are satisfied. Also, the merchandise database 211c contains various merchandise information that can be purchased by users or awarded based on satisfying certain requirements. These databases 211a-211c can also contain links to specific web pages associated with the incentive point, coupon, or merchandise so that the user can be properly redirected to that website. In another embodiment, these databases do not contain ads, programs, coupons or information; rather, these databases contain only links where the user can be properly redirected for more detailed information. The website associated with the link has the programs and coupons that are awarded to users. If necessary, these websites communicate with the account database 211e to keep credits, debits, and points information.

The soundtrack database 211d contains soundtrack files for those TV programs, TV ads, radio programs, and radio ads of companies that are participating in this broadcast interactive system. This soundtrack database could also just be a collection of music from a given genre that is available for sale. That is useful for implementations in which cardholders know that they can operate their card to identify that sort of music. For example, a "top 40" card or a "country & western" card might be considered. The various incentive points, coupons, and merchandise are awarded in conjunction with some matching function performed by the pattern recognition search engine 212b against the files in the soundtrack database 211d. Alternatively, the matching function results in the user being redirected to the website that is associated with the matching soundtrack file.

For example, assume that a requirement for winning a certain number of incentive points or a particular coupon or a particular merchandise is providing proof that the user watched a particular ad that appeared in conjunction with a certain TV show (e.g., ABC Corporation's ad in an "X-Files" episode). One form of proof that the server 210 will accept is the audio clip recorded with the electronic card 10 (FIG. 1). The user records an audio clip from that advertisement (perhaps the jingle portion of the ad). The user then accesses the website associated with this server 210 with his browser and plays back the recording. The pattern recognition search engine 212b compares the user's audio clip to those stored in the soundtrack database. If a match is found between the user's submitted audio file and a soundtrack file in the soundtrack database 211d as determined by the pattern recognition search engine 212b, then the incentive points, coupons, and/or merchandise are awarded to the user who submitted that audio file.

Analogously, the successful match may result in the user being redirected to a particular web page where he can get more information on the product/service that was advertised in that TV ad. For example, if a user recorded an audio clip from a commercial featuring XYZ Corporation's coffeemaker, the pattern recognition search engine would then match the user-submitted audio clip with the appropriate soundtrack file associated with XYZ's coffeemaker. The match results in the user being redirected to the website associated with the XYZ coffeemaker.

In another example, the user may record a sound clip from some music that he heard over the radio. Although the user is unsure of the music's identity, he knows that he "likes" it. He accesses some central music website where he plays his sound clip. The pattern recognition software identifies the music and provides for the user the various CDs and other music forms (e.g., MP3) that are available for purchase. Thus, without knowing the title or artist of the music that he just heard on the radio, the user is able to identify and purchase that piece of music by merely recording a sound clip from that music and playing it back to a central website. This is especially useful because in most cases, the radio station rarely identifies the title (or even the artist) of a piece of music prior to actually playing that piece of music over the air. Usually, this identification occurs after the music is played. Sometimes, the radio disc jockey identifies this music along with several other songs that have also aired, which complicates the identification process for the user. Not only does the user have to match the identification with the actual song he heard, but he may have to wait for quite some time before the radio disc jockey makes the on-air identification. With this embodiment of the present invention, the user merely records the a clip of the song and play it back to a central music website. The music website will identify the music immediately and also suggest CDs that contain that song to purchase.

The memory 214 provides support for the database server 212 and the authentication server 213 so that these servers can serve all the user requests coming in. For example, hundreds if not thousands of users may be accessing this server 210 to submit audio clips. These audio clips are temporarily stored in the memory 214 until they are served by the database server 212, the authentication server 213, or both. The pattern recognition search process also requires some memory space to perform the match functions.

The account database 211e contains information about each user's account. Normally, only a user with an account (i.e., member) get the benefit of this broadcast media interactive system with points, coupons, and merchandise. The account information includes account balance (points or otherwise), expiration date for each point or group of points, redemption information, credit card information, billing information, billing address, and whether the account is authorized for using points for credit. Although this embodiment illustrated in FIG. 2 shows the account database 211e integrated with the rest of the server 210, another embodiment may have the account database located in a third party's server and maintained by the third party.

These databases 211a-211e contain appropriate linking fields so that an entry in one database can be associated with a related entry in another database. For example, when a user earns incentive points from the incentive points database 211a, that user's account in the account database 211e is appropriately updated.

In another embodiment, the incentive points database 211a, the coupon database 211b, and the merchandise database 211c are integrated into one database. The soundtrack database 211d and the account database 211e, however, are kept separate. In still another embodiment, these databases are distributed across one or more machines. These machines are coupled via communications line 219a to the database server 212. These databases comprise the "back end" of the system which the Internet server 215 access.

The authentication server 213 provides security functionality so that only those users with a proper account can access the features provided by the server 210. In particular, the data stream of the electronic card, which includes the group ID, individual ID, counter value, and raw data, can be encrypted. These fields can be checked against the account database to ensure that the proper user (individual ID, counter value) associated with a proper participating merchant (group ID) is accessing the system. Of course, the audio clip (i.e., raw data) is used only when the user has been authenticated. The authentication server also ensures that only those users with the properly sponsored electronic card (which performs the encryption and frequency translation (e.g., to ultrasound)) can access the server. Thus, anyone with a standard tape recorder cannot merely record an audio clip of a TV commercial, access the website associated with server 210, playback the audio clip, and obtain the desired service (e.g., redirection) or item (incentive points, coupons, merchandise).

In another embodiment, the authentication server is not implemented so that, for example, any user with a tape recorder could record the relevant audio clip, access the web site associated with server 210, playback the recording, and obtain the desired service or item, so long as the user is a member (i.e., has an account in the account database 211e) or opens a new account. This aspect, however, might be less than desirable because of the lack of convenience that the electronic card would otherwise provide. Still, the basic audio recording and playback functionality required by the system could be so provided.

The pattern recognition search engine (212b in FIG. 21) will now be discussed. In particular, the pattern recognition search functionality in the pattern recognition search engine will be described. Referring now to FIG. 22, the 5-10 second audio clip that was submitted by the user is represented by reference numeral 220. This audio clip is sampled at sampling block 221. In one embodiment, the sampling rate is 2,000 samples per second. The sampled audio clip is presented to a normalization block 222. The normalized audio clip is then presented to filtering block 223 to remove undesired frequency components.

A time slice block 224 receives the filtered audio clip. This time slice block divides the audio clip into time slices, where each time slice is approximately 20-50 msec in duration. Each audio file in the soundtrack database 211d (in FIG. 21) has also been divided into time slices. The search for a match between the user-submitted audio clip and one or more audio files in the soundtrack database 211d (in FIG. 21) involves comparing time slices of the user-submitted audio clip and time slices of the audio files in the soundtrack database. The length of each time slice in the pattern recognition search engine 211d (in FIG. 21) should be short enough to make the match process time-invariant. In other words, the incoming audio clip submitted by the user is a 5-10 second clip from any portion of the soundtrack that aired on TV or radio. One user may start recording as soon as the soundtrack began, while another user starts recording 4.2 seconds into the soundtrack. No two users may record the same section of the broadcast soundtrack. To compensate for this time variance, the match process must make the time slices short enough so as the make the search engine time invariant. On the other hand, each time slice must not be so short that the match process would be too computationally intensive requiring a very fast processor. Analogously, if the time slice is too long, the pattern recognition search engine may not find any match whatsoever.

For each time slice, a feature calculation block 225 performs feature calculations. The feature calculation block 225 attempts to extract some usable feature for each time slice. Typically, the feature calculation block 225 performs some time domain to frequency domain transformation process. In one embodiment, the feature calculation block 225 performs a Fourier Transform on the data in each time slice. In another embodiment, the feature calculation block 225 performs linear predictive coding (LPC) on the data in each time slice. In still another embodiment, the feature calculation block 225 performs a power spectral density on the data in each time slice. However, the present invention is not limited to such time-to-frequency domain transformations. Other transformations as known to those ordinarily skilled in the art of pattern recognition search technology can be applied.

Figure 21:
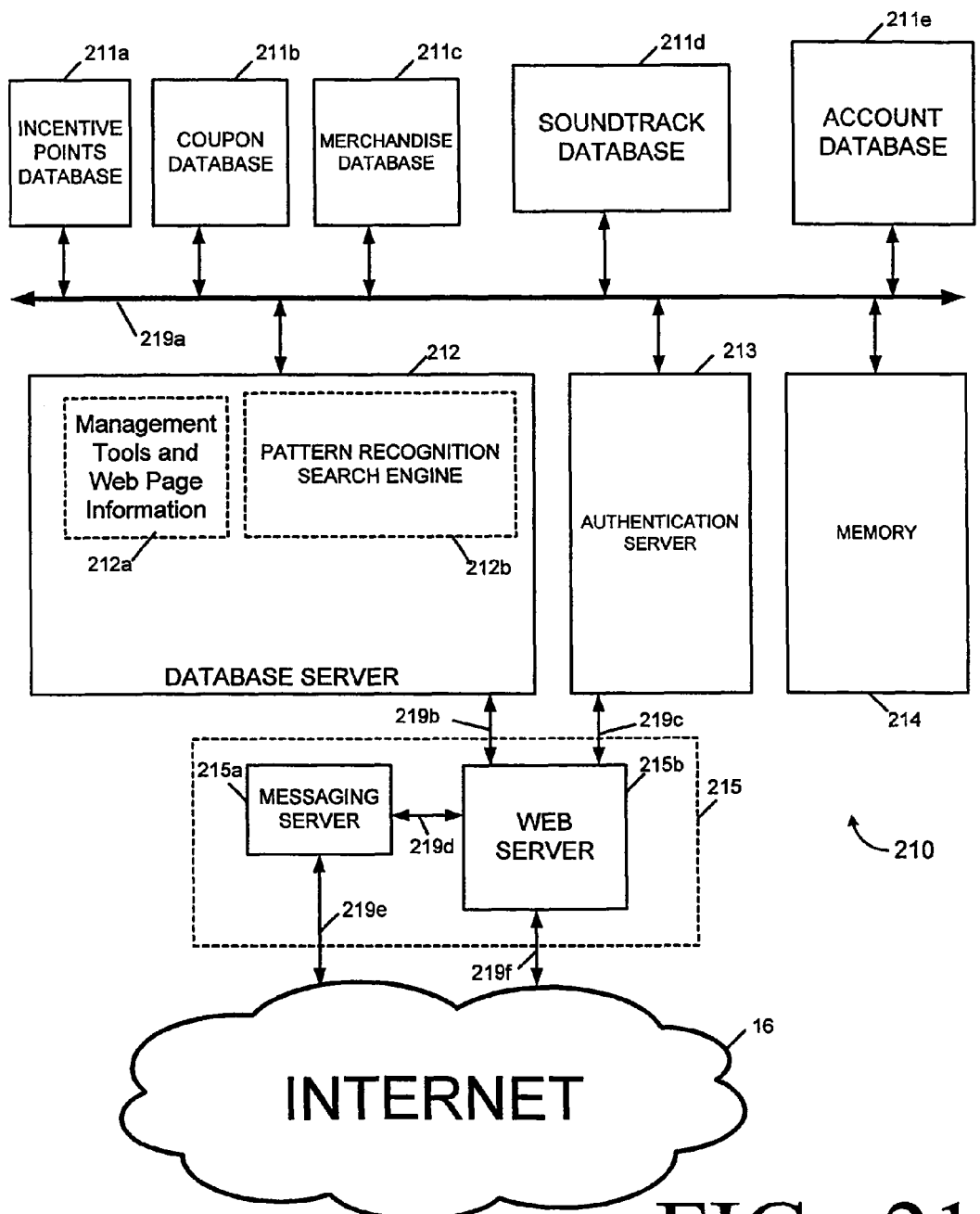
FIG. 21 shows a server architecture which implements the pattern recognition search engine and various databases including an account database, coupon database, incentive points database, merchandise database, and soundtrack database in accordance with one embodiment of the present invention.
Figure 22:
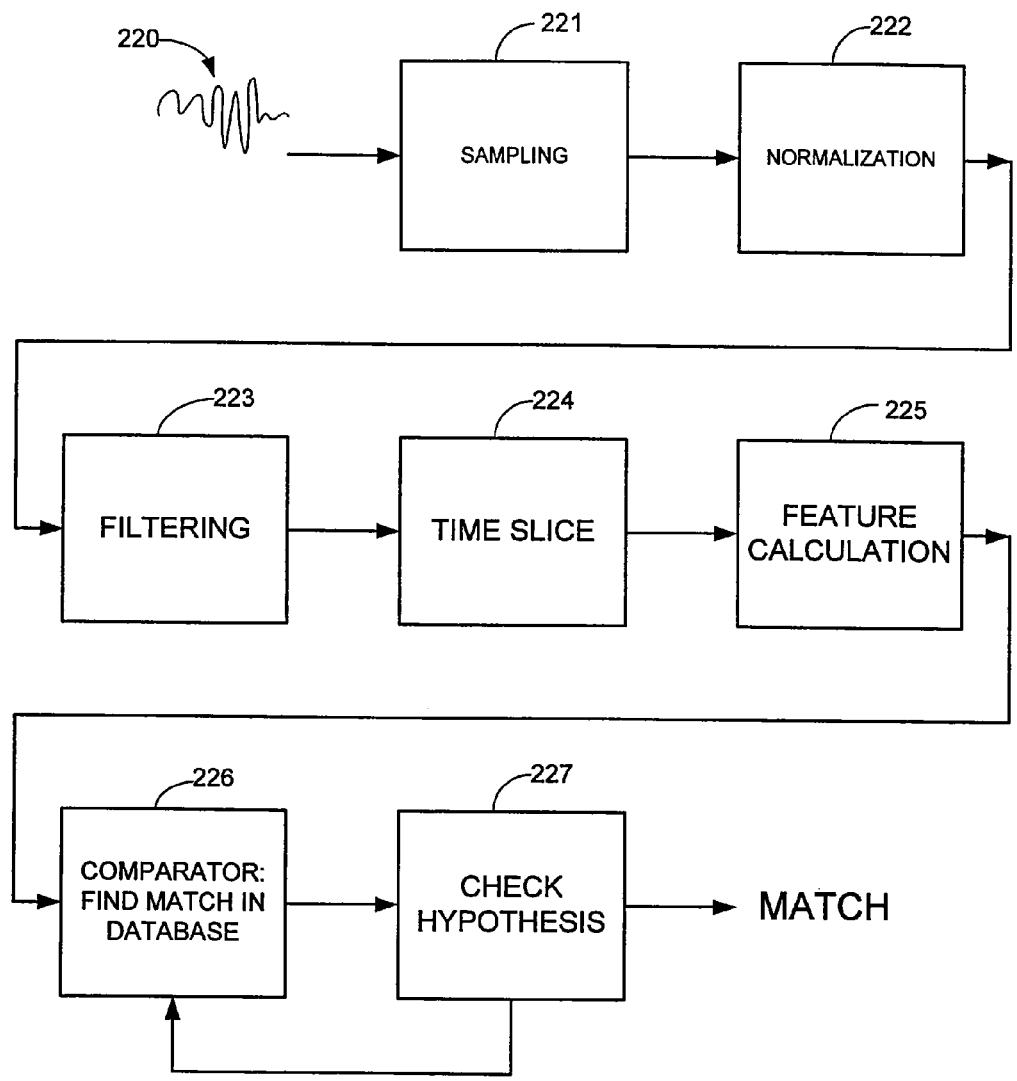
FIG. 22 shows a high level block diagram of the pattern recognition search functionality in the pattern recognition search engine in accordance with one embodiment of the present invention.

Based on the feature calculation for each time slice, a comparator block 226 attempts to find a match between each time slice from the audio clip submitted by the user and the time slices in the soundtrack database 211d (in FIG. 21). In one embodiment, a time slice associated with the user's audio clip is compared with each time slice in the soundtrack database. The calculated features in each time slice are compared to each other. The audio file in the soundtrack database that provides the closest match for this initial time slice results in the search engine producing a hypothesis where that audio file in the soundtrack database is considered a match. This hypothesis will be tested in block 227 as more time slices associated with the user's audio clip are compared to the soundtrack database. The check hypothesis block 227 creates a table or a list of soundtrack files that have successfully matched the time slices in comparator block 226. When the number of matches for a particular soundtrack file exceeds some "high confidence" threshold, then the particular soundtrack file is considered a match with high confidence. Alternatively, if a particular soundtrack file exceeds some "medium confidence" threshold (which is much less than the "high confidence" threshold) of matches and no more time slices are available for further comparisons, then that particular soundtrack file is considered a match with medium confidence. Similarly, if a particular soundtrack file exceeds some "low confidence" threshold (which is much less than the "medium confidence" threshold) of matches and no more time slices are available for further comparisons, then that particular soundtrack file is considered a match with low confidence.

Also, if a particular soundtrack file does not exceed the "low confidence" threshold and no more time slices are available for further comparisons, then the pattern recognition search engine will determine that no match exists. Alternatively, the pattern recognition search engine may determine that a match with negligible confidence exists for this latter case.

5.1.5.3 System Operation

In this section, the recording of content will be described first, followed by the various redemption schemes. In general, a user need to merely press the record button on his electronic card when a TV commercial, TV program, infomercial, radio commercial, or radio program is being aired. However, to get any benefit out of this broadcast media interactive system, the broadcast content must have a corresponding soundtrack file in the soundtrack database 211d (in FIG. 21). Normally, the soundtrack can include the entire audio from the content, whether it's an hour-long drama, a two-hour long TV movie, a half-hour sitcom, or a thirty-second commercial.

The operation of the server in FIG. 21 can be done centrally or in distributive fashion. In the central operation scheme, only one website or entity would own and operate the server of FIG. 21. Accordingly, all users must come to this entity's website to request pattern recognition search services to obtain the coupons, incentive points, sales information or to be otherwise redirected to the proper website where the user can receive coupons, points, and sales information. Usually, the owner of the server of FIG. 21 negotiated some type of arrangement with a merchant (XYZ Corporation for ads, commercials, infomercials), TV network (e.g., ABC, CBS, NBC, Fox), cable service provider (e.g., AT&T Cable Services), satellite service (e.g., Direct TV), local TV station, local radio station, and the like. This arrangement includes placing the soundtrack of the program or the commercial in the soundtrack database for pattern recognition searching purposes. Without such an arrangement, the user can record any content he pleases but he will not be able to redeem it for any value in return.

In the distributed scheme, any web merchant, network, cable provider, local station (TV, radio, or otherwise), and the like can own and maintain its own server of FIG. 21. In this case, users would have to go to each web entity's website for service. If a user just recorded an audio clip of a commercial on CBS, he may have to go to the website of either CBS or the company associated with that commercial. In this distributed scheme, multi-entity arrangements may not be necessary.

For example, assume that CBS wants to increase viewership of certain TV programs. To utilize the various embodiments of the present invention, the electronic cards must be distributed to users so that they will use them when watching TV programs CBS and/or other entities may provide for card distribution in any number of methods.

One method includes distributing these cards in the same package as another product. For example, in a joint venture with TV Guide Magazine, CBS and TV Guide distribute these electronic cards as a securely placed insert in the upcoming issues of TV Guide (with or without any additional price increase in the TV Guide). As another example, CBS and a certain XYZ Corporation agree to distribute these electronic cards in XYZ's compact discs (CD) in a joint venture to co-market CBS and XYZ Corporation's CD division. When a user purchases an XYZ CD, the CD package includes a free electronic card.

In another distribution scheme, CBS may limit distribution of these cards to some entity with a large membership base. For example, in a joint venture with AOL, CBS and AOL agree to distribute these electronic cards to AOL members only. AOL members would receive these cards in the mail. Similarly, VISA card holders may receive these electronic cards in the mail as a result of some arrangement between CBS and VISA.

In another distribution scheme, the major credit card organizations (i.e., VISA, Mastercard, American Express) arrange for its member issuing banks to distribute these cards to all new and existing card holders. In this arrangement, CBS has no involvement in the distribution, but rather benefits from having some other organization handle the distribution of the cards.

Whatever the card distribution scheme, assume for the purpose of discussion that these electronic cards are now in the hands of users. CBS would of course market the use of these electronic cards via print (e.g., newspapers, magazines) and electronic media (e.g., TV commercials, radio broadcasts, Internet newsgroups, CBS's website). CBS would also have some arrangement with the server of FIG. 21 to carry soundtracks of its programs and commercials in the soundtrack database 211d (in FIG. 21). Now, to increase viewership, CBS would market certain programs heavily. It mentions that by recording an audio clip of a CBS program (or relevant portion of a CBS program, such as the opening credits) or a commercial that appeared within a program's time slot, the user could redeem the recording to earn coupons to various merchandise, earn incentive points such as mileage with a popular airline, win free merchandise, or otherwise obtain some benefit. In this case, the broadcast media interactive system benefits both the sponsoring entity (e.g., CBS, TV Guide, XYZ Corporation) by increasing viewership or product purchase, as well as benefiting the user.

Redemption schemes will now be discussed. Basically, the redemption schemes include: (1) finding information that is related to or associated with the audio clip more quickly and easily than conventional Internet searching techniques; and (2) receiving coupons, incentive points, or other sales offers as a reward for watching that TV program/advertisement or listening to a particular radio broadcast/advertisement. These redemption schemes can be implemented on-line over the Internet or at a conventional store.

In the first type of redemption scheme, the user would take his electronic card, which contains the audio clip of a TV program or commercial, to his computer and access the Internet. The user initially recorded this audio clip because he was interested in a particular TV program (if his audio clip was some portion of the TV program), or some product or company (if his audio clip was of some portion of a TV commercial or radio commercial). The user wants more information about that program, an actor/actress of that program, the network itself (e.g., CBS) carrying that program, the product that was showcased in that commercial, or the company that makes/distributes that product in that commercial. However, the use of a conventional search engine might be too complicated, inefficient, or both when he tries to find the relevant information on the web. The electronic card facilitates his searching efforts.

When he accesses the website associated with the server of FIG. 21, the website then instructs the user to play the recording to his PC microphone. He plays the recording. When a match occurs between the user's audio clip and a file in the soundtrack database 211d (in FIG. 21), the server then redirects him to the relevant web page. Assume that the user was interested in a particular product in a TV commercial, the server redirects him to the website of the company that makes or sells that particular product. In may cases, the user is directed to the particular web page that has the detailed information about that product to simplify the process for the user. The user need not be directed to a company website where he then has to wade through the tens or hundreds of pages of products that the company makes or sells. Rather, he is directed to the very page that has all the information that the user desires on that particular product. From here, the user can access information about the company that makes or sells that product, if desired.

Assume that the user is interested in finding more information about a particular actor who appeared in a television program. While watching that program, the user would record an audio clip of a portion of that program. He would then playback this recording in the manner described above as instructed by the website. The website associated with the server of FIG. 21 would then perform a pattern recognition search of the submitted audio clip. If a match occurs, the website would then redirect him to a web page that corresponds to the TV show he was watching. From this website, the user can then find links to the actors in this program, including the actor he is interested in, and access the linked web pages to obtain more information about that actor. If desired, the user can also obtain more information about the network that broadcast that TV show, the studio that made that TV program, or a whole host of other information related to that TV program.

Similarly, assume that the user recorded an audio clip of a TV commercial. In that commercial, the merchant advertised certain coupons or mileage points by going to his website and registering. The user takes the recorded audio clip, plays it to the server via his microphone across the Internet, and waits for pattern match. The server then informs the user that a match occurred (or no match), and redirects him to the merchant's webpage. Here, the user can register to earn his coupons or mileage points. In this case, the user's account balance is modified to reflect the earning of the mileage points. This account can be at either the website that the user was redirected to or the website of FIG. 21, where the account database 211e is maintained. This example is also related to the second redemption scheme. However, in this example, both the redirection and the earning of coupons or points occur together.

As another example of this second redemption scheme, the user takes his recorded audio clip in his electronic card to the website associated with the server of FIG. 21. When he plays back the recorded audio clip, the server performs the pattern match search and generates some match result. If a successful match results, the user with the proper account in the account database 211e earns the advertised incentive points, mileage points, or coupons. These earnings are reflected in the account database 211e associated with that user. The user can then redeem these coupons at any participating merchant and follow rules associated with their redemption, such as using the coupons prior to the expiration date.

As mentioned briefly above, the user can also take his electronic card to a conventional non-web store for redemption. Of course, the store sponsored the coupon that he saw (and recorded) on TV or radio or otherwise sells a product/service of another company that sponsored the coupon. Sometime after recording the audio clip with his electronic card, the user takes his electronic card to a kiosk, which is equipped with a computing station or terminal. The user activates the kiosk to prepare it to receive the coupon data. He then activates the playback switch on the electronic card to play the recorded audio clip. The kiosk receives the information and delivers the audio clip to a server or computing system that contains the pattern recognition search engine and the soundtrack database. If the store is a national or otherwise chain-type store, this search function may occur at a designated network server that links other related stores. If the store is purely a local store, the search may be done locally at the kiosk or a network server that serves that particular store. If the search indicates that the coupon is valid (i.e., audio clip matches a soundtrack file), the kiosk may generate an actual paper coupon for the user to use at the checkout line.

In a variation of this embodiment, the user may also simply go to the checkout line at an actual conventional store (with or without any merchandise, depending on the coupon). At the checkout line, the store has a computer that also functions as an electronic cash register. Equipped with a standard sound device, the cashier asks the user to press his playback switch on his electronic card. He does so and the audio clip is transmitted to the store computer. This transmitted audio clip is now checked with the soundtrack files in the soundtrack database. Again, like the kiosk case above, if the store is a national or otherwise chain-type store, this check may occur at a designated network server that links other related stores. If the store is purely a local store, the check may be done locally at the a network server that serves that particular store. If the check indicates that the coupon is valid, the computer allows the user to redeem that coupon. If some merchandise is involved, the value of the coupon is applied to the purchase of that merchandise. If a free promotional item is offered, the item is given to the user without charge. Thus, based on the nature of the coupon, the action taken after the check will vary.

Similarly, the user may go to a kiosk or customer service station. When he plays the recorded audio clip, the kiosk or customer service station informs him the location of the merchandise associated with the recorded audio clip. The user can then find his item in that store with relative ease.

5.1.6 Bookmarks for Broadcast Media

In a variation of the content recording embodiment, the audio clip can be used to keep a "virtual bookmark" in the electronic card with respect to the broadcast content. Later, when he access the Internet, he can playback his recording at a central website. Once the pattern recognition functionality in that website finds a match, it directs him to the website associated with that recorded content.

Typically, when a user is watching television or listening to the radio, he may be interested in particular content that just aired. However, he has no easy momentary access to the Internet to look up that content. In some instances, even if he has easy momentary access to the Internet, he does not want to look for more information relevant to that content because he wants to continue watching/listening to the broadcast that is airing. In these cases, the electronic card can be used to record an audio clip of the broadcast. By doing so, he has stored a virtual bookmark to a web address.

Later, at his convenience, he can access the web and go to a central website. This central website has a pattern recognition functionality. When the user plays back the recorded audio clip, the pattern recognition software attempts to find a match. When it finds a match, this match is associated with a table that contains web addresses. At this point, this central website can redirect him automatically to this web address or simply display the web address for the user. This web address has more detailed information on the product/service that was the subject of the broadcast he just recorded. If the broadcast was a commercial, the recording would allow the user to later be redirected to the webpage of the merchant associated with that commercial or even directly to the webpage of the product/service being advertised. If the broadcast was a TV program, the recording would allow the use to later be redirected to the webpage of the network or production company that produced that program, or even to a fan webpage of that particular TV program.

Multiple recordings can be stored in the electronic card so that in effect, the user is storing multiple "virtual bookmarks." They are analogous to bookmarks because web bookmarks on browsers allow the user to conveniently and quickly access a particular desired webpage without any searching. Similarly, the "virtual bookmarks" in the electronic cards allow the user to conveniently and quickly access a particular webpage without any searching effort by the user.

In another embodiment, the "virtual bookmark" can be used to make a realtime purchase on a home shopping network channel. When the user sees an item on the home shopping network channel that he wants to purchase, he records an audio clip while that item is on display on TV. The user would take this audio clip to his computer, access the home shopping network website, and playback the recording. When the pattern recognition software in the server detects a match, the user is given the option to purchase that item. Alternatively, the user could go to a central website where the pattern recognition feature redirects him to the home shopping network website based on the successful pattern match. Thereafter, the user navigates to the webpage containing the item or the redirection automatically takes the user to the webpage of that item.

5.2 Smart E-Wallet System

In accordance with one embodiment of the present invention, a smart e-wallet application is provided which allows the user to use the electronic card in conjunction with a web browser to make on-line shopping faster and more convenient. Essentially, the smart e-wallet system according to one embodiment of the present invention allows the user to automatically launch a browser, send the user ID and password to the e-wallet server, and emulate the "fill" and "submit" buttons when the user is in a website's checkout line with the simple press of the switch in the electronic card. More details are provided below.

5.2.1 Installation

The smart e-wallet system comprises the e-wallet client software, the electronic card, software associated with the electronic card (DSP, sound card drivers, etc.) and an e-wallet server. The installation of the e-wallet client software and the electronic card software can be accomplished using standard methods. In one embodiment, the user would already have an electronic card that is sponsored by a merchant, portal, or some other entity that has an interest in distributing the electronic cards. The software installation process includes downloading the electronic card software from the website associated with the electronic card company and also downloading the e-wallet client software from the website associated with the e-wallet company. These two separate processes will now be described.

Figure 29:
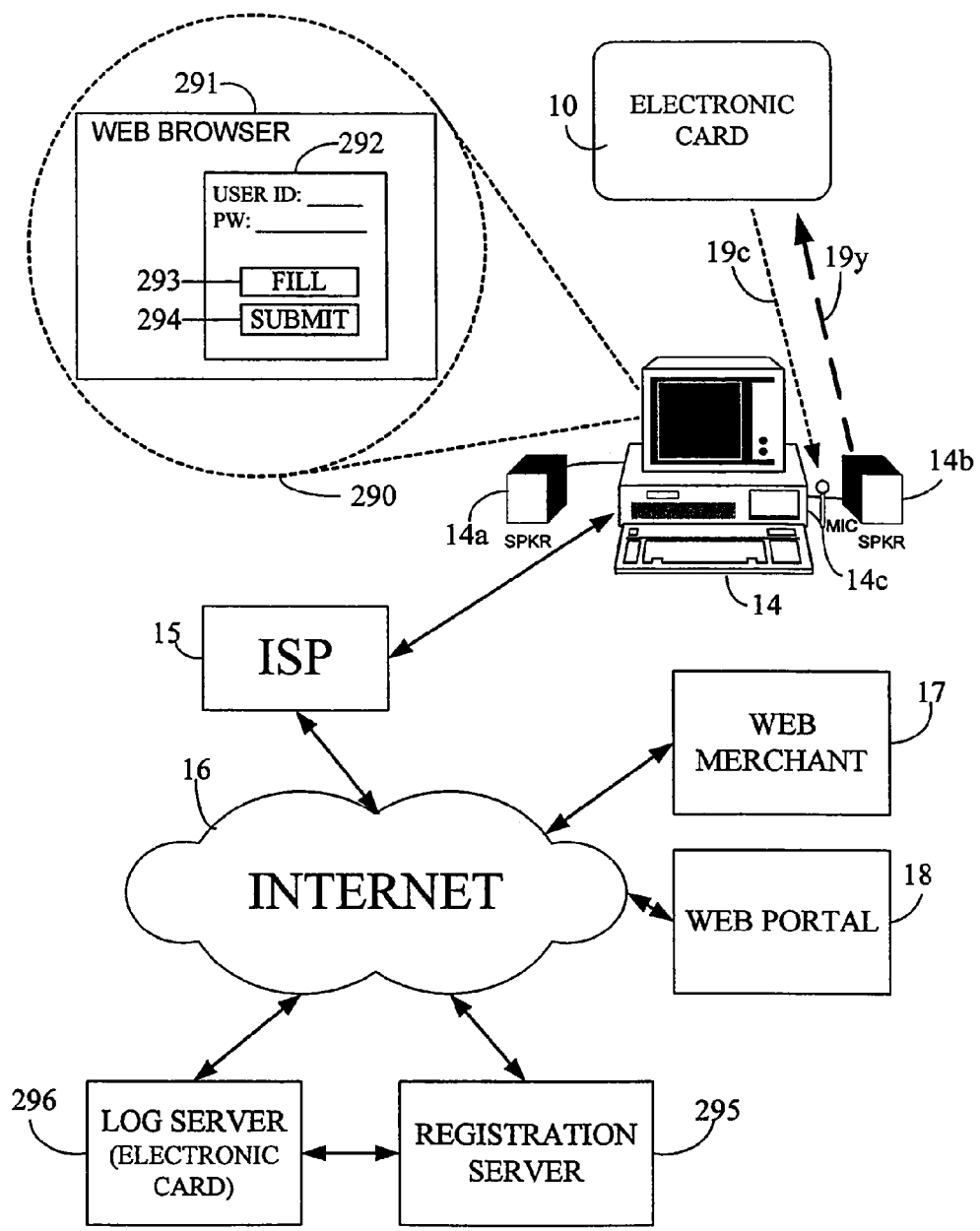
FIG. 29 shows a system diagram for the E-Wallet system in accordance with one embodiment of the present invention.

Referring to FIG. 29, a log server 296 and a registration server 295 are provided. In one embodiment, the log server 296 is operated by and associated with the electronic card company and the registration server 295 is operated by and associated with the e-wallet company. Alternatively, the log server 296 is operated by and associated with an e-wallet company and the registration server 295 is operated by and associated with a typical web merchant. In other embodiments, both the log server 296 and the registration server 295 are operated and associated with a single company, whether electronic card, e-wallet, or web merchant/portal.

Typically, the servers are NT-based systems that use the IIS platform to handle Internet requests and feature a SQL server by Microsoft to manage and store the collected data. The log server 296 primarily handles user registration of the electronic card, installation of the software associated with the electronic card, and collects MIS data for later use and analysis.

As part of the registration and software installation process, the log server stores and updates a list of users and their corresponding electronic card IDs by name. Note that while the server knows each electronic card ID, it does not know or have access to the electronic card's secret key (i.e., MyEWallet password) which is generated by the hash function, as described further below in the security section of the patent specification. The log server also prepares the installation software and personal data file for each user. Finally, the log server stores and retrieves each user's usage characteristics.

To start the installation process, the user accesses a website that is associated with an e-wallet company, such as the website supported by registration server 295 in FIG. 29. The user may also be asked to provide other personal details including:
(1) full name (first, middle, last)
(2) email address
(3) electronic card number (or user ID)
(4) optional e-wallet profile name
(5) address 1
(6) address 2 (optional)
(7) city
(8) state/province
(9) zip/postal code
(10) home telephone number
(11) work telephone number
(12) interests/hobbies
(13) shopping preference
(14) household size
(15) household income
(16) Question for password
(17) Secret answer for password question These are just representative information that the registration process requires. Some information may not be requested at all. In another embodiment, the user need not manually enter these information; rather, the information is stored in the electronic card itself and the mere activation of the card will provide this information to the server.

Since this registration server 295 is associated with the e-wallet company only, the registration server 295 takes the user to the log server 296, or the server operated by the company associated with the electronic card. After all, the e-wallet company provides e-wallet service and software to many different types of people, regardless of whether or not they have the electronic card of the present invention. The company associated with the log server 296 provides the service/software for the electronic card. Alternatively, the user may have gone directly to the website associated with the electronic card company first. However, as described above, if the user happens to go to the website associated with the e-wallet service first, that website will redirect the user to the website associated with the electronic card company.

The log server 296 delivers a registration web page that requires the user to enter the electronic card number. A dialog box can pop up to inform the user of the terms and conditions of the e-wallet/electronic card program. When the user agrees, the log server 296 delivers the software download page to the user. The user then downloads the software associated with the electronic card which can include the data file for personal information. An application file also includes a one-time code which is similar to the electronic card's transmission of the Series in the data stream. This one-time code is unique to each user and is used later in the smart e-wallet application for security purposes, as described further below. The user then subsequently installs the software using standard techniques, such as using an installation wizard program. The install wizard also tells the user how to install the microphone and test the microphone, sound card, and the electronic card. At this point, only the software associated with the electronic card is installed. This software is similar to software 114 of FIG. 11.

Finally, the installed software sends the user to the website associated with the e-wallet system. Here, the user name and password are entered by the installed software and the e-wallet client software is downloaded. The e-wallet client software can then be installed using its own techniques. The user is then notified that the installation of the smart e-wallet application has been successfully completed. The entire installation process takes only a few minutes (with a 33.6K baud modem).

Of course, the separate e-wallet company-sponsored registration server and the electronic card company-sponsored log server need not be two separate servers. Either, or both, companies can agree to operate a single server that provides registration for e-wallet and registration for the electronic card.

Alternatively, the user may purchase a disk or CD-based software package, which he then installs in the conventional manner. Also, the software could be bundled together with other pieces of unrelated software when the user purchases a computer from a store or directly from a manufacturer. Once installed, the user can proceed to the website associated with the e-wallet and/or electronic card and register.

The smart e-wallet system allows for multiple installations in multiple personal computers. Thus, a user could use the smart e-wallet system from the home and the office with a single electronic card. The installation procedure is as described above. However, a security mechanism is provided to ensure that the subsequent installations are legitimate. In the process of installing the software for the first time, the log server/registration server will provide the user three unique information options (i.e., question and answer). The user must provide a response to one of these options. In subsequent installations, the registration server/log server will prompt the user with the same question. If the user provides a correct response, the server will allow the new installation to proceed.

5.2.2 Operation

An e-wallet is a convenient application that allows the user to shop and purchase items on the web with relative ease. Because the user had registered with the proper personal information such as name, address, phone number, credit card number, expiration date, and the like, the user's shopping experience is a painless and positive one. Indeed, this information may have already been entered by the card's provider. When the user is about to purchase some item at a website, he goes to the checkout line. Instead of filling out a form like he would normally do, he invokes the e-wallet application which contains all of his personal information. The e-wallet application would either fill out the form automatically for the user or deliver equivalent information to the website so that the sales transaction can be finalized.

Referring now to FIG. 29, the smart e-wallet application (which includes the e-wallet client software and the electronic card software) is a single tray application which is represented as an icon in the System Tray by the Windows OS if the application is active. Typically, the smart e-wallet application opens automatically on start-up. Of course, the user can turn off (i.e., close) the e-wallet application at any time after it has been opened by, for example, right clicking the tray icon and selecting "Exit." The icon will then promptly disappear from the system tray. Conversely, the user can manually open the e-wallet application from the Program Menu, or if a short cut has been provided on the desktop.

If the user has successfully registered with the e-wallet system (e.g., registration server 295 in FIG. 29), the user can use the electronic card 10 to gain instant access to a designated e-wallet "home" website and perform easy and secure purchases from that site. For the purpose of this patent specification, this designated "home" site is called MyEWallet.

Figure 30:
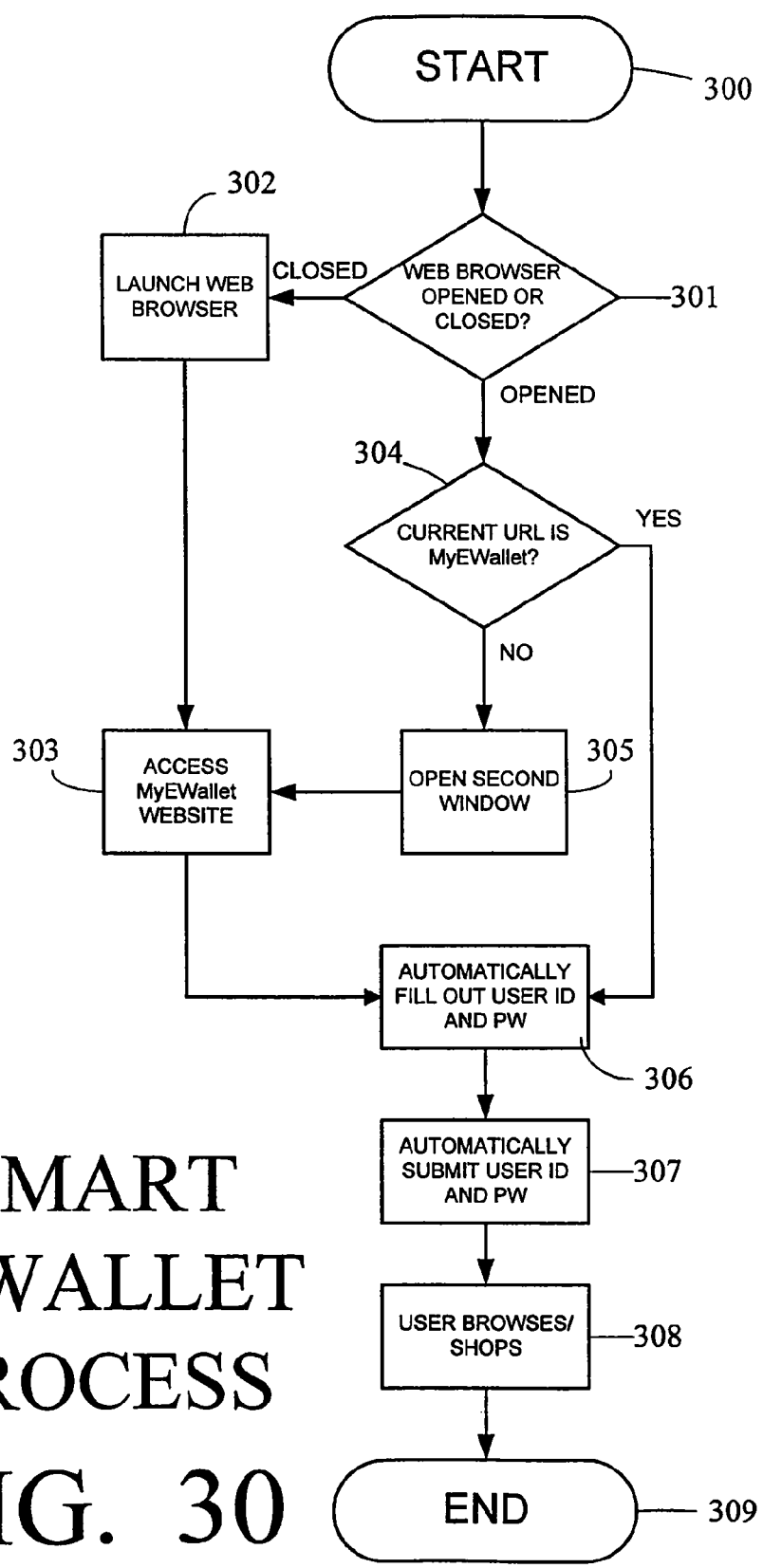
FIG. 30 shows a flow chart of the operation of the E-Wallet system in accordance with one embodiment of the present invention.

First and foremost, the computer station 14 is powered up and running. Secondly, the sound system is also running properly and active. When the user clicks on the electronic card, the electronic card transmits a data stream which should be detected by the client software. The electronic card software portion of the smart e-wallet application checks for a valid transmission (i.e., user password). It the transmission is invalid, the user receives a security warning. If the transmission is valid, the smart e-wallet application performs any number of functions that is context-sensitive. For the most part, the smart e-wallet application checks the launch status (i.e., open or closed) of the web browser and the URL of the web page accessed. FIG. 30 shows a flowchart of this context-sensitive process.

The process starts at step 300. Step 301 checks to determine if the web browser is closed or opened. FIG. 29 shows a portion 290 of the computer screen that displays the web browser. If the web browser 291 (in FIG. 29) is closed, the smart e-wallet application launches the PC's default browser at step 302, accesses the MyEWallet website at step 303, and logs the user into the website (steps 306, 307). If the user is properly registered, the web page opened will be the user's personalized web page. The e-wallet interface 292 (in FIG. 29) will appear with the user ID and password automatically filled in by the smart e-wallet application as shown in step 306. Thereafter, the user ID and password are delivered to the MyEWallet website at step 307. If proper, the user has now been logged into the MyEWallet website. The user can browser and shop as he pleases as indicated at step 308. At this point, the user's e-wallet which contains his personal information can be used to fill out a form or otherwise deliver these information to the website to finalize any sales transaction. Note that the smart e-wallet application fills in the user ID and password and submits them automatically to the MyEWallet server to log in. Thus, the mere press of the switch in the electronic card automates an otherwise manual process.

Returning to step 301, if the web browser is open, the smart e-wallet application checks the URL of the current web page at step 304. If the current URL is not MyEWallet, the smart e-wallet application opens another window at step 305, accesses the MyEWallet web page at step 303, and logs in the user as described above. As in the first case above, the smart e-wallet application fills in (step 306) and submits (step 307) the user ID and password automatically. At this point, the user proceeds with his web browsing and shopping in this second window. The previously opened first window is not associated with the smart e-wallet system so any tasks performed in this first window will not benefit from any automated tasks already performed by the smart e-wallet system. In another embodiment, the smart e-wallet system will access the MyEWallet web page and log in the user in the first window, without opening up another window. Thus, in this alternative embodiment, step 305 is eliminated.

Returning to step 304, if the browser is already opened to the MyEWallet URL but the user did not log in yet, the smart e-wallet application proceeds to fill in the user ID and password in the e-wallet interface 292 (in FIG. 29) at step 306, followed by submission of the user ID and password to the MyEWallet server at step 307. If proper, the user is logged into the MyEWallet system and can now take advantage of the e-wallet system.

Once the user is logged into the MyEWallet server, the next click of the electronic card performs other tasks. If the application is in the "fill" stage, the smart e-wallet application will fill out the form on the current web page, just as if the user had clicked on the "fill" button with the mouse. If the form is completely filled out, the web page would now be in the submit stage. The next press of the electronic card emulates the press of the "submit" button.

The user can, of course, fill out the form himself. If any portion of the form is filled out, the smart e-wallet application detects that the web page is in the "submit" stage. If the browser is already opened to the MyEWallet URL and the application is in the "submit" stage, the smart e-wallet application will submit the completed form on the current .html page to the appropriate server, just as if the user had clicked on the "submit" button with the mouse.

During these user transactions with web merchants and portals, the smart e-wallet application sends usage information to the log server 296. Specifically, whenever the electronic card is activated, the log server 296 gathers the following information:
(1) electronic card serial number (or individual ID)
(2) group ID (i.e., sponsoring web merchant or portal)
(3) server date and time
(4) PC date and time
(5) Counter value (or card click number)
(6) Action performed by card (e.g., open browser, login to wallet, press "fill" button)
(7) URL of the website visited by the user These data can be used later to monitor user on-line behavior so that targeted marketing and advertising schemes can be employed. Additionally, if the user has some technical or other problems with the system, the appropriate customer service representative can assist the user more effectively with these stored historical data.

5.2.3 Security

Generally, the e-wallet application in the client computer station performs two checks—(1) card signal is valid based on signal structure, and (2) card transaction is valid based on the counter value. These checks must be performed in real-time whenever a sound is detected by the sound system of the PC. In one embodiment, the client computer station checks both card signal transmission validity and card transaction validity. In another embodiment, the client computer station performs card signal transmission validity and a remote server performs card transaction validity.

The sound system, and in particular the microphone, is active in the computer station. Accordingly, any signal or noise can be picked up by the microphone. Noise or other random sounds should not trigger the operation of the e-wallet client application. To trigger the operation of this e-wallet system, a proper signal from the electronic card has to be detected.

As described above in the data format section of this patent specification, the electronic card transmits f0, f1, sync byte, known byte, the data, and the CRC, along with start and stop bits at every byte interval. The data portion consists of the individual ID and the Series (which is generated by applying DES3 encryption on the key, group ID, and counter value). The transmitted signal that is generated by the card has a unique structure, which the client software in the PC can use to detect a valid signal.

The e-wallet client software also has a table that was generated from a DES3 operation on the card signal so that the client can perform a pseudo decryption function. This table has the following fields—card signal, counter value, and user password. Also, the e-wallet application keeps track of the last counter value that was transmitted by the electronic card (and detected by the e-wallet application) as an additional check, as explained further below. In one embodiment, the table includes 3,000 possible card signals that could be detected by the e-wallet client software. Based on the various possible card signals, the table provides corresponding counter values and user passwords.

When a signal (or noise) is detected, the e-wallet application first determines if the signal is a valid electronic card transmission. If it is not a valid signal, the signal is ignored and no further processing is necessary. If, however, the signal is valid, the e-wallet application determines whether the card transaction is valid. The e-wallet application determines card transaction validity based on the counter value in the table based derived from the card signal structure. If the derived counter value in the table is greater than the counter value that was previously stored by the e-wallet system, then the card transaction is considered valid. Why?

The electronic card increments the counter value in the card each time the card switch is pressed. Thus, if the current counter value of my card is 24, this implies that I had pressed the card 23 previous times. This counter value of 23 is currently stored in the PC. When the user presses the electronic card, the counter value of 24 is transmitted to the PC and the card increments its internal counter value to 25. This $24^{th}$ press of the electronic card is a valid transaction because the transmitted counter value 24 is greater than the stored counter value of 23.

If, however, an interceptor recorded the electronic card transmission while the user pressed the electronic card when the 24 counter value was transmitted, he may attempt to use this recording to break into the user's account. At this point, the PC's counter value is now 24 because the user had just transmitted the counter value of 24. If the interceptor attempts to log into the user's MyEWallet account by playing back the sound recording to the microphone, the sound recording would transmit a signal that included the counter value of 24. The PC's counter value is 24. Since the interceptor's signal's counter value of 24 is not greater than the PC's counter value of 24, the card transaction is considered invalid.

Once the card transaction is considered valid, the smart e-wallet application performs a two-factor on-the-fly authentication operation to generate a MyEWallet password. As mentioned above, the electronic card transmits a data stream which, for the most part, is constant except for the counter value. Accordingly, each transmission of the data stream in the electronic card contains a one-time code and the individual ID (or card serial number). Also, a one-time code is also generated by the server that provided the software download during the smart e-wallet application and provided to the client computer station. This one-time code is stored in the hard disk during the software installation and is different for each user. Upon determination of a valid transmission and a valid transaction, the smart e-wallet application takes the detected one-time code from the electronic card and the hard disk-stored one-time code and hashes them together to generate a MyEWallet password. In another embodiment, a simple XOR operation could be performed on the card's one-time code and the hard disk-stored one-time code to generate the MyEWallet password.

Multiple benefits are provided by this on-the-fly authentication scheme:

(1) Only the electronic card in accordance with the present invention can be used to log into the MyEWallet server and access the user's account. No other card can achieve successful authentication.

(2) Since the hashing function generates the MyEWallet password from both the electronic card's transmission and the one-time codes on the hard disk, the password does not "exist" in either location; that is, the MyEWallet password is neither in the electronic card nor the client computer station's hard disk. A hacker/virus will not be able to retrieve the electronic card's secret ID (or password) from examining the user's computer hard disk since the secret ID (and password) are not stored there. The secret ID and password are not stored in the application's .exe file. Similarly, even if someone stole the card, the MyEWallet password cannot be determined since the MyEWallet password is generated anew from the information from the electronic card and information from the computer station.

(3) Because of the use of the always incrementing counter value, the mere recording by an interceptor of one or more of the electronic card's transmission and the subsequent playback of that recording will not enable the interceptor to gain access to the smart e-wallet system. As described above, the smart e-wallet system only accepts card transactions with a counter value that is higher than the counter value stored in the smart e-wallet system.

(4) Because the one-time code transmitted from the electronic card is unique for every transaction, the user need not remember the password since the smart e-wallet system generates the password for each transaction.

In another embodiment of the present invention, the counter value is tracked by the log server. By doing so, a particular security problem associated with PC-based tracking of the counter value is eliminated. To elaborate on the problem, assume that the smart e-wallet application is installed and running in two PCs—one at home and the other at the office. One day, the home PC's counter value is 15 and the office PC's counter value is 14. The user uses the office PC to purchase various items on the web. As a result, the counter value in the office PC is now at 18. During the transaction where the counter value 17 was transmitted to the office PC, an eavesdropper recorded this card transmission. He could then take the recording to the user's home and if he somehow accessed the user's home PC, he could log into the smart e-wallet system and access the user's account. Why? The recorded transmission includes the counter value of 17. The home PC checks for a valid transaction by comparing the received counter value with the last counter value in the computer, which is 15 in this example. Since the received counter value (i.e., 17) is greater than the last counter value (i.e., 15) in the computer, the smart e-wallet system considers the transaction to be valid.

In contrast, a server-based solution to the tracking of counter value would eliminate this problem altogether. Because the server tracks the counter value, any recording of transmissions and subsequent playback would not enable the interceptor to access the MyEWallet account. The counter value in the recording would not be greater than the counter value in the server, regardless of which computer (office or home) is used. Similarly, this problem would not be an issue at all even if the PC kept track of the counter value if the user used only one computer for all transactions.

Figure 32:
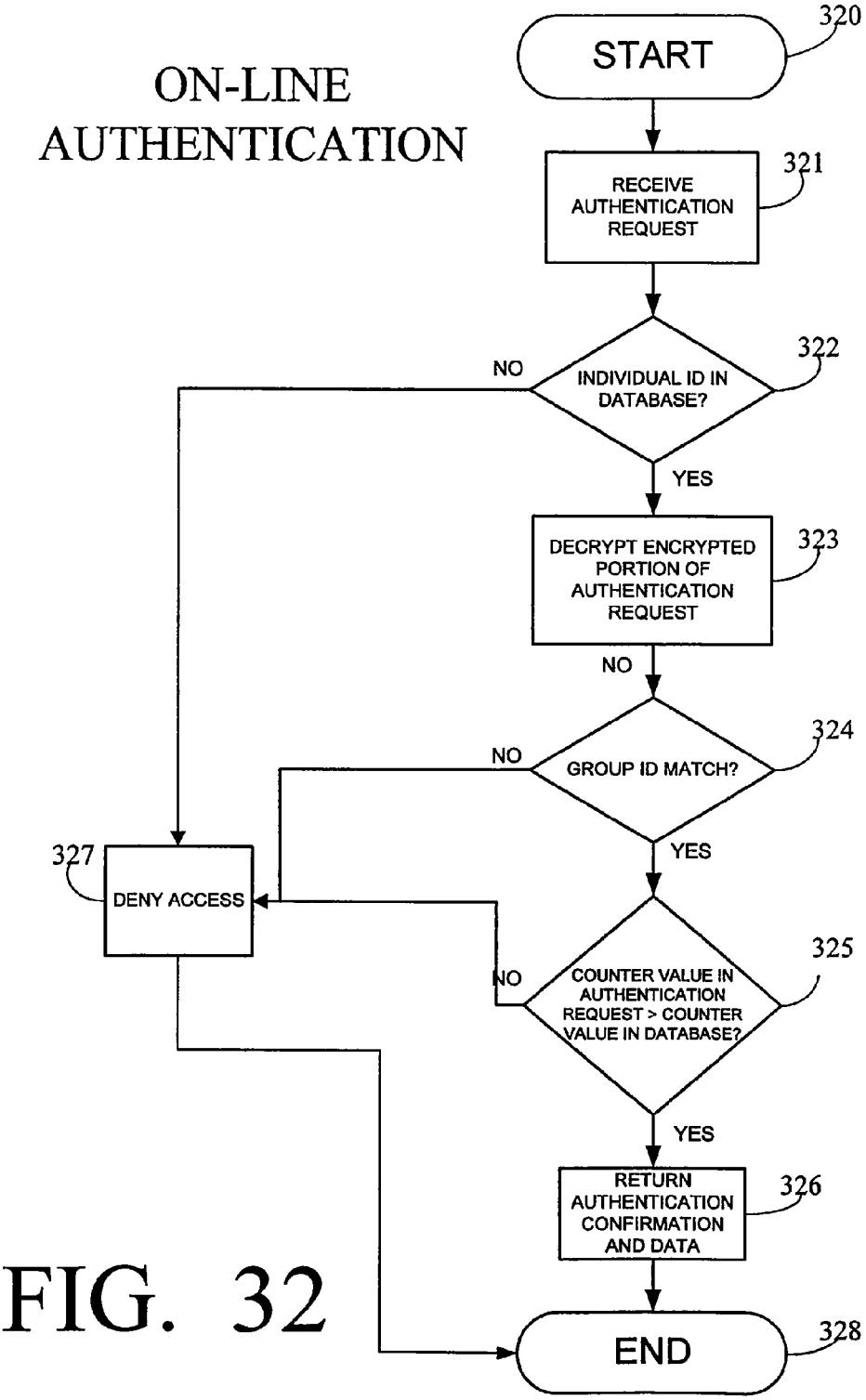
FIG. 32 shows a flow chart of the on-line authentication operation in accordance with one embodiment of the present invention.

As mentioned before, the primary purpose of the authentication server is to authenticate users. To this end, the authentication server maintains a database of the following that information associated with each user: DES3 keys; counter values; electronic card individual ID (or card serial number); electronic card group ID; and other secure personal information such as user name, password, credit card number, credit card expiration date, and the like. When a user wants to log into the smart e-wallet system, the user presses the switch on the electronic card. This transmitted data is included in the request that is delivered to the server over the Internet. When this request is received, the server checks the individual ID (serial number) of the card transmission. Remember, the individual ID is not encrypted. The server then decrypts the data using DES3, checks to make sure that the individual ID is associated with the group ID, and then checks the counter value. Refer to FIG. 32 and the corresponding discussion below.

5.3 Web Transactions and Authentication

The use of the electronic card in accordance with one embodiment of the present invention provides many benefits for on-line web transactions. One problem with the current method of conducting sales transactions over the web is that merchants and banks are concerned about card presence issues. In other words, because the merchants and banks cannot get your signature on the sales transaction slip like conventional store purchases, the risk of repudiation of that sales transaction falls on the merchant. How do the merchants know that you are who you say you are and are using your card as opposed to someone else's card? If a sales transaction is repudiated, the merchant does not get paid; the credit card issuing bank loses some customer satisfaction; the acquirer bank loses some transaction cost for processing this repudiated transaction as well as experiencing some annoyance; and the relationship between the acquirer bank and the merchant can potentially deteriorate.

Generally speaking, the credit card fraud rules dictate that when a transaction is "card present," the risk of fraud falls on the issuer. In a conventional store purchase, the merchant processes the customer's credit card by checking with the issuer before completing the sales transaction. When the credit card is cleared, the merchant finalizes the sales transaction. This is done in realtime. On the other hand, when the transaction is "card not present," the risk of fraud falls on the merchant. Usually, these transactions are the telephone or Internet orders where the reliability of the credit card actually being present is low.

By using the electronic card of the present invention, the card presence issues are significantly reduced. With the appropriate client side and server side software, the only transactions accepted by the participating merchants, acquirer banks, and issuer banks are those involving the electronic card. The issuer bank (or even the credit card organizations) can require the merchant to only accept the electronic card of the present invention or else the risk of fraud falls on the merchant. Customers will no longer be able to merely type in the credit card number because these participating institutions will want some greater assurance that the credit card is present during the sales transaction.

For example, assume that a company JKL, Inc. is a web portal. JKL has been able to successfully sign on numerous merchants onto its website. In addition JKL has provided the electronic card of the present invention to all of its members. They instruct the member to use the electronic card for all sales transactions conducted on their portal or with merchants associated with the portal. With such an arrangement, the acquirer bank for merchant XYZ Company agreed to pay the merchant XYZ Company the full amount of all sales transactions conducted with the electronic card. This acquirer bank believes that the use of the electronic card minimizes card presence issues and the transaction is trustworthy. Similarly, the user of the electronic card is secure in knowing that his credit card number is not being broadcast throughout the web where it could be potentially intercepted and used elsewhere. He knows that purchases made with merchants associated with the JKL web portal are bona fide legitimate purchases that he made himself (or an authorized agent).

Similarly, a web merchant such as XYZ Company has a website. It provides the electronic card to all of its members. The company requires use of the electronic card to conduct sales of its items. It sets up this policy to protect its members from unscrupulous credit card thieves and to ensure that its acquirer bank will guarantee payment for all sales transactions. The risk of repudiation is low for the merchant.

The following sections provide details into the credit card infrastructure that the electronic card of the present invention supports, some on-line authentication applications, some off-line authentication applications, and other web-related applications.

5.3.1 Credit Card Infrastructure

Figure 31:
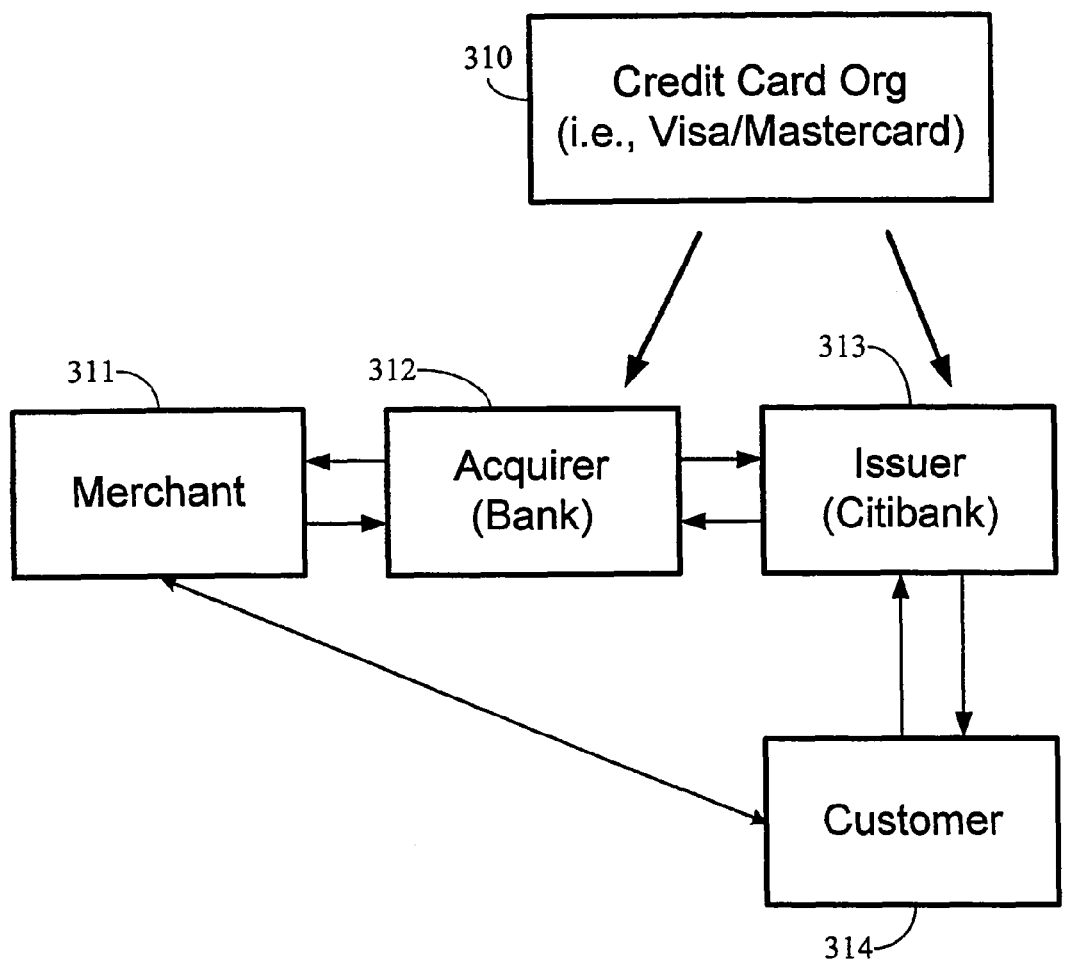
FIG. 31 shows a high level block diagram of the various entities that involved in credit card transactions.

Referring now to FIG. 31, a simplified diagram shows the relationship among the various players for credit card transactions. The customer 314 normally obtains a credit card from his issuer bank 313 (e.g., CitiBank). He may have obtained the credit card by filling out an application or the issuer bank pre-approved the credit card and sent it to the customer. Regardless, the customer 314 has an account with the issuer bank 313. For all his transactions with the credit card, the customer 314 receives periodic statements of his activities from the issuer bank 313.

The customer 314 purchases merchandise or some service from a merchant 311 whether web-based or conventional store-based. If cash is used, no credit card-related issues are raised. However, if the customer uses a credit card, the various parties shown in FIG. 31 are involved at some point or another. With the credit card, the customer 314 can purchase goods and services from the merchant 311. Sometimes, this sales transaction can be legitimate or illegitimate (e.g., stolen credit card). But for the most part, this sales transaction is usually finalized.

In order to be paid for a given sales transaction involving a credit card, the merchant 311 sets up an account with an acquirer bank 312. The merchant can select any number of acquirer banks to conduct its business. The acquirer bank 312 will honor the credit card-based sales transaction and pay the merchant 311 so long as the merchant 311 complies with the rules governing their business relationship. For example, the acquirer bank 312 may require that a signature of the customer 314 be provided on the sales slip. For web transactions, the acquirer bank 312 may require certain security signing authorities be used to decrease the risk of repudiation. The particular deal between the merchant 311 and the acquirer bank 312 can vary but usually involves a small flat fee per credit card sales transaction or a small percentage (with a cap on the actual dollar amount) per transaction. In any case, the acquirer bank 312 also makes some money out of the sales transaction between the customer 314 and the merchant 313.

Of course, the acquirer bank 312 ultimately gets paid by the customer's issuer bank 31, who in turn require corresponding payment from the customer, usually by check or money order. The issuer bank 313 also makes some money from the interest from customers 314 who do not pay the full amount of the credit card balance by the due date.

Governing the behavior of the issuer bank 313 and the acquirer bank is the government (not shown) and the appropriate credit card organizations 310, such as VISA and MasterCard. Of course, the government regulates the banking industry heavily to protect consumers and the banks themselves. The credit card organizations 310 control everything from the credit card itself (e.g., physical specifications, electrical specifications, logo placement, photo placement, embossing) to credit card readers and the communications protocol for on-line verification. Accordingly, the credit card organizations 310 place additional restrictions on the issuer bank 313 and the acquirer bank 312.

At times, a particular sales transaction can be disputed by the customer 314 because: (1) the sales transaction is legitimate but the customer cannot remember the transaction; (2) the sales transaction is not legitimate and of course, the customer cannot remember the transaction; (3) the sales transaction is legitimate, the customer remembers the transaction, and the customer still wants to dispute the transaction out of criminal intent; or (4) the sales transaction is legitimate, the customer remembers the transaction, and the customer disputes the transaction price. To resolve the dispute, the customer 314 can call the issuer bank 313. For low priced items, the issuer bank 313 typically credits the customer's account regardless of whether the dispute or the sales transaction is legitimate or not. In other instances, however, the issuer bank may resort to actual proof that the customer's signature is provided on the sales receipt. For web purchases, no signature is available to serve as such a proof. Any number of people with the credit card number could have initiated and completed that sales transaction over the web.

The electronic card of the present invention alleviates these card presence issues. Various card distribution models are possible within the framework of this credit card infrastructure. The electronic card can be distributed or otherwise sponsored by any of the following players: (1) merchant, (2) issuer bank, and (3) credit card organization.

First, a merchant, whether web merchant, web portal, or some other company with a web presence, can distribute the cards to its members and potential members. If this company does not get involved in the distribution of the electronic cards, it can sponsor the electronic cards instead. Thus, members can use the electronic card to purchase goods and services over the web at any website associated with this electronic card. Of course, if multiple merchants are sponsoring this electronic card, the member customer can use the electronic card at any website associated with these sponsoring merchants to make a purchase.

Similarly, an Internet Service Provider (ISP) can sponsor or distribute these electronic cards to its subscribers. In one embodiment, the ISP indicates to its subscribers the participating merchants that accept the electronic card as a means of payment. Initially, this list of participating merchants may be fairly limited but as more and more subscribers use the electronic card, more and more merchants will accept the electronic card as the payment means instead of (or in addition to) the conventional credit card.

In another embodiment, the ISP could set up the authentication server with the smart e-wallet system. The subscriber initially logs into the authentication server at the ISP and once authenticated, the subscriber can browse the web as usual and shop on-line. When the subscriber encounters a purchase form as a result of selecting a merchandise and going to the checkout line, the subscriber can use the form fill function of the smart e-wallet to complete the sales transaction. Refer to the smart e-wallet system description above.

Second, the electronic card could be distributed by the issuer banks 313 themselves. So, as customers 314 apply for credit cards, they receive these electronic cards instead. However, these electronic cards could be used like the conventional credit cards because the electronic cards comply with standard credit card form factor requirements. To the average customer, these electronic cards are no different from the standard conventional credit cards with the magnetic strip, logo and embossed name, credit card number, and expiration date.

Third, and related to the second point above, the electronic card could be sponsored by or otherwise supported by the credit card organizations (e.g., VISA, MasterCard, American Express). Thus, all issuer banks must provide electronic cards that comply with the requirements specified in this patent specification when distributing new or replacement credit cards to their respective member account holder customers.

In another embodiment, the issuer bank can bundle an online service membership with the credit card account. So, when a customer applies for a credit card, the issuer bank sends the customer the electronic card (which can also function as a conventional credit card with the magnetic swipe) and an automatic online service membership. The first use of the electronic card (when the user has accessed the online service company's website) could affiliate the user with the account. With this bundling, the online service provider could keep track of various user-related usage data. The online service provider could then send membership (and cardholder) usage data to the card issuer bank.

The principle advantages of this bundling scheme to banks is that they increase the frequency and depth of interaction with their cardholders. The effect is to heighten the cardholders' awareness of the issuers brand and services. This could lead to interesting opportunities, such as maintaining more detailed databases on use habits to help make more tailored offers of additional services to the cardholder. The increased presence of the card in users' everyday experiences could also lead to increased transaction volumes.

Moreover, the fact that users activate their cards more regularly than they would use a simple payment card leads directly to applications not otherwise possible. Issuers of cards under the present invention, by virtue of network servers used to authenticate the cards, can be made aware of when cards are being activated. Since the cards are being used in the context of Internet sessions, issuers may assume that cardholders will be present near their computers for some limited period following card activation. During that period of time, issuers can use the opportunity of a cardholder's presence to exchange useful messages with the cardholder. Exemplary messages include notifying cardholders of upcoming bill due dates, notifying cardholders of past due dates, and notifying cardholders of special promotional offers or discounts. Ideally, the cardholder would also provide a mechanism for the user to respond immediately. Because the issuer knows that the user has a card presence, the issuer can even use that opportunity to conduct higher risk transactions than they normally would in a card-not-present atmosphere. Because of the presence of the card, the issuer might, for example, allow balance transfers, withdrawals or bill payments to be paid online.

Another embodiment for increasing interaction between issuers and cardholders integrates the cards with "push" technology, such as is known in the art, for sending a priori messages to Internet users. At any point during an Internet session (whether or not a card has been activated but preferably after), alerts that call for card activation can be pushed out to the cardholder over the Internet. Exemplary alerts of this kind include notification of successful or unsuccessful bids for auctions or 'reverse auctions' (e.g. eBay, Priceline), as well as stock trading alerts. Through integration of "push" technology to the electronic card's client software, alerts can be conveniently delivered to the cardholder. As is known in the art, "push" technology can deliver such information as messages, content and patches to client software, without direct client request.

In one embodiment, a cardholder is pushed an alert, indicating that her bid to a reverse auction was not accepted. The user could then be prompted to activate their electronic card to authenticate their re-entry to the bidding system in one step. This scenario saves time in the re-bid process, and can reduce both customer drop-off rates in re-bidding, as well as re-bid repudiation. This scenario provides advantage over the current system of unauthenticated, email alerts. In another embodiment, the user is pushed an alert indicating their successful bid. The user could then be prompted to activate their electronic card in order to print a record of their successful bid.

In another embodiment, the integration of the card with push technology provides users with the opportunity to pay bills securely. The client software could be configured by the user or service provider to receive bill payment alerts from merchants, utilities or financial services. For example, bill payment and presentment services could push payment alerts to customers, to remind them to pay their telephone and electrical utilities bills. In a similar fashion, online financial service companies could remind users to make mortgage or margin payments, or to contact customer service regarding returned checks. The user authentication functionality of the card enables secure payment of such bills in direct response to these prompts by operating a card.

5.3.2 On-Line Authentication

In accordance with one embodiment of the present invention, the on-line authentication works in a manner similar to that of the smart e-wallet system described above. Generally, the electronic card interactive system can involve some checks locally at the client PC or remotely at the authenticating server.

For the local check, when the user presses the switch in his electronic card, the PC processes the signal and checks for electronic card transmission validity. If the structure of the signal detected by the PC's microphone and sound system is similar to that of the electronic card's signal, then the signal is presumed to be valid. Thereafter, the PC checks for electronic card transaction validity. Here, the PC merely checks whether the counter value in the signal transmitted by the electronic card is greater than the counter value last stored by the PC. If the transmitted counter value is indeed greater than the counter value stored in the PC, then the card transaction is presumed to be valid. In another embodiment, the counter check will occur at the authentication server, instead of at the local client PC. So far, the checks have only been made locally at the client PC. The remotely located authentication server will also perform checks of its own.

To perform the remote check, an authentication server includes a database, decryption facilities, and authentication logic. Refer to FIG. 32. The authentication process begins at step 320. The database includes the user names, DES3 keys, and other secure information (e.g., password, credit card number, expiration date, group ID, counter value, individual ID). Once the electronic card transmission passes the local client checks, the data from the electronic card transmission is delivered to the authentication server as an authentication request at step 321.

The data stream in the electronic card's transmission, which is included in the authentication request, includes an encrypted portion and an unencrypted portion. The encrypted portion includes the DES3 key, group ID, and counter value. The unencrypted portion includes the individual ID. The authentication server takes the unencrypted individual ID and checks if a corresponding user is associated with that individual ID at step 322. If so, the authentication server decrypts the encrypted portion of the data stream at step 323. If not, the authentication server returns a security error message or a message otherwise indicating that access is denied at step 327 before ending at step 328.

At step 324, the authentication server checks if the group ID in the decrypted portion of the authentication request corresponds to the individual ID just verified. If that check is passed, the authentication server checks if the counter value in the authentication request is greater than the stored counter value at step 325. If not, access is denied at step 327. If the counter value in the authentication request is greater, then the authentication has been successful. The new counter value is then stored in the database associated with this user. This counter value check at the authentication server is in contrast to another embodiment where the counter value check occurs at the local client PC, as described above. Once the user has been authenticated, the authentication server returns a confirmation that indicates that authentication has been successful at step 326. This authentication process ends at step 328.

Once authenticated, the user is free to shop, purchase, and otherwise browse on the web. For e-wallet applications, the smart e-wallet application facilitates the form filling function in finalizing sales transactions. Smart e-wallet applications are provided above in the smart e-wallet system section. For other applications, the authentication process merely allows a user to access and other wise complete the sales transaction after pressing the TX switch on the electronic card. For example, once a user has shopped and selected an item to purchase from a website, the website delivers a purchase form to fill out. The user does so. However, instead of the credit card number, the user is asked to take out his electronic card and press the button. The user does so. When both the user's PC and the remote authentication server has authenticated the card transmission, the website will either return a web page that states "Thank you for your order. Your order number is 1234ABC" where the return confirmation message from the authentication server also finalized the sales (by emulating the "submit" button on the web page). Alternatively, a message is displayed indicating that the authentication process has been successful. The user then proceeds to submit the form manually and complete the sales transaction in the conventional manner.

This authentication model can be implemented in several different ways. The authentication server can be located or otherwise maintained and operated by several entities: (1) third party (e.g., private security based company, bank, or credit card organization), (2) merchant or web portal, or (3) ISP. These implementation strategies will now be discussed.

For the merchants, a convenient implementation strategy would involve some third party such as the hypothetical company RST Corporation which dedicates one or more authentication servers for various merchants. The third party could also be a bank (normally the issuer bank) or the credit card organization. Thus, the disruption to the merchants' web system would be minimized. Customers merely access RST's website to shop. When these customers have selected some merchandise to purchase, they merely take them to the checkout line on the website. Although the sales procedure varies from merchant to merchant, invariably the customers get to a web page where they have to provide some personal details such as name, shipping address, and credit card number.

At this point, the customer is asked to take out his electronic card and press the button. When he does so, his PC handles the local authentication as described above. When he passes the local authentication checks, an authentication request is delivered to the IP address associated with the third party's authentication server location. Here, the third party's authentication server handles the authentication of this user. If authentication fails, access is denied and the merchant's server is notified in real-time of this condition. The merchant would then refuse this particular user's purchase request because, for various reasons, this user's account is delinquent, the account does not exist, the transaction is not valid because the counter value is not valid (perhaps the user was using a recording of another person's card transmission), the group ID is not valid, or the serial number (individual ID) is not valid. Alternatively, the merchant would assist the user in setting up an account.

If, however, the authentication server returns a confirmation to the merchant's server in real-time, the merchant's server would then allow the user to manually continue with the purchase process since the merchant deems this user to be present and in good standing. Alternatively, the confirmation from the authentication server to the merchant's server may also trigger the automatic completion of the sales transaction. The authentication request associated with the user pressing the switch on his electronic card essentially emulates the "submit" button that would normally be present in these sales forms.

This implementation strategy represents an advantage over the current on-line transactions because the merchants would receive transaction confirmation from a trusted source. This trusted source is the third party which not only confirms card presence during the sales transaction, but also checks various aspects of the account—from account delinquency to non-existence of the account. The frequent contact between the third party and the merchant and the added fraud-protection over conventional "card-not-present" transactions strengthen the relationship between the third party and the web merchant. If the third party is the issuer bank, the relationship between the web merchant and the bank would improve. For example, a credit card issuer of electronic cards under the present invention could offer to assume the risk of those "card-not-present" transactions only to merchants participating in the issuer's e-wallet, or e-commerce portal service. The effect would be raising the interaction with cardholders and transaction volume, without taking on real fraud risk, since the present invention provides adequate assurance that a transaction is, in actual fact, card-present.

For the second implementation strategy, the merchant and/or web portals themselves operate the authentication server independent of any third party. In this case, the database it maintains only keeps track of its own members. However, this implementation strategy may be less attractive to merchants who are more concerned with improving and maintaining their own content, instead of maintaining and operating an authentication server. However, it is a viable strategy for those merchants with the resources to support this separate server.

For the third implementation strategy, an ISP maintains and operates the authentication server. If only a few ISPs participate in this venture, only those subscribers in a region serviced by that ISP can benefit from the electronic card interactive system. To gain universal acceptance, many ISPs located throughout the world must participate in this venture because web merchants are located across the web. However, it is possible to have the ISP authenticate the user when the user launches the browser. Upon accessing the ISP, the user will be asked to press the electronic card switch for authentication. Alternatively, the user will be asked to press the electronic card switch to launch the browser followed by other functionality in a manner similar to the smart e-wallet system described above. Thereafter, the smart e-wallet application will fill out any form for the user when he is about to purchase an item from a web merchant.

Ideally, the payment card associations (Visa, Mastercard, American Express, Discover, etc.) would agree that transactions effected by cards under the present invention were actually considered "card present," and honored to the same extent as any other card-present transactions. But also note that under any of these schemes for online authentication, those payment card associations need not make any change to their own transaction processing systems in order for merchants under the current invention to enjoy the benefit of card-present transactions. In the prior art, the payment card associations' systems are equipped to identify in real time whether a transaction is card-present (in store) or card-not-present (via phone or Internet.) Under the current invention, a merchant could be provided with evidence for its records that a transaction was effected not by manual entry of a card number, but by an actual transmission from a physical card. If a cardholder does not report a card lost or stolen, and then later attempts to repudiate the transaction, the merchant would have in his records good evidence that the transaction was genuine.

5.3.3 Off-Line Authentication

In accordance with another embodiment of the present invention, off-line authentication works in a manner similar to that of the smart e-wallet system and the on-line authentication described above. The difference with the off-line authentication is that confirmation is not provided to the merchant in real-time.

In one embodiment, the confirmation would be sent to the merchants via email or through some other non-real-time means. In this way, the merchant and the customer could deal with each other in the conventional manner without waiting for the third party authentication server to complete the authentication check. But, before the merchant ships the merchandise or provides the service to the customer, the merchant would check to make sure the confirmation has been received. If the confirmation has been received, that sales transaction has been approved by the authenticating third party. If the confirmation has not been received, the merchant would hold shipment of the merchandise or otherwise refuse to provide the requested service. The third party could also keep the confirmation (or lack of confirmation) report for each sales transaction for future reference without affecting shipment or providing the service.

Like the real-time confirmation example described above, this embodiment represents an advantage over the current on-line transactions because the merchants would receive transaction confirmation from a trusted source, albeit in non-real-time fashion. This trusted source is the third party which not only confirms card presence during the sales transaction, but also checks various aspects of the account—from account delinquency to non-existence of the account. The frequent contact between the third party and the merchant and the added fraud-protection over conventional "card-not-present" transactions strengthen the relationship between the third party and the web merchant. If the third party is the issuer bank, the relationship between the web merchant and the bank would improve. No major changes are required for the merchant's web site and the web server for the non-real-time authentication.

In another embodiment, the authentication server can assist those merchants who, for various reasons, do not want to make any changes to his system. The merchant may not even want to do the simple act of turning on the authentication flag in his server. Perhaps the merchant does not even want to perform any authentication. How do you provide authentication services to these merchants?

In this embodiment, the authentication server would place the confirmation number in a form field that is normally not used in most, if not all, of the purchase forms that websites require customers to fill out to place an order. In this embodiment, the ADDRESS LINE #2 would be used. This field is hardly, if ever, used by customers. In other webpages, a NOTES field is provided. The sequence of operations are as follows:

When the customer has selected an item to purchase on the web, he goes to the checkout line and encounters a form. He must fill out this form to place the order with the web merchant. In most of these forms is a field that is typically called "ADDRESS LINE #2." With the smart e-wallet application or other special client software that is designed for use with the electronic card, the customer takes out his electronic card and presses the button. The electronic card then transmits its data to the PC via the PC microphone. The client software delivers this data to a third party authentication server which performs the authentication in a manner described above. The authentication server then sends a transaction confirmation number back to the customer's PC client software, which fills in the ADDRESS LINE #2 field with this transaction confirmation number in the merchant's purchase order form page.

In one embodiment, the transaction confirmation number is merely a randomly generated number. In another embodiment, the transaction confirmation number is actually a digital signature of the order number and a public key. A digital signature is used to authenticate the identity of the sender (i.e., the third party authentication server) or the signer of the document. The use of the digital signature ensures that the signed document cannot be easily repudiated, cannot be imitated by someone else, and can be easily time-stamped.

A special merchant software can process all the purchase forms and associate customers with successful or unsuccessful authentication results. Thus, after completing the sales transaction, the third party authentication server places the transaction confirmation number on the purchase order form via the special client software located in the customer's PC. When the customer finalizes the sales, the purchase order form is submitted to the merchant. At the end of the day, the merchant has electronic versions of all the purchase order forms that have been filled out by customers as they purchased the merchant's products or services.

The special merchant software would process all the purchase order forms and decipher the transaction confirmation number provided on the ADDRESS LINE #2 field off-line. The special merchant software would then generate a report that indicates the success or failure of the authentication for each customer. The nature of the transaction confirmation number would provide this indication. The merchant can use this report to hold the shipment of the item purchased. Of course, the merchant would check with the customer to inquire why the authentication failed and may even assist the customer in repairing the situation if the situation is reparable (e.g., insufficient credit limit, expired electronic card).

This embodiment of using the ADDRESS LINE #2 field represents an advantage over current on-line transactions because it provides merchants a transaction confirmation number from a trusted source. This transaction confirmation number indicates that the customer had the electronic card associated with a particular customer's credit card account present when he made the web purchase. Merchants can use this transaction confirmation number to validate the customer in real-time, if necessary, or any time thereafter. This information provides the proof necessary to counter later repudiations. This method prevents such fraud techniques as credit card number generators or stolen credit card numbers since the actual credit card number is not delivered over the Internet. Also, no changes are required in the merchant's web page or server.

In accordance with another embodiment of the present invention, some additional information is provided in the credit-card field in conjunction with the standard credit card number for authentication purposes. For example, a one-way card with an e-wallet software is provided. Whenever the user makes a purchase, he presses the button on the electronic card. With the button press, the card calculates the next number in a series, and sends it to the PC. The PC turns on the e-wallet engine and fills the address and credit card fields. However, instead of filling the regular credit card number, it fills a special code.

An exemplary code is designed as follows: 4 constant digits to designate the card number as a special kind, 6 digits for the card ID, and 6 digits of the card-sponsoring company's ID, and 6 digits from the pseudo-random series generated by the card (based on the counter value).

The merchant receives the card number and sends it through some channel to the acquirer bank as is typically done today. When the acquirer bank sees the special 4 first digits, he queries the server to checks whether the last 6 digits are valid according to the counter value. If two identical codes are received (same counter value), then a theft or some fraud has occurred, or if the code received is too old, then there was an attempt for theft. The server is located at the issuer bank and instead of listening for one credit number per user as is normally done, it listens for a unique credit card number per transaction.

5.3.4 Password Generator

For this application, the electronic card and the PC client software are used to generate an ever-changing password to the user to access a web page. The electronic card contains a display for presenting the password to the user. The user then manually enters the newly generated password with the keyboard to enter the web page.

In this embodiment, the password generator includes the electronic card with a display, the special client software, the web browser, and the server that performs the authentication. Typically, the user browses the web and attempts to access a web page that he may or may not have an account with. If he has an account with this web page, he also has the electronic card provided to him by this merchant or some other sponsoring company that work. For various reasons, the access is limited to those users with open accounts and the electronic card. When the user requests access to this web page, the web page informs him that access is limited to members in good standing.

The web page asks the user to start the authentication process and when done, to enter the newly generated password before submitting the authentication form back to the website. The user enters his name (or ID) and perhaps a password. The server associated with this web page then sends an encrypted number to the user's PC via the web browser. This number is also accessible by the special client software. In another embodiment, the number is not encrypted. The special client software in the PC sends this number to the user via the PC speakers. This number can be based on the counter value or a randomly generated number. The counter value can be accessible by the server because the account database includes the counter value for this particular user.

The electronic card detects the encrypted number, decrypts it with its private key, and generates a password. This password is then presented on the electronic card's display. Concurrently, the web site server has also generated a password since the password-generating functionality is analogous in both the electronic card and the server. At this point, the user enters the password with the computer keyboard into the authentication form on the web page and submits it. When the server receives this password, it compares this received password to the password it generated internally. If a match exists, the user is allowed to access the web page. If a match does not exist, the user is denied access to the web page.

This approach provides several advantages over the conventional password-related approaches. Because the password is different for each transaction, the system is more secure. The user need not remember the password and even if one password was stolen somehow, that thief could not use it for another transaction. Also, the password does not exist in the electronic card, the PC, and the authenticating server for a long period of time. The password exists in the electronic card and the server for a short period of time. In the electronic card, the password is saved in RAM so when the electronic card powers down, the password is forever gone. In the server, the password exists for a short time (e.g., 5 minutes) that is just long enough for the user to log in successfully. Thereafter, the server discards the password immediately. In this configuration, the PC need not have a microphone since the user is not using the electronic card to directly transmit any data to the PC (or server). On a related note, the special client software does not need any special digital signal processing section to process any received signals since the electronic card will not be transmitting any signals to the PC.

5.3.5 Challenge-Response

In another embodiment of the present invention, the merchant and user can employ challenge-response techniques to verify to each other's trustworthiness. Usually, one of the parties verifies that the other is indeed the party it claims to be for a given transaction. In some cases, however, both parties may want to verify each other for a given transaction.

In either case, digital certificates can be used. As known to those skilled in the art, a digital certificate is similar to an electronic "credit card" that establishes the certificate user's credentials when doing business or other transactions on the web. It is normally issued by a certification authority. The digital certificate contains the user's name, serial number, expiration dates, a copy of the certificate holder's public key, and the digital signature of the certificate-issuing authority so that the recipient of the digital certificate can verify that the certificate is indeed authentic and real. Some digital certificates conform to the X.509 standard.

Figure 33:
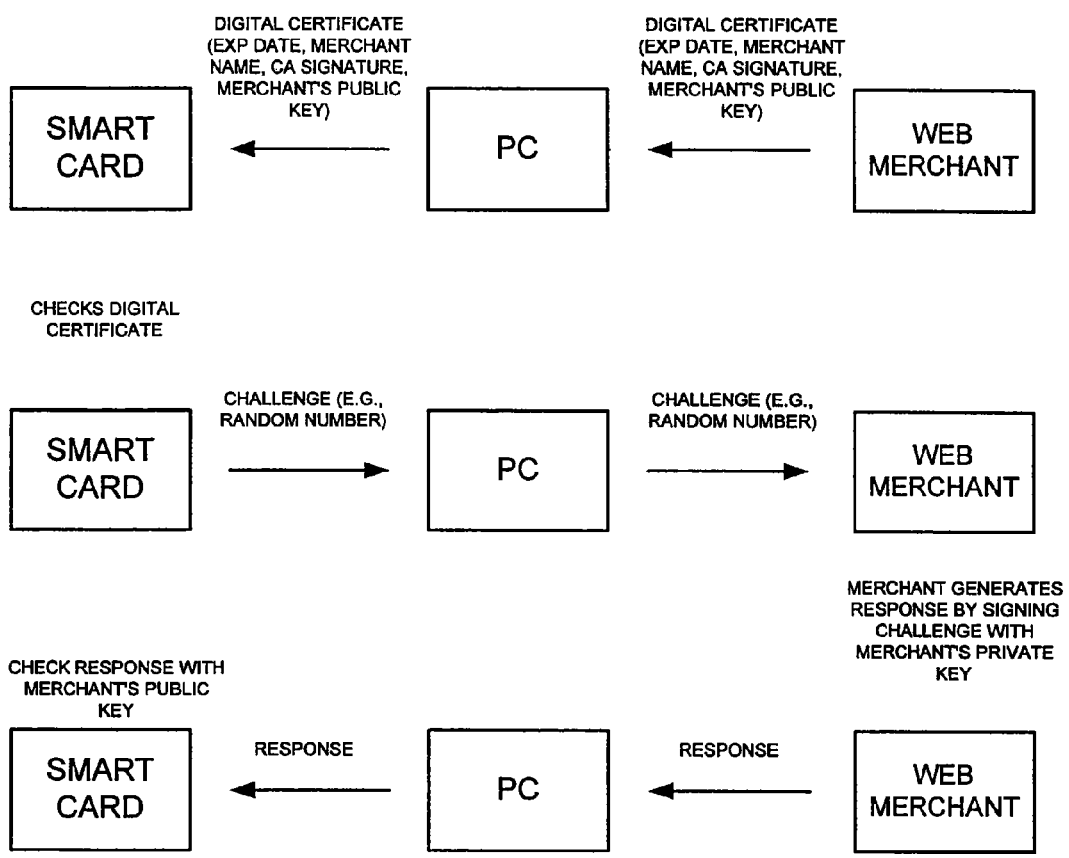
FIG. 33 shows the sequence of steps taken by the electronic card, PC, and the web merchant when the customer is attempting to check the trustworthiness of the web merchant via a challenge-response technique in accordance with one embodiment of the present invention.

FIG. 33 shows the sequence of steps of actions taken by the electronic card and the merchant in the case where the customer wants to verify the merchant. Initially, the merchant sends a digital certificate over the web to the customer. The digital certificate contains the date of expiration, name of merchant, signature of the certification authority (e.g., Verisign), and the merchant's public key. The customer's PC receives the digital certificate and in turn, transmits the digital certificate to the customer's electronic card. The electronic card contains standard logic and programming to perform a check to make sure the digital certificate is valid. In one embodiment, the electronic card checks to make sure that the digital certificate is signed by the certification authority and contains no errors. By verifying that the digital certificate is properly signed by the certification authority, the customer is making sure that no one is faking the information in the certificate.

At this point, the customer has the public key of the merchant. The customer can verify the merchant by sending a challenge and then testing the response to the challenge. The electronic card generates a random number. The customer transmits the random number to the PC. The PC then sends the random number to the merchant. The merchant signs the random number with the merchant's private key and sends the signed random number back to the customer's PC. The PC receives the signed random number and sends it to the electronic card. The electronic card checks the signed random number with the merchant's public key, which it obtained earlier. If the proper random number is recovered, then the merchant is presumed to indeed be the merchant it claims to be. The customer can now trust the merchant. Alternatively, instead of the customer sending a random number, the customer can send a digital certificate, which contains the ID and a public key. This certificate is sent by way of the certification authority.

Note that in this example, the party on the other side of the transaction knows the public key that matches the private key. The certification authority ensures that this public key belongs the merchant when the digital certificate has been delivered to the customer. To indicate a successful verification, the electronic card contains logic to sound an audible alert such as a ringing bell. If the verification is not successful, the electronic card can sound a different audible alert such as a buzzer.

In an alternative embodiment, the electronic card is not involved in this process. Rather, the PC performs all the steps that the electronic card is programmed to perform as shown in FIG. 33.

Figure 34:
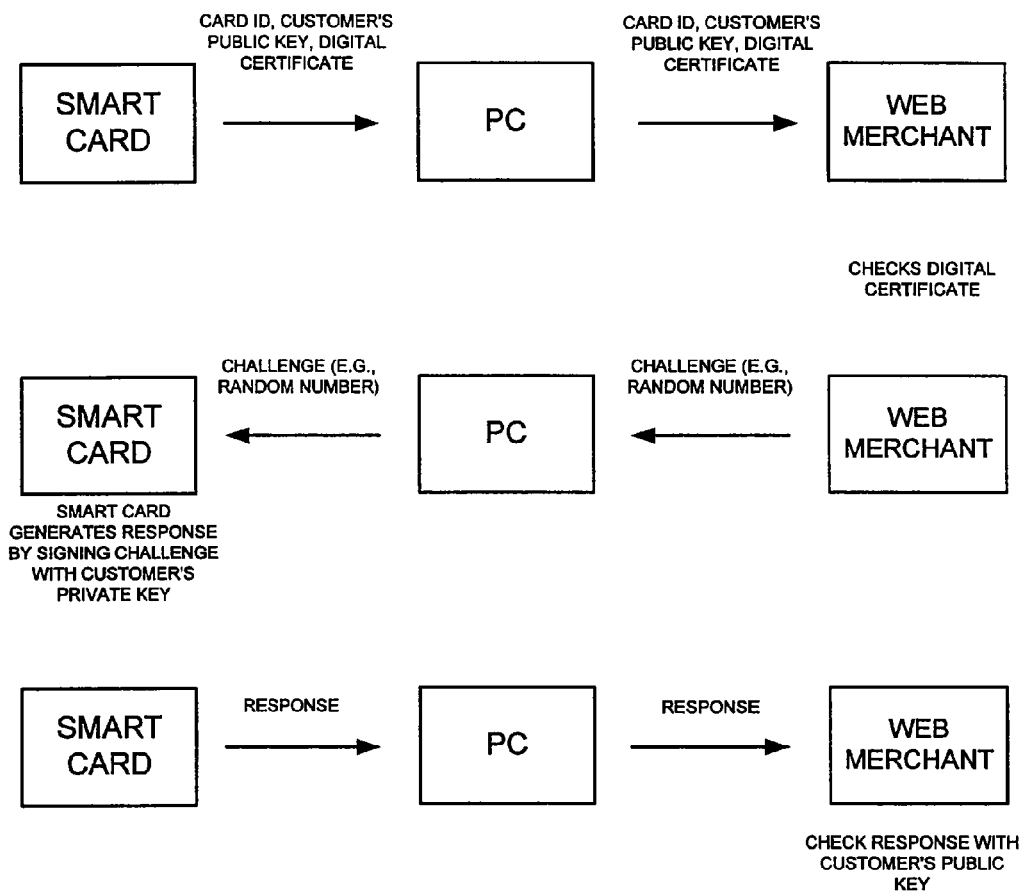
FIG. 34 shows the sequence of steps taken by the electronic card, PC, and the web merchant when the web merchant is attempting to check the trustworthiness of the electronic card (and hence user) via a challenge-response technique in accordance with one embodiment of the present invention.

FIG. 34 shows the sequence of steps of actions taken by the electronic card and the merchant in the case where the merchant wants to verify the customer. For this case where the merchant needs to check the customer's identity to determine whether it can trust the merchant, a similar procedure is provided in the opposite direction. The customer's electronic card sends the card ID number (i.e., individual ID or serial number), the customer's public key, and a digital certificate. The PC receives this transmission and sends the card ID, the customer's public key, and the digital certificate to the merchant.

When the merchant receives the card ID, the customer's public key, and the digital certificate, it checks to make sure that it is a good signature from the certification authority. This provides the merchant with the assurance that no one is faking the card ID and public key.

The merchant then sends a random number to the PC, which retransmits it to the electronic card. The electronic card signs the random number with its private key and sends the signed random number back to the PC. The PC then sends the signed random number back to the merchant. The merchant receives the signed random number and checks it with the customer's public key. If the check is proper, the merchant can be assured that it is dealing with the electronic card that it purports to be. The merchant can trust the electronic card.

Figure 35:
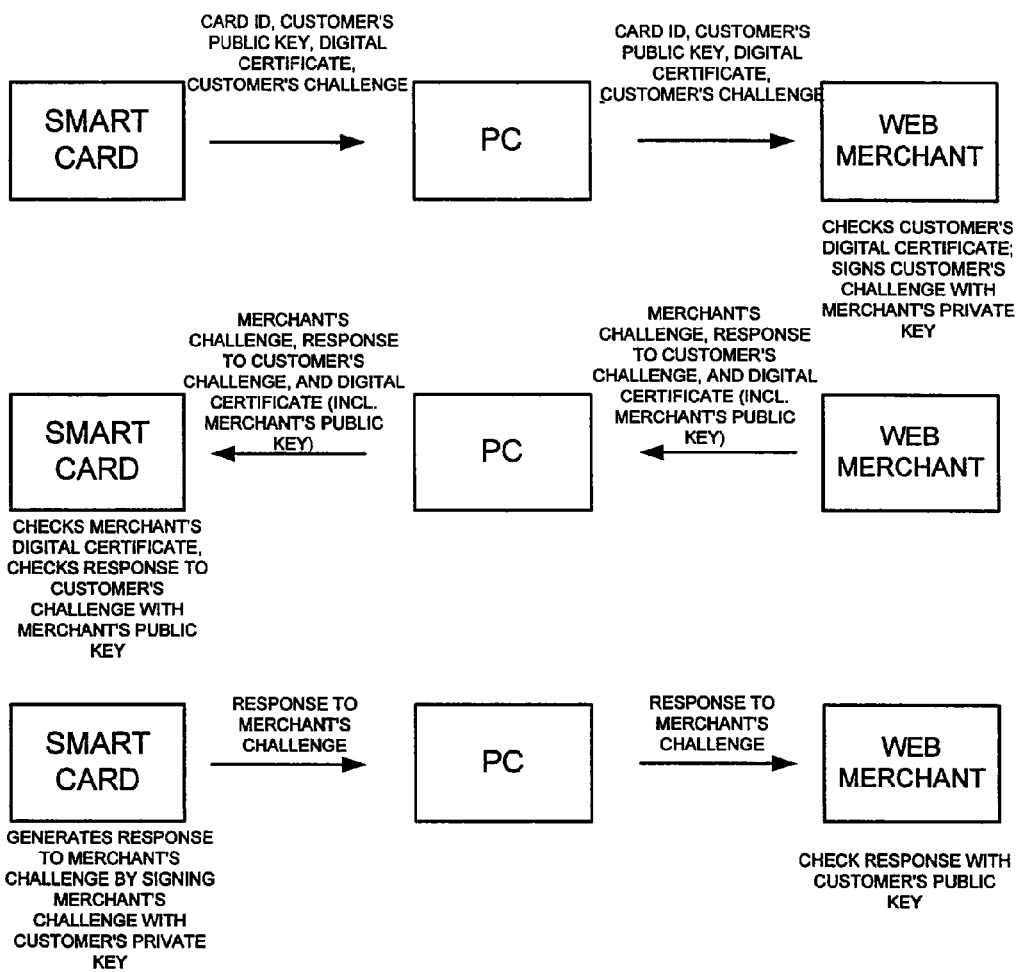
FIG. 35 shows the sequence of steps taken by the electronic card, PC, and the web merchant when both the web merchant and the customer are attempting to check each other's respective trustworthiness via a challenge-response technique in accordance with one embodiment of the present invention.

FIG. 35 shows the sequence of steps of actions taken by the electronic card and the merchant in the case where they want to verify each other. In this embodiment, both the customer and the merchant check each other substantially concurrently. The electronic card sends a first set of data including the digital certificate, the card ID, the customer's public key, and a challenge (e.g., random number) to the PC. The PC retransmits the first set of data over the web to the merchant.

The merchant receives this first set of data and signs the challenge with the merchant's private key. The merchant then sends a second set of data which includes its own challenge, the response to the customer's challenge, and the digital certificate which contains the merchant's public key (among other data as described above). The customer's PC receives this second set of data and retransmits it to the electronic card.

The electronic card checks the digital certificate to make sure it was signed by the proper certification authority and the response to the customer's challenge (i.e., the random number originally sent by the customer and subsequently signed by the merchant with the merchant's private key). The customer checks the response with the public key that was just sent by the merchant as part of the digital certificate. If the response is proper, then the customer can trust the merchant. The electronic card then signs the merchant's challenge with the customer's private key and sends the response back to the merchant. In an alternative embodiment, the electronic card is not involved in this step of the process. In other words, the PC checks the merchant's digital certificate and the response to the customer's challenge with the merchant's public key.

The merchant then receives the customer's response to its challenge. The merchant checks the response with the customer's public key that was delivered initially. If the check is proper, the merchant can trust the customer.

In another embodiment, the electronic card can send back the response via conventional telephone systems. Thus, the merchant sends a challenge via the Internet to the customer's PC. The electronic card receives the challenge via the PC. The electronic card calculates the digital signature to sign the challenge and sends the response back via the conventional land-line telephone or cellular telephone system. In this embodiment, the acoustic signal is in the audible range. The merchant receives the response and checks it to make sure it is valid.

In another application, the use of the electronic card in chat rooms or message boards can prove invaluable in proving the authenticity of the user. Thus, the user would use the electronic card to log into the message board or chat room. The server would, of course, verify the identity of the user based on the electronic card and employing the techniques described above.

5.3.6 Crypto Service Provider (CSP)

As mentioned numerous times in this patent specification, the electronic card in accordance with one embodiment of the present invention should be compliant with the existing infrastructure. For Windows-based systems, all web browsers and servers support client authentication by using Public Key Infrastructure (PKI), as known to those skilled in the art. Other exemplary merchant servers that support CSP include Apache, HS, and Netscape Server. To use this authentication method, merchants need only turn on the "user authentication" flag within their server software, which requires selecting a button in a set-up menu.

Essentially, PM allows users to send documents with digital certificates to prove that the user is indeed the user. The client authentication involves the use of cryptographic API (or crypto API), which provides an API between the various applications that are running in the user's client computer system (such as Microsoft Internet Explorer, Outlook Express, Word, etc.) and the cryptographic service provider (CSP) module.

As known to those ordinarily skilled in the art, CSP is a block of code distributed in Dynamic Link Library form that allows programs that are aware of it to connect and use its resources. Generally, CSP resources are essentially the hashing and encryption algorithms that it contains. Physically, each Crypto Service Provider (CSP) is a dynamic-link-library (DLL) with an associated cryptographic signature authorizing it for use by the Crypto API. One of the jobs of the CSP is to protect private key information from being exposed. Each CSP provides a different implementation of the Crypto API. Some provide stronger cryptographic algorithms than others. In addition to Microsoft, a number of third party developers have also released their own versions of Crypto Service Providers, each with its own unique set of ciphers, data formats and protocols. Indeed, two different providers may in fact include the same cipher algorithm but it would be incompatible due to different padding schemes, different key lengths, and different default modes.

Practically speaking, the CSP interacts with the user (and the user's applications in his client computer station) to allow the user to perform various security related tasks such as choose disk, give fingerprint (or voice print or biometric data), and the like. Because all web browsers and servers support it, the merchants who want a web presence are also required to support it. Thus, the CSP does not represent any change to the existing infrastructure.

In general, the CSP essentially enables the servers to ask the users to send digital certificates. The CSP in the client sends an unsigned digital certificate. The server which supports CSP receives the digital certificate and sends a random number back to the client to have it digitally signed. The client receives this random number and signs it with its private key and sends the signed random number back to the server. The server receives this signed random number and checks it with the client's public key for final authentication.

Figure 36:
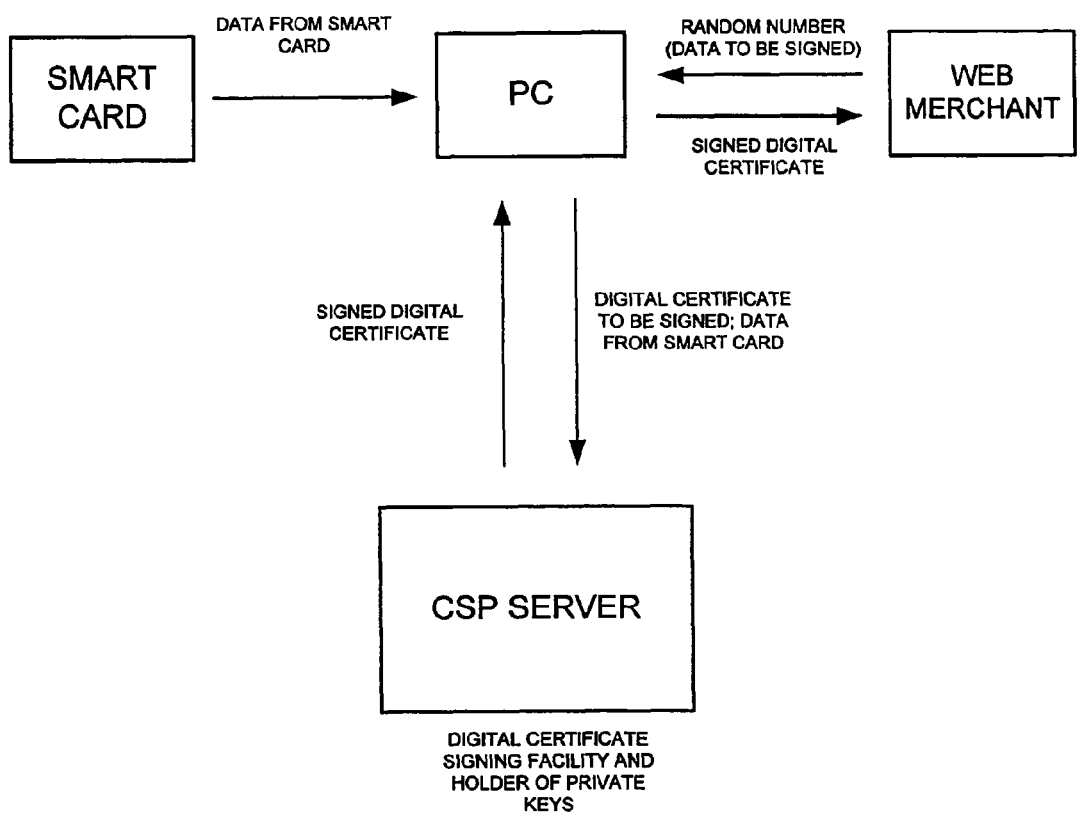
FIG. 36 shows a crypto service provider (CSP) scheme, the entities, and the sequence of steps taken by these entities in accordance with one embodiment of the present invention.

One drawback to this conventional approach is that the private key is held in the customer's client computer station. Thus, some hacker could theoretically break into that client computer station and steal private key. In accordance with another embodiment of the present invention, the private key is held in a third party CSP server. Referring now to FIG. 36, the electronic card sends its data (i.e., individual ID, group ID, etc.) to the PC. Similarly, the web merchant sends a random number (i.e., challenge) to the PC across the web.

The PC, through the CSP module, sends a digital certificate (which includes the customer's public key) and the electronic card data to a third party CSP server. This third party CSP server functions as a digital certificate signing facility and holder of private keys of all its members. This CSP server signs the digital certificate, signs the random number with the customer's private key, and then sends them back to the PC. The CSP server also checks the data sent from the electronic card for "card presence" issues, which includes checking counter values and other parameters as described above in the On-Line Authentication section of the patent specification. The PC then delivers the signed digital certificate and random number to the web merchant who checks the signature with the customer's public key.

In an alternative embodiment, the digital certificate with the customer's public key could be sent directly to the merchant first. Thereafter, the electronic card sends the data and the merchant sends the challenge to the PC.

This scheme provides strong customer authentication without installing new server software. Cardholder privacy is also preserved because transaction information is not sent in real time to an Internet authentication server. With minor configuration changes to the existing software, merchants can confirm that a given electronic card was present in a particular transaction.

5.4 Plug-in Applications

In accordance with another embodiment of the present invention, the special client software 114 (in FIG. 11) and works with one or more plug-ins in an integrated fashion. In one embodiment, the plug-ins are all subservient to the master special client software 114 (in FIG. 11). Thus, in addition to communicating with the electronic card, the special client software also manages the plug-ins. In another embodiment, the plug-ins are dominant over the special client software and can potentially perform more advanced and powerful functionality.

As known to those ordinarily skilled in the art, plug-ins or plug-in applications are supplementary programs to the user's web browser which assist the web browser to provide dynamic content that the web browser alone could not provide, such as playing sound or video. These so-called helper applications run as a separate application and require that a second window be opened. Plug-ins are easily installed and used with the web browser. A plug-in application is recognized automatically by the browser and its function is integrated into the main HTML file that is being presented. Exemplary popular plug-ins are Adobe's Acrobat, a document presentation and navigation program that lets user's view documents just as they look in the print medium; RealNetworks' RealVideo or RealAudio streaming media players, and Macromedia's Shockwave for Director, an interactive animation and sound player. Hundreds of plug-ins are available for download/install on the web or install via CD-ROM.

5.4.1 Plug-in Subservient

In this embodiment, the special client software 114 (in FIG. 11) functions as the master or manager of the various plug-ins that are associated with the electronic card. These plug-ins are bidirectionally coupled to the special client software via the API layer. The special client software generally functions as described above—DSP for communicating with the electronic card, initialization, interaction with the web browser, interaction with the PC's sound system, etc. Additionally, the special client software basically provides the front end interface to the user and manages/launches the plug-ins when needed.

The plug-ins are generally sponsored by and/or written by various service providers, web merchants, or any company for that matter. By definition, these plug-ins are other software applications in the PC that are called into service whenever the web browser, or in this case, the special client software needs them. Because these plug-ins are merely subservient support applications, their functions are controlled or otherwise limited by the special client software.

As the manager of the plug-ins, the main special client software keeps track of the group ID. As described above, the group ID is essentially the identifying number or code that represents the sponsoring entity, whether it is an individual, a company, or some other organization. For example, XYZ Corporation may sponsor a set of the electronic cards in accordance with the present invention to promote their website and product lines. They distributed the electronic cards to members and potential members so that they could use them to purchase products, request sales information, earn incentive points, obtain coupons and other discounts, and otherwise receive updated news about the company. Thus, XYZ Corporation is assigned a unique group ID that are provided in their electronic cards. Electronic cards sponsored by other companies will have their own respective companies' group ID. Theoretically, a user could have many different electronic cards just like some users have many different credit cards.

So, when the electronic card associated with a particular web merchant transmits some data to the PC, the special client software performs the DSP functionality to recover the data and checks the group ID. Based on the group ID, the special client software looks for the appropriate plug-in and enables its functionality. If the plug-in is outdated, the special client software will access a newer version of the plug-in over the web, download it, and install it. This may be done with or without the assistance of the user.

The special client software is equipped with additional functionality, because it is more than just a switch that routes the electronic card data to the proper plug-in based on the group ID. Assume that the special client software is sponsored by a particular bank, let's say the user's Visa issuing bank. This special client software associated can update and keep user passwords and IDs, check the user's credit card if it is delinquent, keep track of the number of times the user accesses the web, assist the user in navigating to the bank's home web page, assist the user in updating plug-ins, provide special offers to member users, scan other financial or other software in the PC and offer updates, retrieve email for the user, and numerous other functions related to the user's web experience with his bank. If a plug-in is necessary to view/hear content in a certain way, then the subservient plug-ins will be appropriately launched and enabled.

The kinds of functionality that can be supported by the plug-ins are limitless. Returning to the above example where the special client software is sponsored by the user's bank, the special client software may deliver the user to the bank's home page where, based on the content and various functionality programmed in that home page, the various plug-ins provide support, such as interactive buttons, sound effects, playing video, playing animation, and the like that are embedded on that web page. For example, a plug-in that provides the user with an interactive calculator to automatically calculate various aspects of his account may be provided. Furthermore, the user may be able to play a real-time video from the security camera at this bank with another plug-in. Another plug-in allows the user to send an email or message to various bank personnel to address questions concerning his account. If the user wanted to view one of his checks that did not clear, a document viewer plug-in is provided to assist the user in viewing that check.

Continuing with this example, another plug-in provides a message to the user via email whenever his account balance has reached certain thresholds (i.e., low threshold that incurs a charge) so that the user can take appropriate action. If the balance is too low, the user can quickly make a deposit or some other adjustments to his account so that he will not incur that penalty charge. Similarly, the user can have a plug-in that sends the user an email whenever anyone withdraws or deposits a certain threshold amount of money. These email or messaging plug-ins operate by automatically contacting the bank's web server, accessing the user's account, checking the account activity since that last time the plug-in logged in, and notifying the user of the activity (if any). The plug-in could send an email to the user's email address, or alternatively, display a message on the user's PC desktop in a manner similar to an active desktop.

In another embodiment, the plug-in associated with XYZ Corporation allows users to log into XYZ's website. In other words, the user takes out his XYZ Corporation electronic card and presses the TX switch. The electronic card transmits the data which includes the group ID and the microphone in the PC receives it. The data eventually makes its way to the sound card and then the special client software.

Based on the group ID, the special client software looks for the XYZ plug-in in the PC. If the plug-in is not available in the PC, the special client software accesses XYZ's website to download and install the latest plug-in. In the alternative, the special client software asks the user to download and install the XYZ plug-in. If the plug-in is detected, the special client software launches the plug-in, which then launches the web browser (if it has not been launched already). If the web browser has been launched, the plug-in navigates to XYZ's home web page. In another embodiment, if the web browser is already launched, the plug-in opens another window to navigate to XYZ's home web page.

At this point, the user is free to navigate anywhere on XYZ's website, or anywhere else for that matter. Note that the plug-in enabled the user to automatically log into the electronic card sponsor's (i.e., XYZ Corporation) website by the mere press of the switch on the electronic card. The master special client software steered the data to the plug-in associated with the group ID.

Another exemplary plug-in allows the user to log into a special members-only web page of the sponsoring web merchant/portal to obtain coupons, discounts, special offers, and other promotional items. Thus, if RST Corporation sponsored a particular electronic card and distributed the electronic cards to its members, the user of that electronic card could also log into a particular web page with the press of a button in the electronic card. On this web page are various promotional offers, discounts, and the like, which are available only to members of RST Corporation's website. The plug-in not only allowed member users to log into this special site but provided functionality that are optimized to view/hear certain information on this web page. Various interactive functionality on this web page are also made possible with the plug-in.

Another exemplary plug-in interacts with an electronic card that functions as a "voucher" or credit-limited card. The electronic card is then generic to multiple or many different web merchants. As users try to purchase merchandise with web merchant(s) that support this "voucher" electronic card, the plug-in checks the purchase to make sure that the user does not exceed his credit limit. Appropriate logic is provided in the plug-in to interact with the web browser to obtain the purchase price of an item so that the proper credit limit check can be performed by the plug-in. If multiple web merchants support this electronic card, this generic plug-in can have different credit limits for each web merchant. If a credit limit is exceeded for a particular purchase, the user is notified with some dialog box and the purchase is otherwise cancelled. Thus, as the user navigates the web and attempts to make purchases, the plug-in checks each purchase to make sure the user is not exceeding the credit limit in his "voucher" electronic card.

If the electronic card is a multi-vendor card, the special client software determines which web page the user navigates to first in this subservient plug-in embodiment. If, however, the plug-in is dominant as described below, the plug-in itself determines which web page to navigate to first. This may create some conflict between or among competing dominant plug-ins.

5.4.2 Plug-in Dominant

In this embodiment, the plug-in is dominant over the special client software. In fact, the special client software merely provides the DSP functionality and checks the group ID to deliver the electronic card-transmitted data to the appropriate plug-in corresponding to the group ID. Beyond this, the special client software relies on the plug-ins for additional support.

In one embodiment, the dominant plug-in can be an application that is placed in the tray with an icon and is running concurrently. The dominant plug-in serves as the front end interface to the user. With this front end, the merchant associated with this plug-in can place advertisement, promotions, special offers, and other items that promote this web merchant's business. By being dominant over the special client software, the web merchant sponsoring the plug-in can write more code for the plug-in to provide more functionality. Indeed, the plug-in could be designed to operate with not only the electronic card described herein but other technologies as well, such as bar code readers.

Generally, the user takes out his XYZ Company's electronic card and presses the button. This data transmission results in the special client software detecting the group ID and enabling the XYZ plug-in to be launched. The XYZ plug-in now takes over, instead of the subservient plug-in embodiments where the plug-ins serve a more supporting supplementary role to the special client software.

Once again, the plug-in can provide various functionality such as messaging service associated with XYZ's website, delinquency information of the user's credit card, and provide ads and other sales information. Essentially, the exemplary functionality described above for the subservient plug-in are applicable for the dominant plug-in except that the front end is designed around the dominant plug-in. The special client software merely assists the dominant plug-in perform its tasks, i.e., by routing the electronic card transmitted data to the proper plug-in based on the group ID.

For both the plug-in dominant and plug-in subservient embodiments, the invention increases and enhances customer loyalty through electronic medium. By merely pressing the electronic card button, the web browser would open to a particular web page, whether it is the home web page of the company sponsoring the electronic card or the special client software. By going to this web page over and over again with the simple act of pressing the button on the electronic card, the user becomes more and more exposed to that web page's messages/ads/promotions. To increase the user's loyalty to this web page, the merchant sponsoring the electronic card can offer incentive points to users for every visit to their web page using the electronic card. The plug-in can appropriately inform the web page whether the user accessed the web page through normal web browsing means or through the electronic card. Thus, even if the use had bookmarked various websites in the web browser, the loyalty program sponsored by this web merchant to promote the use of their electronic card will increase customer loyalty.

Additionally, the plug-in can navigate the user to the user's personalized web page on the web merchant's website or a particular community/interest group message board whenever the user uses the electronic card. In this way, targeted advertising, sales offers, discounts, and other coupons can be tailored to the user's specific interests/needs based on his past purchase decisions or the past purchase decisions of those group of people who are like the user (based on some statistical profiling scheme). Specific functionality needed by website can be provided by the plug-ins (e.g., playing sports game instant replay video/animation file for other community members to see).

5.5 Points/Cash Purchasing Mechanism

One embodiment of the present invention provides for a remote purchasing mechanism that involves the interaction of a consumer, a card issuer, and a web-based merchant. At the consumer end, an electronic card (or electronic card) and a client computer system are used. In the client computer system, a special client remote access software in accordance with one embodiment of the present invention is installed and running. In addition, a standard microphone, speaker(s), and a web browser are utilized. At the card issuer end, a card issuer server is provided to handle the consumer's account and authentication needs. At the merchant end, a merchant server or a server hosting the merchant's website is provided.

Figure 45:
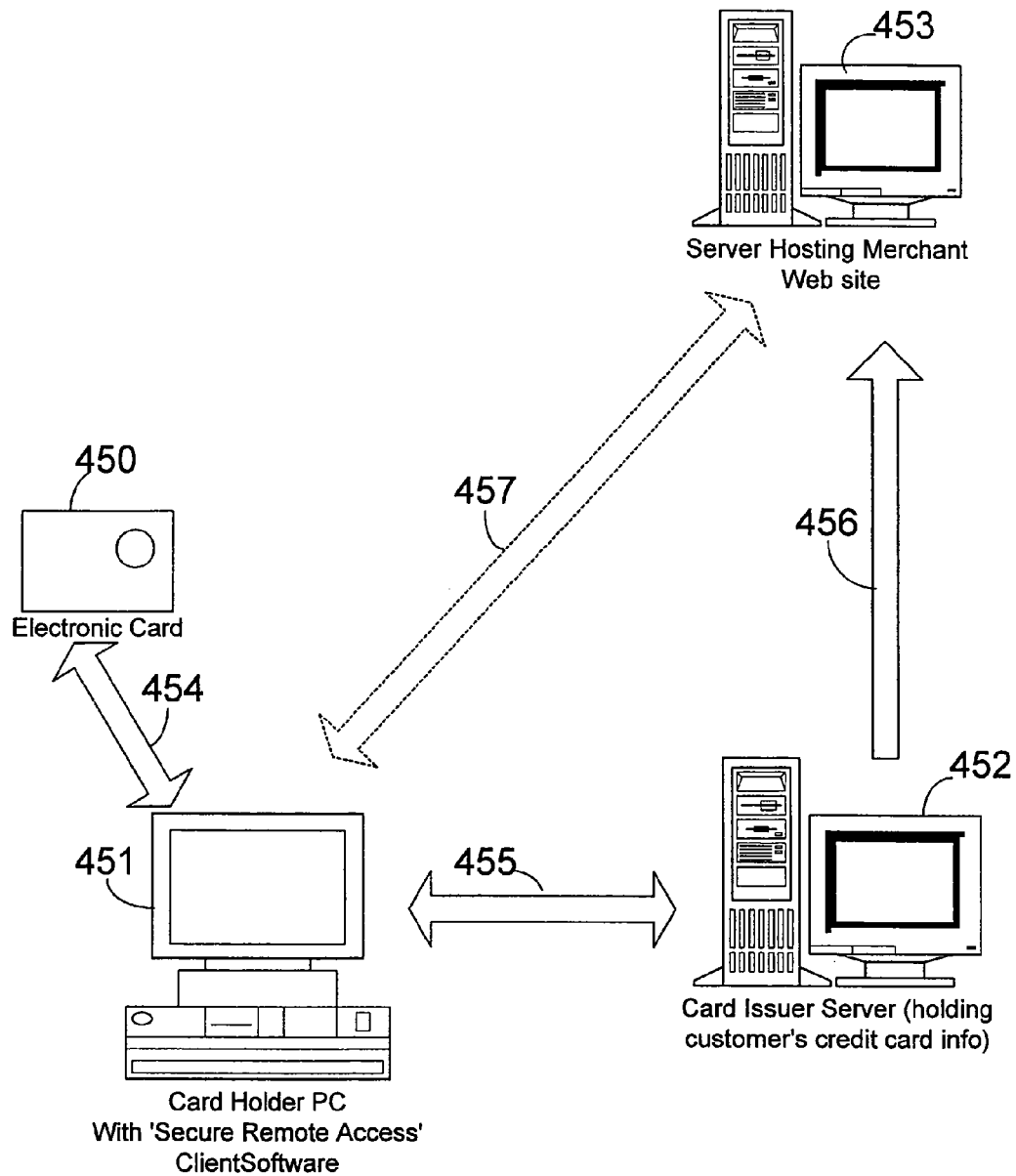
FIG. 45 shows a diagram of a secure purchasing mechanism in accordance with one embodiment of the present invention where incentive points/mileage instead of cash can be used to purchase products.

As a starting point for discussing one embodiment of the present invention, refer to FIG. 45. A consumer, who also has a membership with a card issuer 452 (to be explained further below), is equipped with a client computer system 451. The client computer system 451 has, among other things, a web browser which the consumer uses the surf the web and make purchases at various web-based stores. The web surfacing occurs on channel 457 with respect to this particular merchant server 453, which provides the product that the consumer wishes to purchase. When the consumer encounters a product that he wishes to purchase, he ultimately goes to the electronic checkout line of that particular web-based store. Normally, the web-based store, via merchant server 453, requires him to complete a form which asks for his name, shipping address, billing address, credit card number, expiration date of his credit card, and other personal information. Instead of manually filling out the form as usual, the consumer can use the secure purchasing mechanism in accordance with one embodiment of the present invention.

At the outset, the consumer is equipped with an electronic card 450 (or electronic card 450). The client computer system is a standard personal computer with a monitor operating on a Windows-based or Apple-based operating system. The electronic card 450 interacts with the client computer system 451 via medium 454. This interaction occurs to transfer the consumer's digital identification (ID) from the electronic card 450 to the client computer system to effectuate some transaction that is of interest to the consumer. The digital ID may be encrypted first in the electronic card and then transmitted to the client computer system 451.

After receiving the encrypted digital ID from the electronic card 450, the client computer system 451 opens another channel 455 to the card issuer server 452 which resides on the Internet and delivers the encrypted digital ID. The client computer system 451 may also send the URL of the merchant server in the same request or in a subsequent request. It accomplishes this using standard Internet accessing schemes by sending a request to the Internet with the uniform resource locator (URL) associated with the card issuer server 452. The card issuer server 452 is typically maintained and operated by a company that provides membership to Internet users and keeps member accounts of various selected currency. Thus, one card issuer may elect to provide frequent flyer miles to its members and allow its members to conduct sales transactions using the frequent flyer miles. Another card issuer may elect to provide incentive points to its members. Still another card issuer may elect to provide jelly beans as a form of currency to its members. Moreover, a card issuer may issue all these forms of currency. Whatever the currency, the card issuer company establishes and maintains an account database of its members. This account database includes name, shipping address, billing address, credit card number, expiration date, and digital ID. Of course, other information on the account holder may also be provided as necessary. The digital ID in the account is associated with the digital ID of the member/consumer that is programmed into the electronic card 450.

In addition to allowing the consumer to select the currency of his choice (that is also accepted by the card issuer), the card issuer also allows the consumer to allocate the amounts in that currency (and other currency) in any way that he desires for the purchase at hand. For example, assume that a book on a book merchant website costs $25. The consumer wants to buy that book but he wants to pay half in cash and the other half in accumulated incentive points at the current exchange rate. The card issuer server sends the credit card information to the merchant and subtracts (or credits) the appropriate number of incentive points from (or to) his account based on that day's exchange rate.

Having received the encrypted digital ID from the client computer system 451, the card issuer server 452 decrypts the digital ID, authenticates it, and references the account database to ensure that the digital ID corresponds to a valid member. In accordance with one embodiment, the card issuer server then opens up another channel 456 in the Internet and sends the credit card information of the member to the merchant server 453. The merchant server 453 processes the credit card information to finalize the sale and sends back a confirmation web page (which indicates that the sale is complete and typically provides a sales confirmation number) to the card issuer server 452. The card issuer server 452 then forwards the confirmation web page back to the client computer system 451. Alternatively, the merchant server 453 sends the confirmation page directly back to the consumer at the client computer system 451 via channel 457 without going through the card issuer server 452.

In another embodiment, the card issuer server 452 sends a confirmation back to client computer system 451 via channel 455 indicating that the digital ID is valid. The confirmation data may also include instructions and member profile data to the client computer system 451 to fill out the merchant's purchasing form. In another embodiment, the member profile data is stored in the electronic card itself so that no additional member profile data need to be sent back to the client computer system from the card issuer server. Having been instructed to complete the form, the client computer system 451 completes the merchant's form in the web browser in automated fashion. The consumer then sends the completed form directly to the merchant server via channel 457. The sale is finalized in the conventional manner. In this case, the card issuer server 452 merely authenticates the consumer and delivers the confirmation back to the client computer system 451.

When the confirmation and instructions data are sent back to the client computer system, the special client remote access software in the client computer system opens up a second window (in addition to the window associated with the web browser). This second window provides the indication to the user of the confirmation. This second window also provides the user with the opportunity to select the desired currency for the sales transaction and specify the allocation (e.g., 40% cash and 60% incentive points for that particular purchase). When the user specifies the currency and the allocation, the information is sent back to the card issuer server, which processes the information by affecting the appropriate accounts. In one embodiment, the card issuer server then sends the credit card information to the merchant server. In another embodiment, the card issuer server sends the credit card information concurrently with the confirmation and instruction data, and the user and card issuer server negotiate for the currency and allocation later.

Note that with this secure purchasing mechanism, the card issuer can increase membership by appealing to the many Internet users who want to use alternate forms of currency to buy goods and services over the web. Additionally, because no special software is needed at the merchant server end, members can use their desired form of currency with any web merchant, unlike the past where consumers were limited to buying/redeeming points at the select few sponsoring merchants. With increased membership and usage, the purchasing mechanism of the present invention will improve and promote name branding of the card issuer's card or card issuer's service.

For the user, a purchase can be made with any web merchant with any desired form of currency (so long as the card issuer supports it). Additionally, because the data transfer from his electronic card to the PC to the merchant (via the card issuer) and back to the user is encrypted throughout the process, additional security is provided.

The special client remote access software performs multiple tasks that are important to the various embodiments of the present invention. During the initial stages of the user's on-line purchase, the special client remote access software processes the sound waves corresponding to the digital ID that have been emitted by the electronic card 10. After having been received by the microphone and processed by the sound card, the sound waves are processed further. The special client remote access software checks the encrypted digital ID sound waves to make sure that the data is complete and corresponds to the appropriate user's electronic card 450. After the check is completed, the special client remote access software opens another Internet channel to send a request to the card issuer server 452. The special client remote access software also sends the digital ID to the card issuer server 452.

During the next stage of the sales transaction, the card issuer server 452 sends back either: (1) a confirmation that the digital ID has been authenticated or no confirmation, or (2) a forwarded web page from the merchant server that indicates that the sale has been finalized with the proper confirmation number. In the first case, the confirmation (or no confirmation) from the card issuer server includes instructions and data for the special client remote access software to complete the form that the merchant server requires for consummating the purchase. The special client remote access software then completes the form displayed in the web browser window without any intervention by the user. After automatically filling out the form, the special client remote access software is not involved any further in the transaction. The user interacts with the merchant server directly with his web browser to finalize the transaction.

In the second case, the card issuer sends the credit card and other relevant information to the merchant server. Thereafter, the merchant server finalizes the sales transaction with the information provided by the card issuer server and sends back the web page that contains the confirmation number of the order (and also some indication that the sale has been consummated such as "Thank you for your order. Your confirmation number is xyzabc123.").

In another embodiment, the electronic card is not needed. In other words, the user merely enters some digital ID with his keyboard. This digital ID is then encrypted and sent to the card issuer server, which processes this information as described above.

In summary, the various components of the system interact with each other to facilitate the purchasing process. The electronic card interacts with the special client remote access software via the client computer system's microphone to transfer a digital ID. The special client remote access software is capable of interacting with the speaker/microphone drivers in the client computer system for transferring the digital ID of the consumer, the web browser for transferring form data, and the card issuer server for authentication and other purchasing tasks. The card issuer server interacts with the special client remote access software for authentication and effectuating other purchasing tasks and the merchant server for delivering payment information. The merchant server interacts with the client web browser for standard web access and the card issuer server for transferring payment information.

The benefits to the card issuer are primarily two-fold. First, because non-conventional currency are permitted to be used by its members, membership in the card issuer company will grow and be very active in sales transactions. Second, the widespread use of the electronic card as a member of the card issuer company will promote name branding of the card itself.

The benefits to the consumer are also primarily two-fold. First, because data is encrypted throughout the entire link of the sales chain (from electronic card to PC to merchant and back), the purchasing mechanism is more secure than today's conventional method. Second, the user can use any desired form of currency (and in any amounts depending on how he allocates the cost) to make a purchase on the web with any web merchant, not just the few sponsoring merchants as he was accustomed to in the past.

5.6 Bar Code Reader

In another embodiment of the present invention, a portable bar code reader is used to scan bar codes to provide an effective link to the bar code's corresponding website for faster service. A couple of examples will be provided to clarify this embodiment.

Assume that a user purchased a merchandise from the store. This merchandise offers a $5 rebate if the proof of purchase is returned to the manufacturer. In this embodiment, the user utilizes a portable bar code reader to scan the bar code of this merchandise instead to store the bar code in the reader.

The bar code reader can then be taken to the user's PC. After launching the web browser, the user takes out the bar code reader and presses the TX switch. The bar code reader then emits the sound which contains the data corresponding to the bar code. The structure and format of this sound signal is analogous to the sound signal described above in this patent specification. Part of the data in the bar code is the URL of manufacturer's website. The URL may correspond to the customer support web page, the technical support web page, or any other web page associated with the manufacturer of the merchandise.

When the special client software detects and properly decodes this signal, it provides the URL information along with any other data in the bar code (e.g., product serial number, model number) to the web browser which promptly navigates the user to the web page specified by the URL. Once at this web page, the user can then apply for the rebate by providing the name and shipping address. The manufacturer can then send a check in the amount of $5 for the rebate. Alternatively, the user can set up an account on this website so that his account can be credited.

As another example, the URL in the bar code can direct the user to a particular web site to get more information about that product, the manufacturer's other product lines, and other related sales information. The user may also earn coupons and other discounts for simply navigating to these web pages. The bar code represents a convenient way for the user to access the relevant web sites.

5.7 Card-to-Card Information Exchange

In another embodiment of the present invention, the electronic card is two-way card where the receiver is operational and waiting for signals when the power is on. In this embodiment, the electronic card contains user profile information. This user profile information includes name, company, title, email address, telephone number, and special interests (e.g., computer hardware, video graphics, software game developer). The electronic cards essentially communicate with each other to: (1) exchange information for storage, and (2) match two users (i.e., customer and vendor, or vendor and vendor) with similar interests.

In the first scenario, the action taken by the electronic cards is analogous to the exchange of business cards. To avoid collisions, though, the transmissions should occur at different time periods. As one user nears another user, the first user can press the TX switch to send the information to the second user. Then, the second user would press the TX switch to send his information to the first user. An audible alert (i.e., beep) would indicate when the transmission is complete (or the data storage is complete). This embodiment implies a manual operation.

Another embodiment is pseudo-automatic. When the first user nears a second user, the two users would each press the TX switch to transmit their respective contact information to the other. Instead of transmitting immediately, the two electronic cards would each determine some random time period. At the expiration of that time period, the electronic card would then transmit the information. Although both users may have pressed the TX switch substantially at the same time, the generation and use of the random time period ensures that, more often than not, the two electronic cards would each transmit information at different time periods. Also, circuitry in the electronic card can be provided such that when one of the electronic card detects a valid electronic card signal from the other electronic card, and this electronic card's randomly generated transmission time period has not expired yet, this electronic card will not transmit the signal as long as it is receiving a valid electronic card signal. Even if the randomly generated transmission time period has expired, this electronic card will not transmit until all of the other electronic card's signal has been received and processed. Then, this electronic card will transmit its own information.

In both cases, an acknowledgment signal may also be implemented. In the first case, the electronic card will retransmit until the other electronic card sent an acknowledgment. Then, the second electronic card would transmit (and retransmit) until the acknowledgment signal was received by the first electronic card. In the second case, each electronic card generates a random time period. At the expiration of that time period, the electronic card will transmit the data to the other electronic card. Thus, using the randomly generated time periods for the transmissions, each card will continue to retransmit after each the expiration of each newly generated random time period until an acknowledgment from the other card is received and processed.

In the second scenario, the electronic card can be used as a means to match entities together—whether buyer-seller, vendor-developer, or employer-potential employee at a job fair. Thus, in one example, a potential buyer goes to a convention. At each booth, the vendor has a reader that can receive and process signals that are transmitted by the electronic card. When the user of the electronic card nears the booth, he presses the TX switch on the electronic card and the reader at the booth receives and processes the signal. If the company at this booth sells a product or is otherwise in a field that is related to the electronic card user's field or special interest, then the reader would indicate a match. The reader would send a match acknowledgment signal or a no-match acknowledgment signal to the electronic card. The electronic card would provide an audible alert that corresponds to the match or no-match acknowledgment signal, e.g., beep for match and buzz for no-match.

In all the scenarios above, the user can take his electronic card to his PC and later download the data therein. Either pressing another button or the same button in download mode (e.g., press twice in rapid succession) will cause the electronic card to transmit the data to the PC. The special client software could then process the data and store them in some usable format. Thereafter, the user could transfer the stored data in whatever application (e.g., Palm Pilot organizer) he desires.

5.8 Webpage-Dependent Activation

With thousands and thousands of webpages on the web, not every website will support the communications protocol of the present invention; that is, not all webpages are designed to listen for the electronic card transmission to perform some function or play an audio file that contains some data in a format that the electronic card of the present invention can understand. However, some websites support the communications protocol.

The user, however, is unaware of which website supports the communications protocol of the present invention as he navigates from one website to another. Two solutions to this problem are offered—(1) webpage provides indication, and (2) client station provides indication.

In the first solution, the website itself will indicate that it supports the communications protocol and thus, the user will be able to take advantage of the electronic card's many benefits. A simple brand logo of either the card's sponsor or the card's manufacturer can be this indication. In other cases, a more lengthy explanation will be provided on the website—something of the form "This website supports the XYZ acoustic card. Please do not press the button on your XYZ acoustic card unless prompted to do so. We will provide some feedback to indicate that your transaction with the XYZ acoustic card has been successful." This instruction may be coupled with eye-pleasing graphics and other animation to make it clear to the user that the timing of the button press is important. Thus, as the user surfs the web, he will be alerted to those websites that support the communications protocol of the present invention.

In the second client station-based solution, the client station via the special client software will provide the indication to the user. In this embodiment, the special client software is installed in the client computer station. It is resident locally and is part of the System Tray set of applications. Normally, it is "asleep" in that it provides no apparent functionality to the user. However, it is operational and communicates with the web browser or whatever application is used to access the web. The special client software is installed in the client and "wakes up" whenever it detects a webpage that supports the communications protocol of the electronic card. This is accomplished by providing a code in the accessed webpage.

As discussed above, some websites support the communications protocol and others do not. This websites that support the communications protocol can embed a special code that is also known to the manufacturer of the electronic card. When the user accesses a website that has this embedded code, the special client software "wakes up" and alerts the user that this website supports the communications protocol of his electronic card. This alert can be a flashing icon on the Icon Tool Bar of the user's Windows desktop, a flashing or pulsating icon of the electronic card on the upper right corner of the screen, or some other visual or auditory cue. This tells the user that he can use his electronic card to conduct whatever transaction he has in mind on that site.

This special code can be provided as part of the header text. The code can also be used in conjunction with some logo or graphic on the webpage that indicates the exact type of electronic card supported. For example, the user has two electronic cards—XYZ Corporation's shopping card and a EZTrade Company's online trading card. At a particular website, the website indicates via some graphic that only the XYZ electronic card is supported.

In addition, different codes can be used in different webpages (or even in the same webpage) depending on the particular function that it supports. Perhaps a one particular webpage will fill out a form for the user when the user presses the button on the electronic card, while another webpage will authenticate the user to access his account. These context- and function-sensitive codes can be detected by the special client software so that the user's press of that single button on his electronic card will accomplish different things.

In a preferred embodiment, a single card can be used to interact with a large number of different web services. This makes a single card more useful to a cardholder. It also gives rise to an opportunity for card issuers to share in the revenues obtained by the service provider that makes the card-present authentication available. For example, assume that an online stock trading service finds this card-present authentication under the present invention attractive enough that they will pay two cents to the authentication service provider every time a card is used to log in. As a way to encourage card use or adoption, the service provider could pass one of those two cents through to the issuer of the card used to effect that authentication. Ultimately, such revenue sharing could contribute to a "network effect" growing the demand for electronic cards, since all issuers and participating web services would be financially encouraged to keep their cards and services open to authenticating universally, and not just to their own services. Users under such a regime would benefit from the ability to use any card under the present invention to authenticate to any card-ready online (or telephone-based) service.

5.9 Electronic Loyalty

Despite the advantage of money as a universally accepted means of payment, some consumers may not be willing to buy certain goods with money. Just as gamblers part with their money more freely when converted into "chips," consumers may be more willing to part with an alternative form of currency. "Points" are an example of a popular alternative currency used by many incentive award programs, as described below.

What are incentive award programs and how did they come about? Merchants have long realized that due to marketing costs, the first sale made to a customer is far more expensive (and thus less profitable) than ensuing sales. In order to maximize profits, most merchants work to build long-time relationships with customers, yielding ongoing sales with higher and higher profits. While many merchants would be willing to offer lower prices to entice particular customers to stick with them and not switch to competitors, this is often impractical and always expensive. Charging different customers different prices is difficult at many levels and even if it could be accomplished, giving the incremental profit back to the consumer defeats the merchant's goal in the first place. For this reason, incentive award programs were developed.

What is an incentive award program? Incentive award programs come in two varieties—loyalty incentives and attention marketing. Loyalty incentive programs award "purchase points" to those consumers who take certain purchasing actions. A classic loyalty incentive program provides a benefit to consumers who stick with or are loyal to a merchant and not switch to competitors, while "punishing" those who switch from brand to brand. Typically, an incentive is an incremental benefit that is worthless until enough points have been earned to redeem for a discount or a gift. Attention marketing programs reward consumers with "attention points" for paying attention to a marketing message.

The loyalty incentive program will be discussed first. A highly successful form of loyalty incentive award program with which many people are familiar is the airline mileage program, although non-mileage-based programs also are widespread. Mileage programs currently are conducted by almost every commercial airline. Travelers can earn mileage or mileage points by purchasing an airline ticket and actually taking the trip. The exact number of miles earned by the traveler is usually calculated by some formula based on the distance of the trip. After accumulating a certain number of miles or mileage points, the traveler can redeem his miles for a free or discounted airline ticket or some other award (e.g., coffee maker, free upgrades) that he can select from a catalog. The price-shopping, airline-switching fickle traveler would arguably not benefit (or not benefit sooner) than the traveler who is loyal to one airline.

Similar incentive award programs also have begun to flourish in an online environment over the Internet. Buyers can earn points online, for example, by purchasing goods from an online merchant, clicking on advertisements, filling out registrations and surveys, and performing various other activities of interest to merchants, advertisers and other companies. Users accumulate "points" into an "account" from which they can redeem their points for certain goods or services.

Even those consumers who are not regular online users or even familiar with the Internet may well be familiar with a variation of the point system. Many merchants award discounted or free merchandise to loyal and frequent customers. For example, by ordering a regular meal at a restaurant on ten different occasions (recorded on a stamped card), the customer may get 50% off the eleventh meal (or even get the eleventh meal free). Similarly, another merchant might give a loyal customer a free drink with his meal after every seventh or tenth visit. Another merchant might give $10 off the next purchase for a first-time customer. These variations on the loyalty incentive point system are just that—variations. Even though an actual physical card may be stamped after each visit to a restaurant or a gift certificate is handed out, these stamps and gift certificates are analogous to points, albeit in non-electronic form.

The tremendous power of loyalty incentives is this: the more points that a consumer has earned, the more the consumer wants points. Each incremental point is more and more valuable to the consumer because high point levels are associated with more exclusive (and valuable) benefits. So, the merchant benefits from the increased returns. The best customers are the least likely to switch to a competitor.

Although most point systems are still merchant-specific, more and more merchants are forming relationships with one another so that points are more universally accepted across different merchants, and thus more desirable to consumers. For example, purchasing goods from one merchant can result in earning points with another merchant. A consumer's use of his credit card might earn the consumer miles with Jones Airlines. Similarly, points earned through one merchant may be redeemable with another designated merchant. Thus, the consumer is no longer restricted to one merchant's catalog at redemption time.

But this is deceptive. Typically, points earned at an online store are usually not redeemable at a conventional bricks-and-mortar store, and voce-versa. Thus, the thousands of points earned at XYZ.com is worthless at the local department store. If a universal points database existed that allowed consumers to accumulate points and store points, much like a bank, as well as redeem them almost anywhere, consumers might be more motivated to participate in incentive award programs with greater frequency.

Thus, incentive award systems have demonstrated the viability of altering consumers' behavior if consumers perceive the points to be of value. Yet, the fixed-merchant nature and the inability to earn/redeem points between online and offline stores in existing incentive award systems often have limited the perceived value of points.

In accordance with one embodiment of the present invention, the Uniform Points System uses payment units, which can be in the form of actual points (and credit points) or cash (and credit). Uniform Points can be either purchase points or attention points. These points are part of a rewards system that rewards users who use the electronic card of the present invention. Although Uniform Points can be viewed as a separate form of currency to purchase products, Uniform Points are better viewed as a means of building a mutually beneficial relationship between merchants and buyers. Thus, as users earn more and more Uniform Points, the users are rewarded with gifts and redeemable merchandise, while merchants are rewarded with more sales-generating traffic on their websites.

Although any form of payment unit can be used in the Uniform Points System of the present invention (including a mixture of cash and points), the patent specification will describe the embodiments with respect to points. However, one skilled in the art will recognize that the implementation details will be similar if money or alternative forms of currency were used instead of points.

How do users earn points? Participating merchants award Uniform Points to consumers, and allow for their redemption, in numerous ways. More importantly, these participating merchants have made these Uniform Points so universal that Uniform Points earned through one merchant can be redeemed with another merchant, and vice versa. Additionally, Uniform Points can also be converted into miles for many frequent flyer programs, and vice versa.

These Uniform Points can be earned in any number of ways, such as by registration, by purchase of product/service, and by viewing advertisements. The consumer is not necessarily required to visit any one website to earn points; rather, Uniform Points can be earned through any website or conventional bricks-and-mortar store that awards Uniform Points (i.e., those merchants with some relationship to Yahoo). Uniform Points can also be earned in other ways. Consumers can earn points from select merchants by:
 (1) switching long distance carriers,
 (2) updating user registration information periodically (to track changing interests)
 (3) trying out a new service with an already existing membership,
 (4) signing up for a new credit card,
 (5) entering a merchant-sponsored sweepstakes,
 (6) signing up for a trial membership to any merchant-sponsored club,
 (7) playing online games such as poker, blackjack, and slots,
 (8) answering questions for an online poll,
 (9) trying a new product with no obligations,
 (10) requesting a free quote on a vehicle,
 (11) visiting a website (although some registration may be involved),
 (12) writing and submitting product reviews (e.g., books, music, video),
 (13) downloading software from a website,
 (14) signing up a friend to some club membership,

(15) serving an online community by answering user questions,
(16) Points could be awarded as a multiplier (i.e., "Click here to double your points"),
(17) Points could be awarded offline as well (e.g., for using a shopping card at a supermarket), and
(18) purchasing a threshold amount of goods from multiple merchants.

This list is merely representative of the ways in which points can be earned. This list is not meant to be a comprehensive list. As mentioned above, these Uniform Points are universally accepted among the participating merchants. Thus, points earned through one merchant can be redeemed through another merchant. So, when a consumer earns 50 points through a music merchant by purchasing some compact discs, that consumer can redeem those earned 50 points with a pet supply merchant to purchase dog food. Of course, the music merchant may have one set of rules on how to earn these points and the pet supply merchant may have a different set of rules on how and when to redeem points and what thresholds are required for redemption. So long as these rules are observed, the consumer can use points like cash and apply them across different merchants.

Figure 47:
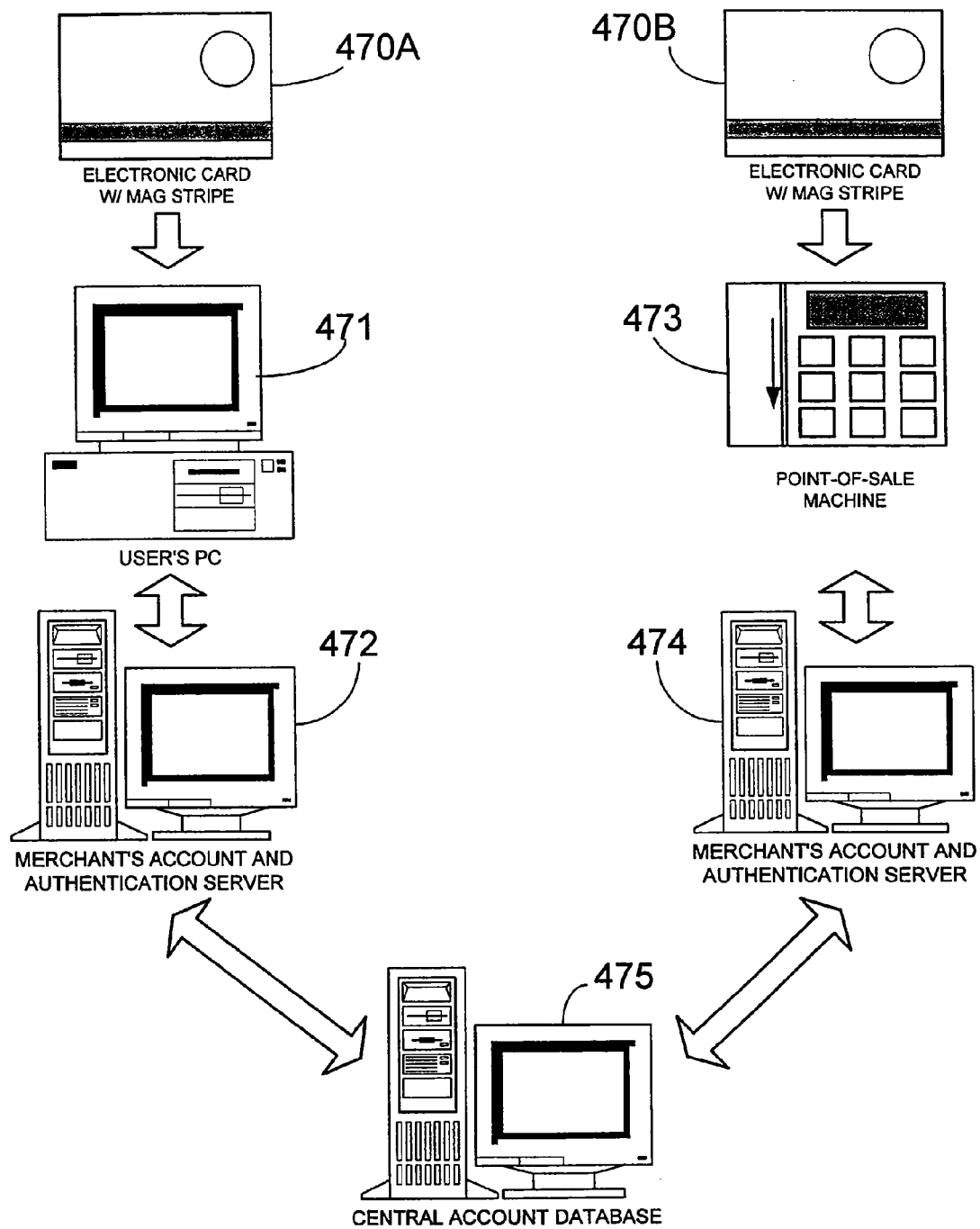
FIG. 47 shows a high level view of another application where benefits are achieved using the versatile electronic card with the conventional magnetic stripe in a system that utilizes a central account database.

Referring now to FIG. 47, the Uniform Points System will now be described. The central database 475 keeps track of points, gift certificates, and cardholder information. Points are as described above. Gift certificates are items that have a specific cash value that can be used at the gift certificate-sponsoring merchant's store, whether online or offline. Thus, a $20 gift certificate from XYZ Corporation is typically redeemable only at the XYZ store. The central database 475 can be considered a points/use database which keeps track of any online and offline card use, whether the card is used as a loyalty card (for earning and redeeming incentive points), a gift certificate, or an ATM card. Each registered user is associated with his own account for each of these uses. Usually, the central database 475 is periodically synchronized with each participating merchant's own account database, such as that associated with merchant account server 472 and 474. In other embodiments, the central account database 475 keeps the only copy of the account information so that the merchant's server 472 or 474 would have to access the central database to access any particular user's account information.

If the electronic card is used as a wireless acoustic card as described in this patent specification, the press of the button on the electronic card 470A triggers the transmission of a data stream. This data stream can be as simple as the card-specific digital ID. The user's PC 471 detects this data transmission and relays this card-specific digital ID (among other data described above) to the specific merchant's account and authentication server 472. Of course, the user may have automatically launched into (via the activation of the electronic card) or manually navigated to this merchant's website. The merchant's website would support the communications protocol of the present invention.

After performing whatever authentication tasks are needed, the server 472 accesses the account therein of the authenticated user. Based on the action taken by the user, the user's account is adjusted. For example, the user may have 50,000 points in his account and by the mere press of the electronic card button, he spent 20,000 points on a brand new color TV set. With this action, the central database subtracts the 20,000 points from this user's account. In another example, the user has an electronic card that represents a $20 gift certificate. The user accesses the merchant's website and uses $17 of this $20-valued gift certificate to purchase a CD. The central database adjusts this user's gift certificate account to reflect this purchase so that only $3 is now remaining. As a gift certificate, the electronic card of the present invention replaces the current paper gift certificates that merchants hand out.

Alternatively, the user could actually walk into a conventional bricks-and-mortar store and use the electronic card 470B. Because the current electronic card 470B has the traditional magnetic stripe on them, this electronic card could be used with any conventional magnetic stripe card reader 473. The authentication is performed via the merchant's account server 474 and the user's account is accessed via the central account database 475. This central account database 475 is the same database used for the non-magnetic stripe embodiment described above.

Thus, the versatile electronic card 470A/470B with the acoustic electronics and the conventional magnetic stripe makes it more attractive and convenient for the user to shop online and offline. On top of that, the central account database 475 increases the user's offline purchasing power through online purchasing actions, and vice versa. A user can shop online and earn incentive points. Because of the universally used central account database 475, these incentive points that were earned online can now be redeemed offline at any participating bricks-and-mortar store. The central account database 475 keeps track of any earned/redeemed points.

5.10 Additional Synergies with Voice

The present invention's preferred communication method (data modulated on sound) gives rise to a number of convenient synergies when implemented with known voice technologies such as voice recognition and voice verification, Voice over Internet Protocol (VoIP). Generally, one of the goals of the present invention is to provide convenient, portable, physical authentication means for the Internet, in a known form factor used in the offline world, that does not require any infrastructure change unlike the traditional smart cards. The recent proliferation of voice applications for the Internet, such as voice recognition, and voice navigation for Internet browsers assures that sound infrastructure (microphones and speakers) are rapidly penetrating into all Internet platforms. The microphones being installed for those other purposes, generally speaking, are well suited for the card communications techniques described herein.

Generally, the strength of a security system is measured, in part, by the number and diversity of the security "factors" being required. Three such genres of security factors are commonly known as "something you know" (e.g. a password); "something you have" (e.g. a card, such as the reader-free electronic card described herein); and "something you are" (e.g. biometric measures such as voice.) For example, a password by itself may not provide complete security, because a holder may inadvertently disclose it, or the password can be guessed. A reader-free electronic card in accordance with the present invention can be lost or stolen. But when, as in accordance with various aspects of the present invention, a password is used as one factor, and the authenticated presence of a reader-free electronic card is used as another, security is enhanced.

For some applications, however, including high security transactions like extremely large financial transactions, there is no security factor equal in value to assuring that the correct person is present. Voice authentication as a biometric security factor is known in the art of computer security. Typically, these schemes will require the authenticating user to read arbitrary text, and then compare these vocal patterns to the authentic user's own speech patterns to verify conformity. One limitation of biometric security schemes, and voice authentication is no exception, is the requirement of special equipment to receive the biometric data (e.g. fingerprint or iris readers, or microphones and sound systems for voice authentication). There are abundant known techniques for deploying voice authentication on a single computer, or over a network by sending voice sounds to and receiving authentication codes from, a network server.

But the fact that any issuer of the acoustic reader-free electronic cards of the present invention can be sure that each and every base station includes a microphone solves this barrier to introducing voice authentication as a security factor. Thus, one embodiment of the present invention enables the proprietor of a security system to deploy a regime including the "something you have" factor in the form of a card or other physical token practicing the acoustic data transmission techniques discussed above, plus any combination of a password or other "something you know" factor, plus biometric verification by voice authentication.

Lack of perceived security and a lack of user trust remain the principal deterrents to people adopting habits of shopping and doing commerce online. Because the base station described above includes a microphone and sound system, increased personal relationship and trust can be established under the present invention by requiring presence of a reader-free electronic card, and adding the personal attention of speaking with live people using VoIP techniques.

Major banks are moving to increase adoption of their online account services. Online banking represents a significant cost savings over in person banking at branches, and even telephone banking. But customers may hesitate to conduct banking activities online because over the Internet, no particular customer service representative can interact with shoppers directly. But known VoIP systems enable voice-based conversations with the other persons visiting a particular website, or with customer service representatives manning that site.

Under the present invention, when combined with online banking or other secure online services, an acoustic electronic card can be activated to enable various functionality within the sound infrastructure. The customer learns to trust the Internet and his transactions therein because of the guaranteed "card presence" transactions that are accepted by online merchants/financial institutions. Furthermore, conversations can be recorded for resolving non-repudiation issues for online banking and other conversations with merchants. The user can also choose his desired customer service representative. In the non-financial Internet world, one embodiment of the present invention allows authentication and limited audience chat plus voice chat in a message board or chat room.

6.0 Non-Acoustic Embodiments

Instead of acoustics, another embodiment of the present invention uses radio frequency (RF) and magnetic field transmission/reception techniques to couple the electronic card and the client computer station.

For RF, data from the PC to the electronic card is transmitted using VHF or UHF frequencies. These high frequencies can be achieved by software manipulation at the PC. The CPU of the PC uses its data-address bus as the transmission antennas and modulating signals on the bus. The electronic card receives and decodes these signals with standard RF decoding circuitry. Alternatively, the PC can employ On-Off RF modulation by halting and restarting the CPU. The electronic card receives and decodes these signals with standard RF decoding circuitry.

For magnetic field, the PC speakers transmit the data from the PC to the electronic card. However, instead of picking off the audio signal, the electronic card picks up the magnetic field created by the speakers and their wires which are present when the audio is played. The pick-up element in the electronic card is a loop antenna.

6.1 Radio Frequency (Rf)

Instead of acoustic signals, the client computer station (e.g., personal computer) can generate RF signals to the electronic card. With appropriate RF decoding circuitry, the electronic card can receive and decode the RF signals to process the data therein. Again, no additional hardware would be necessary in the PC to generate the RF signals.

The unique RF transmission technique in the PC involves using the address-data bus as the transmission antenna and the CPU as the oscillator. The PC currently generates electromagnetic signals because the electronic circuitry in the PC applies voltage to the various buses causing current to run along the wires. The electromagnetic signal is RF in nature because the PC's microprocessor speed is typically in the RF range (tens to hundreds of MHz). The microprocessor's speed is typically 100-450 MHz, although more and more new PCs are being sold with microprocessors in the gigahertz range.

As known to those ordinarily skilled in the art, the main frequency component of an RF signal is at the base carrier frequency. For a microprocessor at 100 MHz, a lot of the signal's power is present at 100 MHz. Signal power is also present at other frequencies which are whole number multiples of the main base frequency. Thus, some signal power is present at 50 MHz (multiple of 2), 33.33 MHz (multiple of 3), 25 MHz (multiple of 4), 20 MHz (multiple of 5), and so on. However, the higher the multiple, the less likely that the RF signal will have a frequency component at that corresponding frequency. Thus, at a multiple of 100, the chance that some frequency component would exist at 1 MHz is low. In some embodiments, appropriate division is performed to obtain the FSK frequencies from the higher RF frequencies.

The first step is to select the frequency of the RF transmission. In the FSK scheme utilized in this invention, the two frequencies are approximately 1 kHz apart. So, for example, one frequency can be 10.7 MHz while the other frequency is 10.699 MHz. The period of these frequencies would also have to be determined. Thus, for the frequency 10.7 MHz, the period is 93.4579 ns.

The next step is to determine how much time an instruction takes. Based on this instruction time and the frequencies selected above, the number of instructions needed for the whole period for each frequency can be determined. If frequency 10.7 MHz is selected for one of the RF frequencies, the number of instructions to fill up the above-calculated 93.4579 ns period would also be needed.

The PC's CPU itself will modulate the address-data bus for the desired frequency. In the above example, since 10.7 MHz was selected as one of the frequencies for transmission, the CPU will apply a logic "1" to the bus for half the period and apply a logic "0" for the other half of the period. The length of these logic "1" and "0" values that are applied to the bus can be controlled by the number of instructions that are delivered to the microprocessor since the time duration of each instruction is known. Accordingly, an RF frequency component will exist at 10.7 MHz in the above example. For longer periods (for lower frequencies), more instructions are delivered to the microprocessor. For shorter periods (for higher frequencies), less instructions are delivered to the microprocessor.

Figure 37:
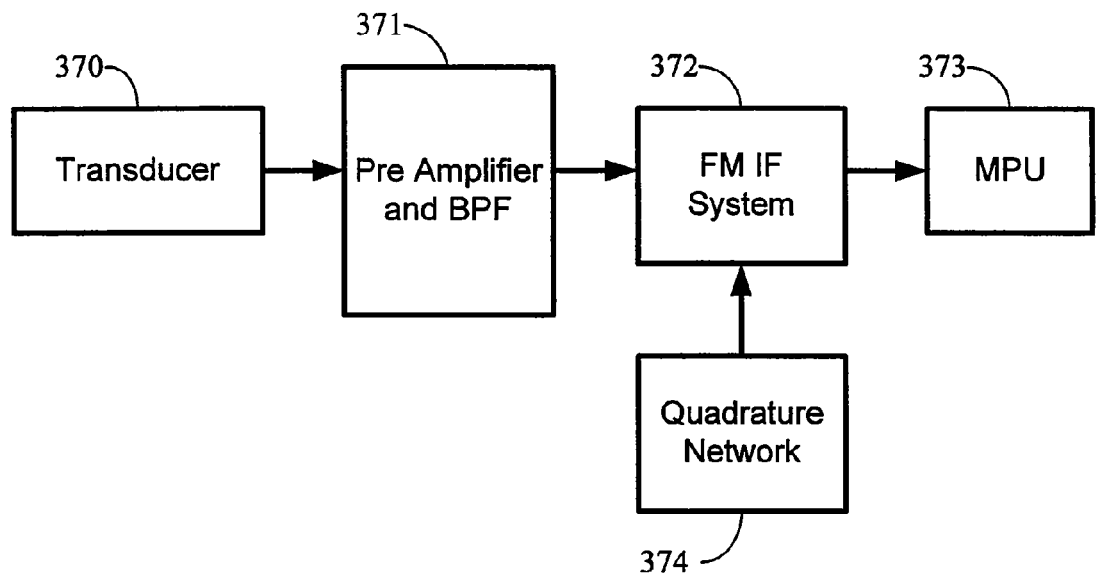
FIG. 37 shows one embodiment of the electronic card decoder when RF signals are used for the PC-to-electronic card communication path.

At the electronic card, appropriate RF decoding circuitry can be employed to receive and decode the RF signals. Referring to FIG. 37, a high level view of the RF decoding circuitry in the electronic card is provided. In this design, off-the-shelf RF IC's are used. The transducer 370 receives RF signals and converts them to workable voltage levels. The pre-amplifier and bandpass filter 371 amplify and clean up the signals for further processing. In particular, the pre-amplifier portion of the unit 371 is a high input impedance amplifier. The bandpass filter portion of the unit 371 filters the signal in order to attenuate speech (or noise) signals. The RF signal is presented to the FM intermediate frequency (IF) unit 372. A quadrature network unit 374 is provided for frequency decoding using quadrature demodulation. Finally, the microprocessor unit 373 in the electronic card accepts the digital demodulated FSK signal, or in the alternative, an analog voltage that is correlated to the input frequency.

Figure 38:
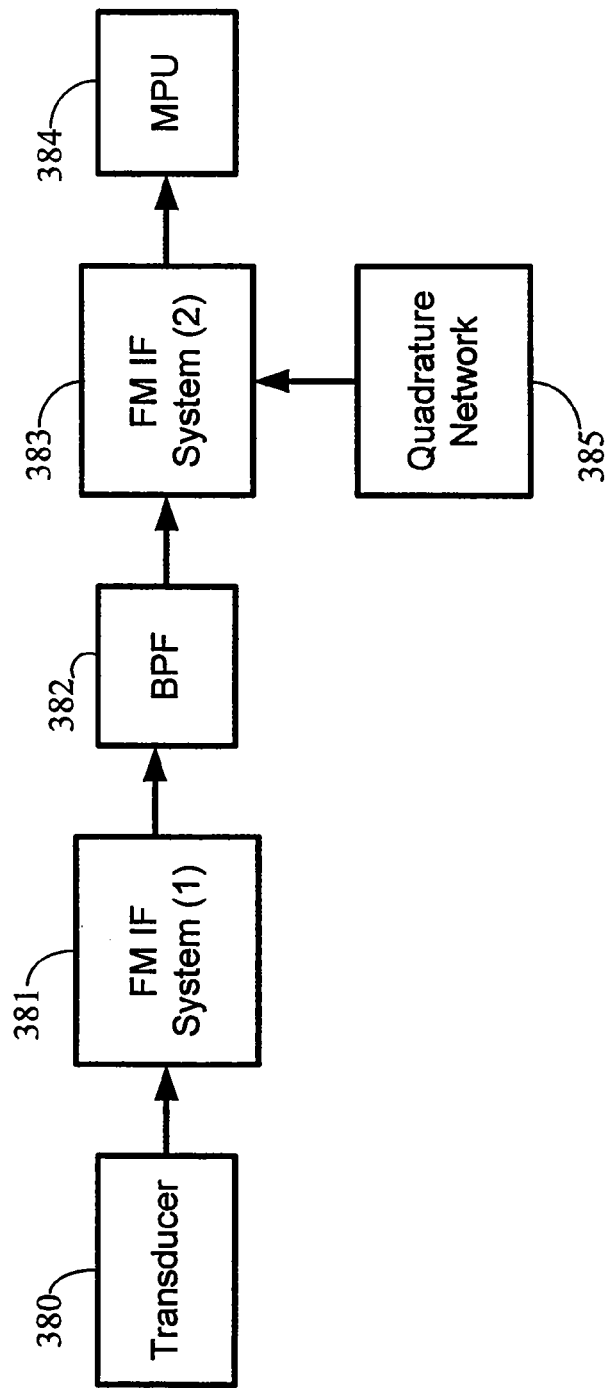
FIG. 38 shows another embodiment of the electronic card decoder when RF signals are used for the PC-to-electronic card communication path.

FIG. 38 shows an alternative embodiment. The transducer 380 receives RF signals and converts them to workable voltage levels. The RF signal is presented to the FM intermediate frequency (IF) unit 381 for filtering. The bandpass filter 382 cleans up the signals for further processing. The filtered RF signal is presented to the FM intermediate frequency (IF) unit 383 for further filtering. A quadrature network unit 385 is provided for frequency decoding using quadrature demodulation. Finally, the microprocessor unit 384 in the electronic card accepts the digital demodulated FSK signal, or in the alternative, an analog voltage that is correlated to the input frequency.

In the electronic card to PC transmission, the microphone in the PC can be used as the receiving antenna. However, the frequencies selected for the RF signal should be in the frequency range supported by the sound card in the PC. If the RF signal is in the 10 mV range, the sound card in the PC can detect it and process it as audio signals even though the transmission was via RF.

This embodiment provides several advantages. By using RF signals, the DSP software is much simpler in the electronic card. RF signals are much stronger and easier to process than acoustic signals. Lots of standard RF components are available in the market at lower cost. The use of RF avoids most acoustic-related issues, such as echo cancellation, range, and interference. The use of RF signals also result in higher bit rates. Also, in the PC-to-electronic card transmission direction, the sound card drivers in the PC need not be checked. In fact, a sound system in the PC is not needed at all for this PC-to-electronic card transmission direction.

6.2 Magnetic Field

In another embodiment of the present invention, the interactive system uses magnetic fields. When audio is played by the speakers, the currents created by driving the speakers are not negligible and thus induce a significant magnetic field. This magnetic field is generated by the speakers and the wires. However, these magnetic fields drop off significantly by a power of 3 so distance from the source of the magnetic field is important.

Figure 39:
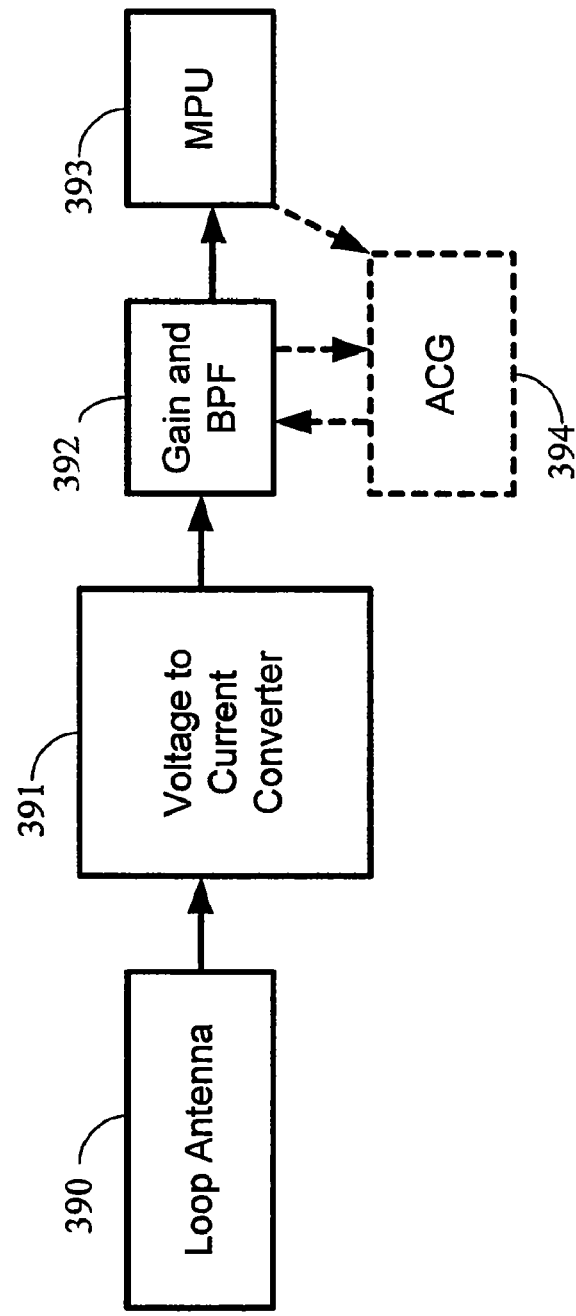
FIG. 39 shows another embodiment of the electronic card decoder when magnetic signals are used for the PC-to-electronic card communication path.

To pick up the magnetic field, the electronic card must be reasonably close to the source of the magnetic field, i.e., speakers and wires. Referring now to FIG. 39, the electronic card employs a loop antenna 390 instead of an acoustic transducer to pick up the magnetic field. Because the received the magnetic field induces a current in the loop antenna, a current-to-voltage converter 391 is provided. The remainder of the components are similar to that for decoding acoustic signals. In particular, the gain and bandpass filter 392 filters the signal for further processing. An AGC block 394 is provided for SNR improvement. The final processed signal is provided to the microprocessor unit 393 for data processing.

With respect to power, a conventional small-sized battery such as Varta LPF-25 is used. In some other embodiments, electronic card power is obtained from the PC via the Hall effect. The electronic card merely has an antenna with which to pick up signals for processing.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention.

The invention claimed is:

1. A method of retrieving information associated with a sound clip on a communication device, the method comprising:
    a. recording the sound clip, the sound clip being recorded from a digital medium;
    b. sending the recorded sound clip to a pattern recognition server, the pattern recognition server retrieving information associated with the recorded sound clip, the sound clip being sent via the communication device; and
    c. receiving the information associated with the recorded sound clip, the information being received on the communication device.

2. The method according to claim 1, wherein the information associated with the recorded sound clip comprises at least one of coupons, incentive points, sales offers, purchase information and a web page.

3. The method according to claim 2, wherein a user can redeem one of the coupons, incentive points and sales offer by one of a manual transaction means and an electronic transaction means.

4. The method according to claim 1, wherein the sound clip is recorded from one of a television advertisement, a radio advertisement, an Internet advertisement, a video advertisement, an audio advertisement, an Internet program, a video program, an audio program, a television program and a radio program.

5. The method according to claim 1, wherein the digital medium is one of a television (TV), a computer and a radio.

6. The method according to claim 1, wherein the communication device is a personal computer, a cellphone, and a PDA.

7. The method according to claim 1, wherein said retrieving the information including matching the sound clip with at least one sound clip stored in a database server.

8. The method according to claim 1 further comprising storing the recorded sound clip as a virtual bookmark, where the recorded sound clip is stored on the communication device.

9. The method according to claim 8 further comprising sending the stored sound clip on the communication device to the pattern recognition server.

10. The method according to claim 1, wherein the communication device is connected to the pattern recognition server via one of the Internet and a wireless network.

11. A method for virtual bookmarking a content on a communication device for retrieving information associated with a sound clip, the method comprising:
    a. recording a sound clip associated with the content, the sound clip being recorded from a digital medium;
    b. storing the recorded sound clip on the communication device, the recorded sound clip being stored as a virtual bookmark for information retrieval;

c. sending the recorded sound clip to a pattern recognition server, the pattern recognition server retrieving information associated with the recorded sound clip; and d. receiving the information associated with the recorded sound clip, the information being received on the communication device.

12. The method according to claim 11, said sending being performed at one of when the communication device is connected to the Internet, when the information associated to the sound clip is needed, and when a wireless network is available.

13. The method according to claim 11, wherein the information comprises one of coupons, incentive points, and sales offers associated with the sound clip and a web page associated with the sound clip.

14. The method according to claim 11, wherein the sound clip is recorded from one of a television advertisement, a radio advertisement, a television program and a radio program.

15. The method according to claim 11, wherein the digital medium is one of a television (TV) and a radio.

16. The method according to claim 11, wherein the system is connected to the pattern recognition server via the Internet.

17. A system for retrieving information associated with a sound clip, the system comprising:

a. a record module, the record module recording the sound clip from a digital medium;

b. a send module, the send module sending the recorded sound clip to a pattern recognition server, the pattern recognition server retrieving information associated with the sound clip; and c. a receive module, the receive module receiving the retrieved information associated with the sound clip.

18. The system according to claim 17, wherein the information comprises receiving coupons, incentive points, sales offers associated with the sound clip and a web page associated with the sound clip.

19. The system according to claim 17, wherein the sound clip is recorded from one of a television advertisement, a radio advertisement, a television program and a radio program.

20. The system according to claim 17, wherein the digital medium is one of a television (TV) and a radio.

21. The system according to claim 17, wherein the system is connected to the pattern recognition server via the Internet.

22. The system according to claim 17, wherein said pattern recognition server matches the sound clip with at least one sound clip stored in a database server.

\* \* \* \* \*